US012510847B2

(12) United States Patent
Fujino et al.

(10) Patent No.: US 12,510,847 B2
(45) Date of Patent: Dec. 30, 2025

(54) TONER CARTRIDGE, IMAGE FORMING APPARATUS, AND REMANUFACTURING METHOD OF USED TONER CARTRIDGE

(71) Applicant: CANON KABUSHIKI KAISHA, Tokyo (JP)

(72) Inventors: Toshiki Fujino, Kanagawa (JP); Tachio Kawai, Tokyo (JP); Teruhiko Sasaki, Shizuoka (JP); Daisuke Abe, Shizuoka (JP); Yasunori Toriyama, Shizuoka (JP); Kaori Noguchi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/434,992

(22) Filed: Feb. 7, 2024

(65) Prior Publication Data

US 2024/0272567 A1 Aug. 15, 2024

(30) Foreign Application Priority Data

Feb. 14, 2023 (JP) ................................ 2023-021184

(51) Int. Cl.
*G03G 15/08* (2006.01)

(52) U.S. Cl.
CPC ..... *G03G 15/0886* (2013.01); *G03G 15/0882* (2013.01); *G03G 15/0889* (2013.01); *G03G 15/0894* (2013.01)

(58) Field of Classification Search
CPC ........... G03G 15/0882; G03G 15/0886; G03G 15/0889; G03G 15/0894
See application file for complete search history.

(56) References Cited

U.S. PATENT DOCUMENTS 5,722,014 A * 2/1998 Fike .................. G03G 15/0872
399/119
5,991,584 A * 11/1999 Meyer et al. ...... G03G 15/0868
222/DIG. 1

(Continued)

FOREIGN PATENT DOCUMENTS

JP 2002-251061 A 9/2002
JP 2010-107569 A 5/2010

(Continued)

OTHER PUBLICATIONS

Jul. 8, 2024 Extended Search Report in European Patent Application No. 24 157 009.2.
Co-pending U.S. Appl. No. 18/630,073, filed Apr. 9, 2024.

*Primary Examiner* — Hoang X Ngo
(74) *Attorney, Agent, or Firm* — Venable LLP

(57) ABSTRACT

A toner cartridge includes a frame including a toner accommodating chamber provided with a discharge opening; an elastic seal provided with a through hole; a pump communicating with the toner accommodating chamber; a sealing member capable of taking a sealing state for sealing the toner discharged through the through hole of the elastic seal and a discharging state for discharging the toner, discharged through the through hole, through the discharge opening; and a nipping member provided with an opening through which the toner passed through the discharge opening and the through hole is discharged to an outside of the toner cartridge. The nipping member nips the sealing member at a predetermined nipping pressure in cooperation with the elastic seal.

21 Claims, 94 Drawing Sheets

(56) References Cited

U.S. PATENT DOCUMENTS

| | | | |
|---|---|---|---|
| 7,130,560 | B2 | 10/2006 | Kawai |
| 7,194,220 | B2 | 3/2007 | Sasaki |
| 7,203,442 | B2 | 4/2007 | Matsubara |
| 7,257,353 | B2 | 8/2007 | Kawai |
| 7,310,489 | B2 | 12/2007 | Kawai |
| 7,457,569 | B2 | 11/2008 | Kawai |
| 7,555,249 | B2 | 6/2009 | Kawai |
| 7,680,444 | B2 * | 3/2010 | Kaiho ................ G03G 15/0886 399/262 |
| 7,848,684 | B2 | 12/2010 | Kawai |
| 8,180,262 | B2 | 5/2012 | Kawai |
| 8,249,485 | B2 | 8/2012 | Horikawa |
| 8,270,876 | B2 | 9/2012 | Morioka |
| 8,515,306 | B2 | 8/2013 | Kawai |
| 8,755,713 | B2 | 6/2014 | Kawai |
| 8,879,954 | B2 | 11/2014 | Nonaka |
| 9,098,012 | B2 | 8/2015 | Yamamoto |
| 9,128,417 | B2 | 9/2015 | Yamasaki |
| 9,285,765 | B2 | 3/2016 | Anan |
| 9,377,716 | B2 | 6/2016 | Yamasaki |
| 9,423,767 | B2 | 8/2016 | Fujino |
| 9,708,116 | B2 | 7/2017 | Koishi |
| 10,427,867 | B2 | 10/2019 | Koishi |
| 10,444,702 | B2 | 10/2019 | Sato |
| 10,671,013 | B2 | 6/2020 | Uesugi |
| 10,877,434 | B2 | 12/2020 | Sato |
| 10,921,749 | B2 | 2/2021 | Abe |
| 10,948,872 | B2 | 3/2021 | Ogawa |
| 10,996,620 | B2 | 5/2021 | Komatsu |
| 11,067,942 | B2 | 7/2021 | Uesugi |
| 11,327,432 | B2 | 5/2022 | Komatsu |
| 11,327,435 | B2 | 5/2022 | Abe |
| 11,378,914 | B2 | 7/2022 | Ogawa |
| 11,392,082 | B2 | 7/2022 | Nishida |
| 11,409,227 | B2 | 8/2022 | Uesugi |
| 11,567,447 | B2 | 1/2023 | Komatsu |
| 11,573,525 | B2 | 2/2023 | Abe |
| 11,592,766 | B2 | 2/2023 | Ozaki |
| 11,662,673 | B2 | 5/2023 | Ozaki |
| 11,774,906 | B2 | 10/2023 | Abe |
| 11,822,265 | B2 | 11/2023 | Ozaki |
| 11,846,910 | B2 | 12/2023 | Komatsu |
| 11,906,927 | B2 | 2/2024 | Fujino |
| 11,927,910 | B2 | 3/2024 | Murakami |
| 2012/0269540 | A1 | 10/2012 | Kawai et al. |
| 2016/0116861 | A1 | 4/2016 | Yamaguchi et al. |
| 2017/0285527 | A1 | 10/2017 | Okabe |
| 2020/0301352 | A1 | 9/2020 | Matsumaru |
| 2022/0050404 | A1 | 2/2022 | Asanuma et al. |
| 2022/0050417 | A1 | 2/2022 | Nishida |
| 2023/0032591 | A1 | 2/2023 | Murakami |
| 2023/0074264 | A1 | 3/2023 | Fujino |
| 2023/0075423 | A1 | 3/2023 | Fujino |
| 2023/0176496 | A1 | 6/2023 | Fujino |
| 2023/0384711 | A1 | 11/2023 | Hirayama et al. |
| 2023/0384732 | A1 | 11/2023 | Abe |
| 2023/0400809 | A1 | 12/2023 | Matsumaru |
| 2024/0036496 | A1 | 2/2024 | Ozaki |
| 2024/0061371 | A1 | 2/2024 | Komatsu |

FOREIGN PATENT DOCUMENTS

| | | | |
|---|---|---|---|
| JP | 2012-203101 | A | 10/2012 |
| JP | 2013-160974 | A | 8/2013 |
| JP | 2022-142766 | A | 9/2022 |

* cited by examiner (a)

(b)

(a)

(b)

(c)

(a)

(b)

(a)

(b)

(a)

(b)

(a)

(b)

(a)

(b)

(a)

(b)

(a)

(b)

(c)

(a)

(b)

(a)

(b)

(a)

(b)

(a)

(b)

(a)

(b)

(a)

(b)

(a)

(b)

TONER CARTRIDGE, IMAGE FORMING APPARATUS, AND REMANUFACTURING METHOD OF USED TONER CARTRIDGE

FIELD OF THE INVENTION AND RELATED ART

The present invention relates to a toner cartridge used for an image forming apparatus, the image forming apparatus used for forming an image on a recording medium (material), and a remanufacturing method of a used toner cartridge in which the used toner cartridge is re-manufactured as a newly usable toner cartridge.

In general, in an image forming apparatus of an electrophotographic type, in order to supply toner (developer) consumed with image formation, there has been known a constitution in which a toner cartridge accommodating the toner is provided detachably mountable to an image forming apparatus main assembly.

According to Japanese Laid-Open Patent Application No. 2002-251061, a toner cartridge such that a frame thereof is provided with a toner discharge opening, and an elastic seal and a plate member are stuck to a periphery of the toner discharge opening, and then a sealing tape is stuck to the plate member is disclosed. Further, on a side opposite from the plate member via the sealing tape, a toner shutter is provided. The toner shutter receives drive (driving force) from the image forming apparatus main assembly, so that the toner shutter is constituted so as to be movable between a sealed position where the toner discharge opening is sealed and an open position where the toner discharge opening is open.

SUMMARY OF THE INVENTION

A principal object of the present invention is to provide a toner cartridge which is a further development of a conventional constitution, an image forming apparatus including the toner cartridge, and a remanufacturing method of the toner cartridge which is used up.

According to a first aspect of the present invention, there is provided a toner cartridge for supplying toner to an outside, comprising: a frame including a toner accommodating chamber configured to accommodate the toner and provided with a discharge opening through which the toner accommodated in the toner accommodating chamber is capable of being discharged; an elastic seal provided with a through hole and disposed on an outer surface of the frame so that the through hole communicates with the discharge opening; a pump communicating with the toner accommodating chamber and configured to discharge the toner, accommodated in the toner accommodating chamber, through the discharge opening; a sealing member capable of taking a sealing state in which the toner discharged through the through hole of the elastic seal is sealed and a discharging state in which the toner discharged through the through hole is discharged through the discharge opening; and a nipping member provided with an opening through which the toner passed through the discharge opening and the through hole is discharged to the outside of the toner cartridge, wherein the nipping member nips the sealing member at a predetermined nipping pressure in cooperation with the elastic seal.

According to a second aspect of the present invention, there is provided a toner cartridge for supplying toner to an outside, comprising: a frame including a toner accommodating chamber configured to accommodate the toner and provided with a discharge opening through which the toner accommodated in the toner accommodating chamber is capable of being discharged; an elastic seal provided with a through hole and disposed on an outer surface of the frame so that the through hole communicates with the discharge opening; a pump communicating with the toner accommodating chamber and configured to discharge the toner, accommodated in the toner accommodating chamber, through the discharge opening; a sealing member capable of taking a sealing state in which the toner discharged through the through hole of the elastic seal is sealed and a discharging state in which the toner discharged through the through hole is discharged through the discharge opening; a stirring unit including a rotation shaft rotatably supported by the frame and a stirring sheet which is fixed to the rotation shaft and which is for stirring the toner, accommodated in the toner accommodating chamber, by being rotated together with the rotation shaft; and a film member which is fixed to the rotation shaft at one end portion thereof and which includes an adhesive surface having an adhesive force at the other end portion thereof, at least a part of the film member being superposed with the stirring sheet and rotating together with the rotation shaft and the stirring sheet.

According to a third aspect of the present invention, there is provided a toner cartridge for supplying toner to an outside, comprising: a frame including a toner accommodating chamber configured to accommodate the toner and provided with a discharge opening through which the toner accommodated in the toner accommodating chamber is capable of being discharged; an elastic seal provided with a through hole and disposed on an outer surface of the frame so that the through hole communicates with the discharge opening; a pump communicating with the toner accommodating chamber and configured to discharge the toner, accommodated in the toner accommodating chamber, through the discharge opening; a sealing member capable of taking a sealing state in which the toner discharged through the through hole of the elastic seal is sealed and a discharging state in which the toner discharged through the through hole is discharged through the discharge opening; a stirring unit including a rotation shaft rotatably supported by the frame and a stirring sheet which is fixed to the rotation shaft and which is for stirring the toner, accommodated in the toner accommodating chamber, by being rotated together with the rotation shaft; and a film member which is fixed to the rotation shaft at one end portion thereof and which includes a welding layer at the other end portion thereof, at least a part of the film member being superposed with the stirring sheet and rotating together with the rotation shaft and the stirring sheet.

According to a fourth aspect of the present invention, there is provided a remanufacturing method of a toner cartridge which is used up and which includes: a frame including a toner accommodating chamber for accommodating toner and a discharge opening through which the toner accommodated in the toner accommodating chamber is capable of being discharged; an elastic seal provided with a through hole and disposed on an outer surface of the frame so that the through hole communicates with the discharge opening; and an urging member which is provided with an opening through which the toner passed through the discharge opening and the through hole is discharged to an outside of the frame, the remanufacturing method comprising: a disassembling step of disassembling the urging member from the frame; a first sealing step of sealing the through hole of the elastic seal by providing the sealing member between the elastic seal and the urging member; a filling step of filling the toner to the toner accommodating chamber through a filling opening provided in the frame; a second sealing step of mounting a first seal member to the frame so as to seal the filling opening; and an assembling step of assembling the urging member to the frame so as to nip the sealing member at a predetermined nipping pressure by the elastic seal and the urging member.

Further features of the present invention will become apparent from the following description of exemplary embodiments with reference to the attached drawings.

Figure 5:
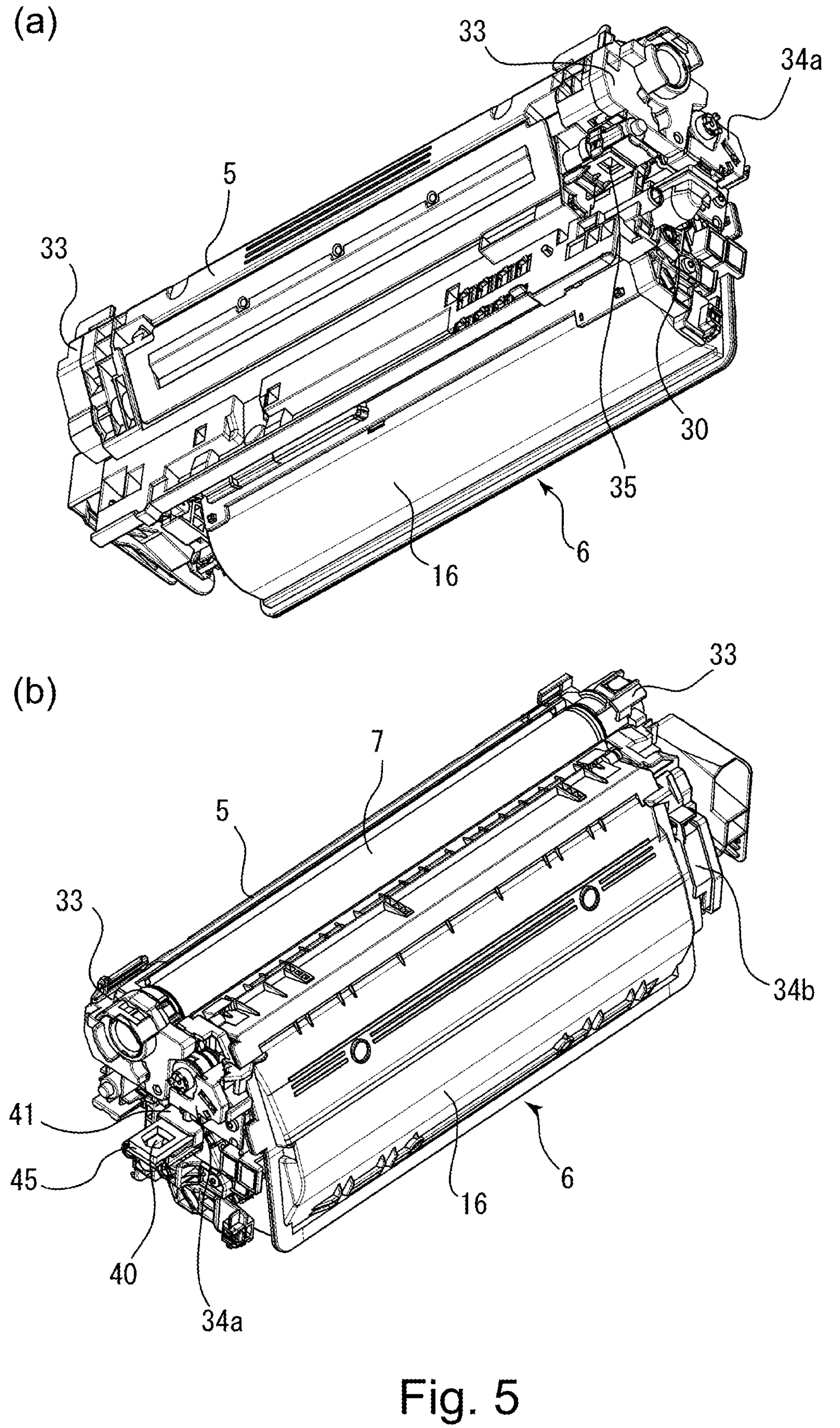

Part (a) of FIG. 5 is a perspective view of the process cartridge as viewed from a downstream side in a mounting direction, and part (b) of FIG. 5 is another perspective view of the process cartridge as viewed from the downstream side in the mounting direction.

Figure 6:
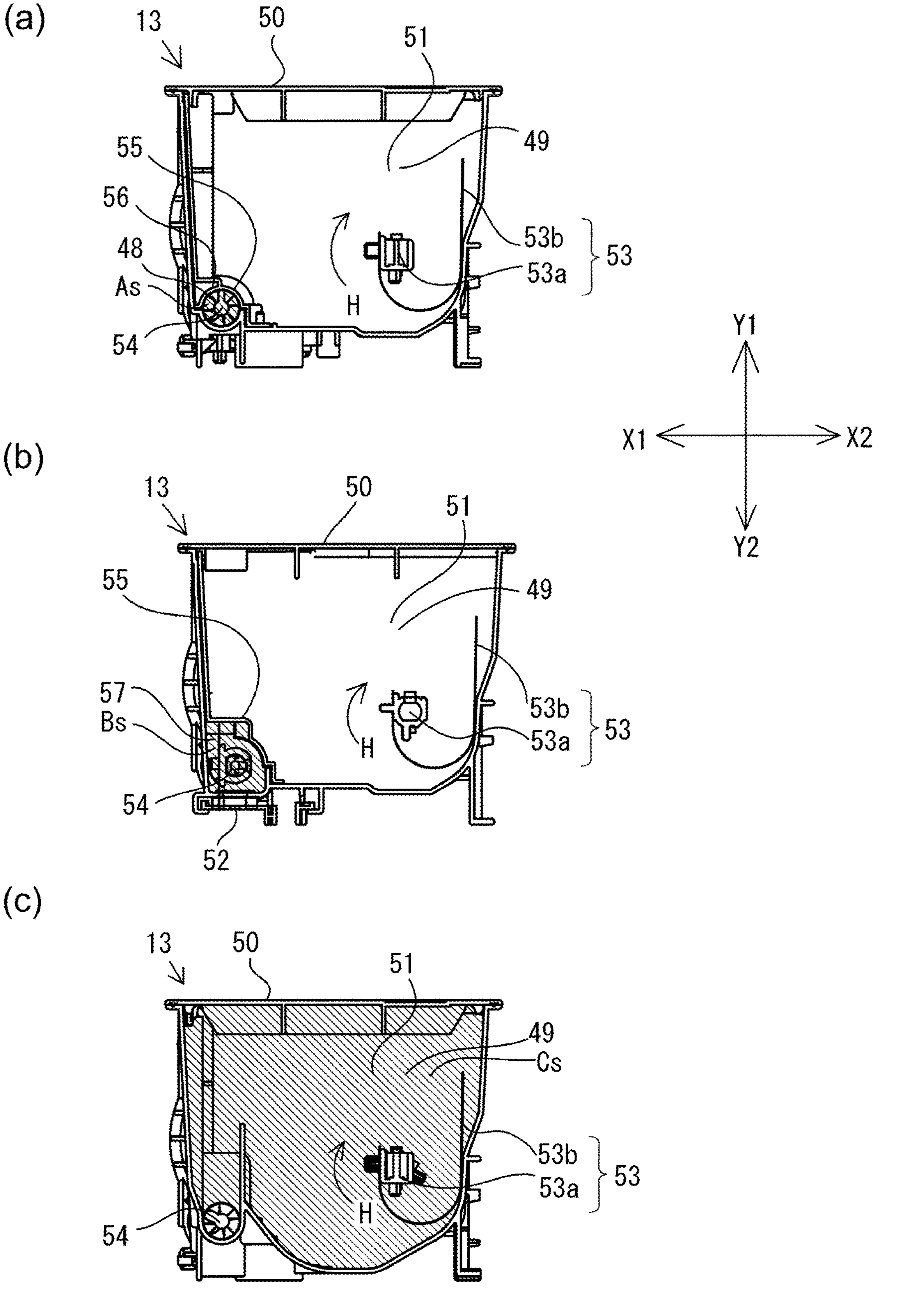
Figure 8:
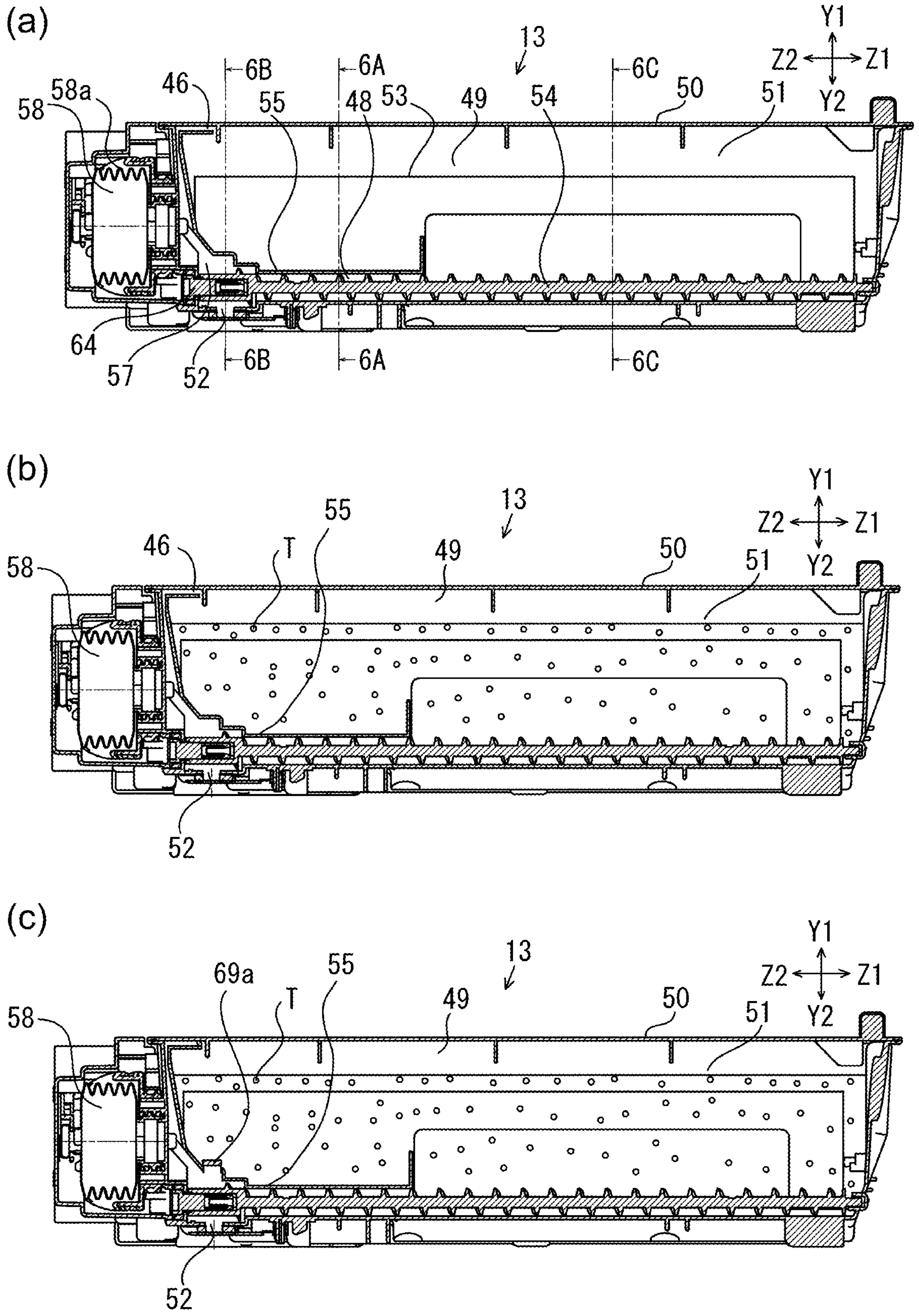

Part (a) of FIG. 6 is a sectional view showing a 6A-6A cross section of part (a) of FIG. 8, part (b) of FIG. 6 is a sectional view showing a 6B-6B cross section of part (a) of FIG. 8, and part (c) of FIG. 6 is a sectional view showing a 6C-6C cross section of part (a) of FIG. 8.

Figure 7:
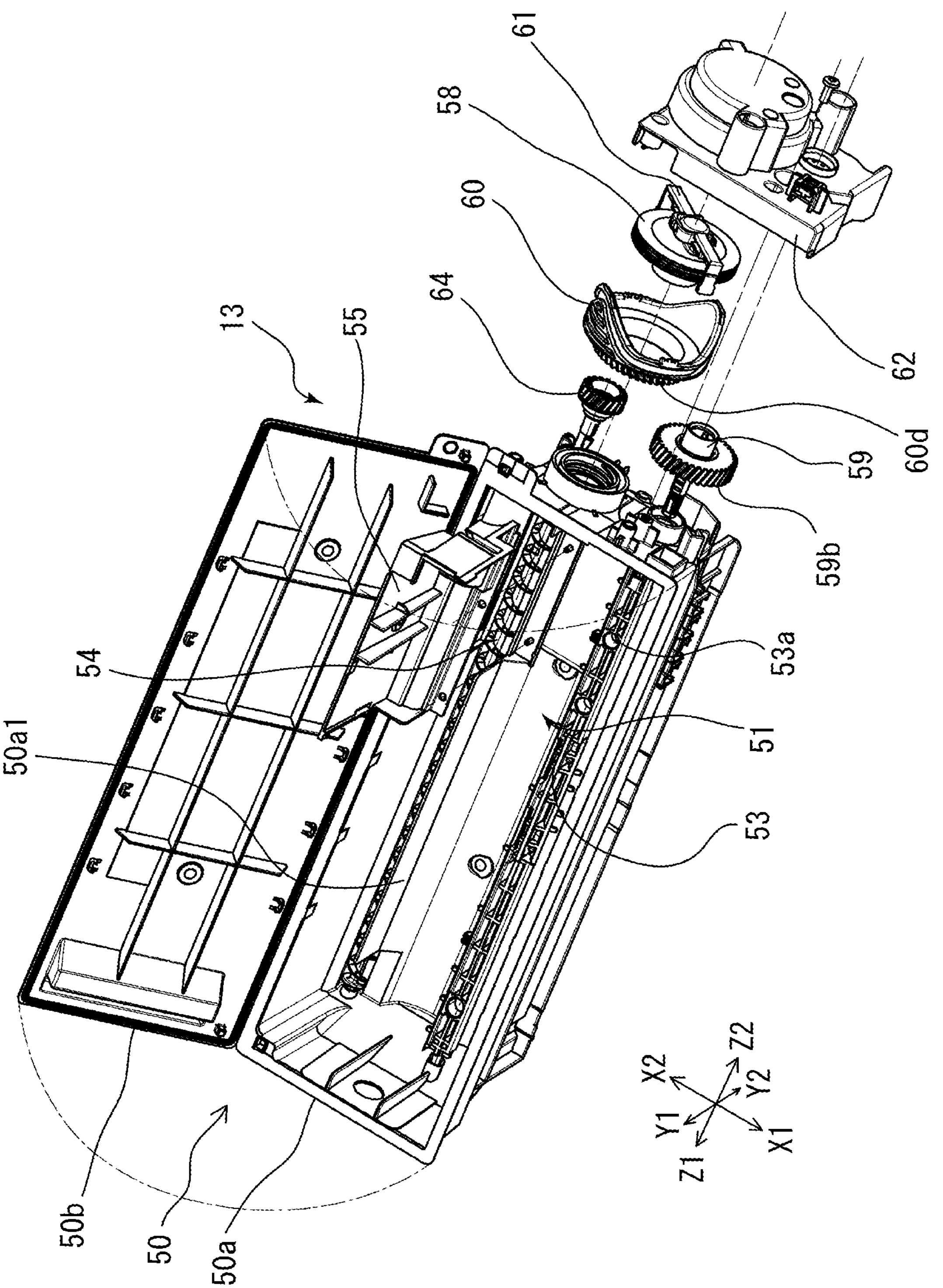

FIG. 7 is an exploded perspective view showing the toner cartridge.

Part (a) of FIG. 8 is a sectional view showing the toner cartridge, part (b) of FIG. 8 is a sectional view showing an upper surface position of toner in the toner cartridge, and part (c) of FIG. 8 is a sectional view showing the toner cartridge provided with a filter at a communication port (opening).

Figure 9:
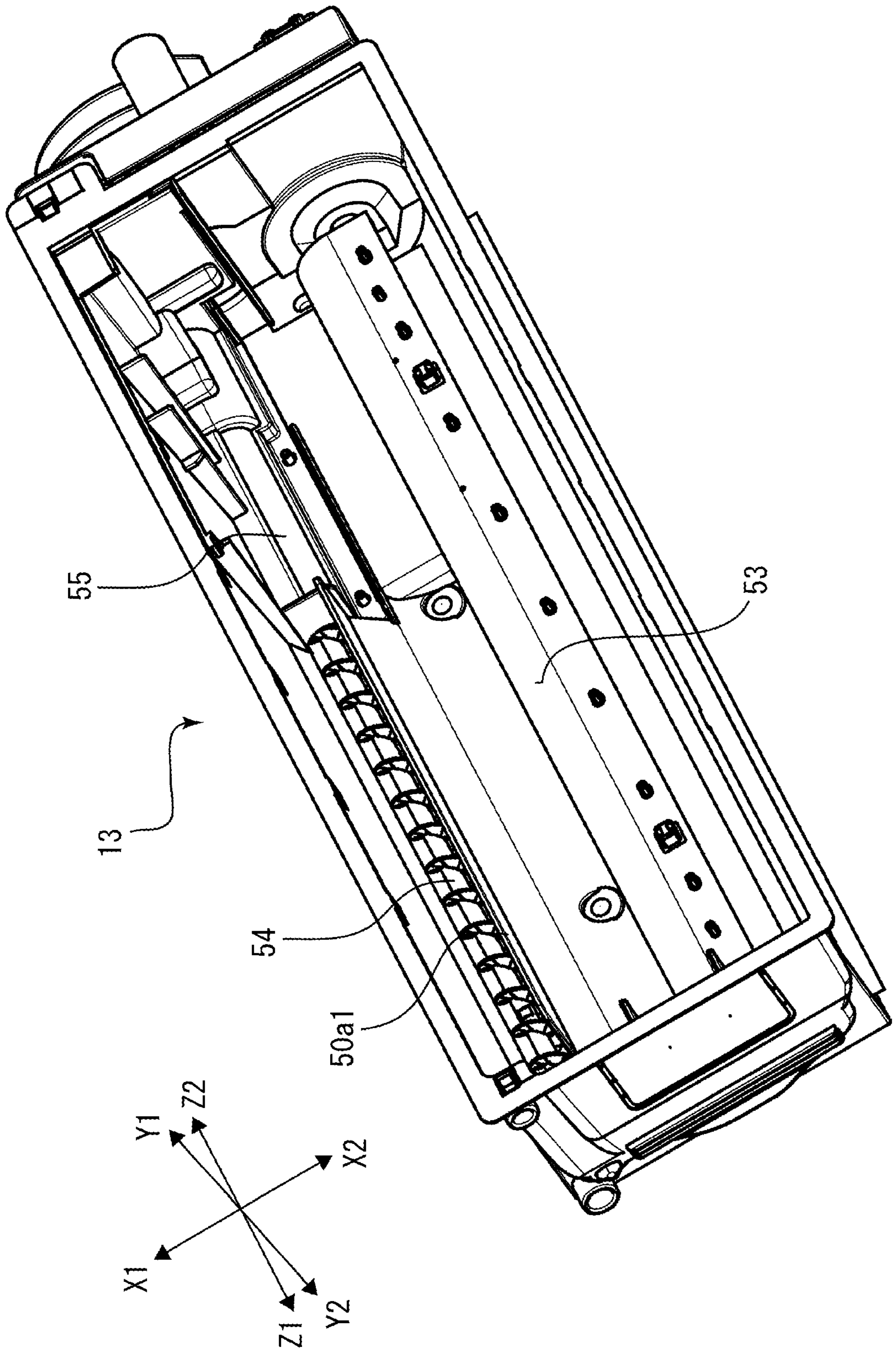

FIG. 9 is a perspective view showing an internal space of the toner cartridge.

Figure 10:
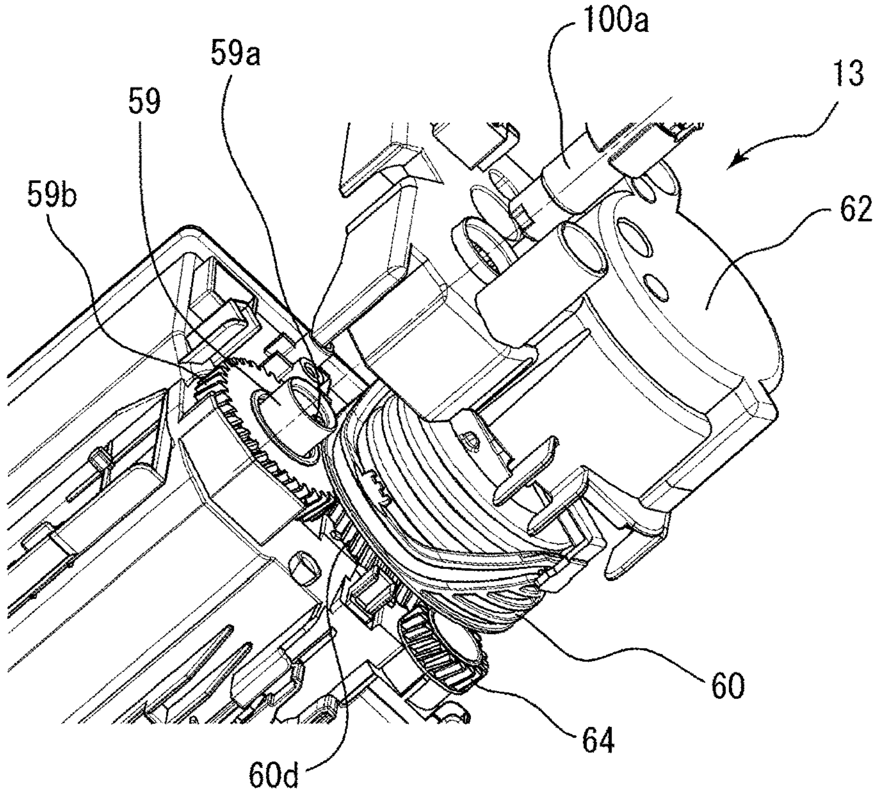
Figure 10:
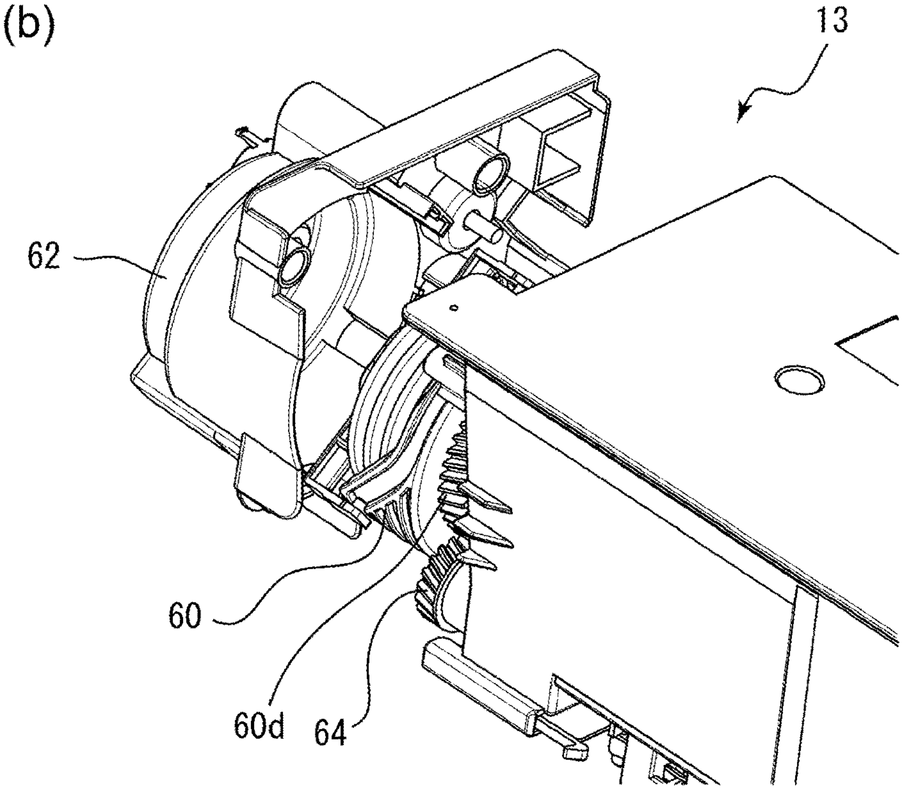

Part (a) of FIG. 10 is a perspective view of a rear end portion of the toner cartridge as viewed from below, and part (b) of FIG. 10 is a perspective view of the rear end portion of the toner cartridge as viewed from above.

Figure 11:
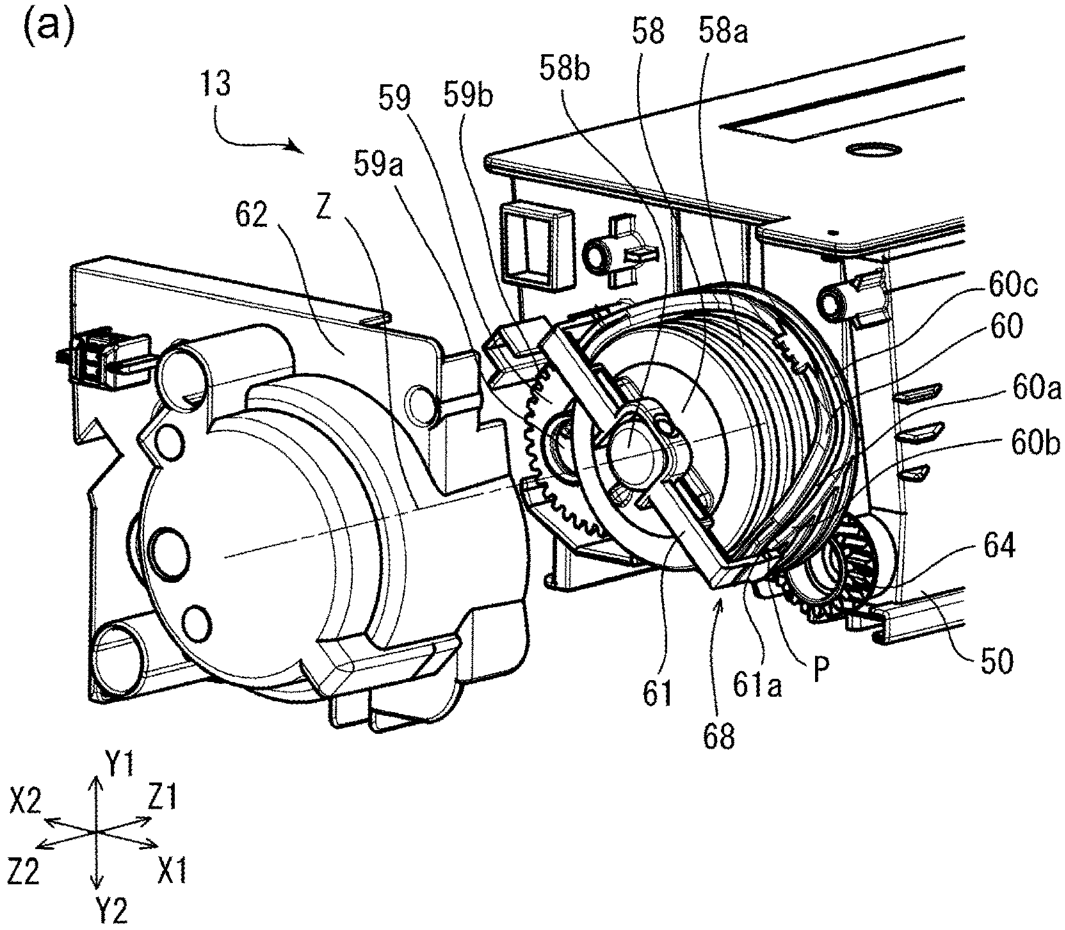
Figure 11:
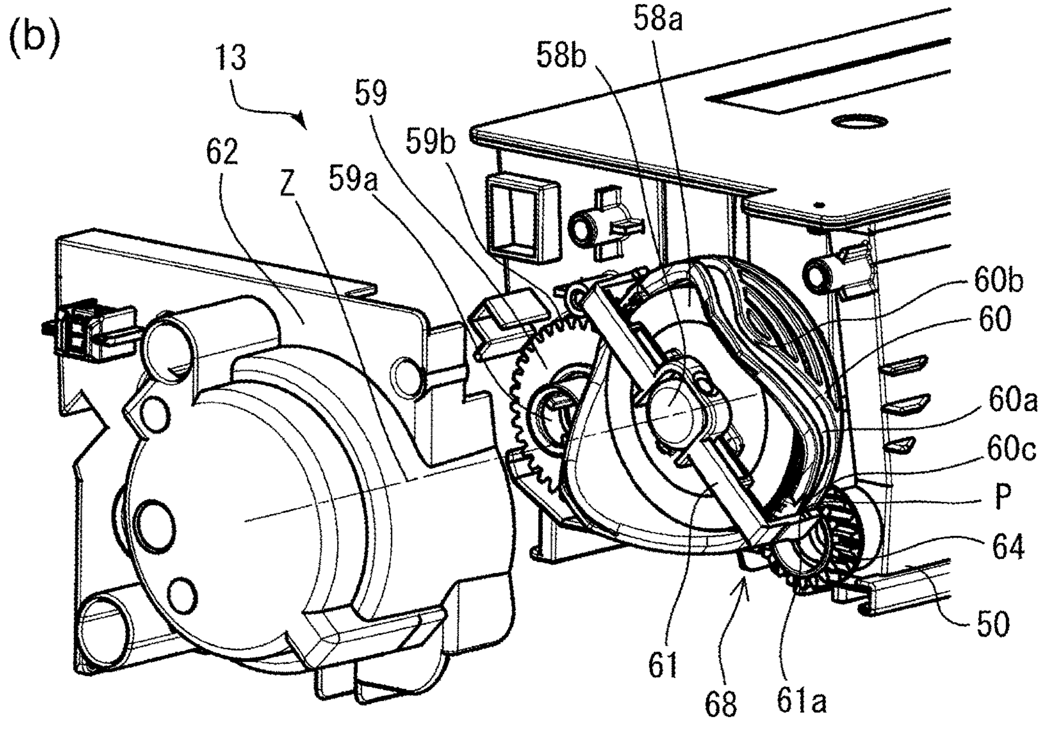

Part (a) of FIG. 11 is a perspective view showing the rear end portion of the toner cartridge in a state in which a pump is expanded, and part (b) of FIG. 11 is a perspective view showing the rear end portion of the toner cartridge in a state in which the pump is contracted.

Figure 12:
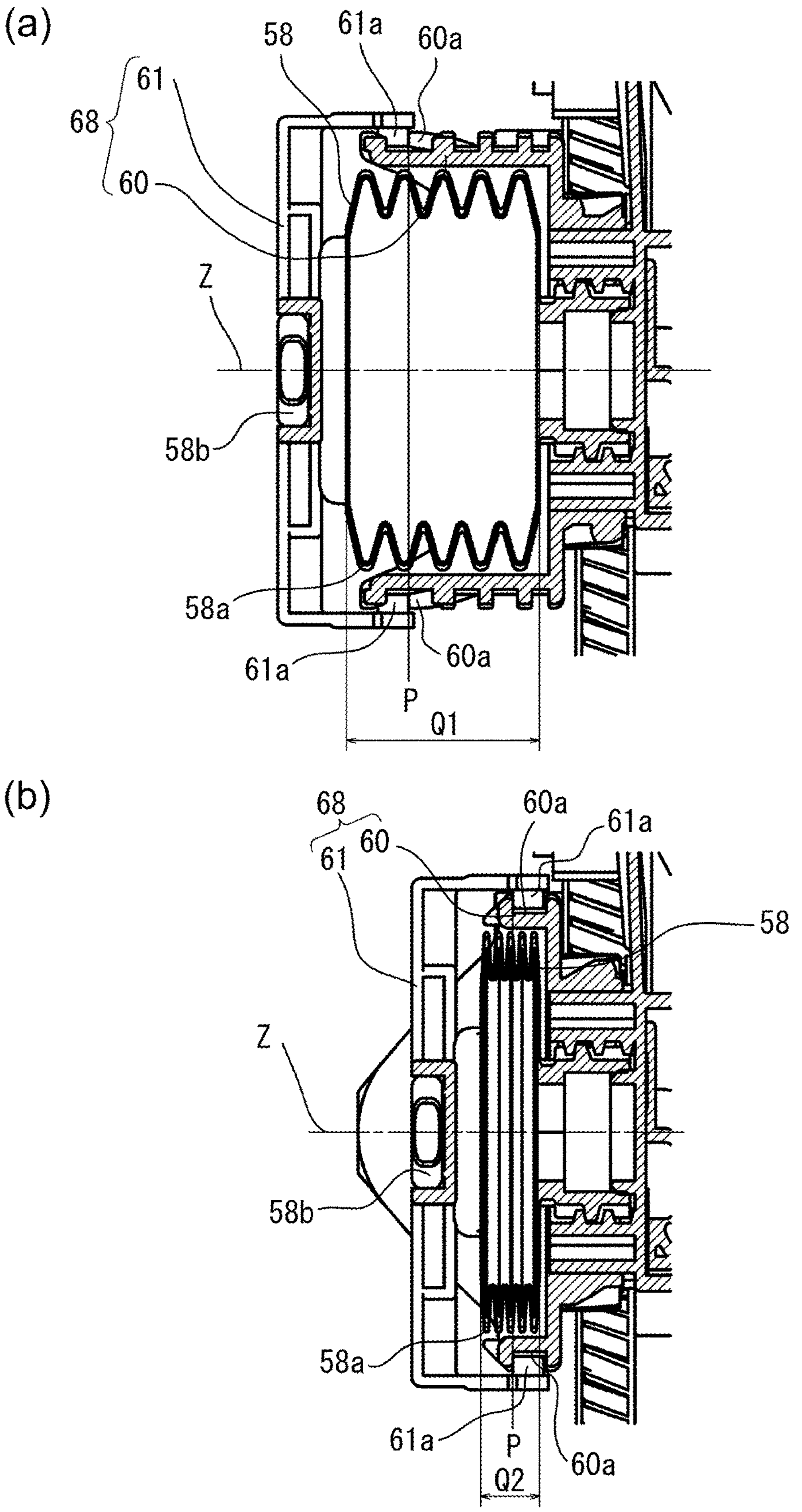

Part (a) of FIG. 12 is a sectional view showing a peripheral constitution of the pump in the expanded state, and part (b) of FIG. 12 is a sectional view showing the peripheral constitution in the contracted state.

Figure 13:
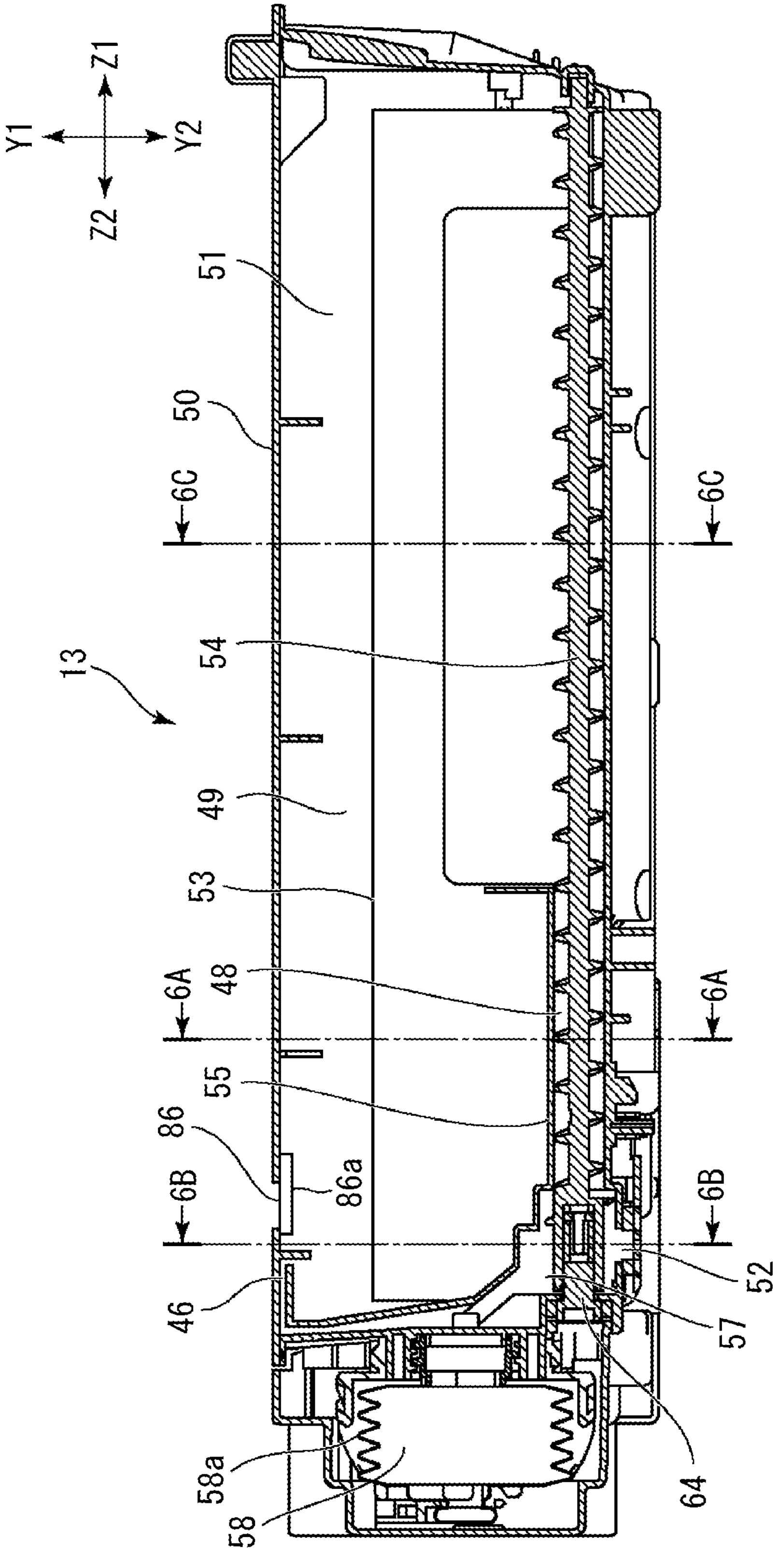

FIG. 13 is a sectional view showing a modified embodiment in which a toner accommodating chamber is provided an air intake port (opening).

Figure 14:
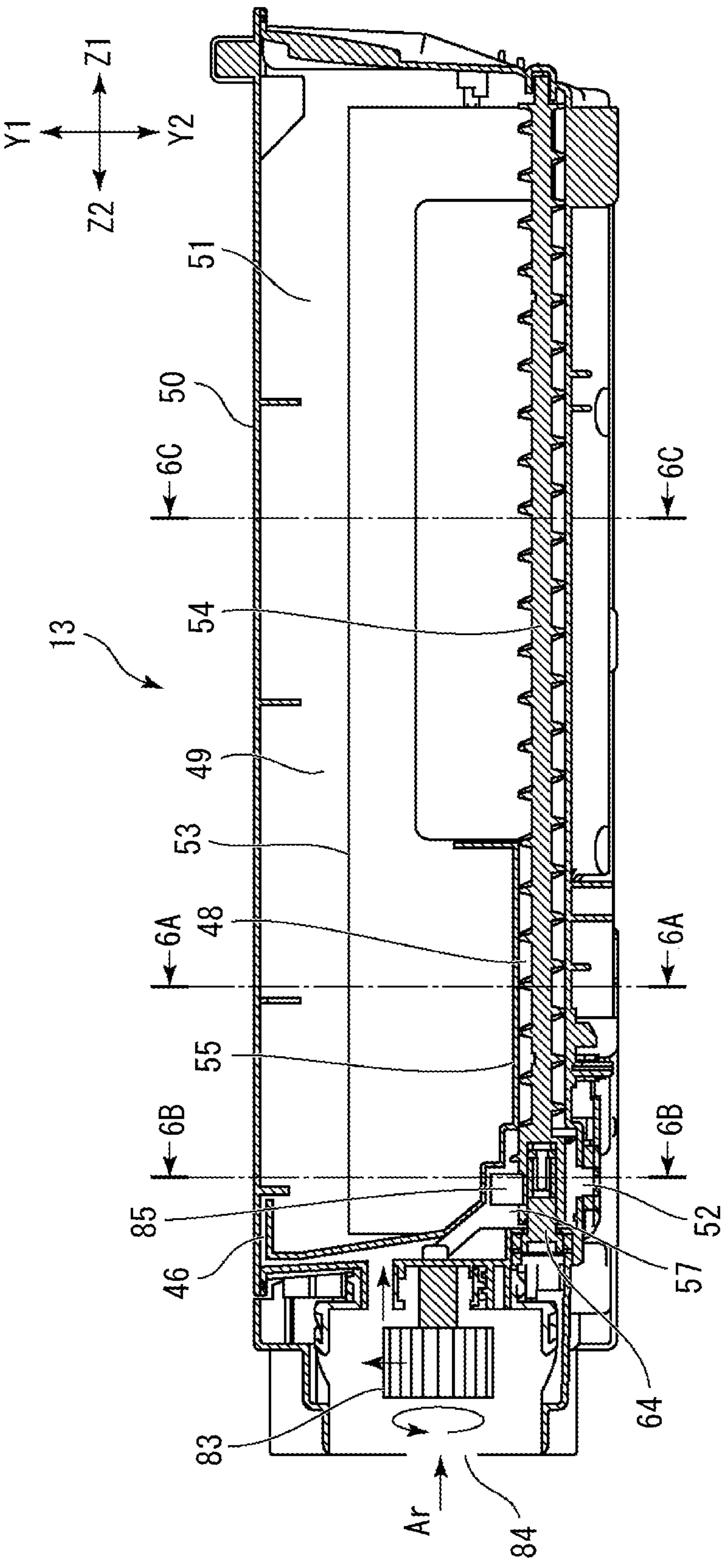

FIG. 14 is a sectional view showing a modified embodiment the toner cartridge provided with a centrifugal pump.

Figure 15:
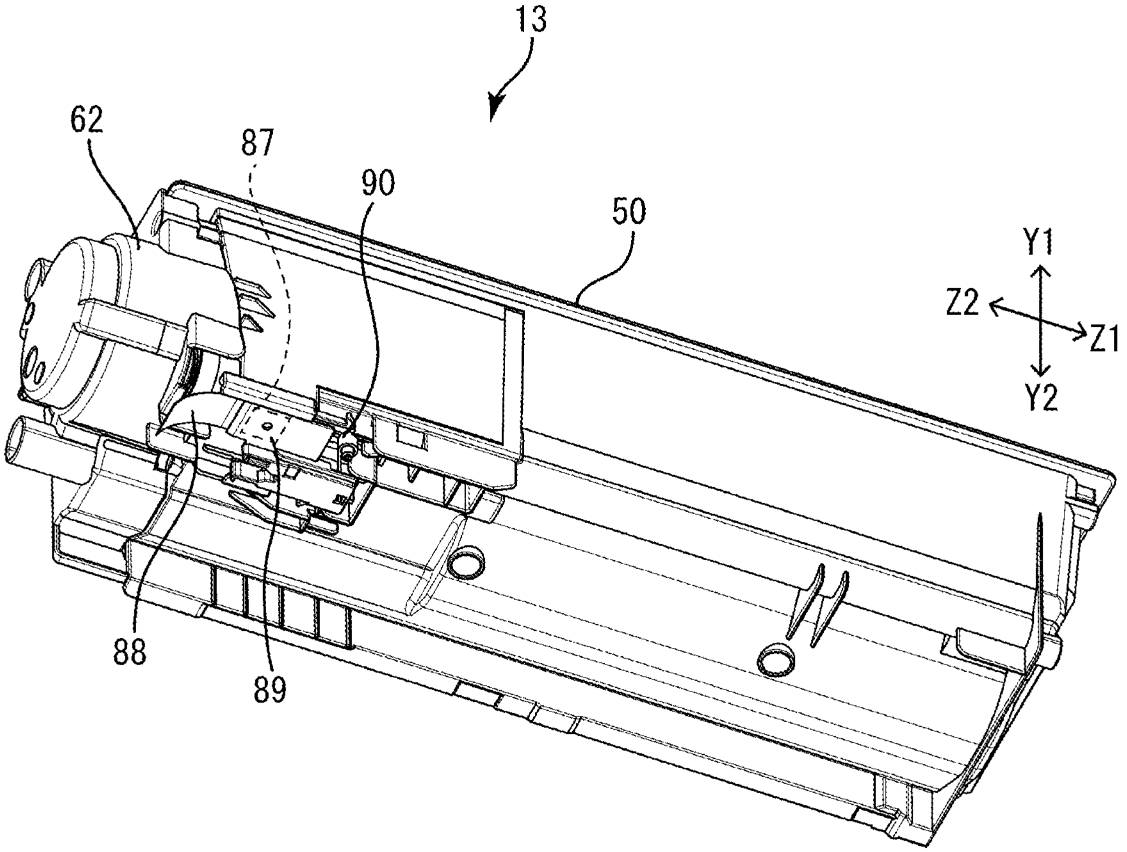

FIG. 15 is a perspective view of the toner cartridge as viewed from below.

Figure 16:
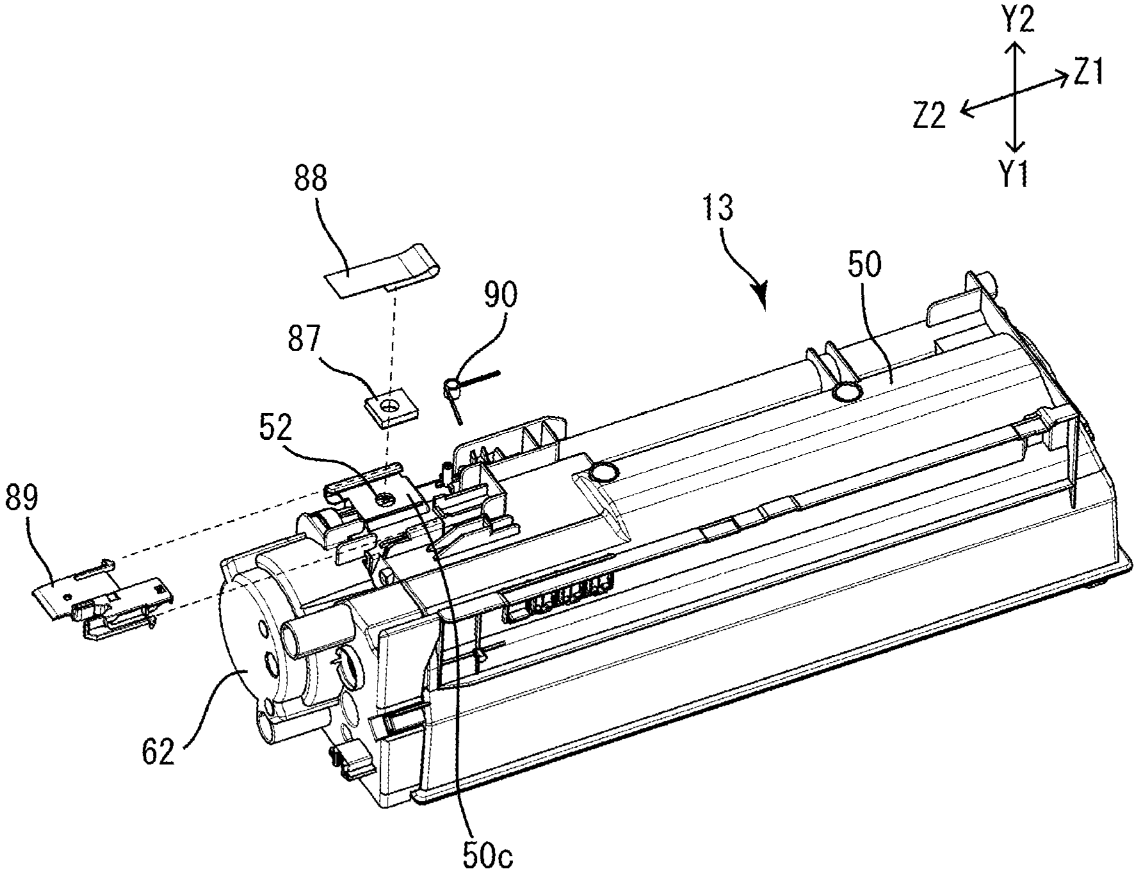

FIG. 16 is an exploded perspective view of the toner cartridge as viewed from below.

Figure 17:
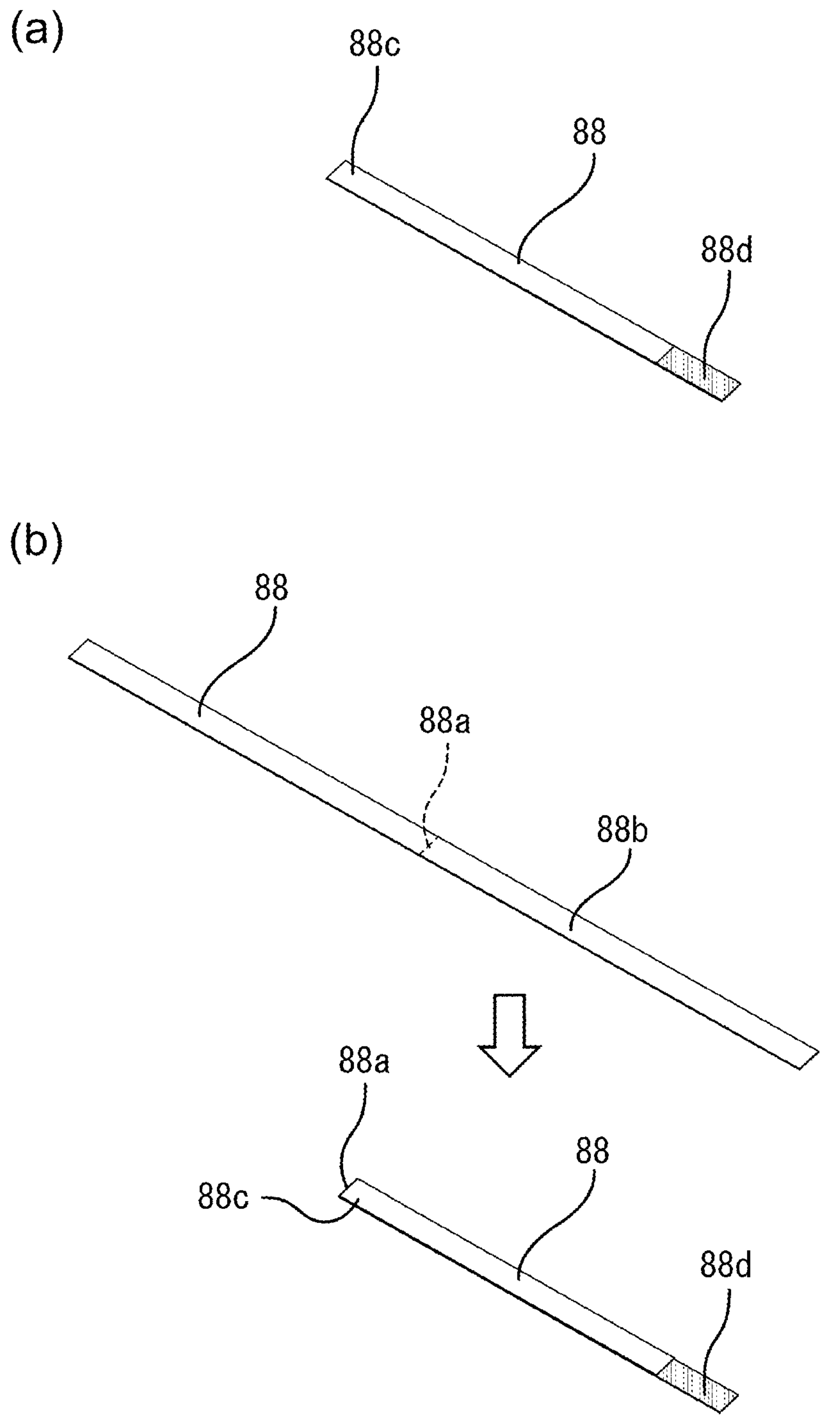

Part (a) of FIG. 17 is a perspective view showing a sealing tape, and part (b) of FIG. 17 is a perspective view for illustrating a step of folding the sealing tape.

Figure 18:
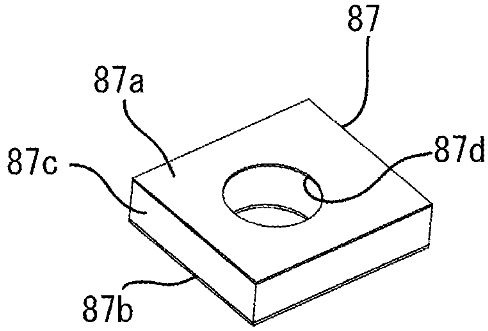
Figure 18:
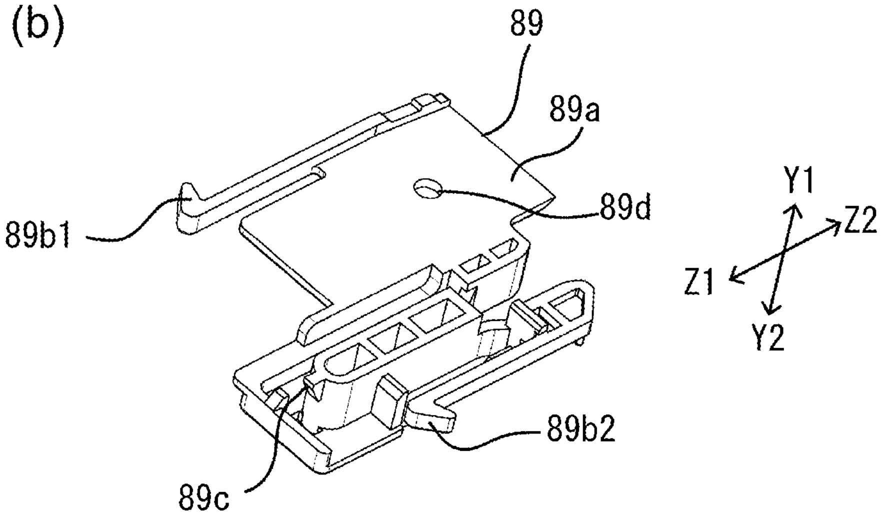
Figure 18:
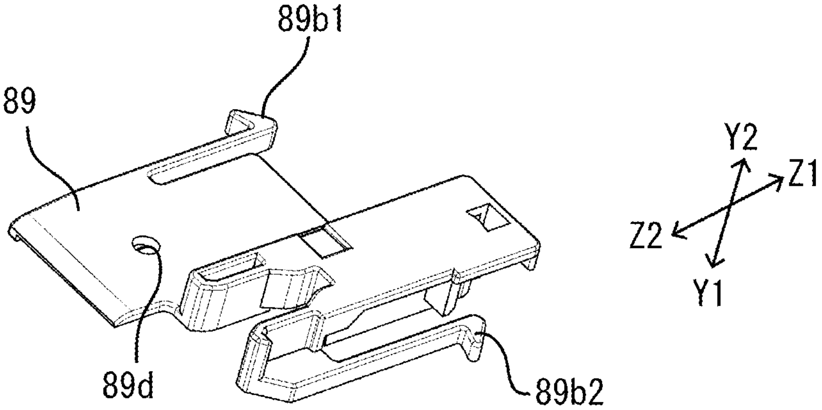

Part (a) of FIG. 18 is a perspective view showing an elastic seal, part (b) of FIG. 18 is a perspective view of a shutter as viewed from above, and part (c) of FIG. 18 is a perspective view of the shutter as viewed from below.

Figure 19:
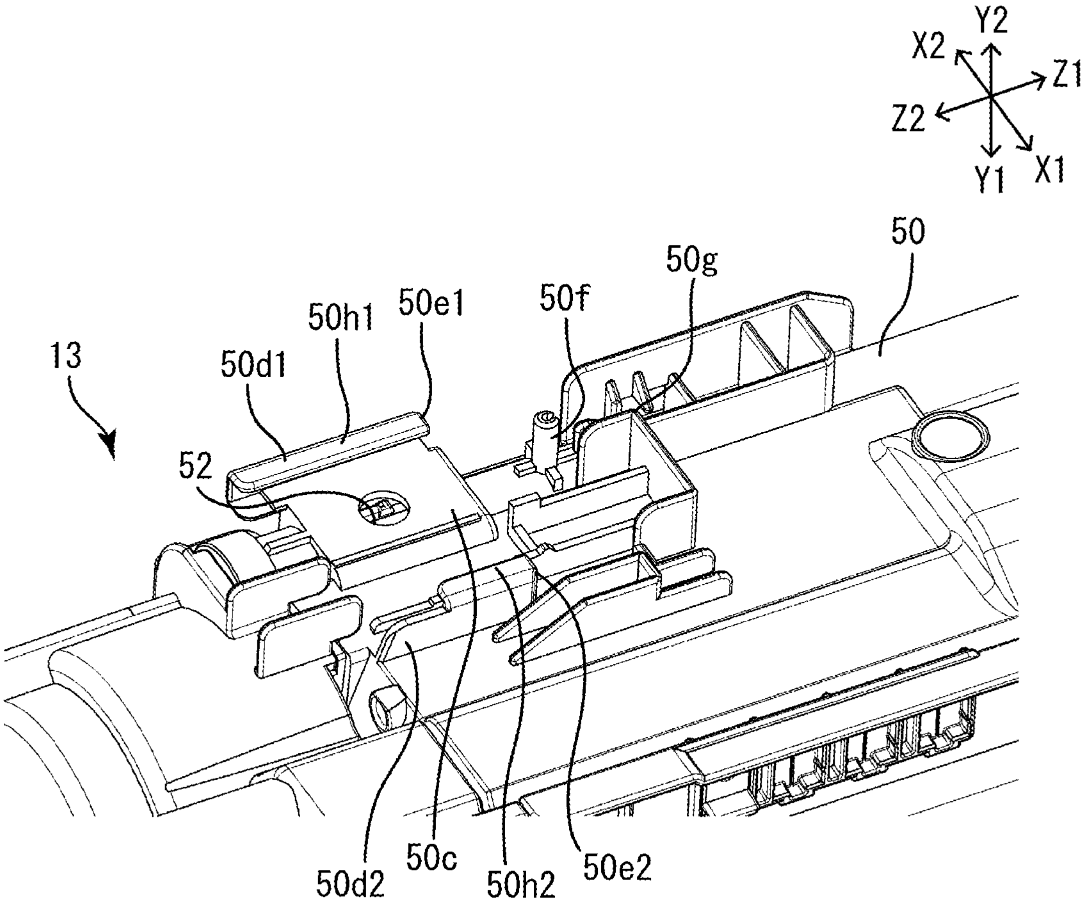

FIG. 19 is a perspective view showing a supply frame in a state in which the elastic seal, the sealing tape, the shutter, and a shutter spring are dismounted from the supply frame.

Figure 20:
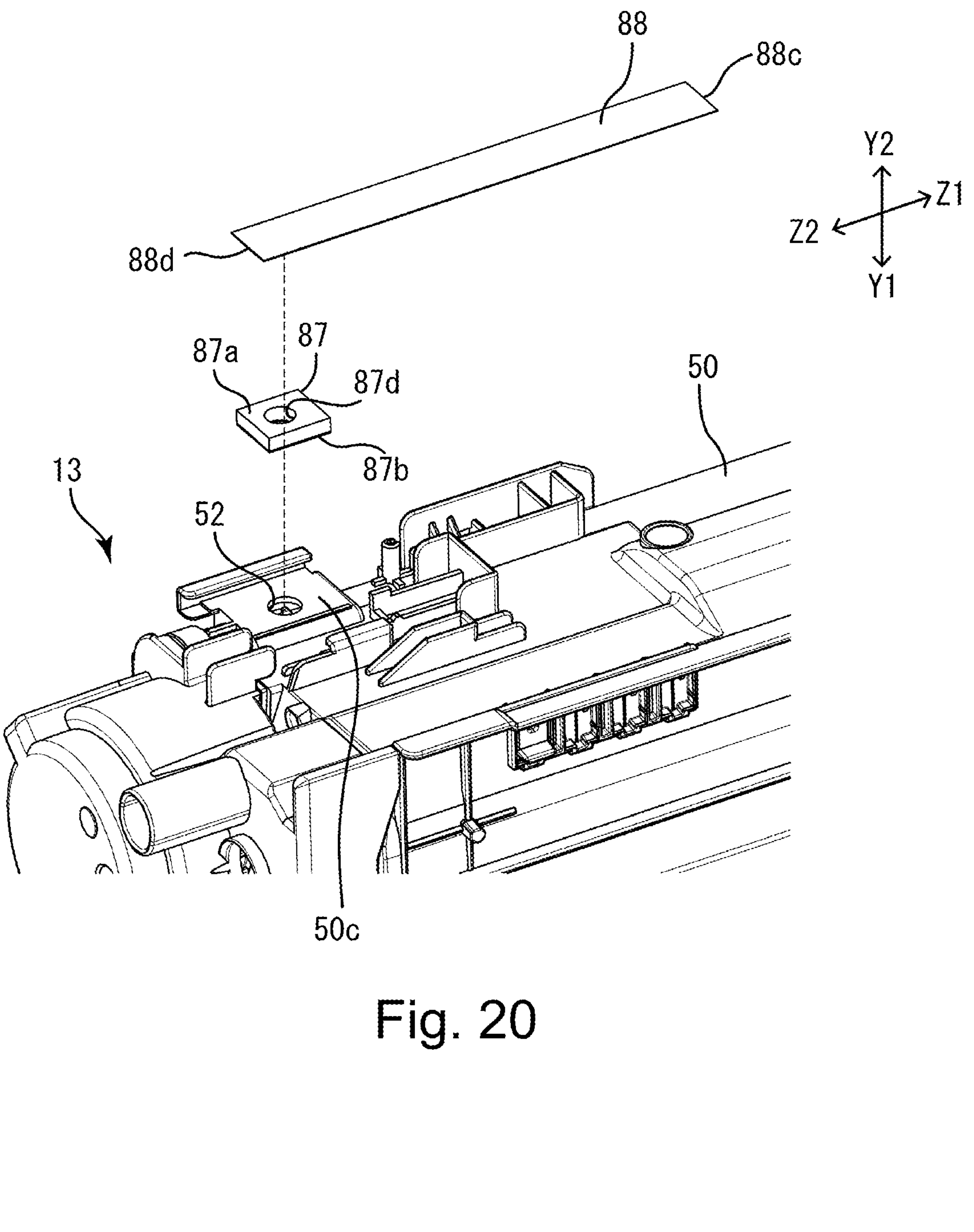

FIG. 20 is a perspective view showing a state in which the elastic seal and the sealing shutter are assembled to the supply frame.

Figure 21:
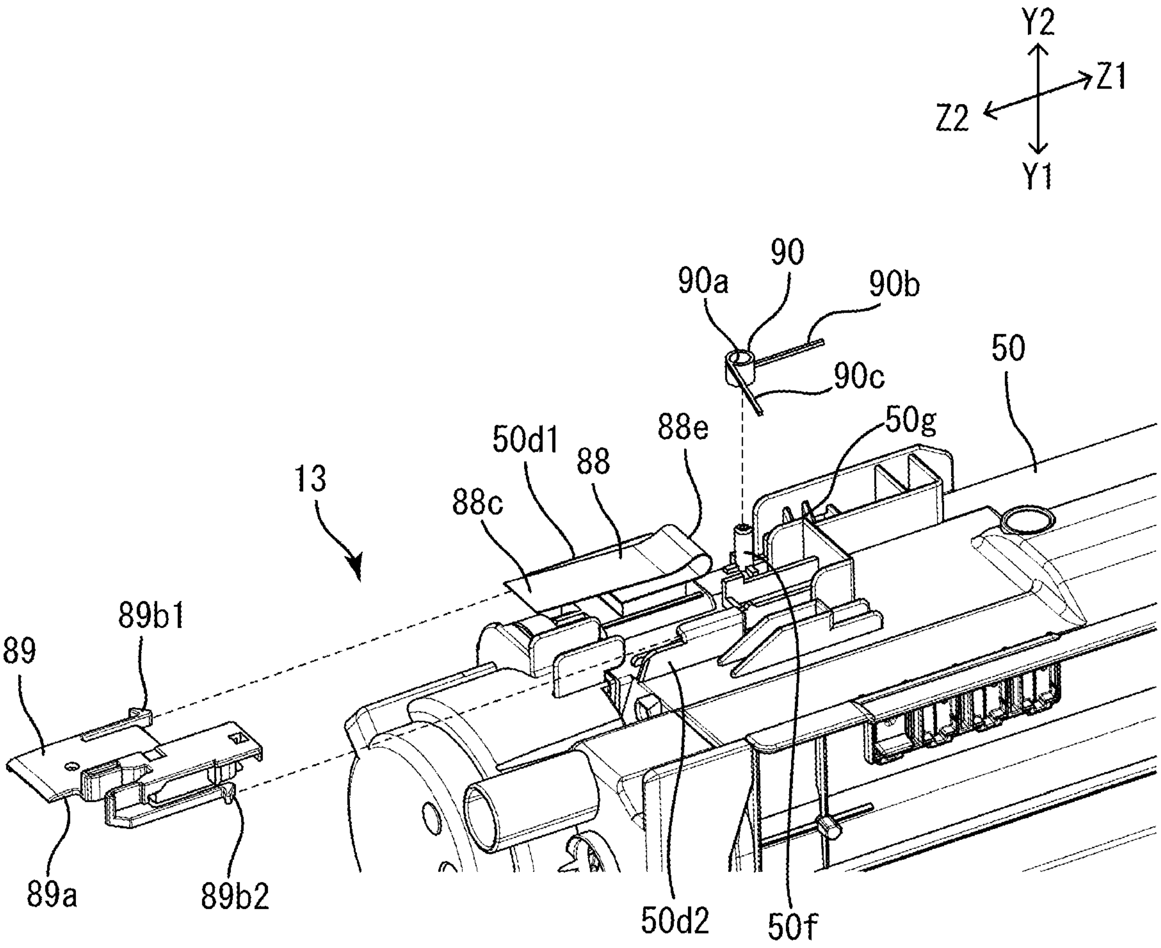

FIG. 21 is a perspective view showing a state in which the shutter spring and the shutter are assembled to the supply frame.

Figure 22:
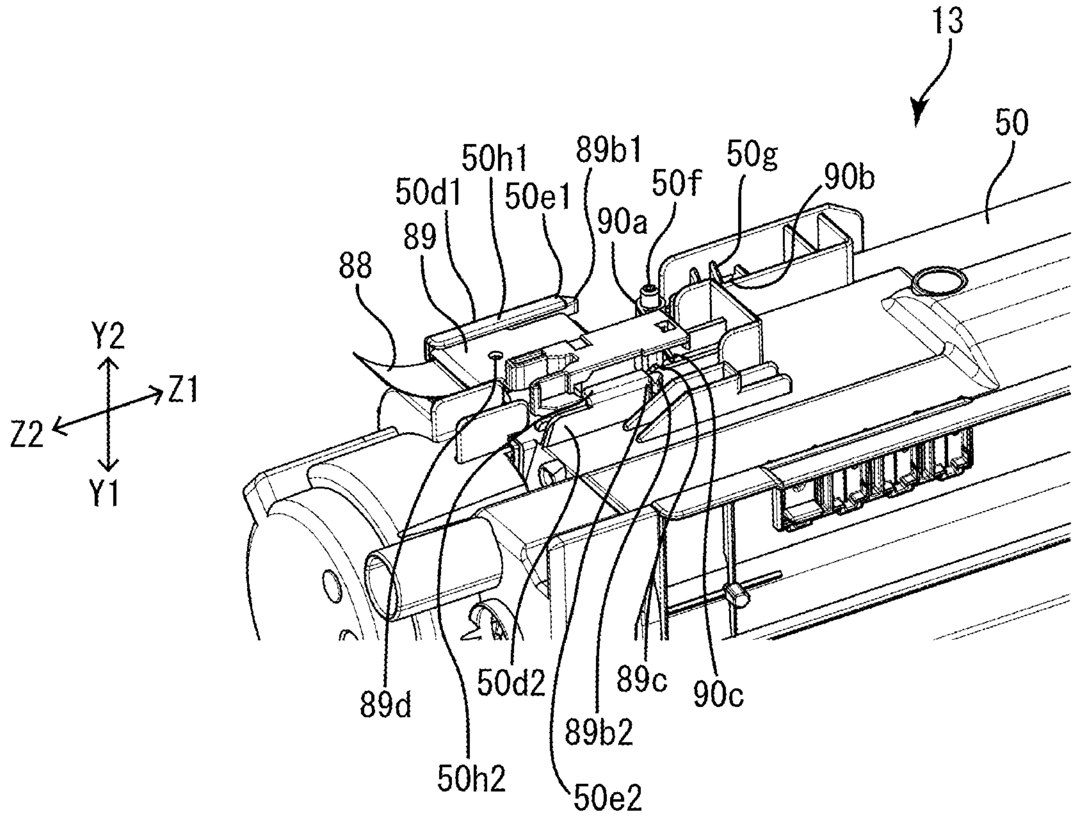

FIG. 22 is a perspective view showing a state in which the elastic seal, the sealing tape, the shutter, and the shutter spring are assembled to the supply frame.

Figure 23:
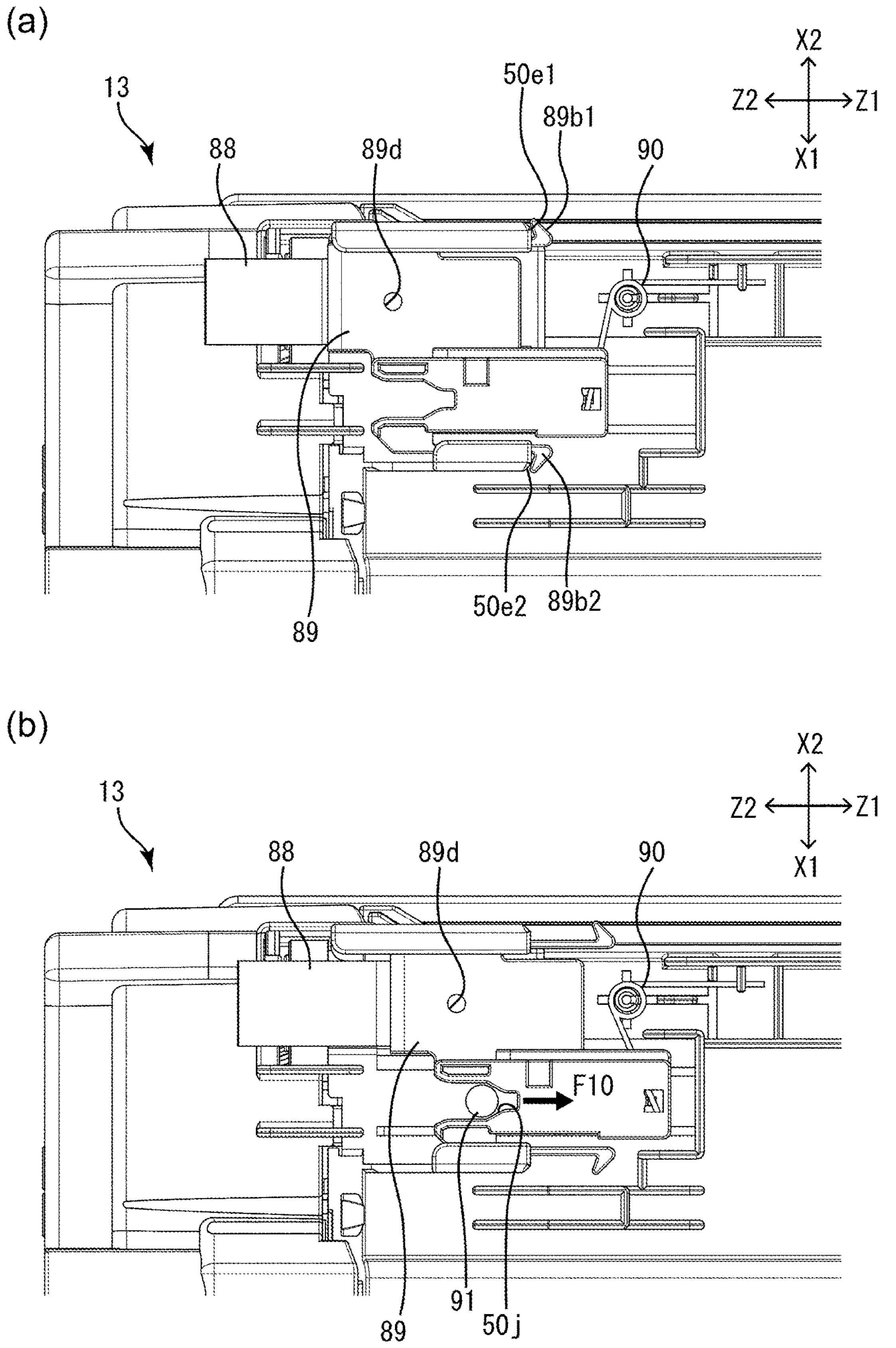

Part (a) of FIG. 23 is a bottom view showing the toner cartridge when the shutter is positioned in a closed position, and part (b) of FIG. 23 is a bottom view showing the toner cartridge when the shutter is positioned in an open position.

Figure 24:
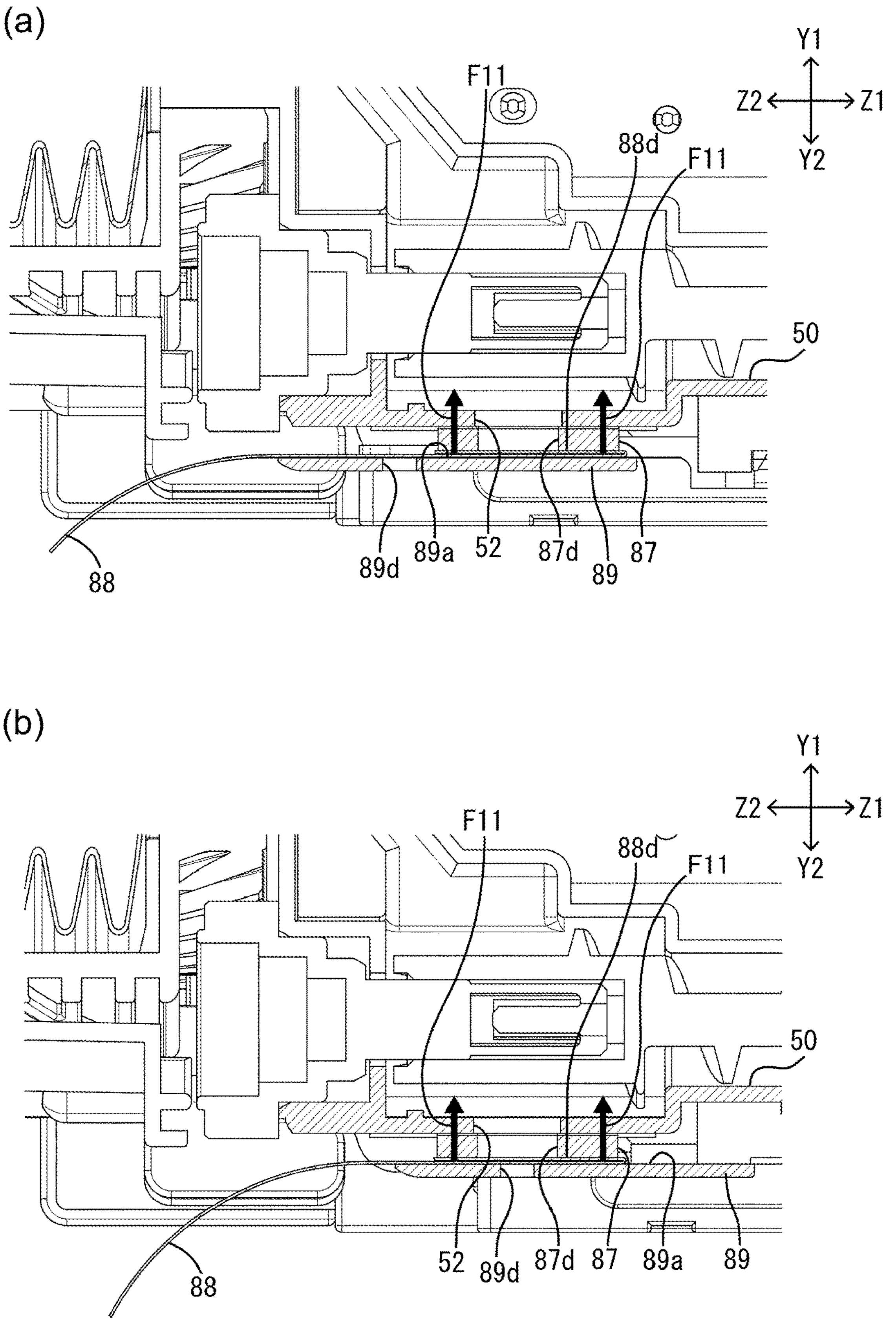

Part (a) of FIG. 24 is a sectional view showing a peripheral constitution of a discharge opening in a state in which the shutter is positioned in the closed position, and part (b) of FIG. 24 is a sectional view showing the peripheral constitution of the discharge opening in a state in which the shutter is positioned in the open position.

Figure 25:
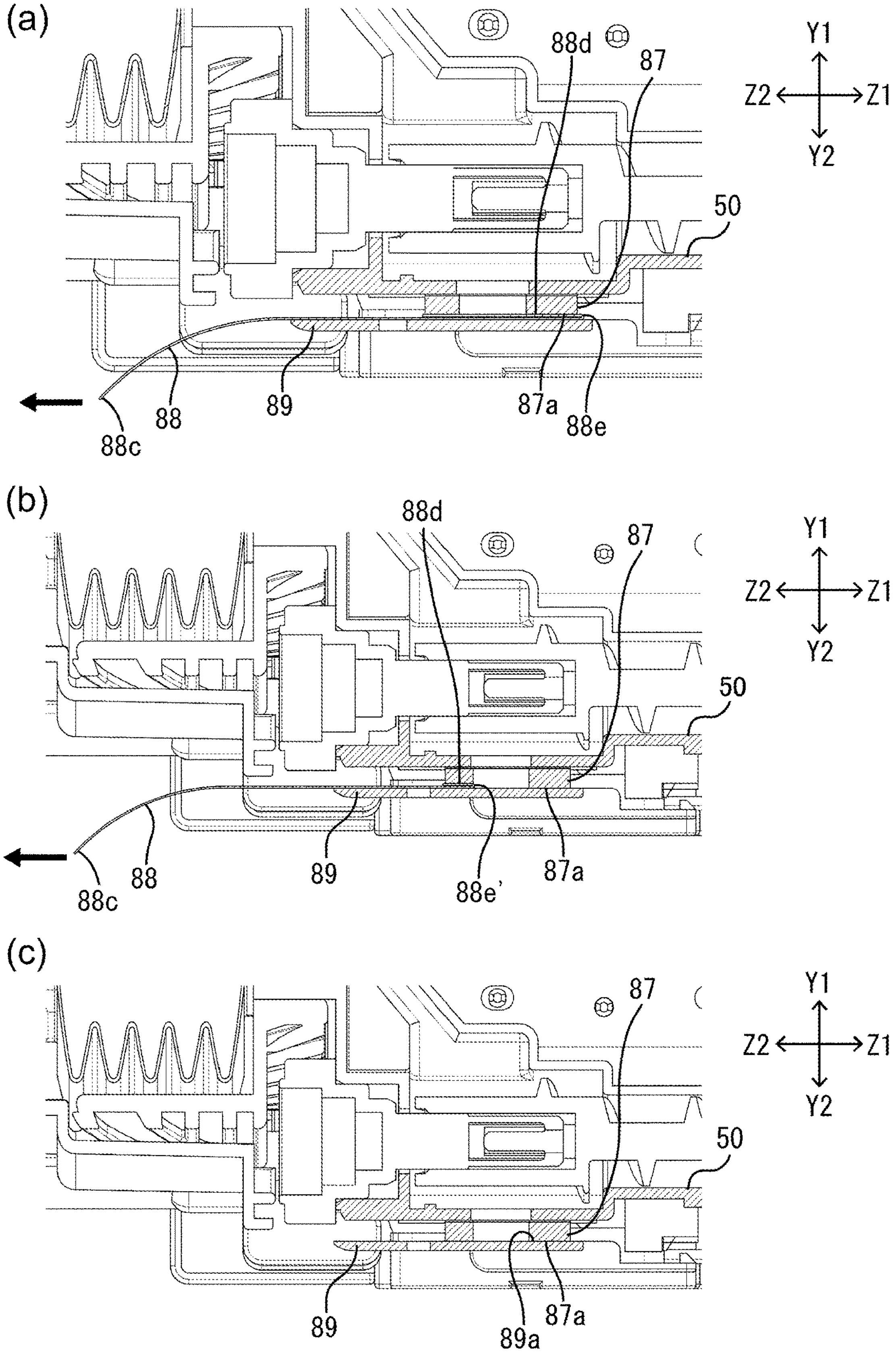

Part (a) of FIG. 25 is a sectional view showing a state before a peeling operation of the sealing tape is performed, part (b) of FIG. 25 is a sectional view showing a state in which the elastic seal is partially peeled from the elastic seal by a user, and part (c) of FIG. 25 is a sectional view showing a state in which the peeling operation of the sealing tape is completed.

Figure 26:
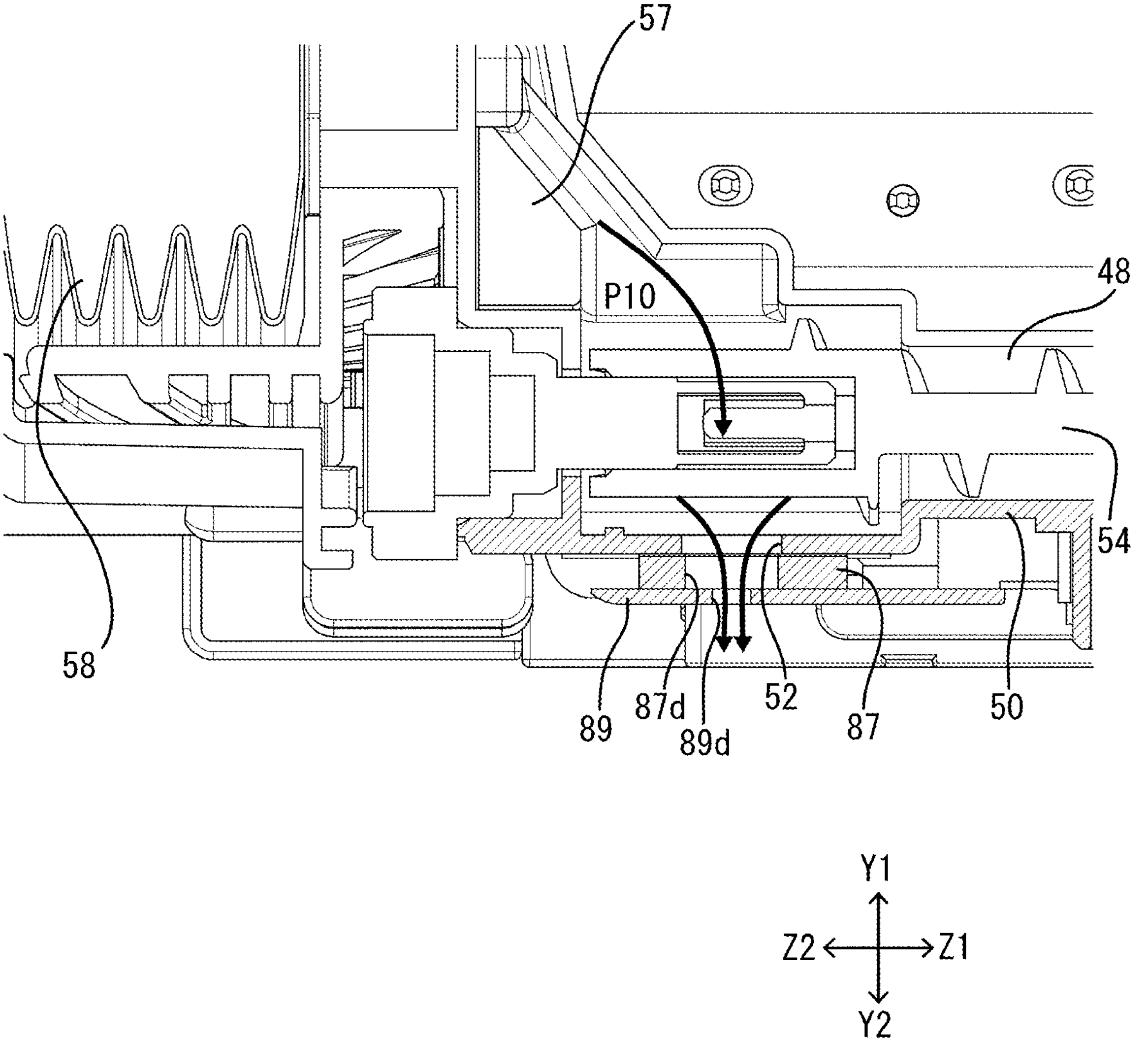

FIG. 26 is a sectional view showing a state in which the sealing tape is peeled off from the elastic seal and the toner cartridge is mounted to an apparatus main assembly.

Figure 27:
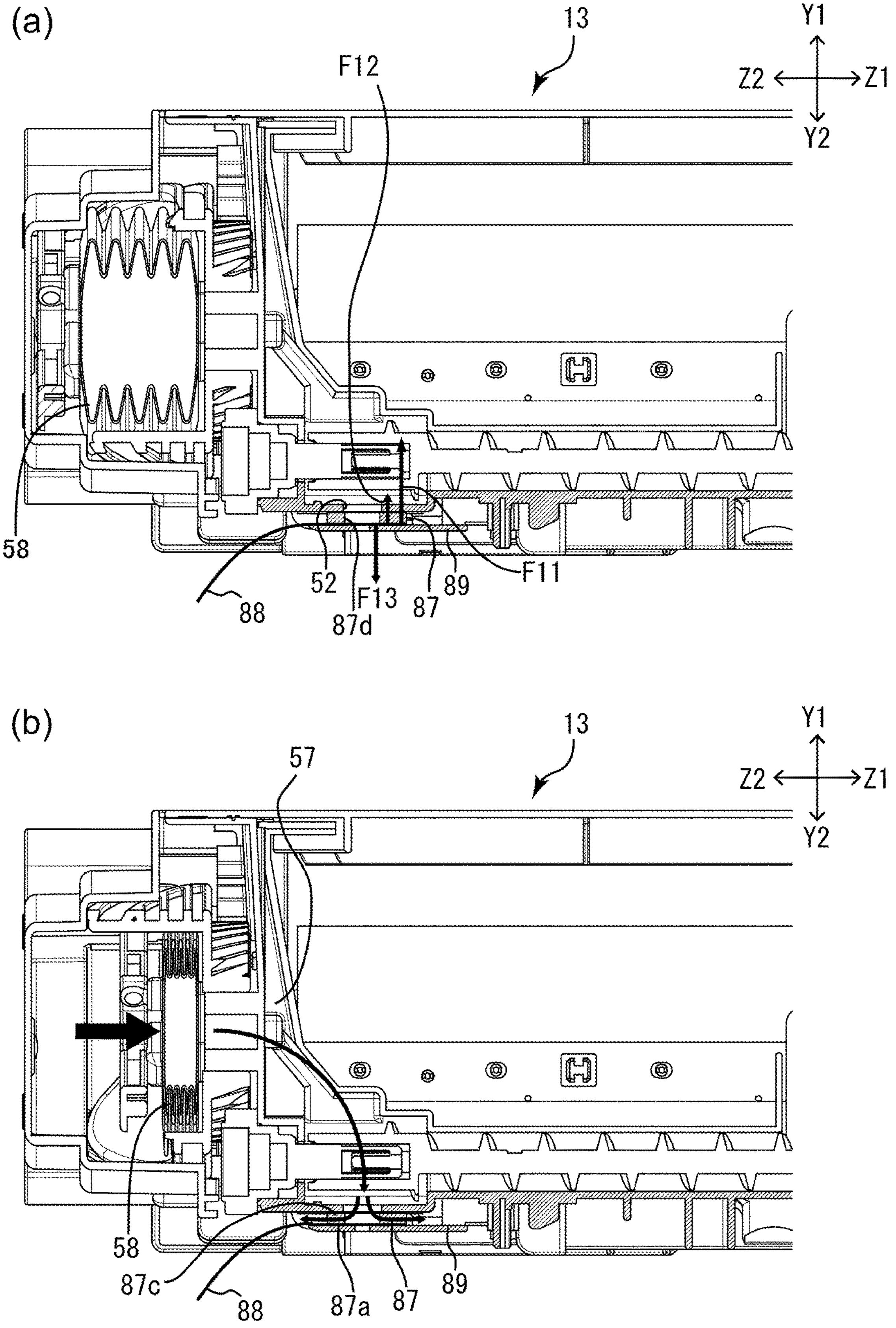

Part (a) of FIG. 27 is a sectional view showing a situation that the pump is operated in a state in which the sealing tape is not peeled off from the elastic seal and in a state in which the toner cartridge is mounted to the apparatus main assembly, and part (b) of FIG. 27 is a sectional view showing a state in which the pump is compressed.

Figure 28:
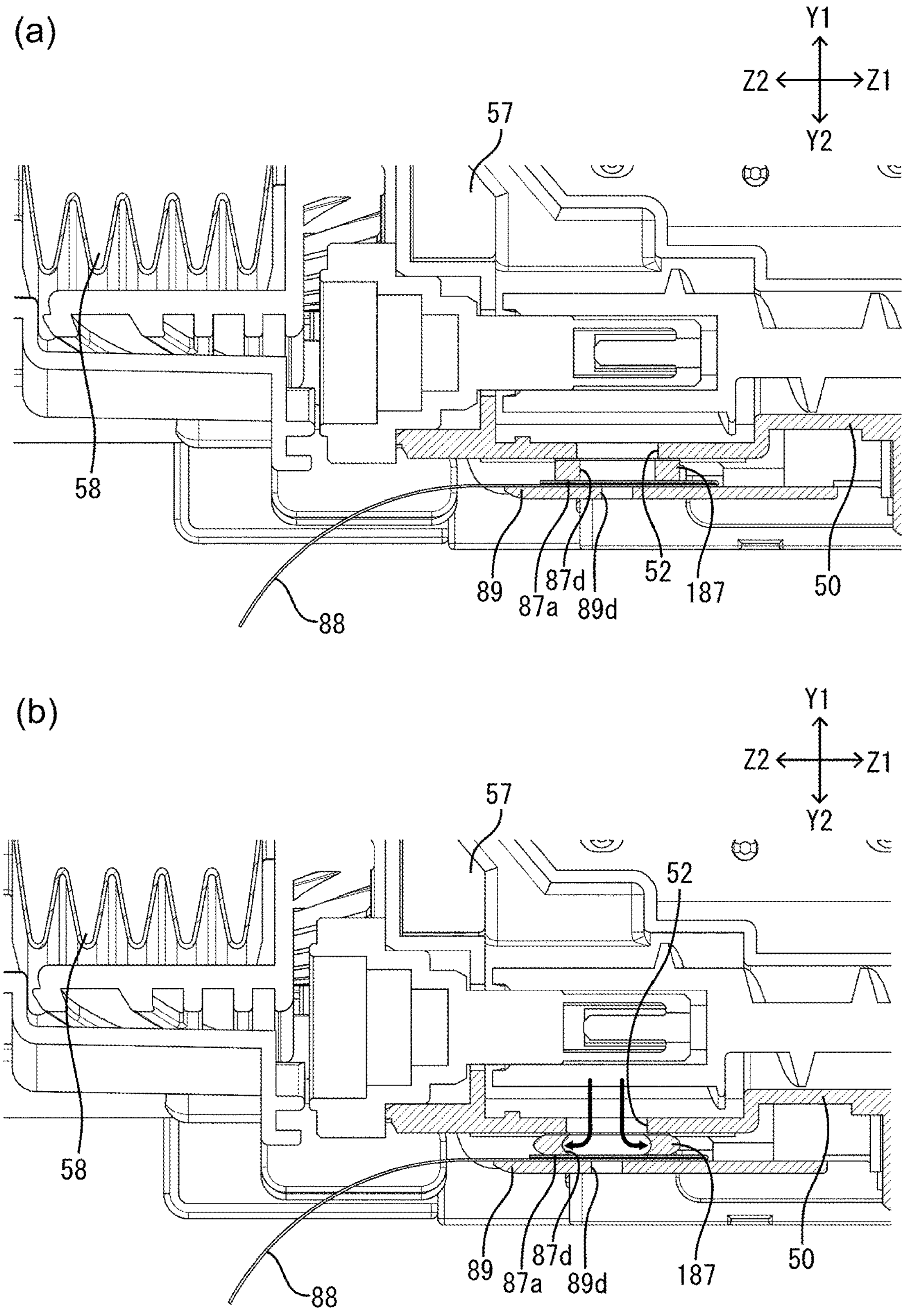

Part (a) of FIG. 28 is a sectional view showing an elastic seal in a modified embodiment 1 of the first embodiment, and part (b) of FIG. 28 is a sectional view showing a state in which the elastic seal is elastically deformed.

Figure 29:
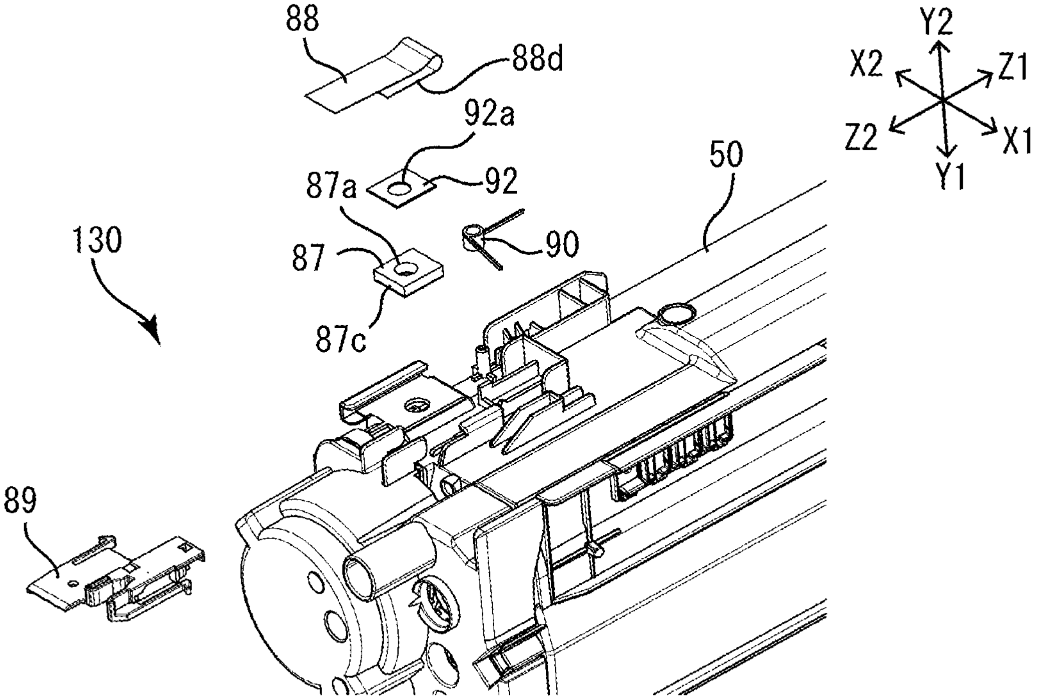

FIG. 29 is an exploded perspective view showing a toner cartridge according to a modified embodiment 2 of the first embodiment.

Figure 30:
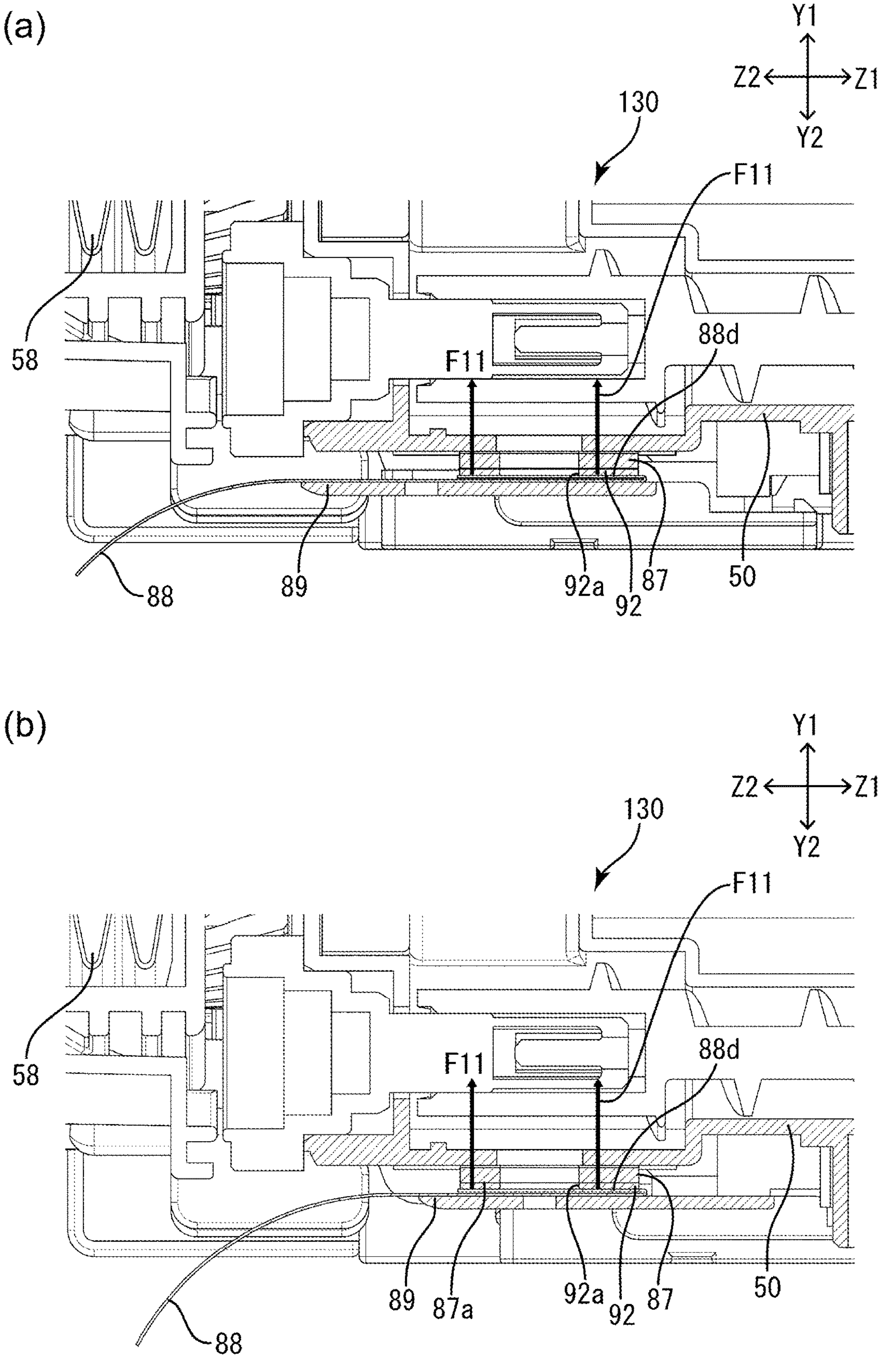

Part (a) of FIG. 30 is a sectional view showing the toner cartridge when a shutter is in the closed position, and part (b) of FIG. 30 is a sectional view showing the toner cartridge when the shutter is positioned in the open position.

Figure 31:
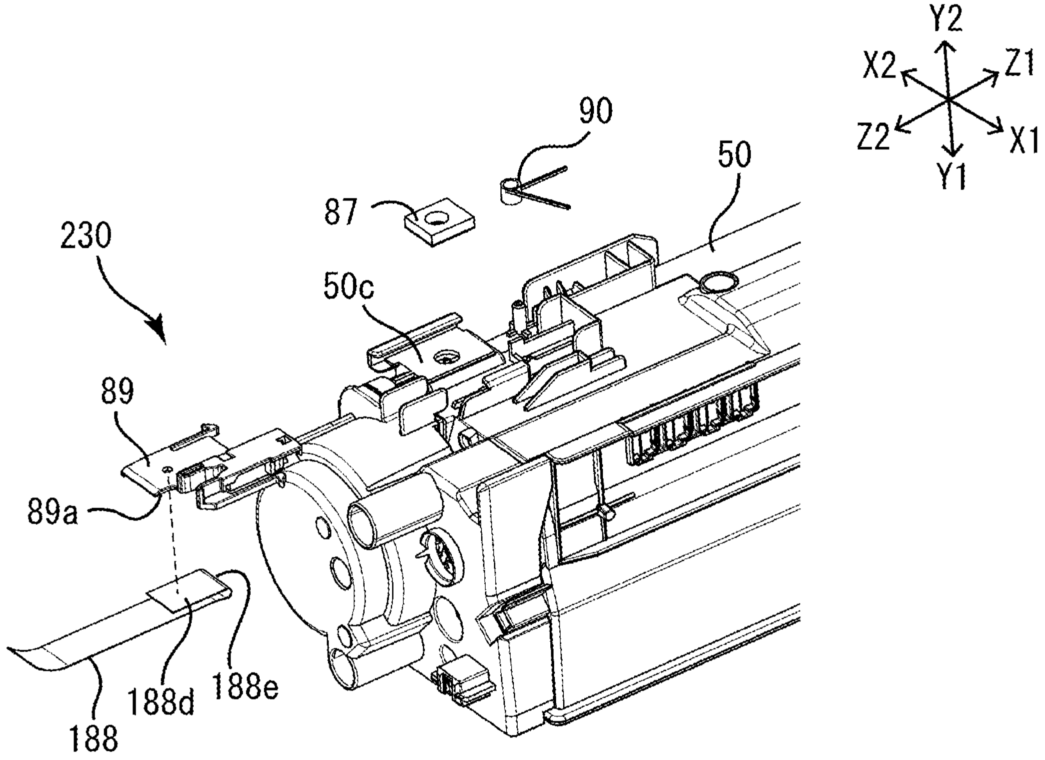

FIG. 31 is an exploded perspective view showing a toner cartridge according to a modified embodiment 3 of the first embodiment.

Figure 32:
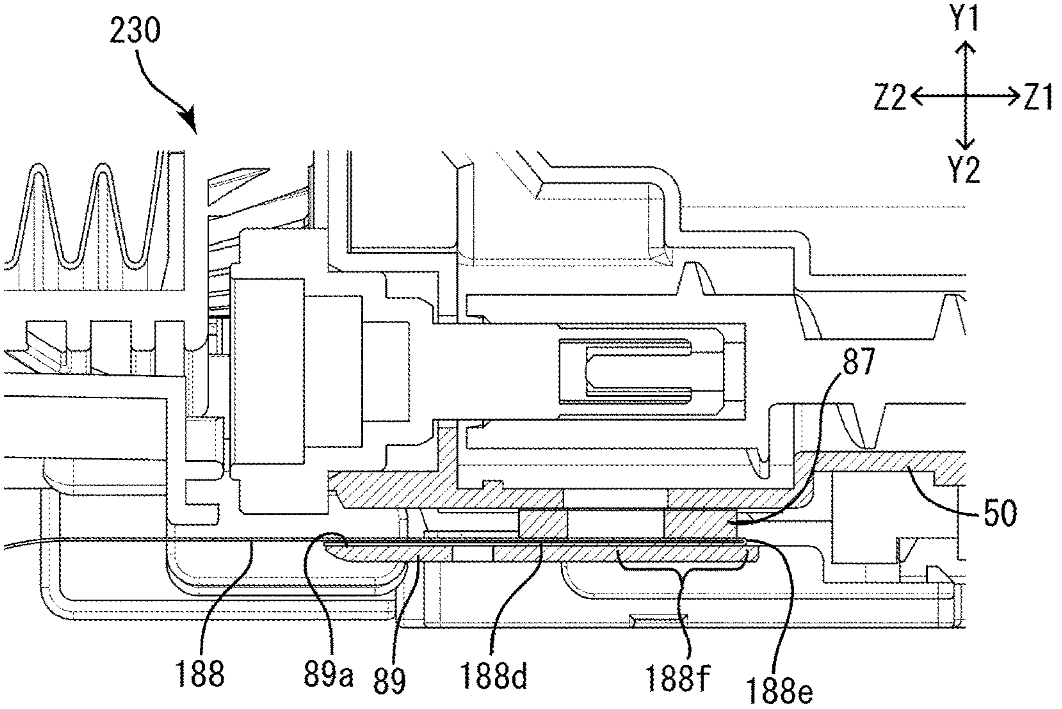
Figure 32:
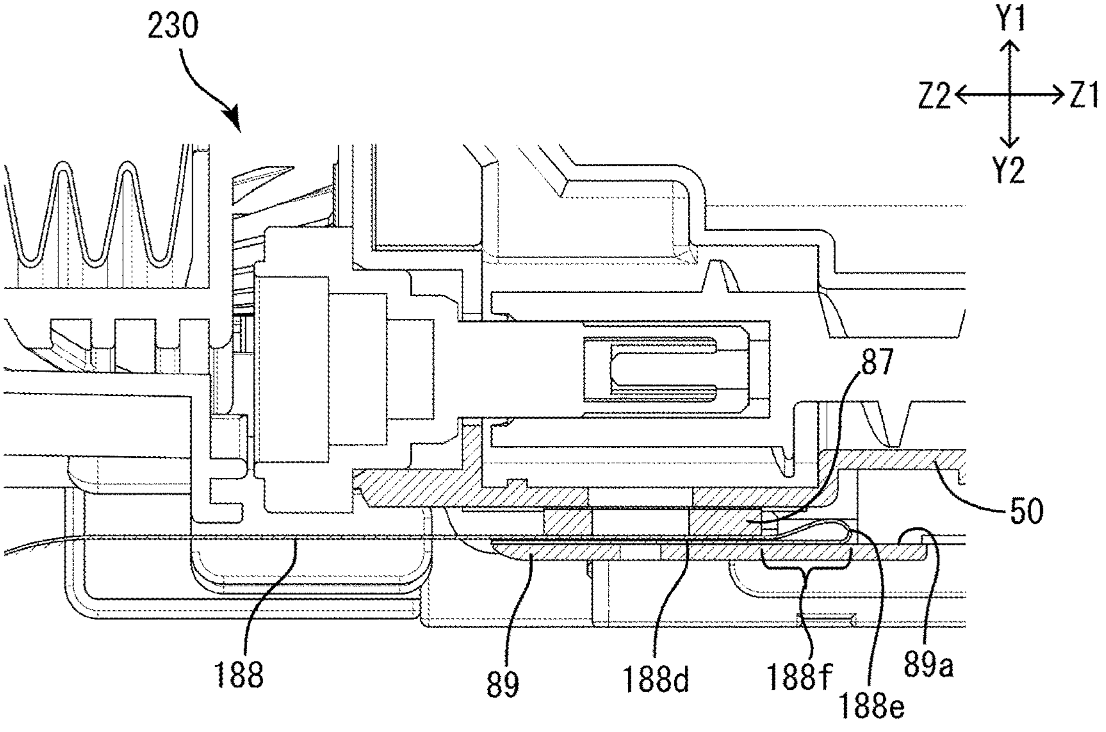

Part (a) of FIG. 32 is a sectional view showing the toner cartridge when the shutter is positioned in the closed position, and part (b) of FIG. 32 is a sectional view showing the toner cartridge when the shutter is positioned in the open position.

Figure 33:
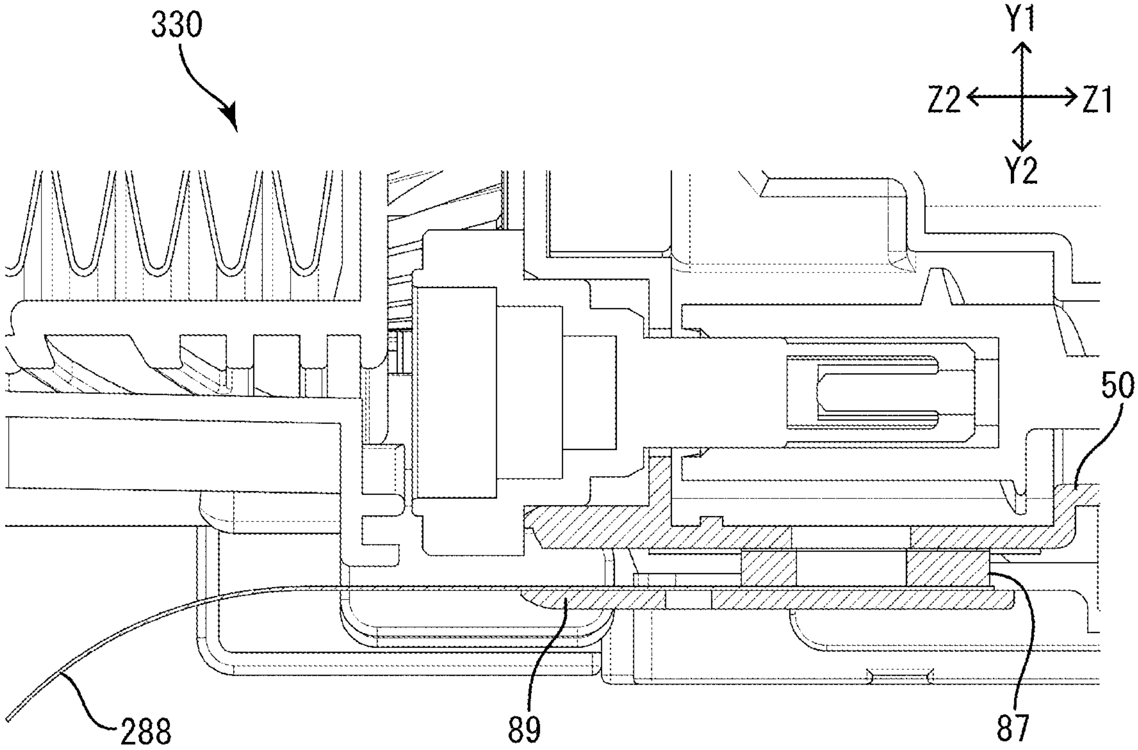

FIG. 33 is a sectional view showing a toner cartridge 330 according to a modified embodiment fourth of the first embodiment.

Figure 34:
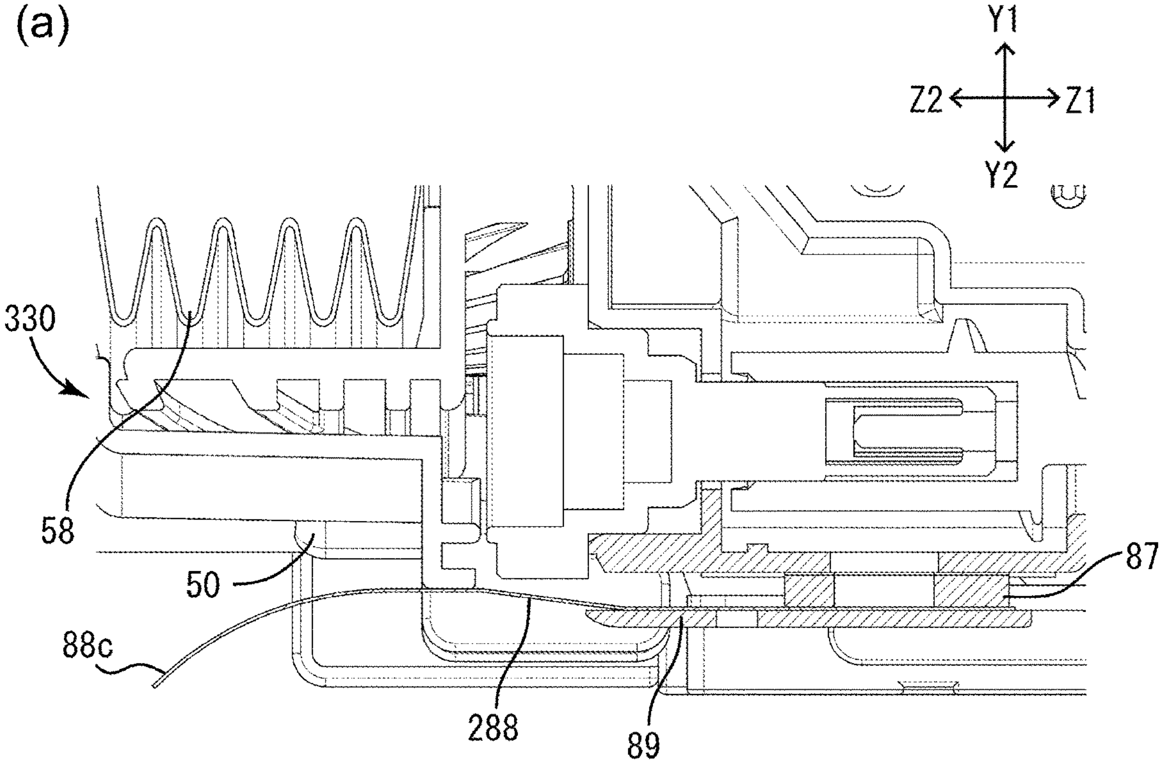
Figure 34:
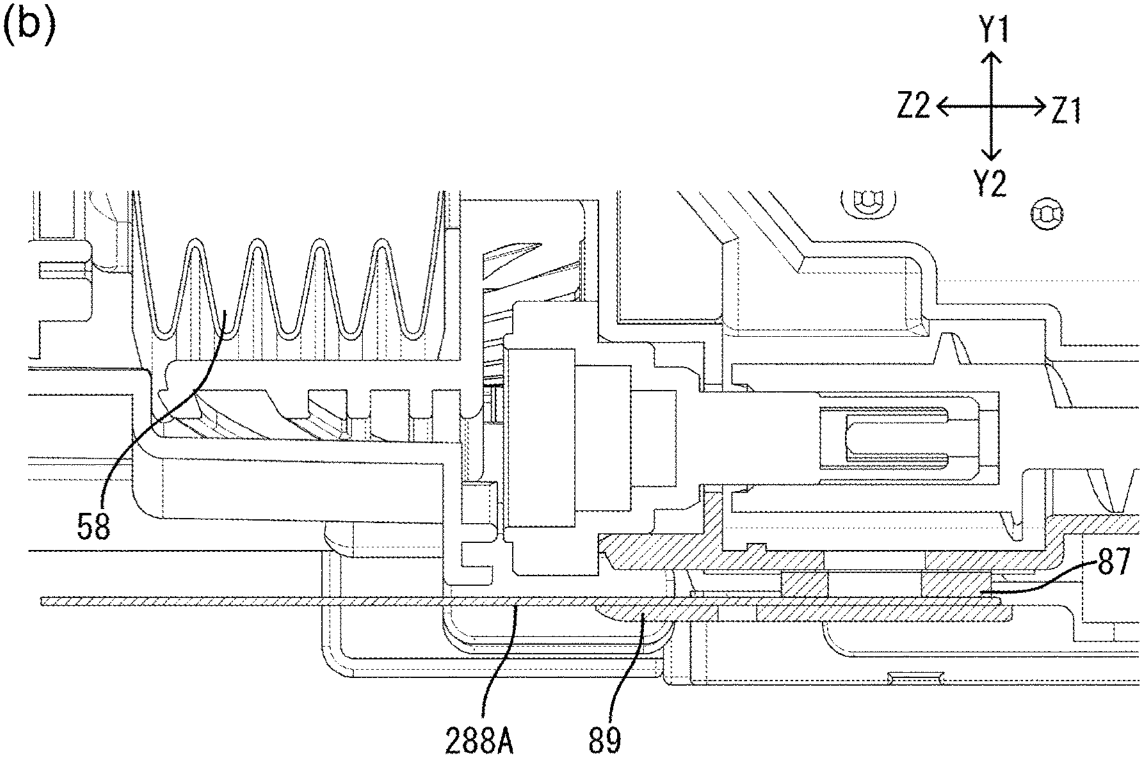

Part (a) of FIG. 34 is a sectional view showing the toner cartridge according to the modified embodiment fourth of the first embodiment, and part (b) of FIG. 34 is a sectional view of a sealing member in the modified embodiment fourth.

Figure 35:
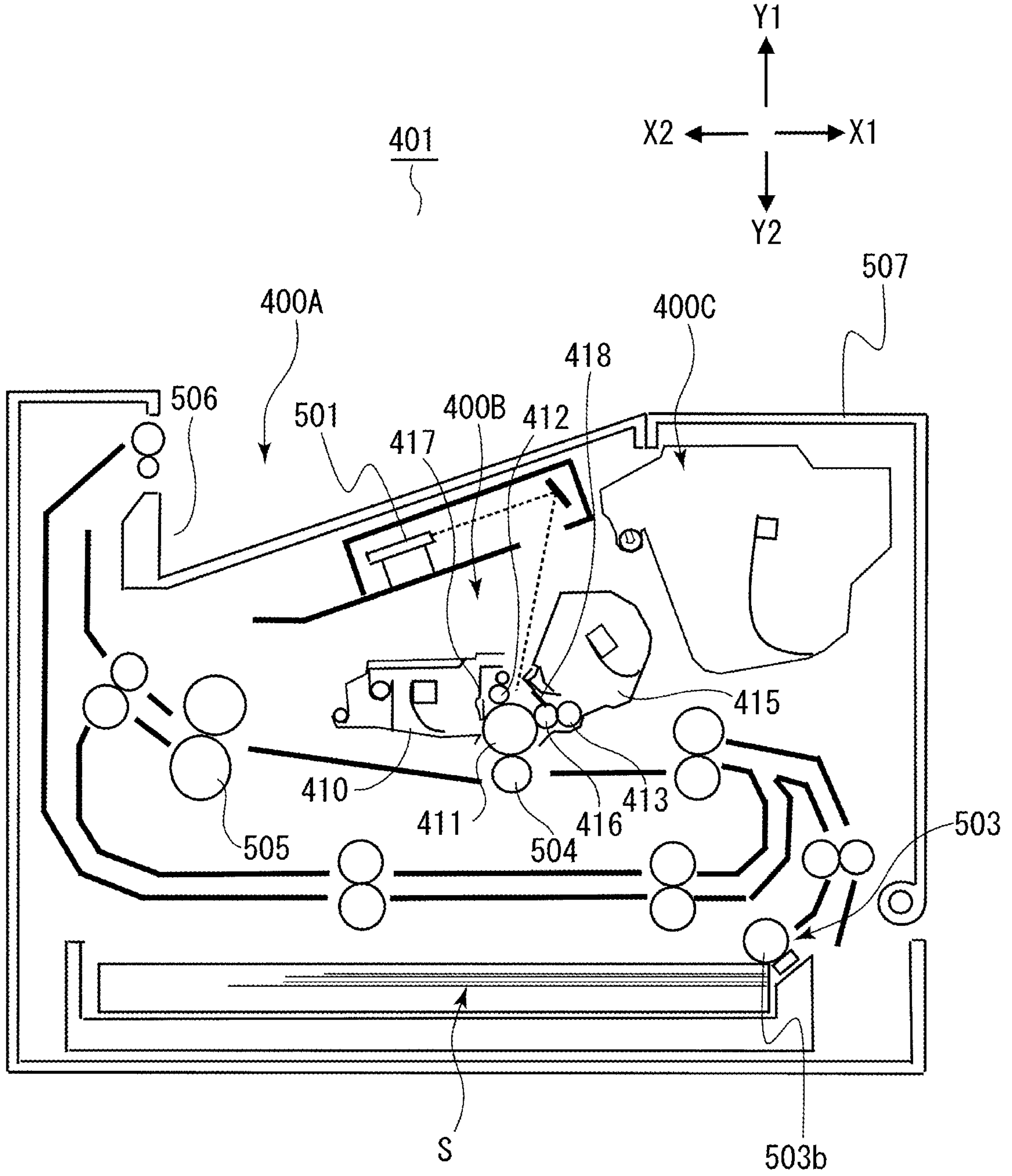

FIG. 35 is a sectional view showing a laser printer according to a second embodiment.

Figure 36:
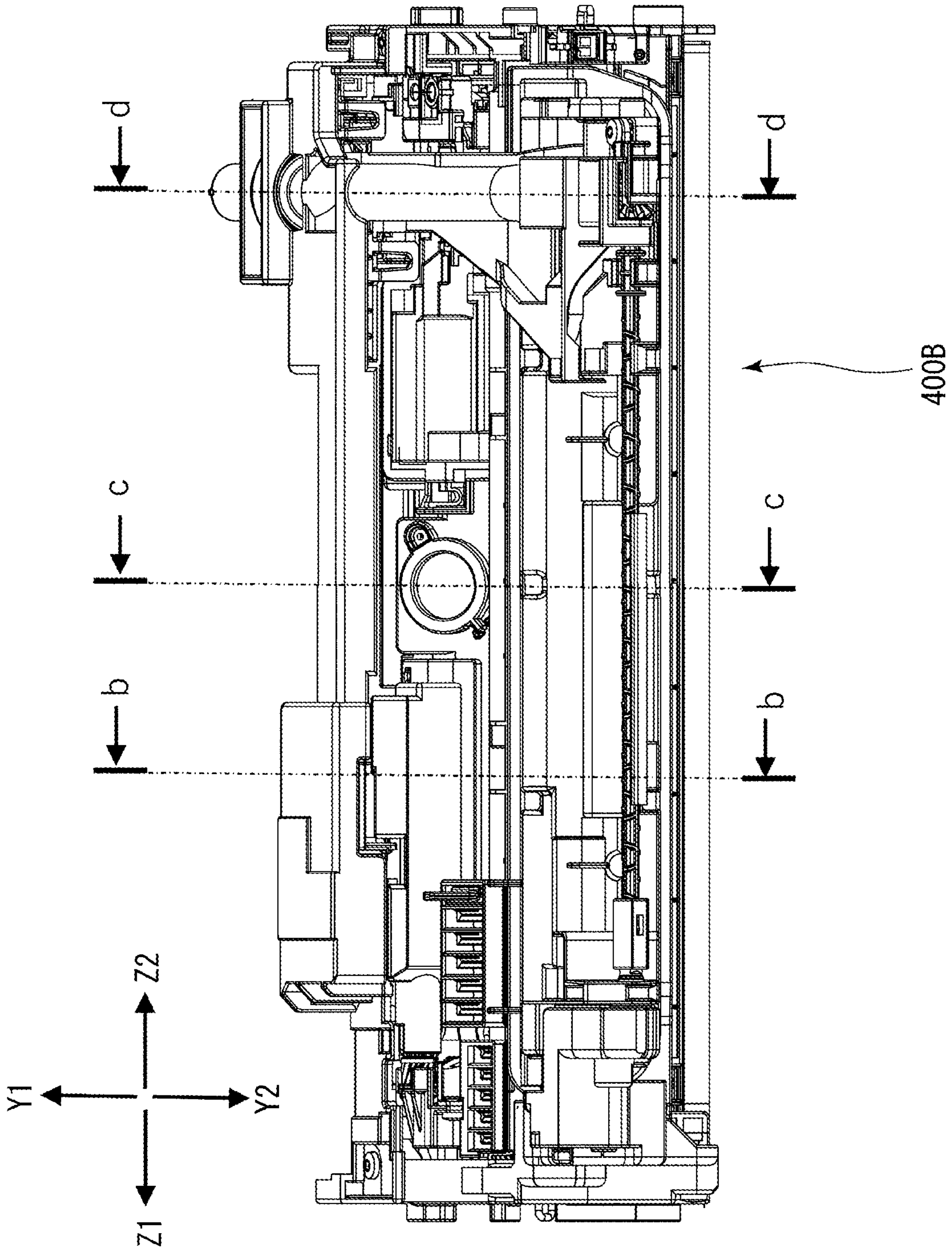

FIG. 36 is a front view of a process cartridge.

Figure 37:
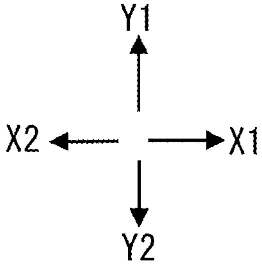
Figure 37:
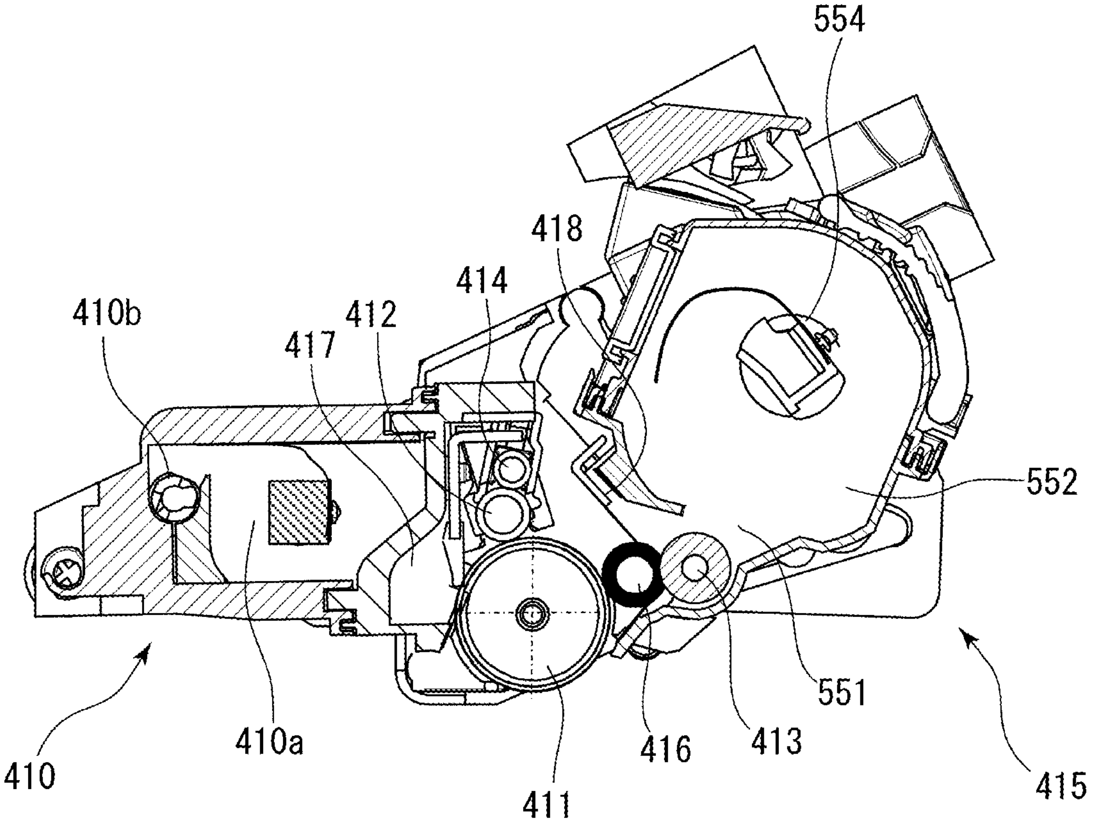

FIG. 37 is a sectional view showing a c-c cross section of FIG. 36.

Figure 38:
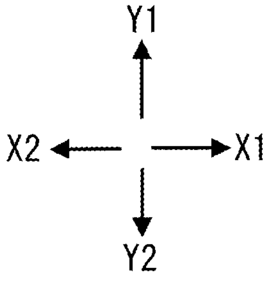
Figure 38:
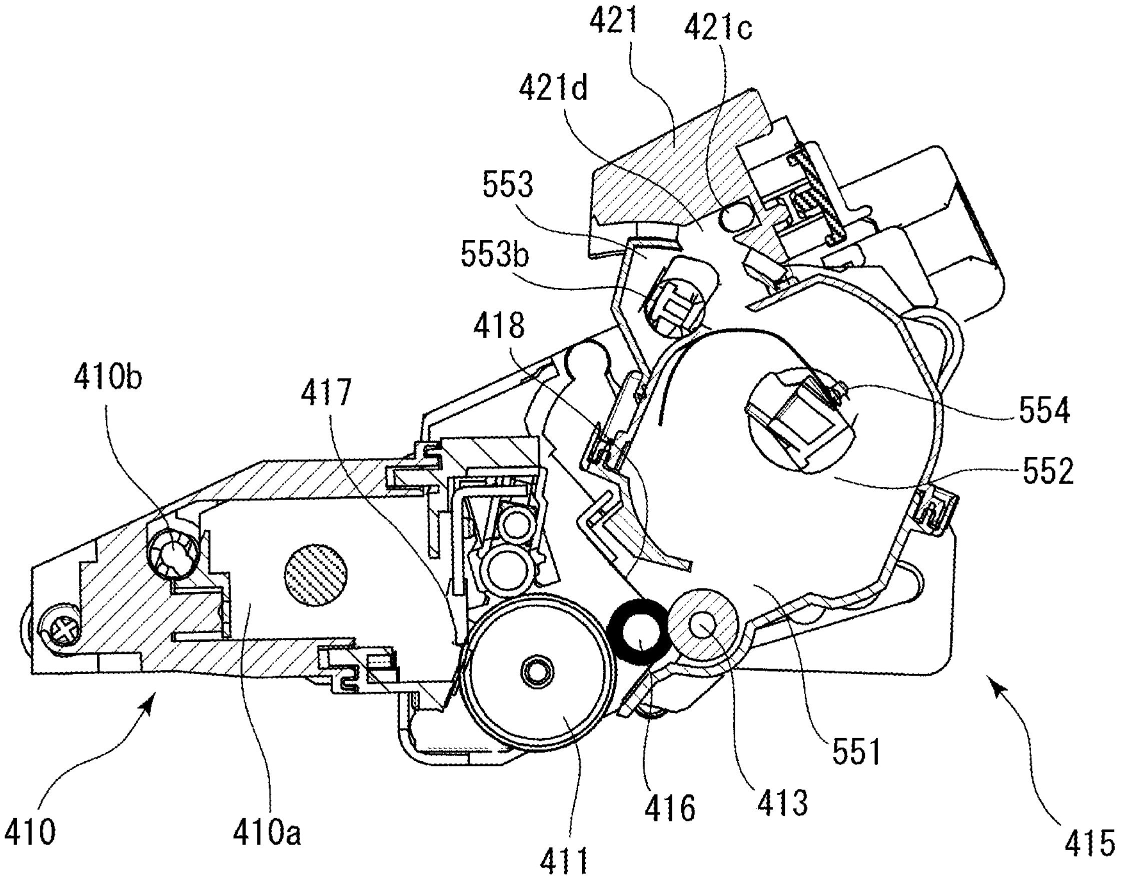

FIG. 38 is a sectional view showing a b-b cross section of FIG. 36.

Figure 39:
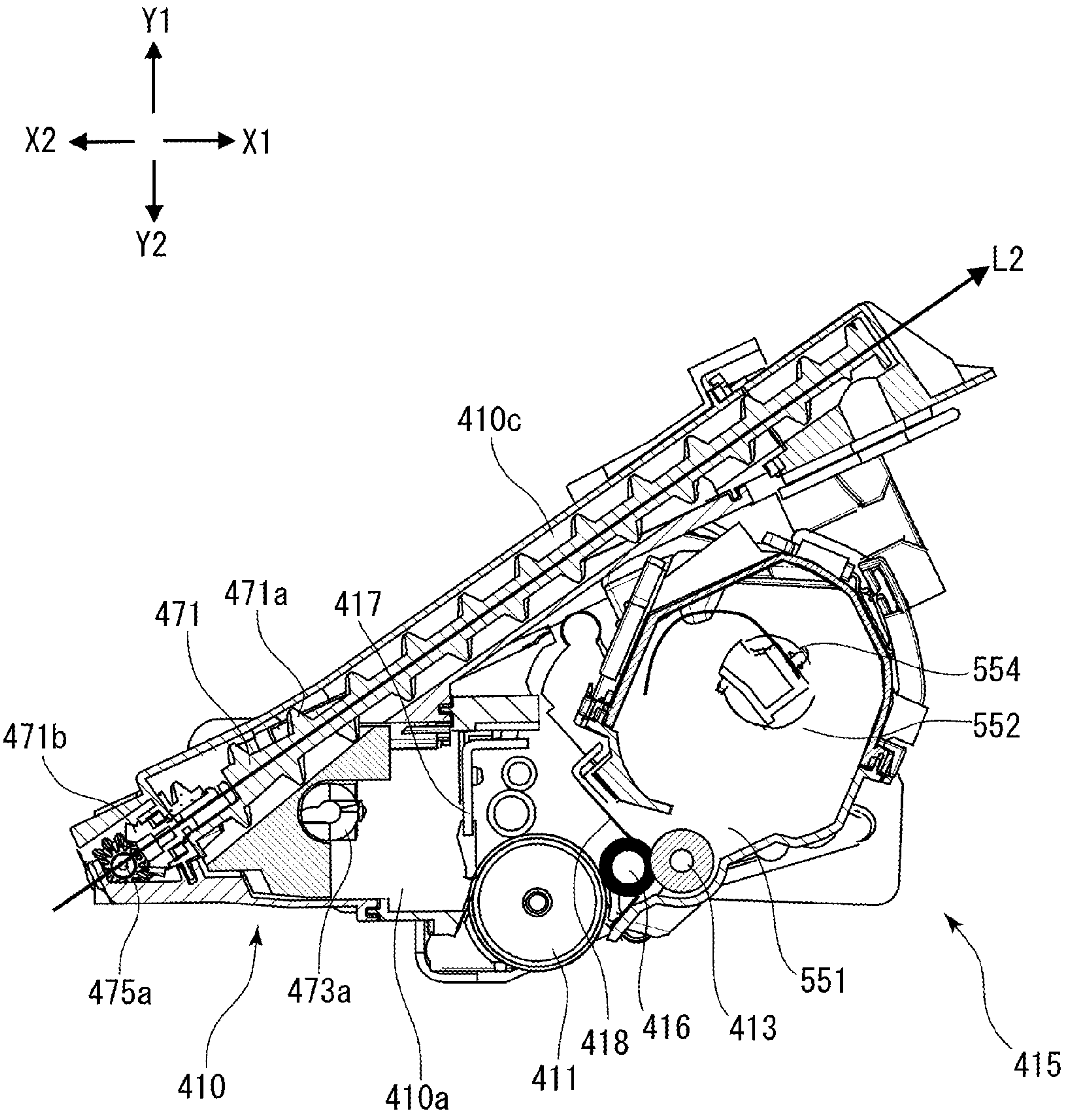

FIG. 39 is a sectional view showing a d-d cross section of FIG. 36.

Figure 40:
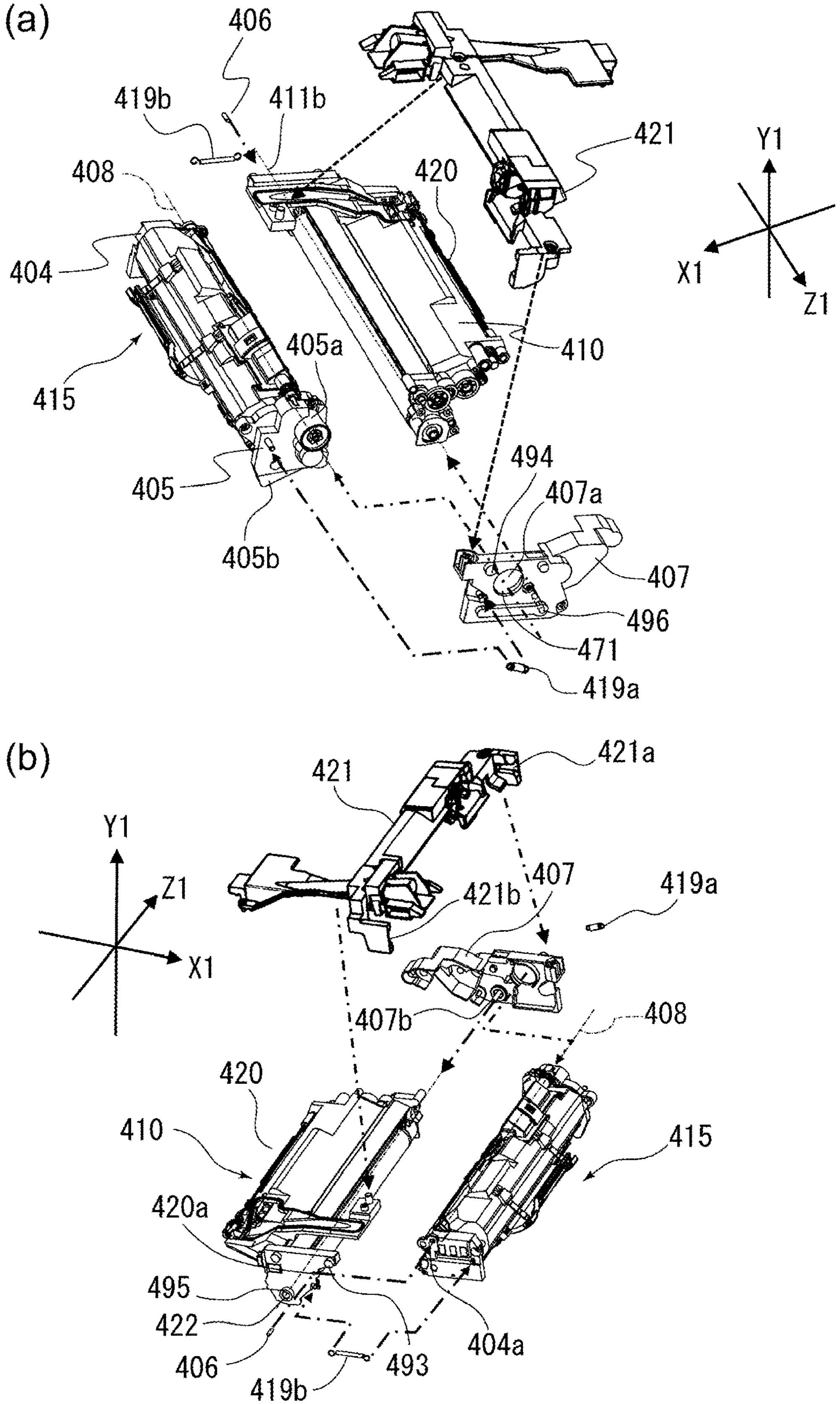

Part (a) of FIG. 40 is an exploded perspective view showing the process cartridge, and part (b) of FIG. 40 is another exploded perspective view showing the process cartridge.

Figure 41:
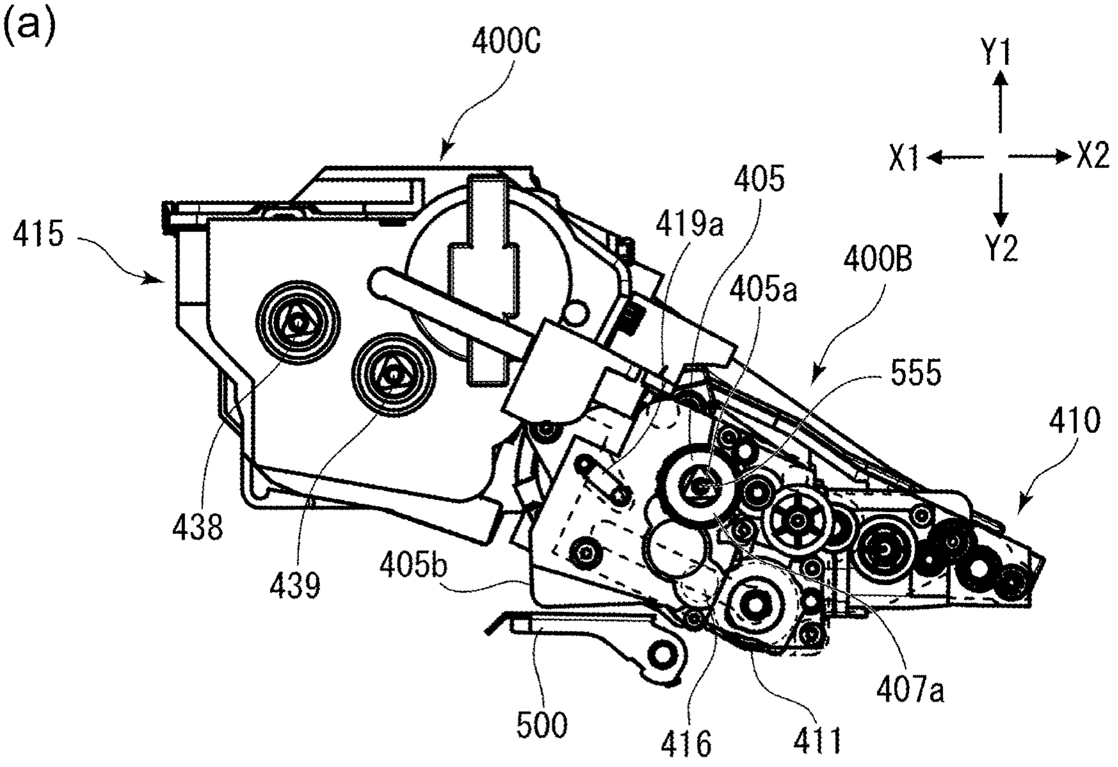
Figure 41:
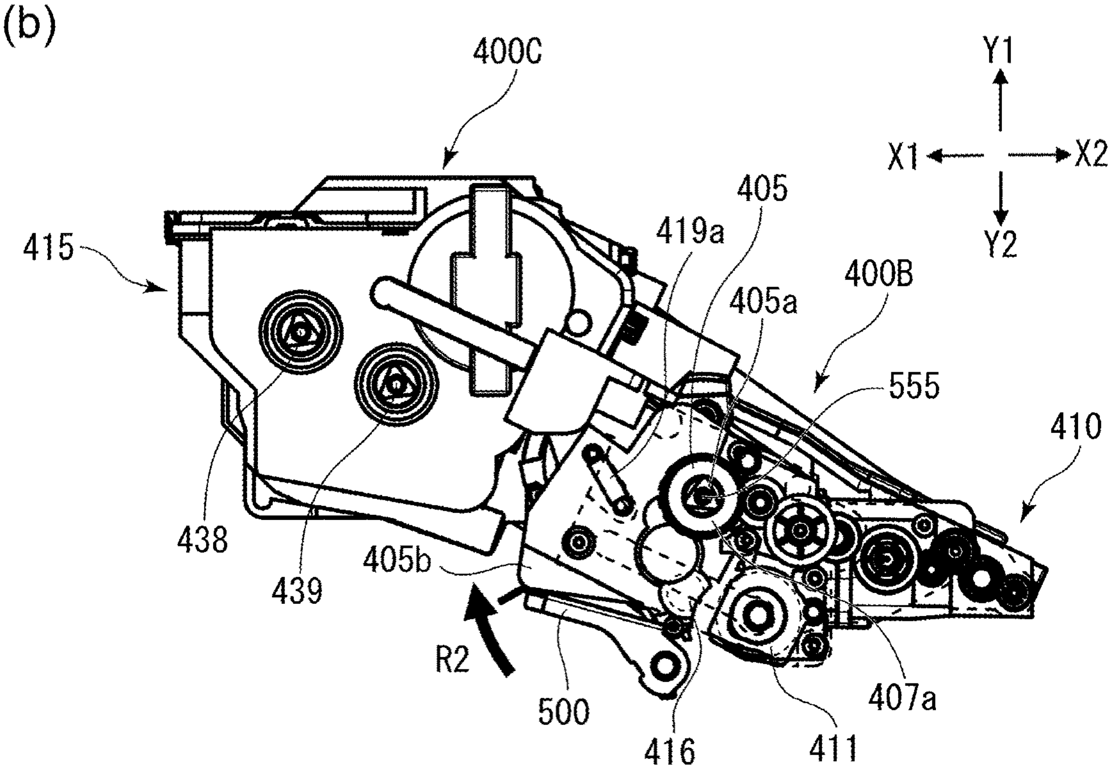

Part (a) of FIG. 41 is a sectional view showing a state in which a photosensitive drum and a developing roller are in contact with each other, and part (b) of FIG. 41 is a sectional view showing a state in which the photosensitive drum and the developing roller are separated from each other.

Figure 42:
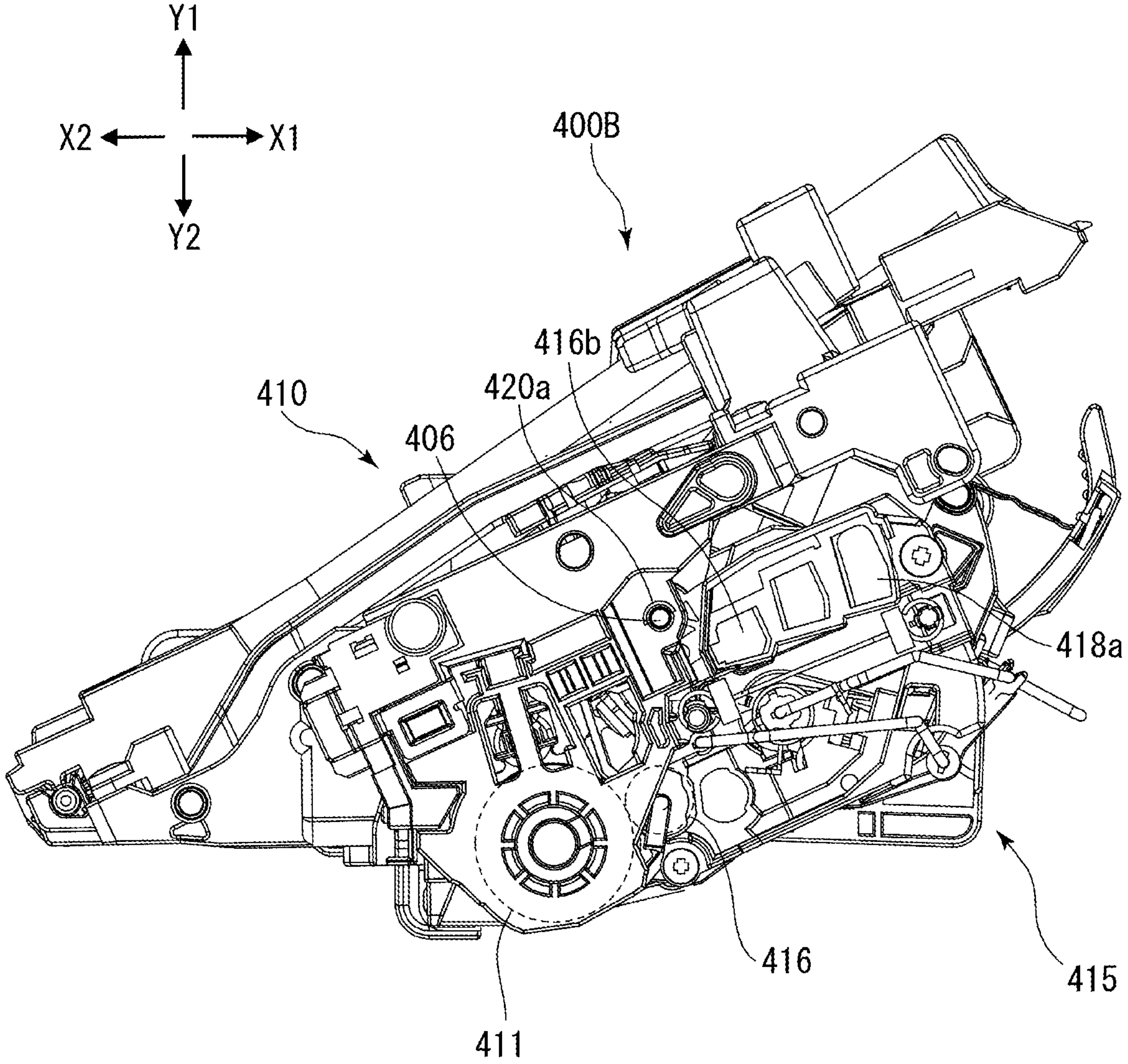

FIG. 42 is a side view showing a non-driving side of the process cartridge.

Figure 43:
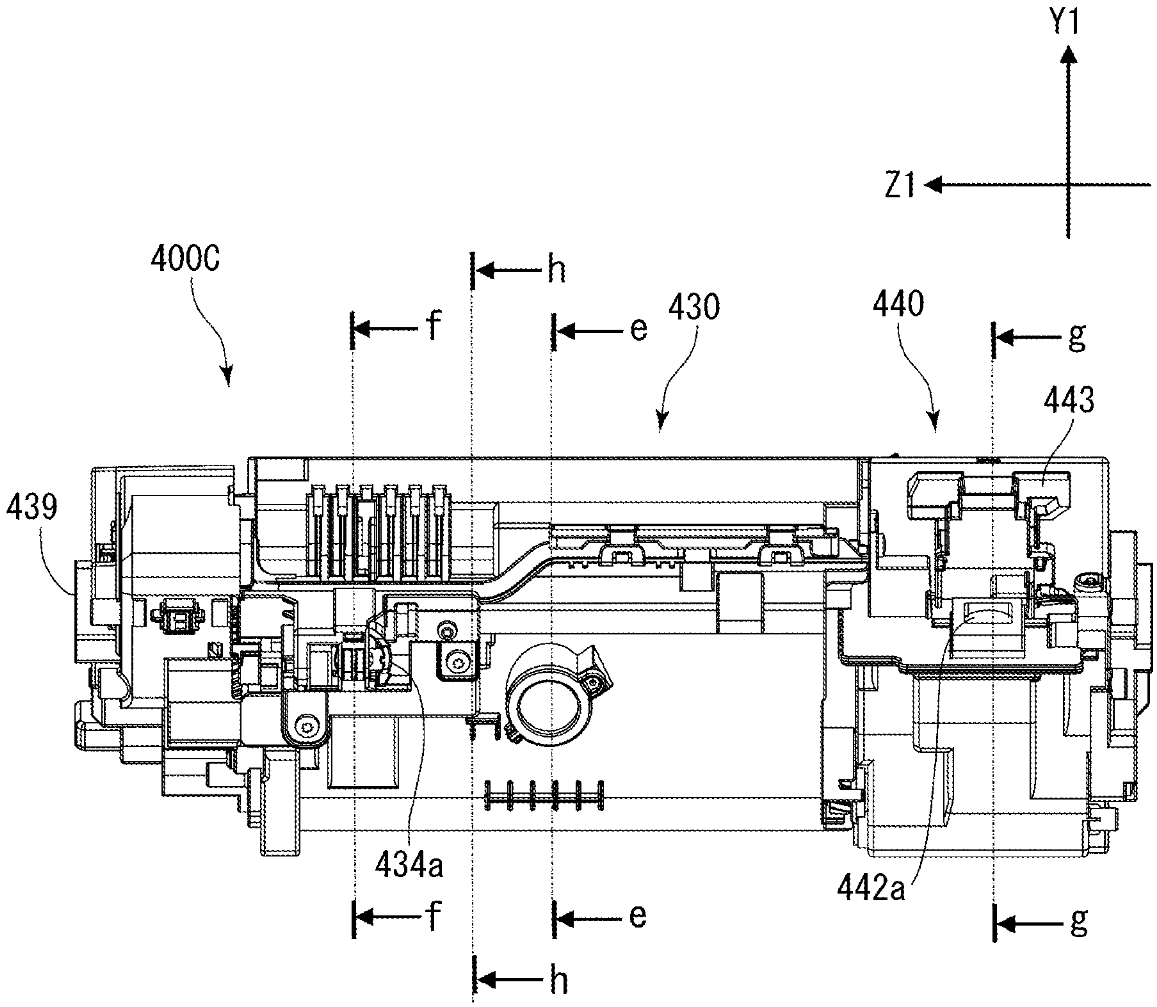

FIG. 43 is a front view showing the process cartridge.

Figure 44:
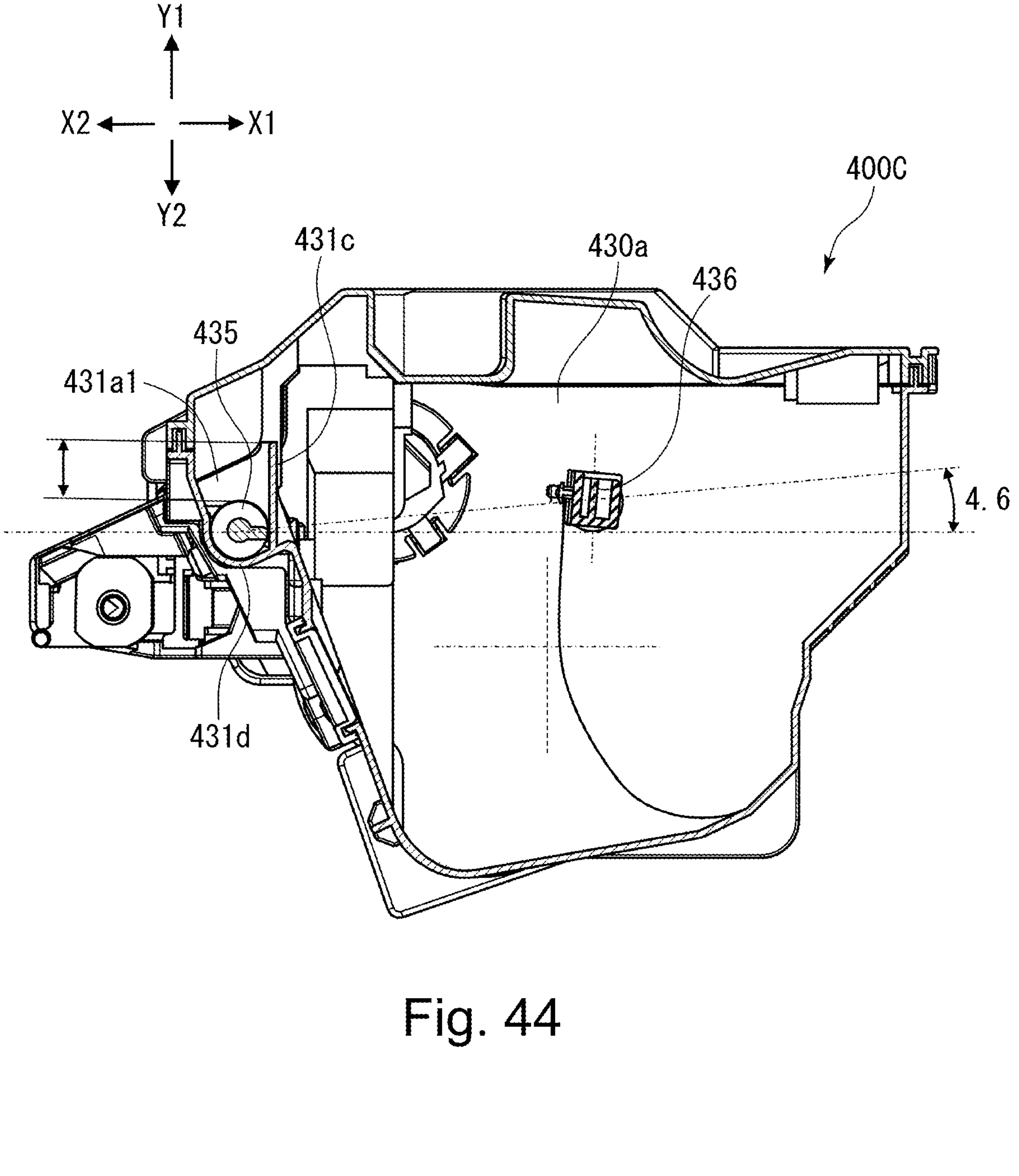

FIG. 44 is a sectional view showing an e-e cross section of FIG. 43.

Figure 45:
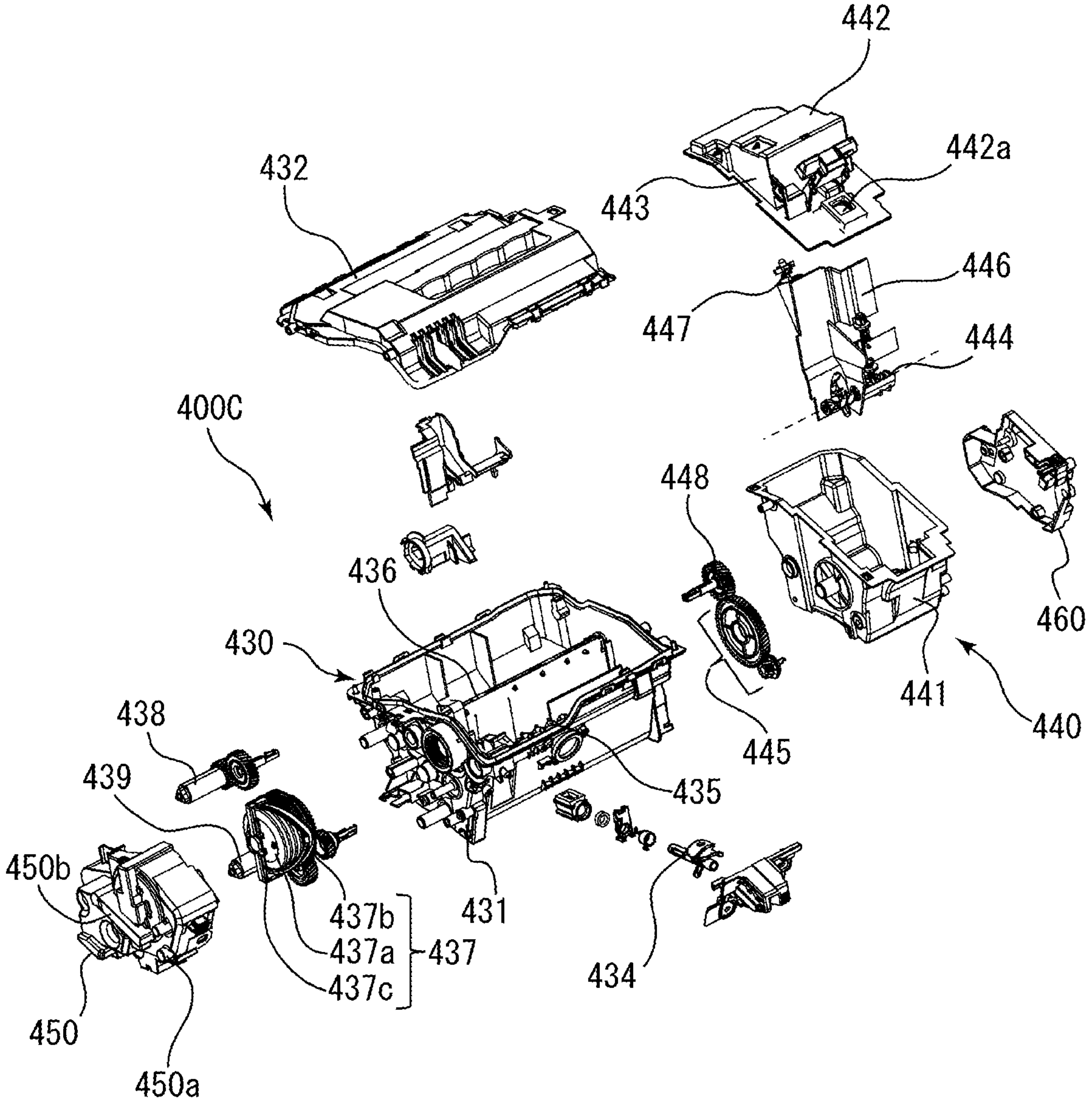

FIG. 45 is an exploded perspective view of the toner cartridge as viewed from a driving side.

Figure 46:
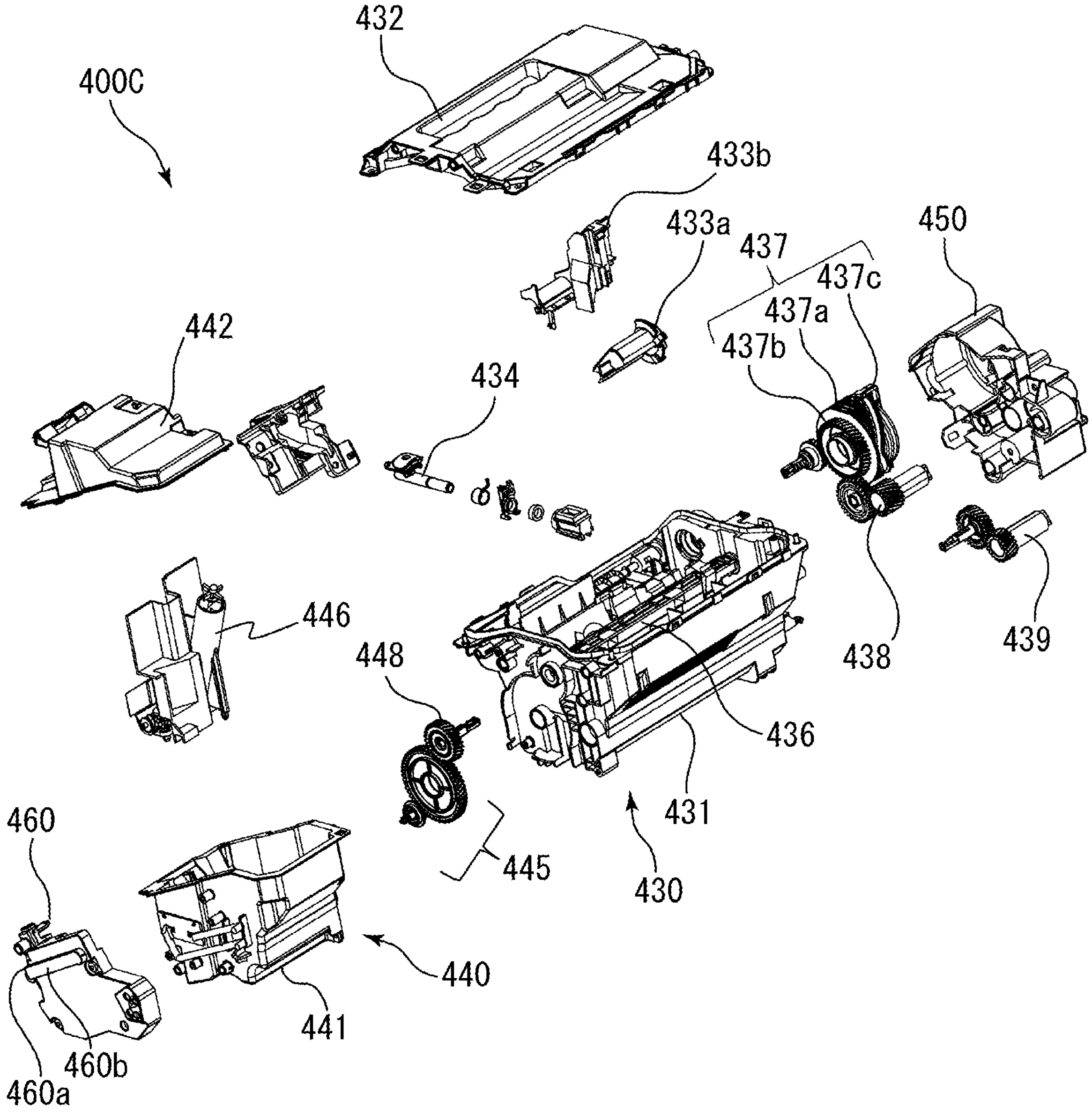

FIG. 46 is an exploded perspective view of the toner cartridge as viewed from a non-driving side.

Figure 47:
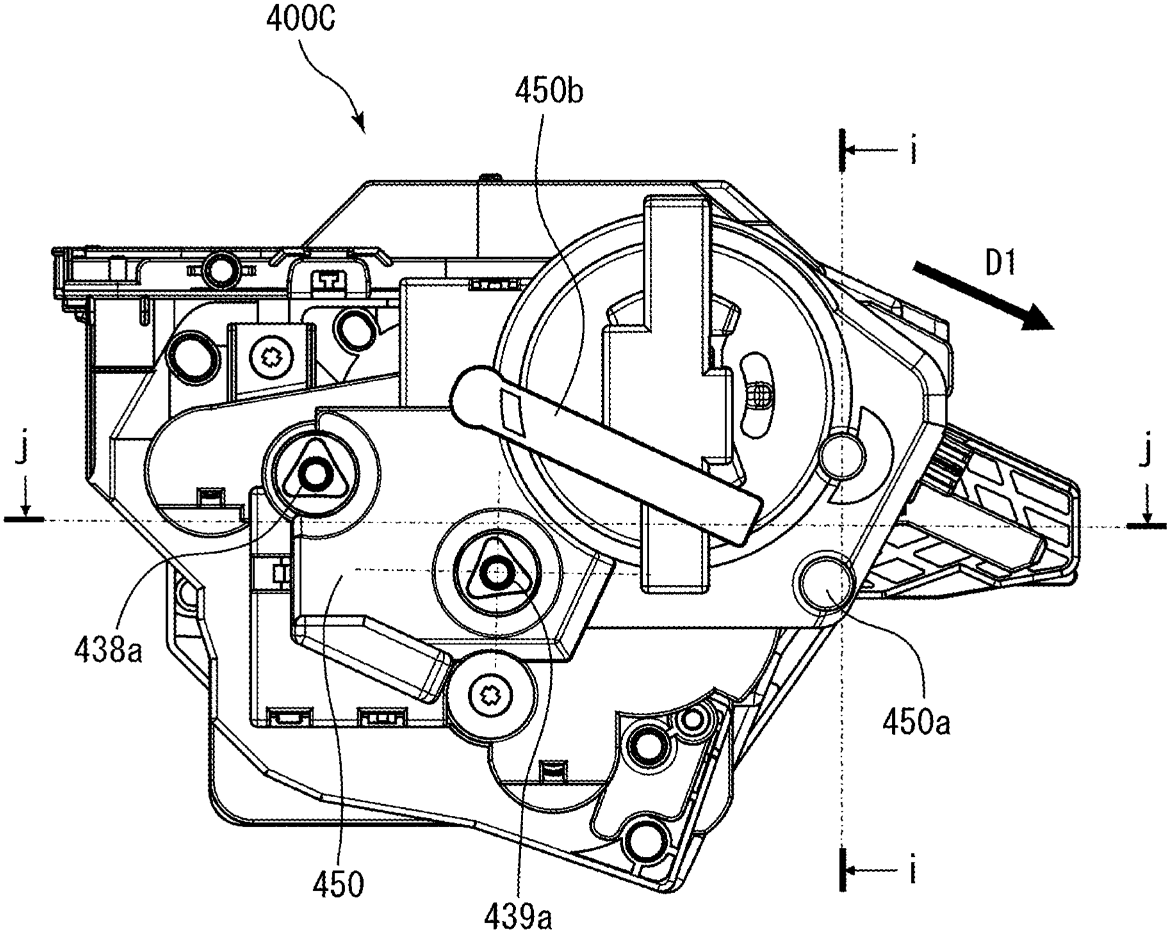

FIG. 47 is a side view showing the driving side of the process cartridge.

Figure 48:
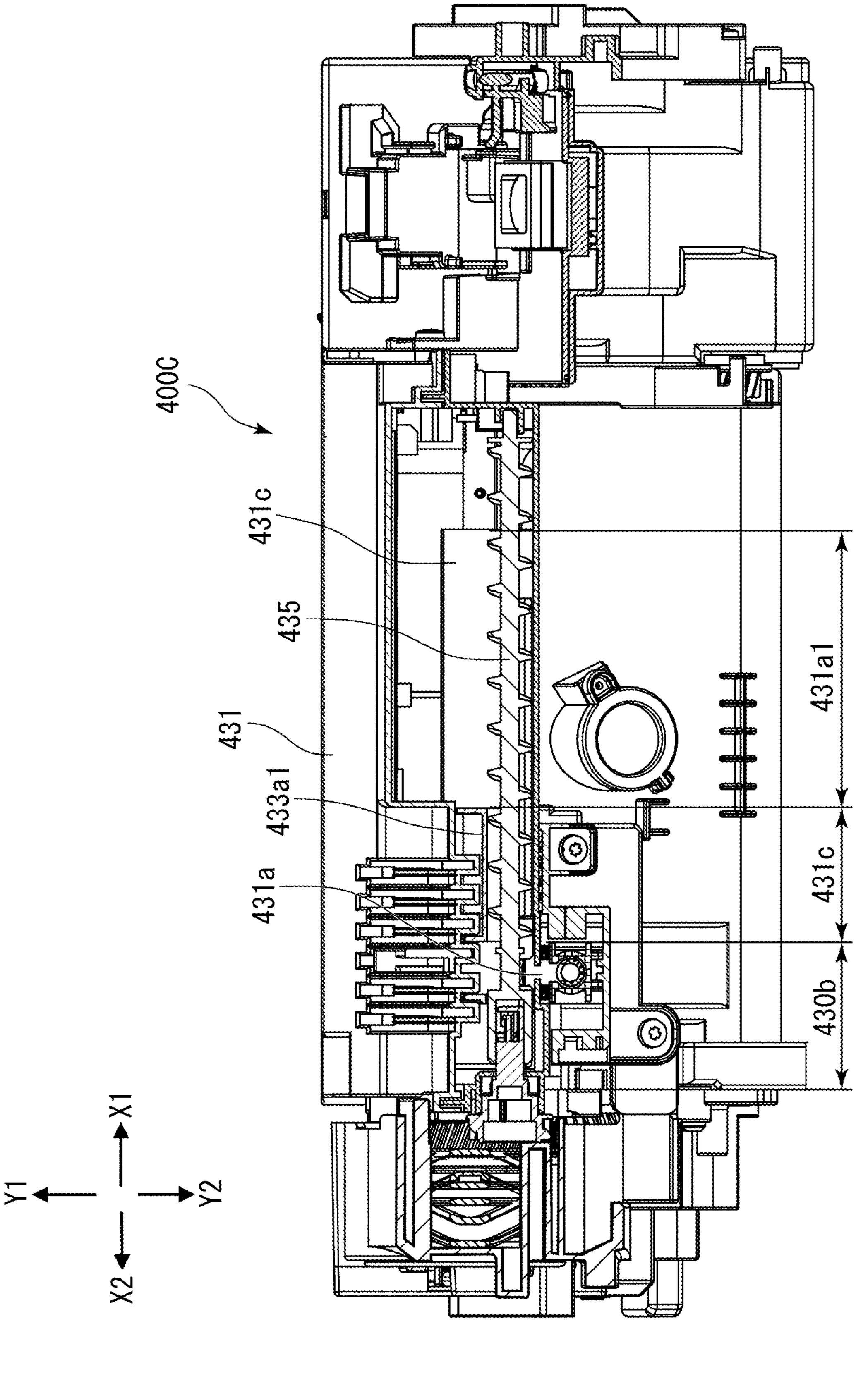

FIG. 48 is a sectional view showing an i-i cross section of FIG. 47.

Figure 49:
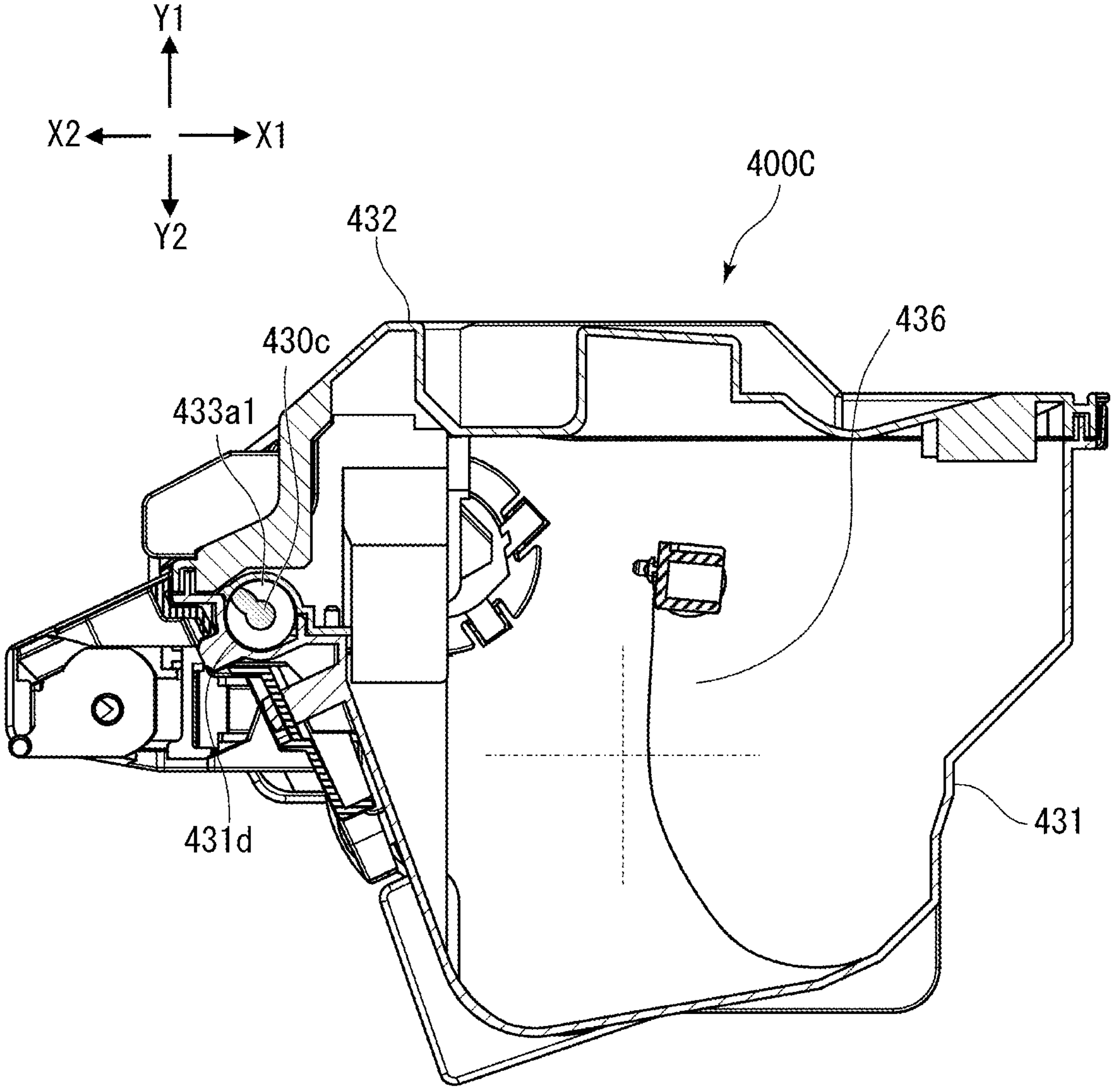

FIG. 49 is a sectional view showing an h-h cross section of FIG. 43.

Figure 50:
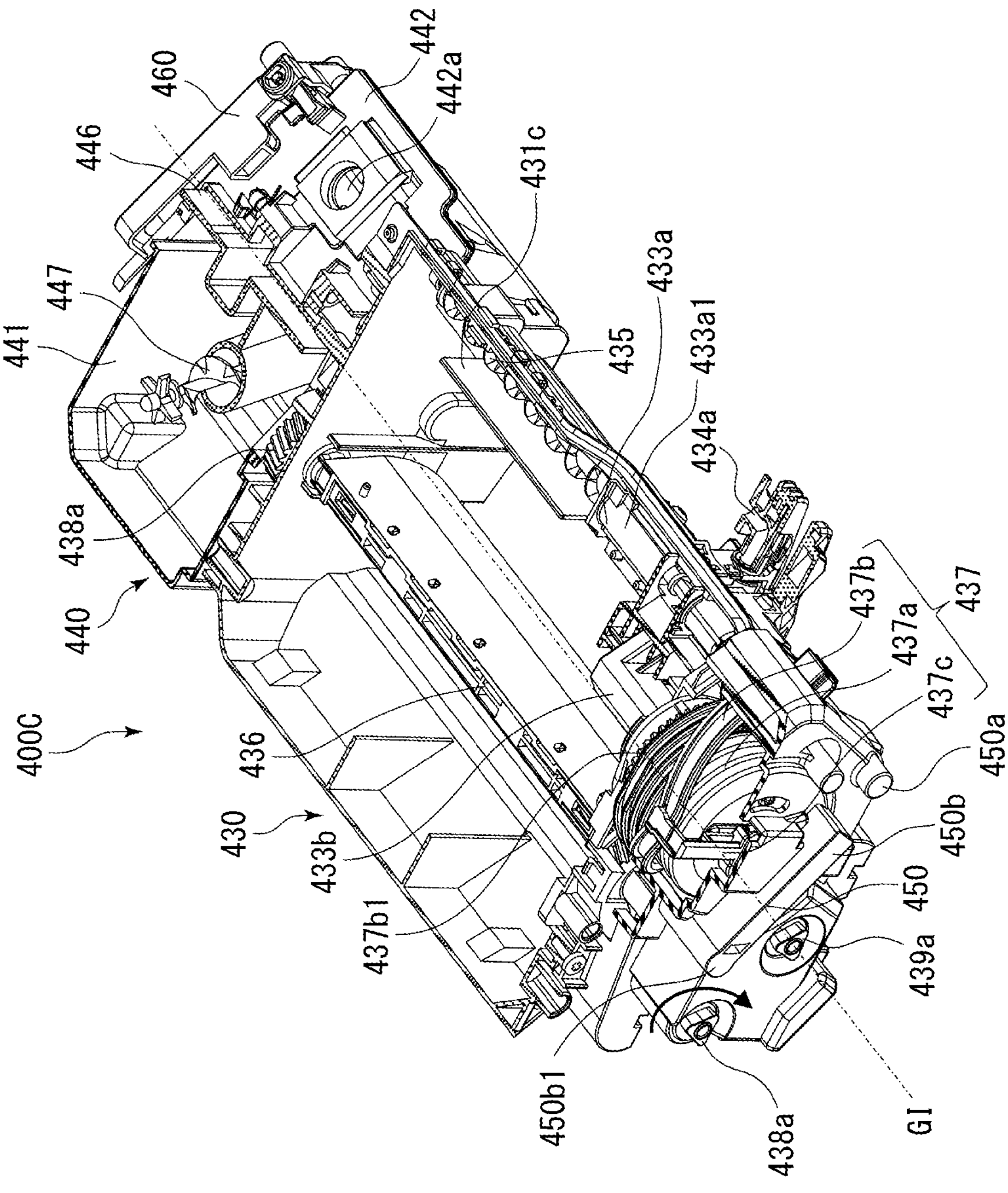

FIG. 50 is a perspective sectional view of the process cartridge along a longitudinal direction.

Figure 51:
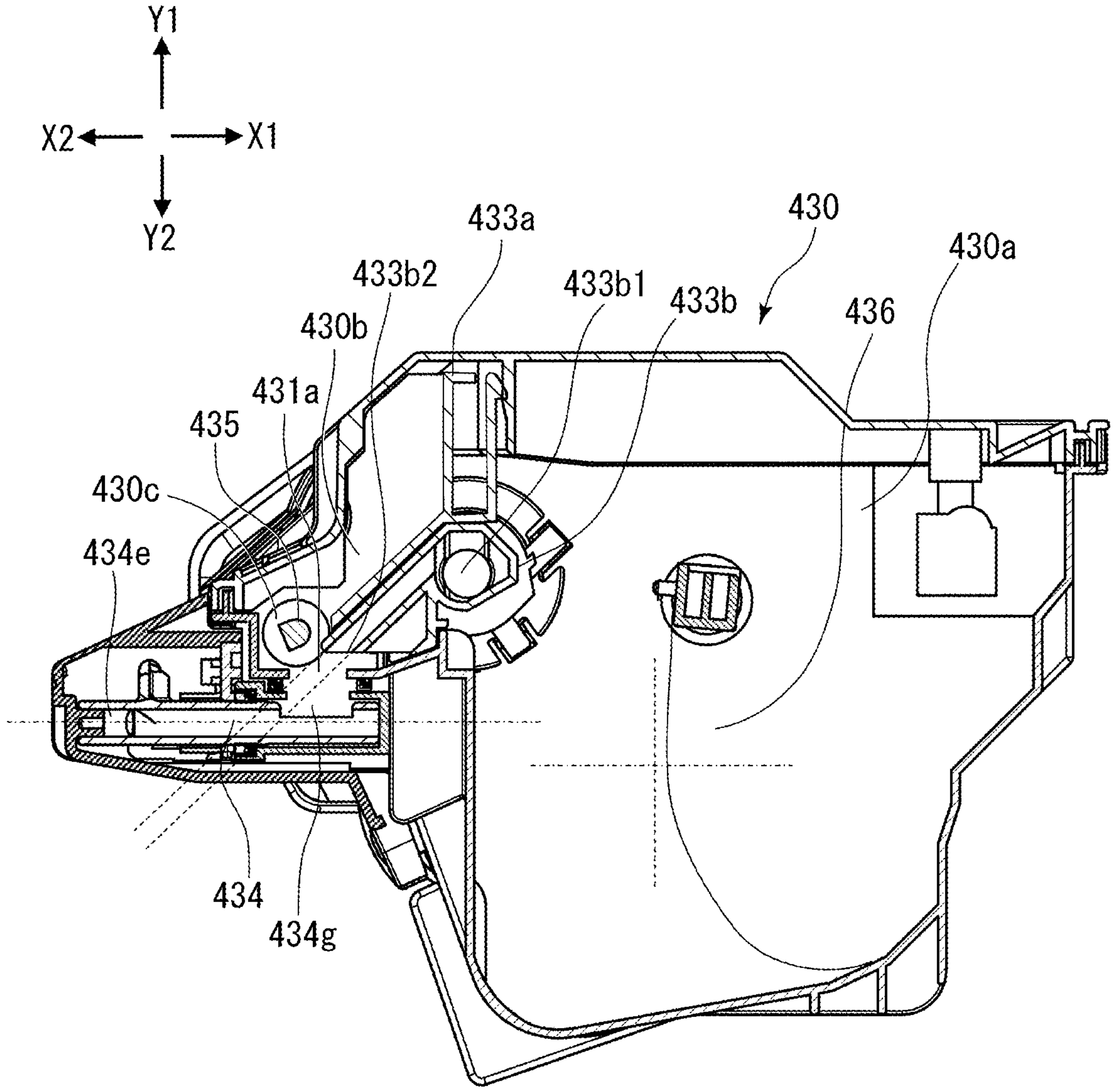

FIG. 51 is a sectional view showing an f-f cross section of FIG. 43.

Figure 52:
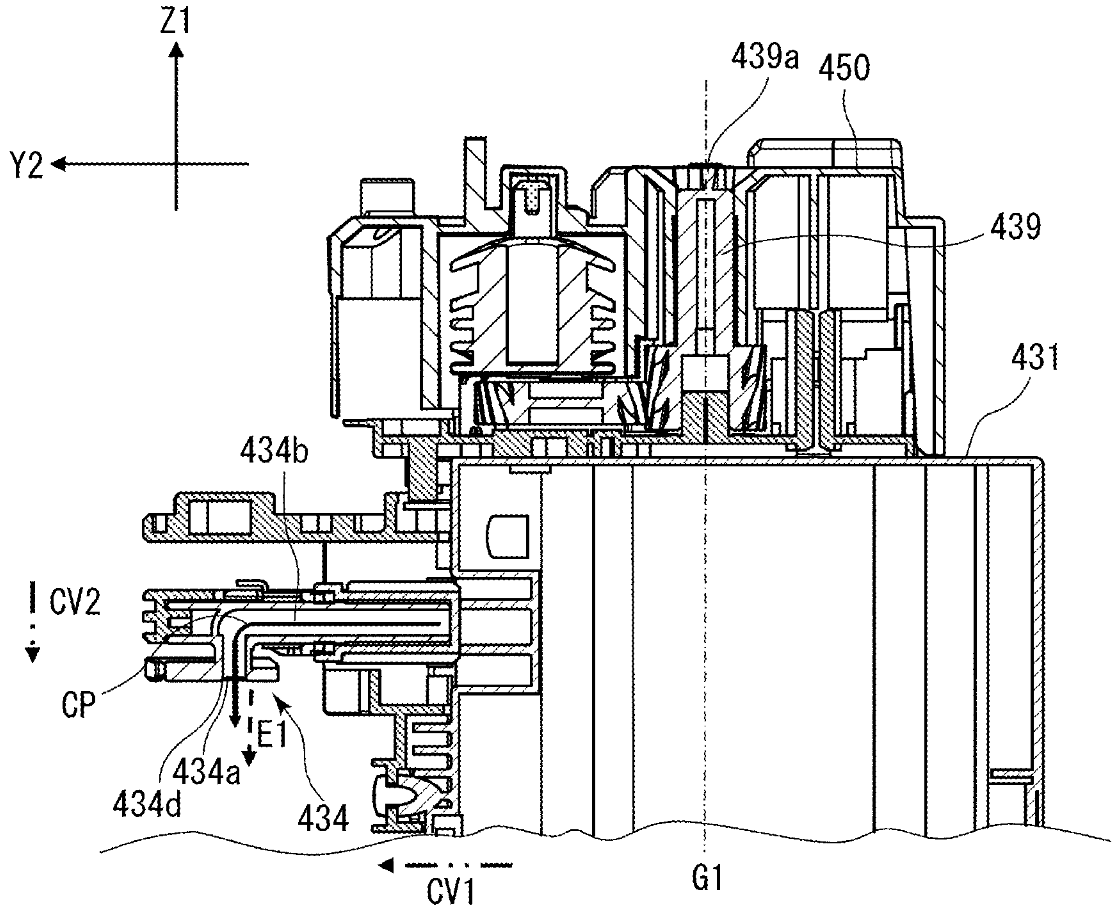

FIG. 52 is a sectional view showing a j-j cross section of FIG. 47.

Figure 53:
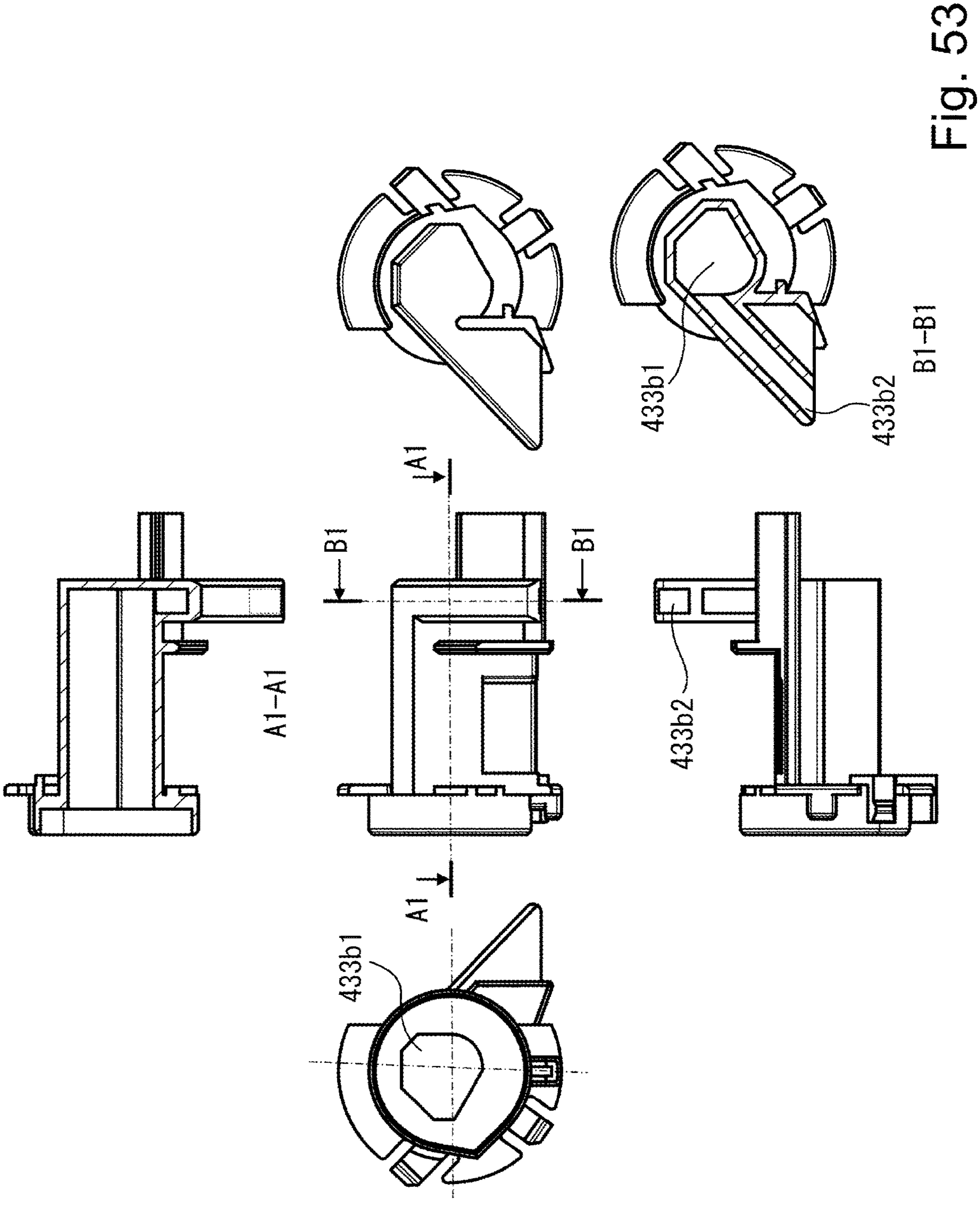

FIG. 53 includes a front view, a left-side view, a right-side view, a bottom view, and sectional views of a nozzle member.

Figure 54:
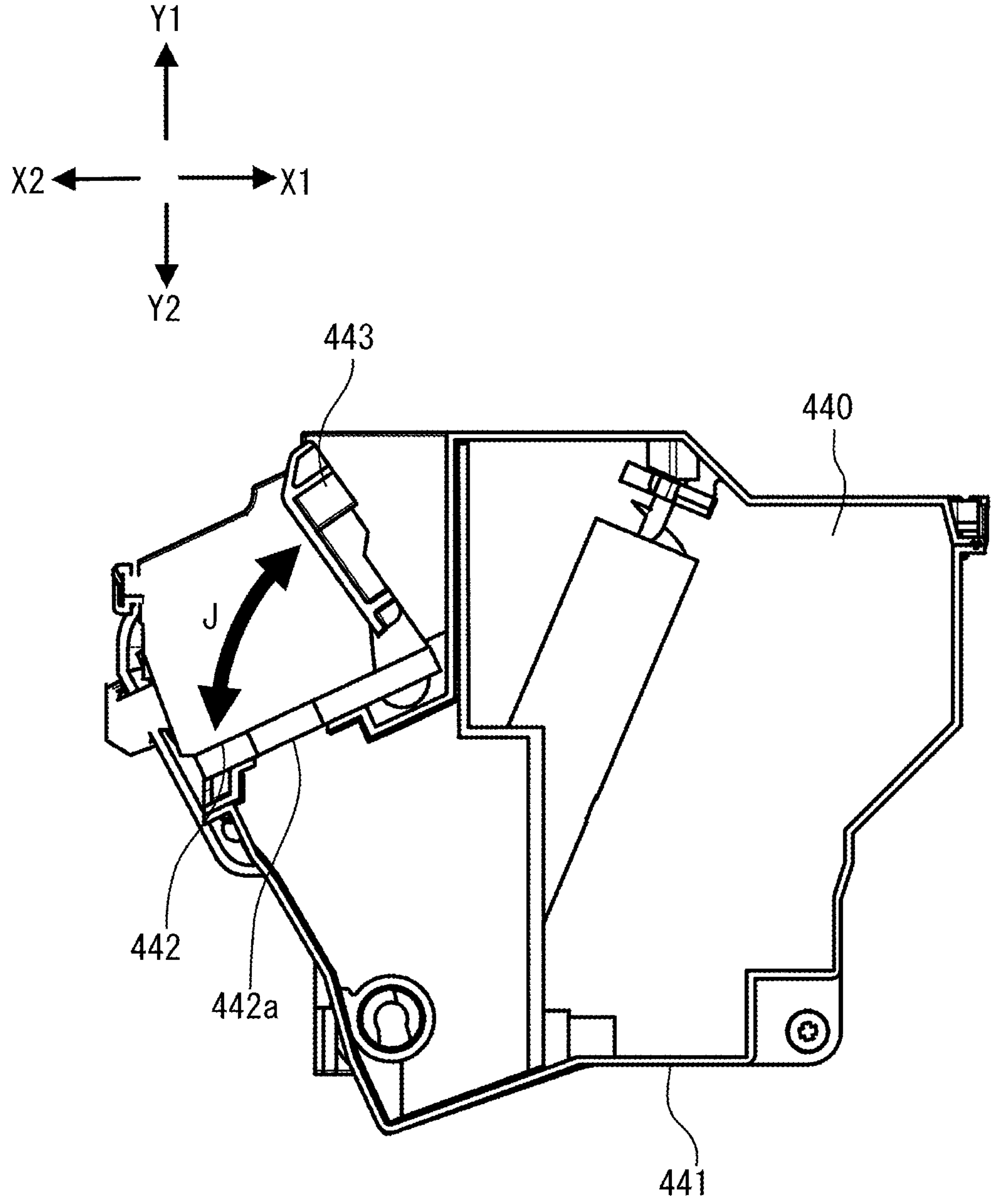

FIG. 54 is a sectional view showing a g-g cross section of FIG. 43.

Figure 55:
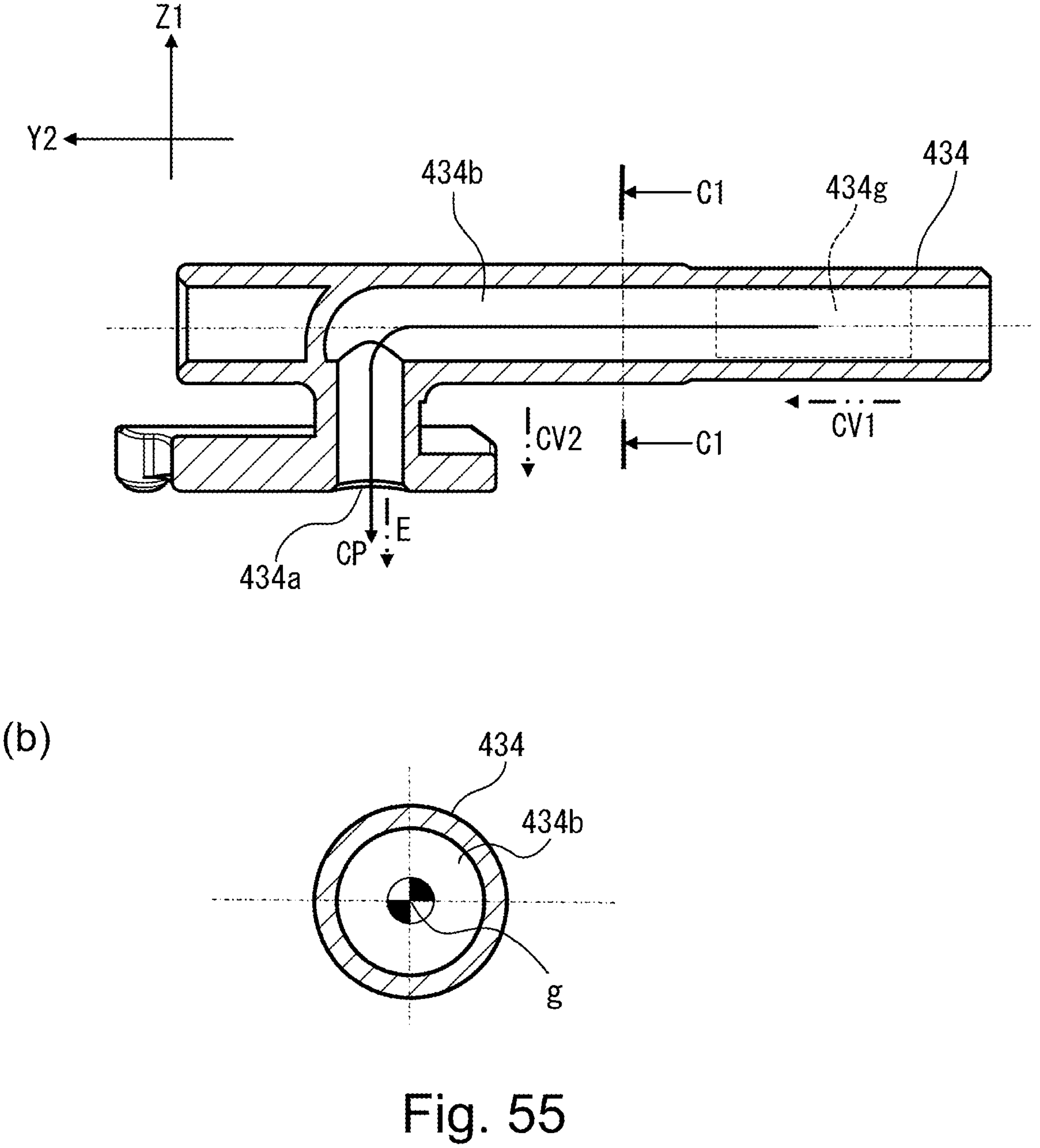

Part (a) of FIG. 55 is a sectional view showing a shutter member, and part (b) of FIG. 55 is a sectional view showing a C1-C1 cross section of part (a) of FIG. 55.

Figure 56:
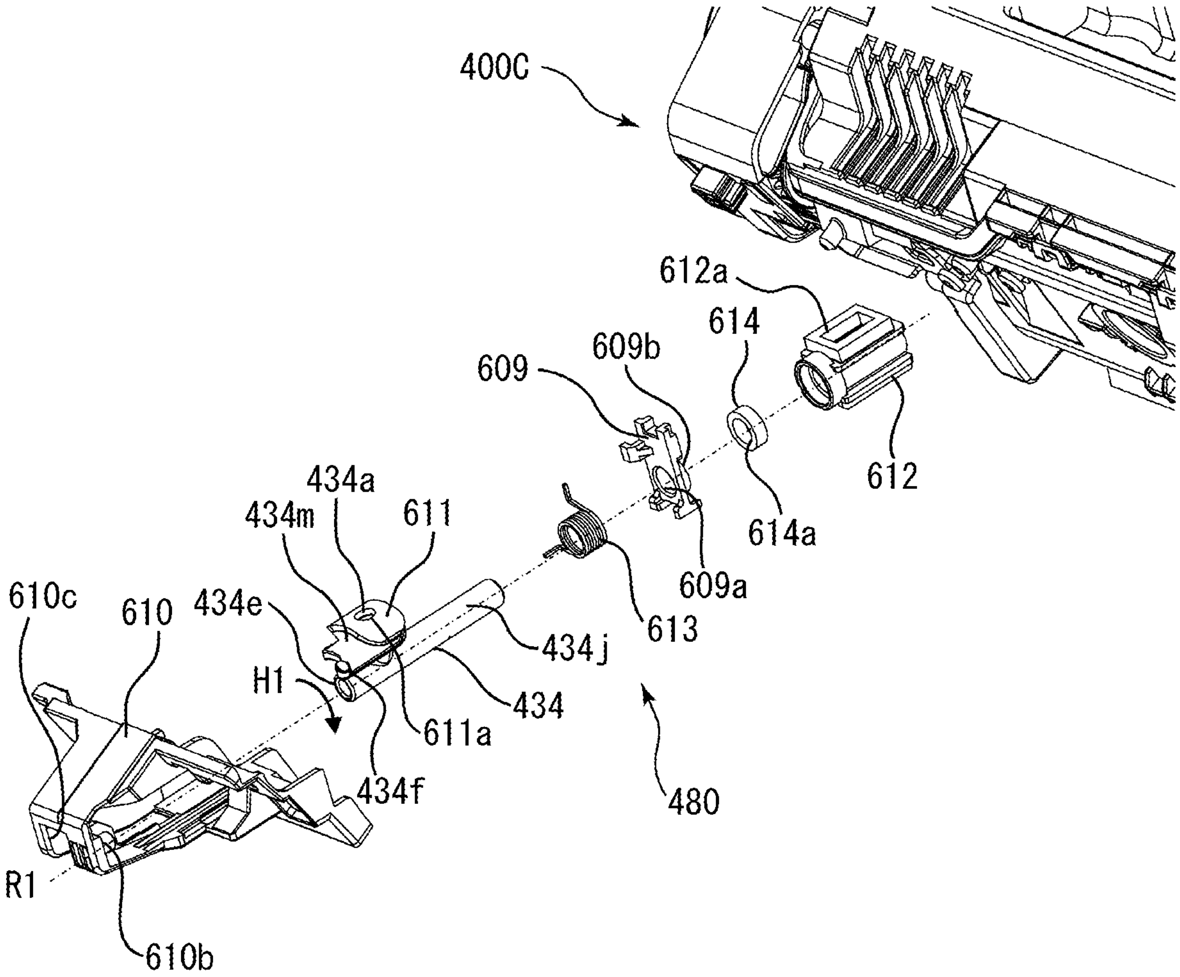

FIG. 56 is an exploded perspective view showing a shutter unit.

Figure 57:
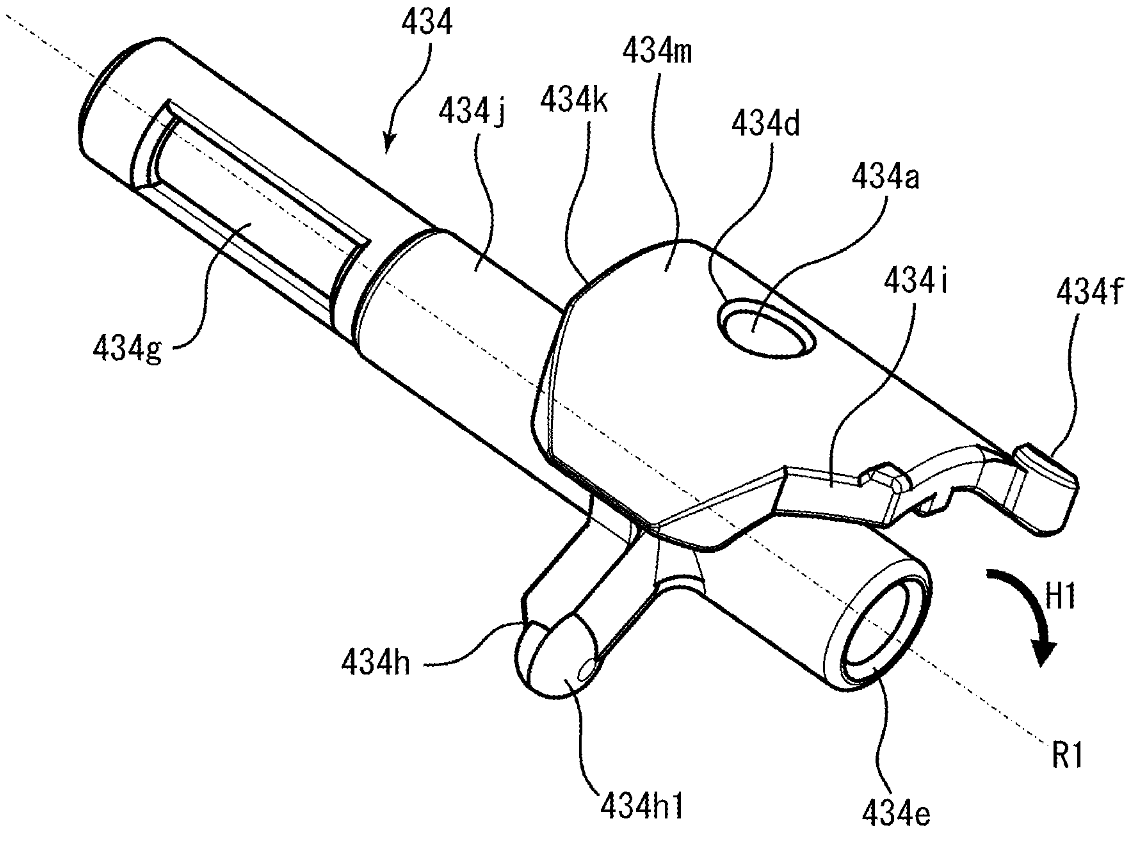

FIG. 57 is a perspective view showing the shutter member.

Figure 58:
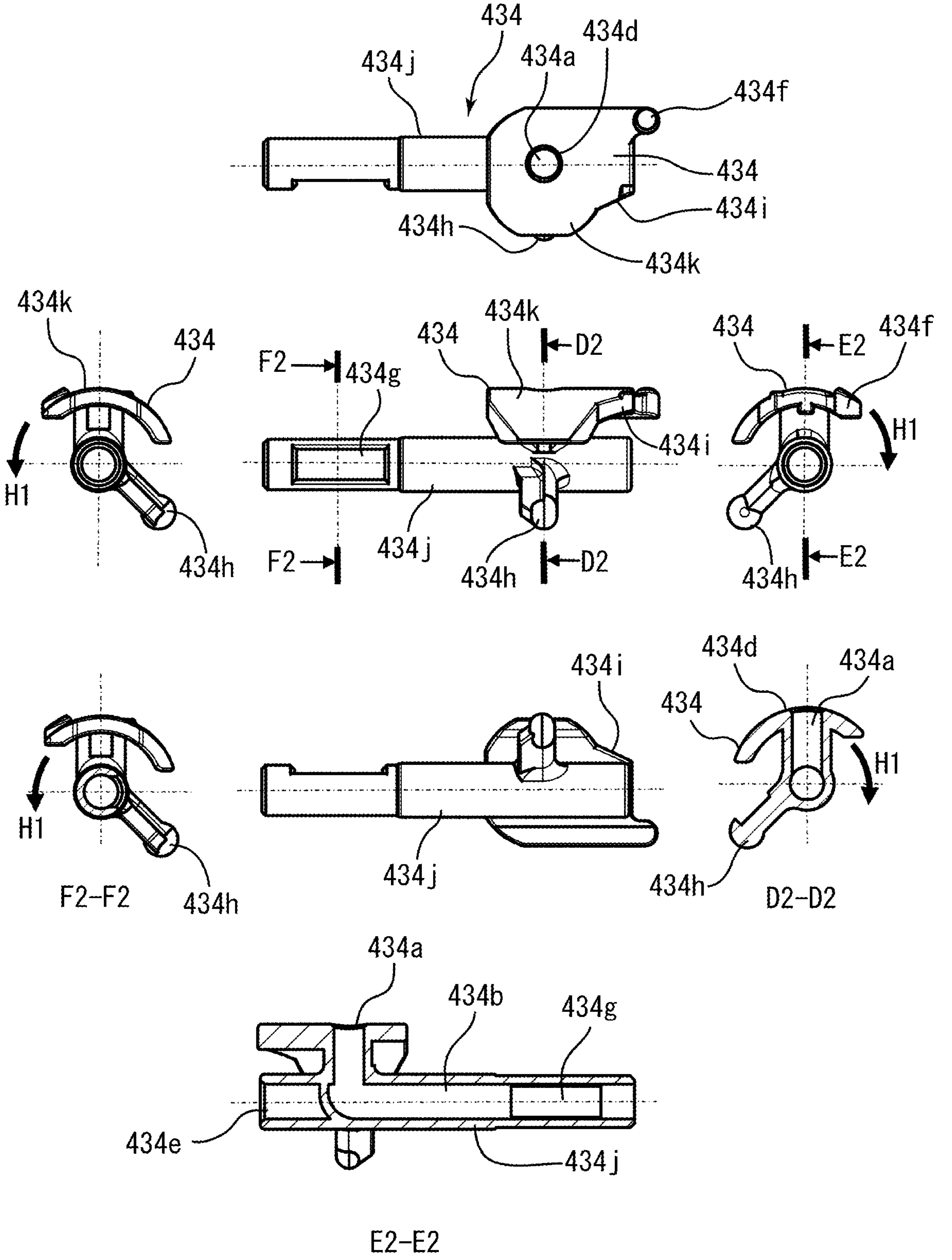

FIG. 58 includes a front view, a left-side view, a right-side view, a bottom view, and sectional views of the shutter member.

Figure 59:
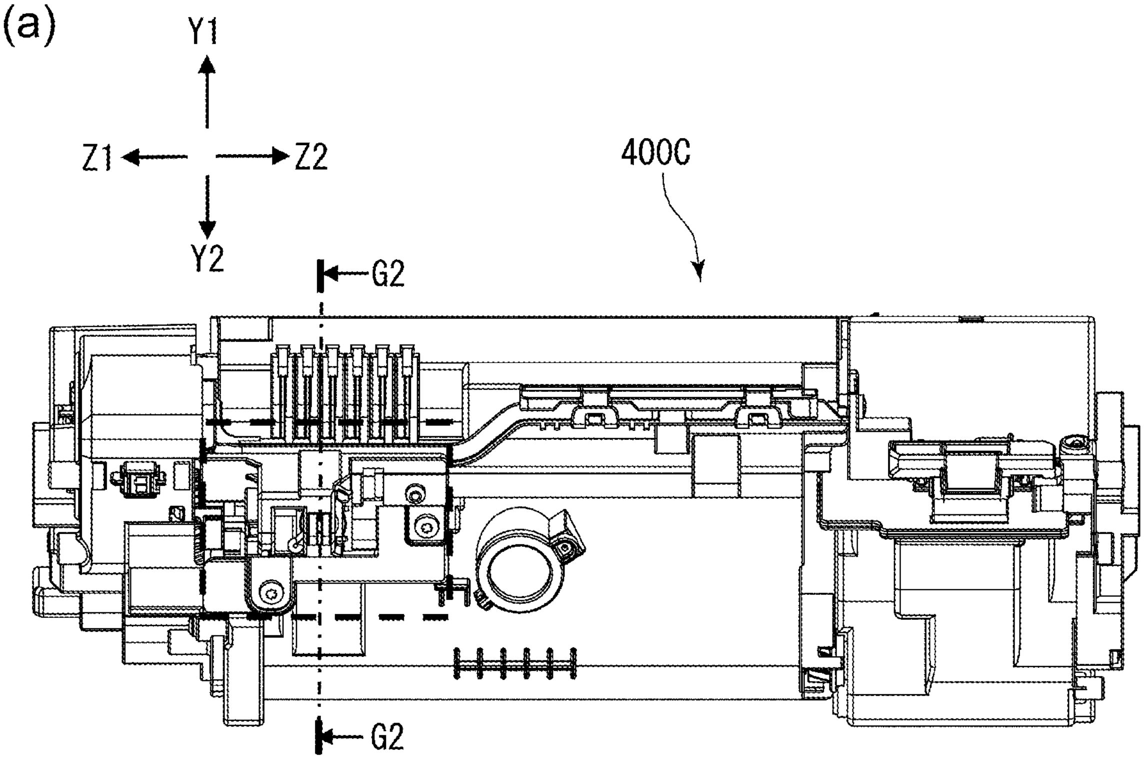
Figure 59:
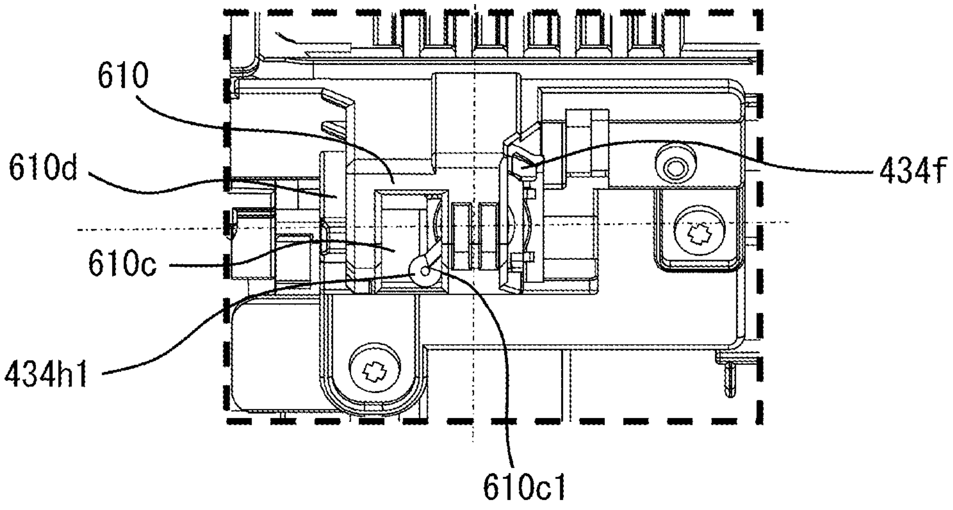

Part (a) of FIG. 59 is a front view showing a state in which the shutter member of the toner cartridge seals toner, and part (b) of FIG. 59 is a partially enlarged view of part (a) of FIG. 59.

Figure 60:
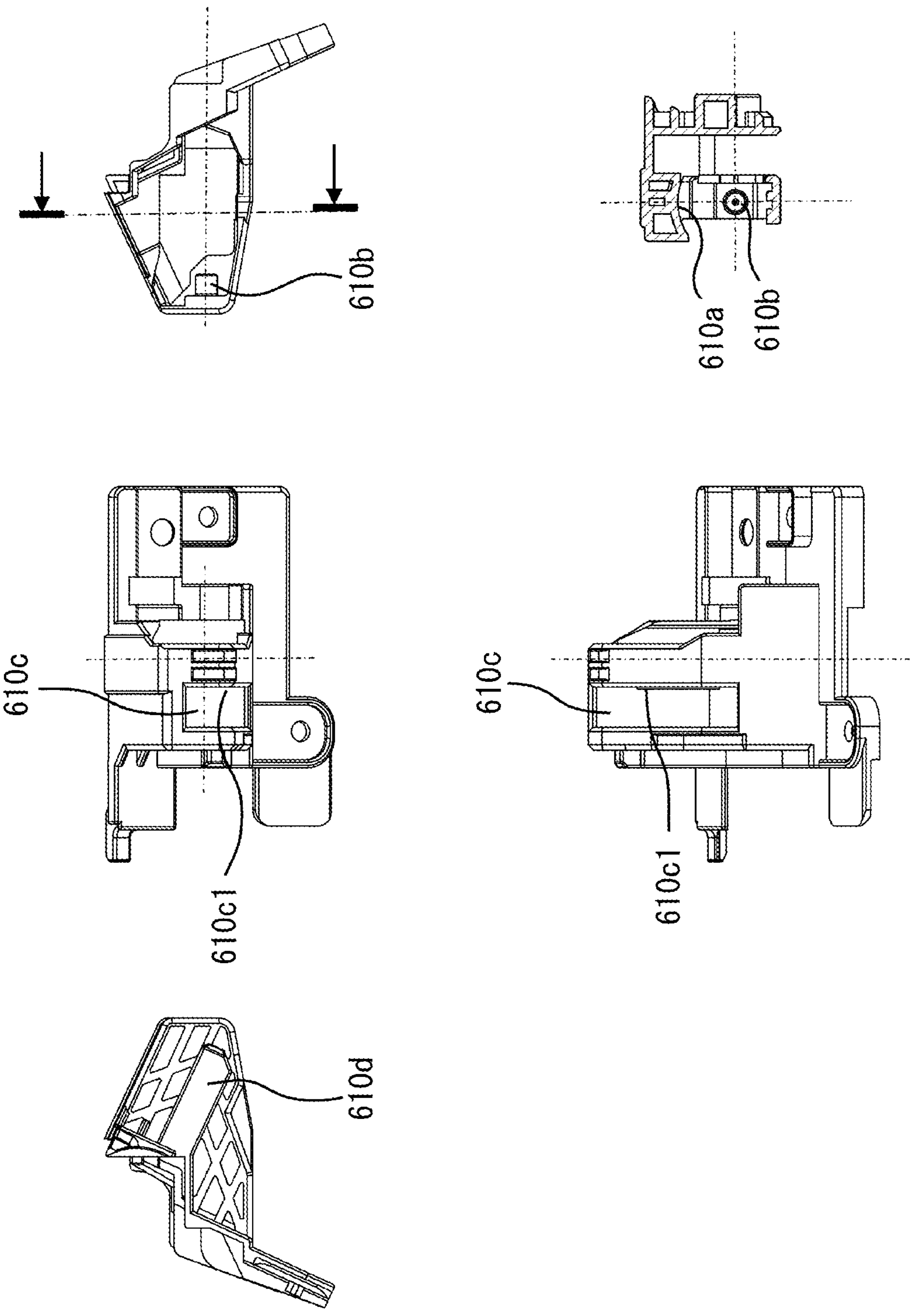

FIG. 60 includes a front view, a left-side view, a right-side view, a bottom view, and sectional views of a shutter frame.

Figure 61:
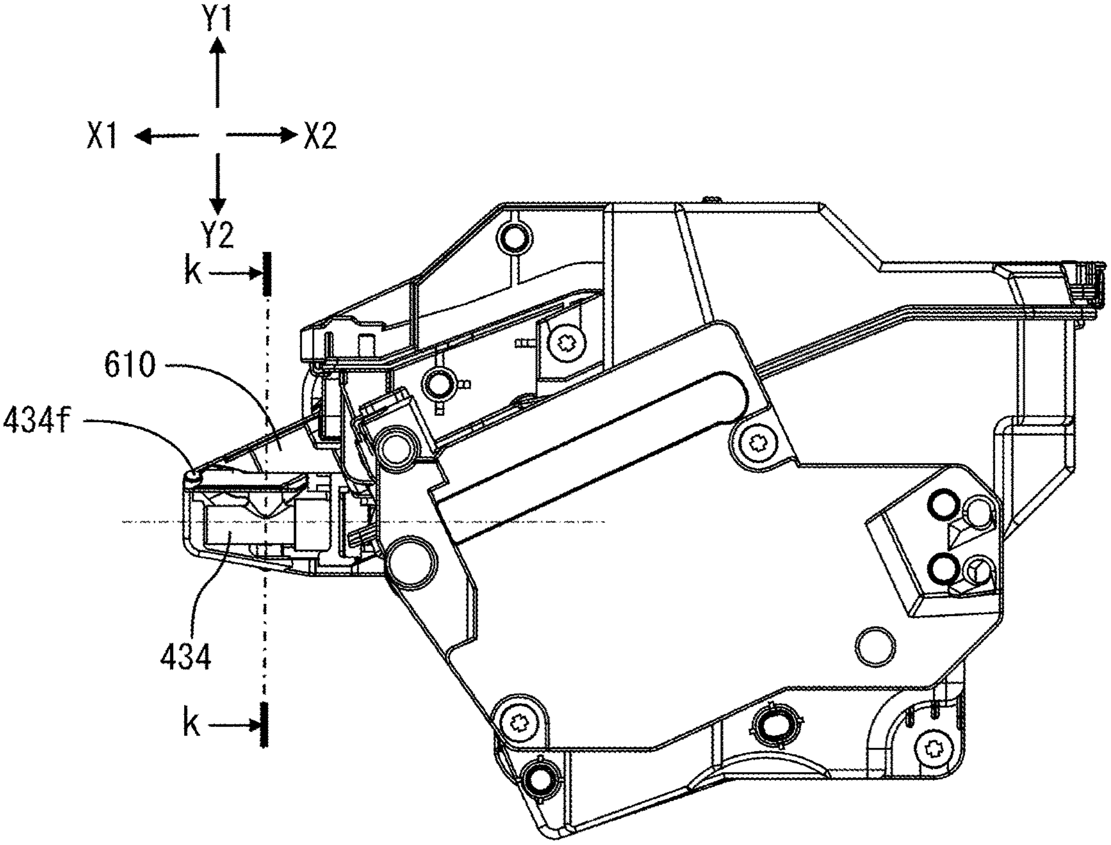
Figure 61:
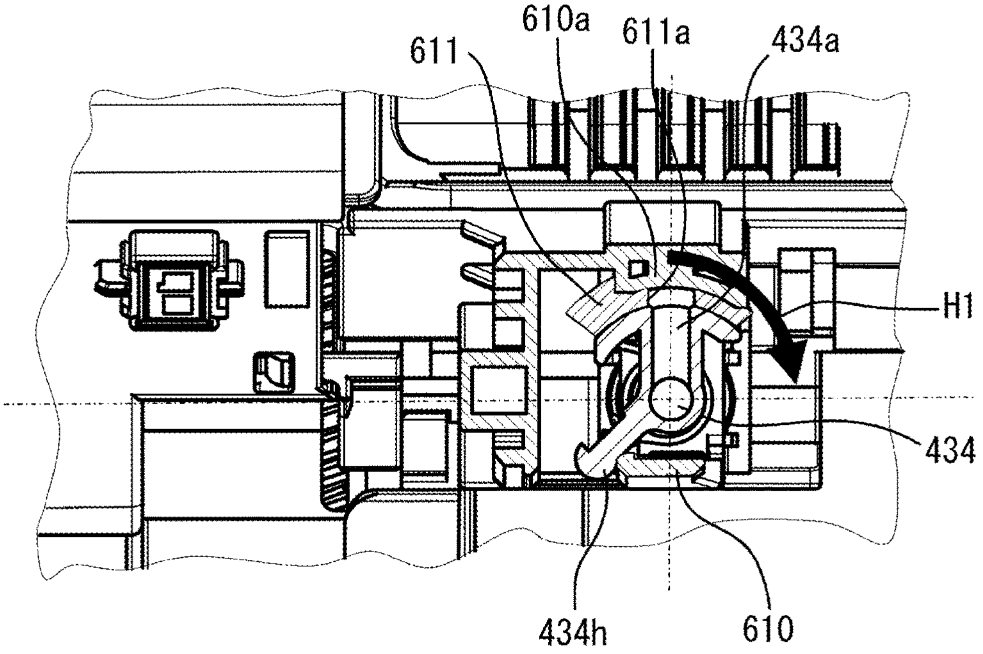

Part (a) of FIG. 61 is a side view showing a state in which the shutter member seals the toner, and part (b) of FIG. 61 is a sectional view showing a k-k cross section of part (a) of FIG. 61.

Figure 62:
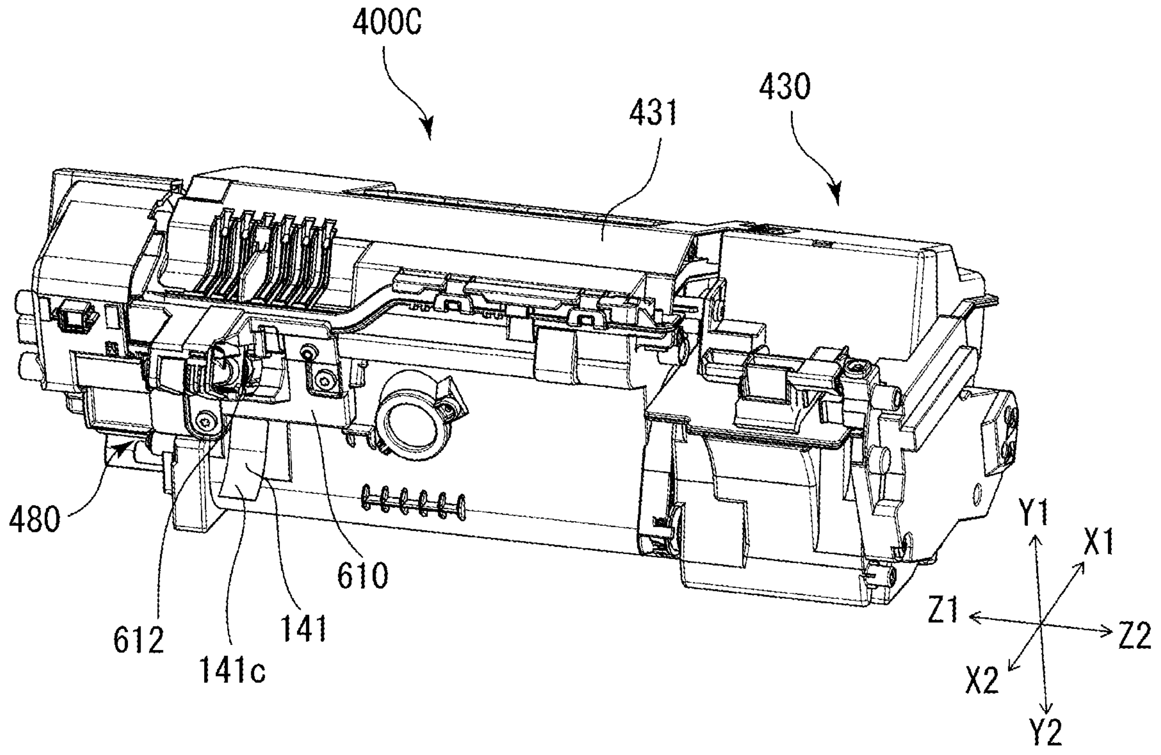

FIG. 62 is a perspective view of the toner cartridge as viewed from below.

Figure 63:
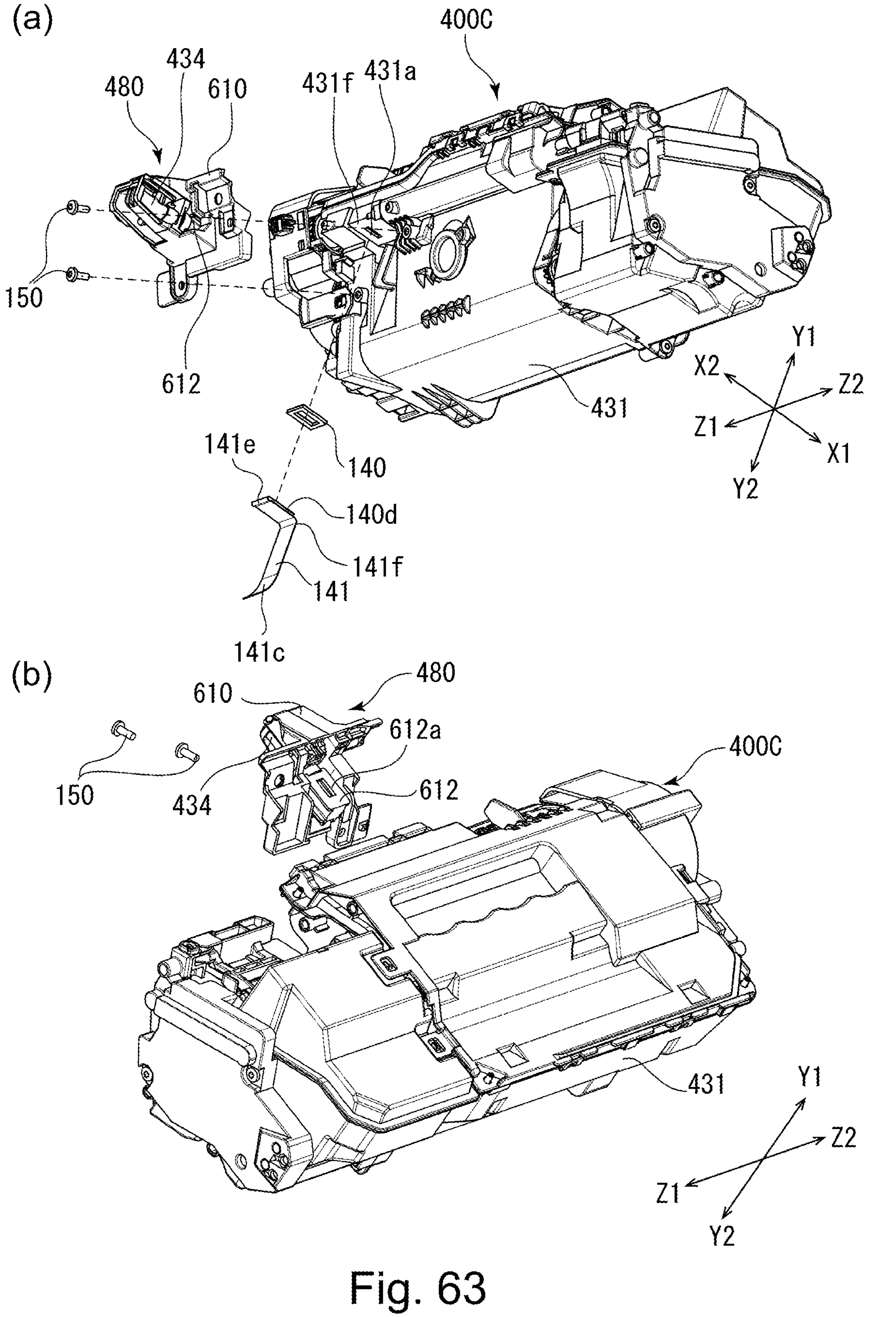

Part (a) of FIG. 63 is an exploded perspective view of the toner cartridge as viewed from below, and part (b) of FIG. 63 is an exploded perspective view of the toner cartridge as viewed from above.

Figure 64:
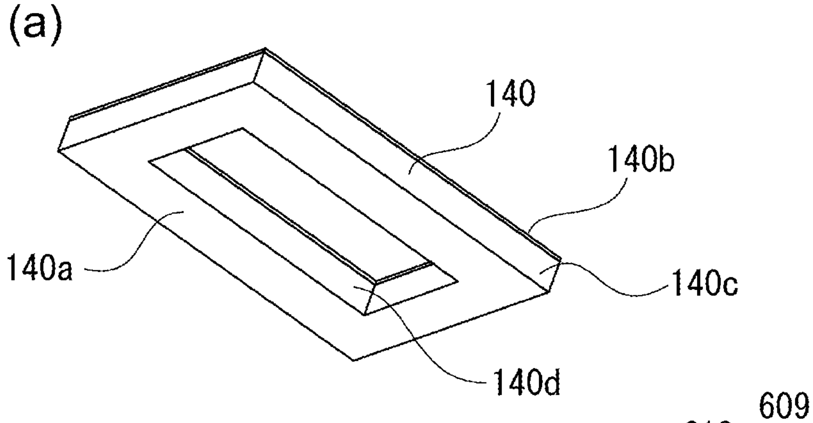
Figure 64:
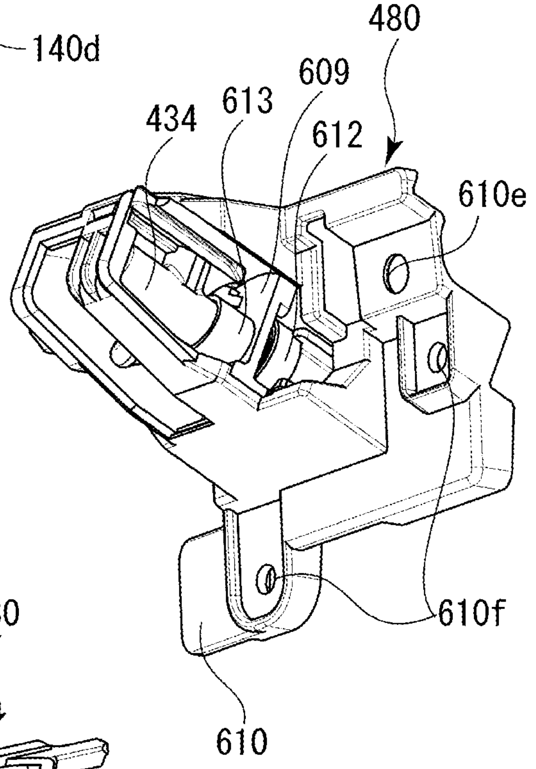
Figure 64:
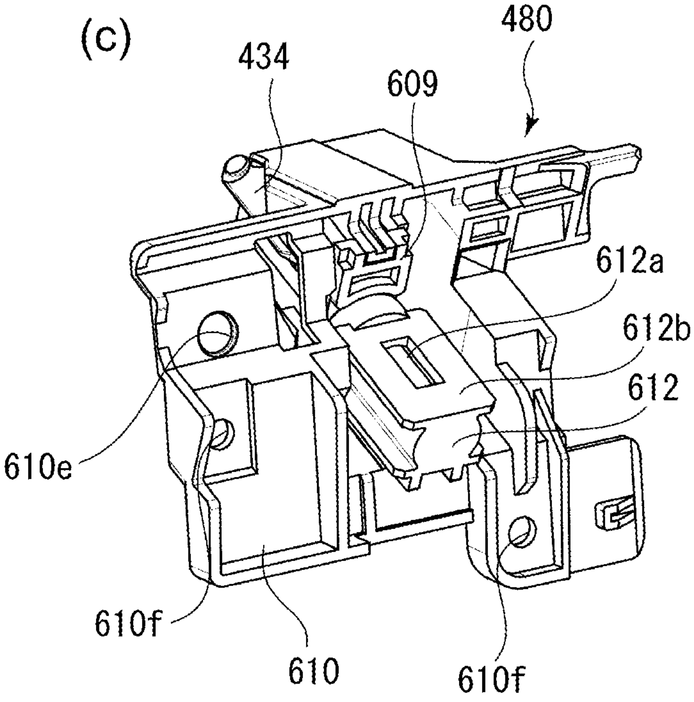

Part (a) of FIG. 64 is a perspective view showing an elastic seal, part (b) of FIG. 64 is a perspective view of the shutter unit as viewed from below, and part (c) of FIG. 64 is a perspective view of the shutter unit as viewed from above.

Figure 65:
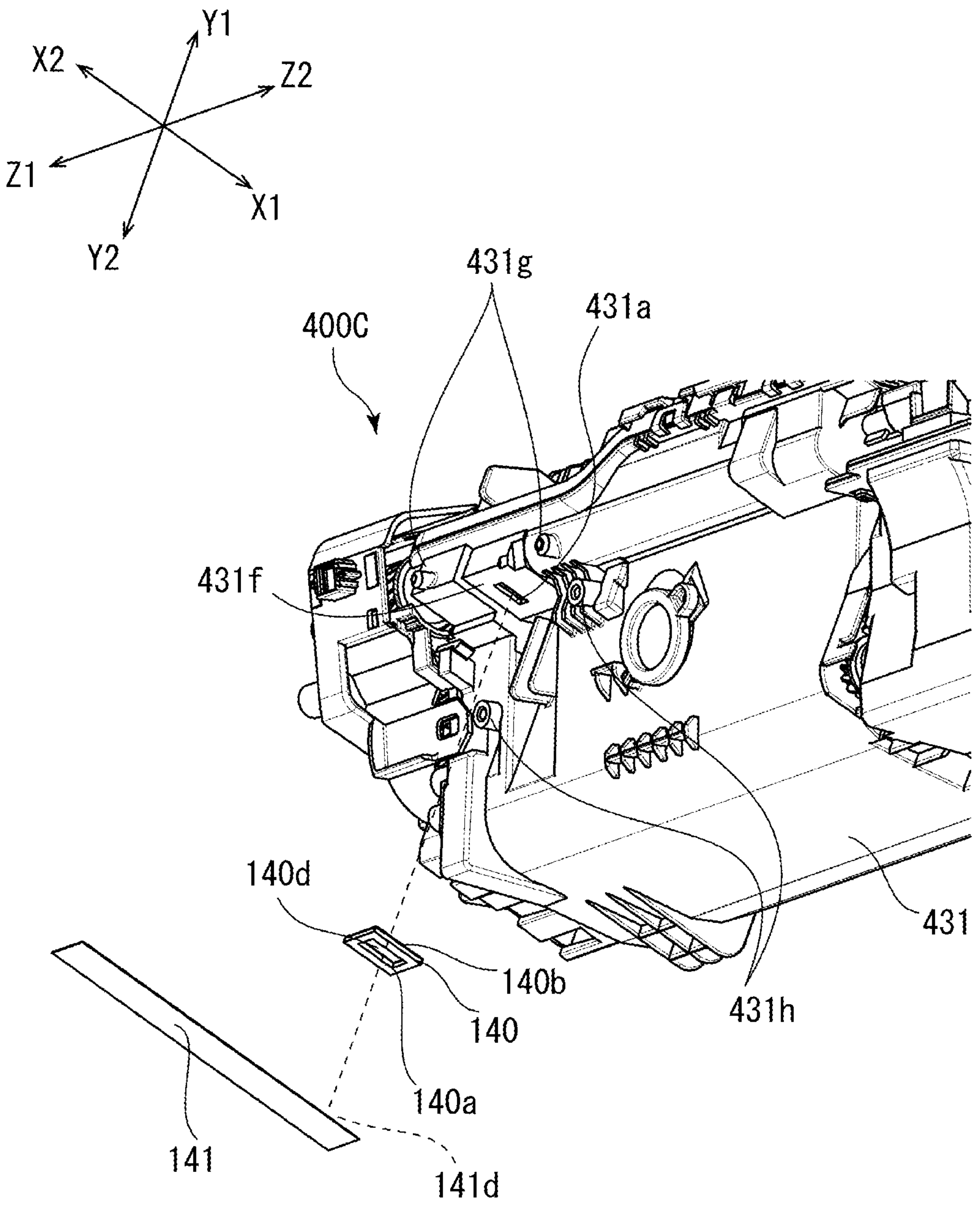

FIG. 65 is a perspective view showing a state in which the elastic seal and the sealing shutter are assembled to an accommodating portion frame.

Figure 66:
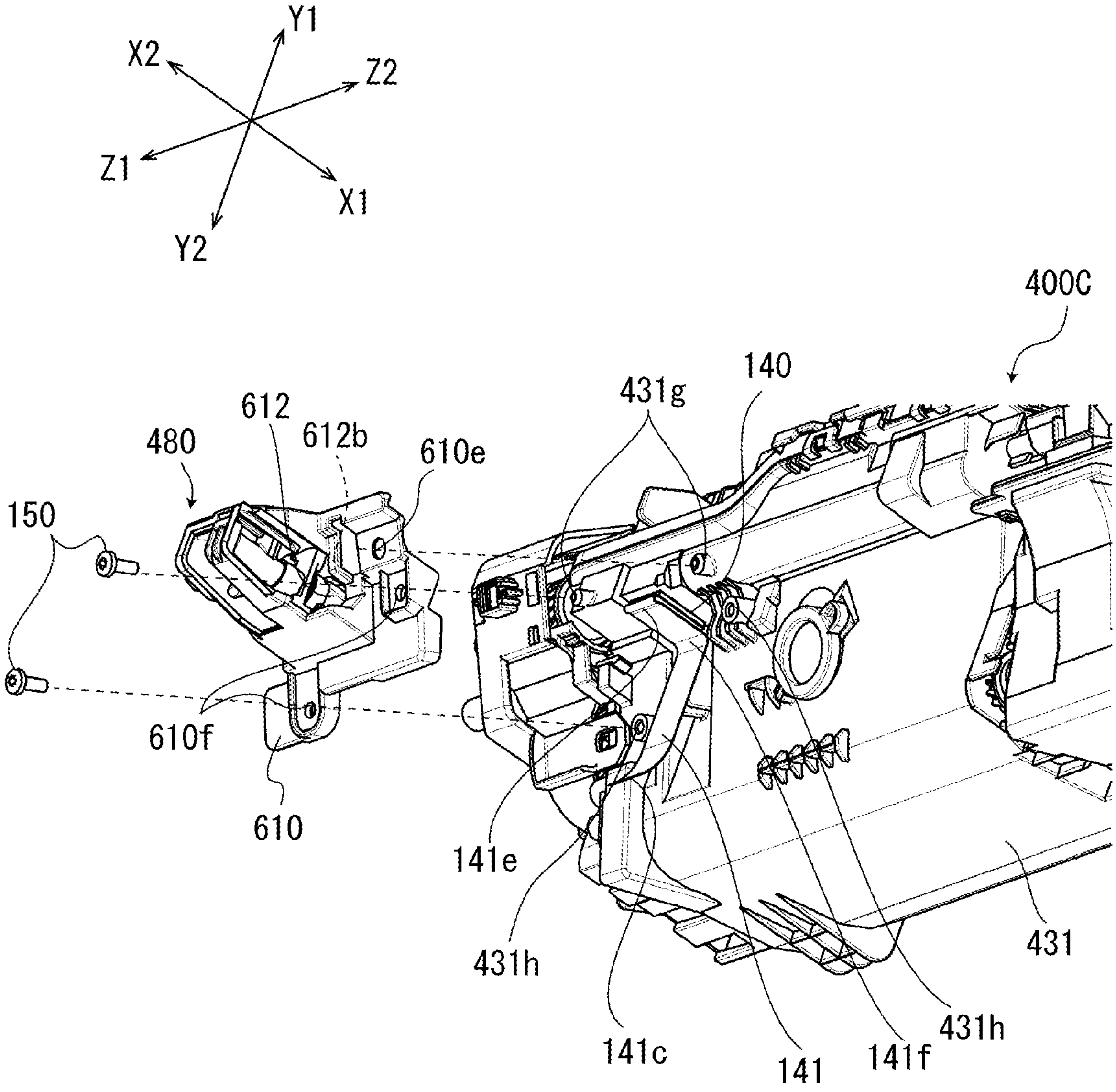

FIG. 66 is a perspective view showing a state in which the shutter unit is assembled to the accommodating portion frame.

Figure 67:
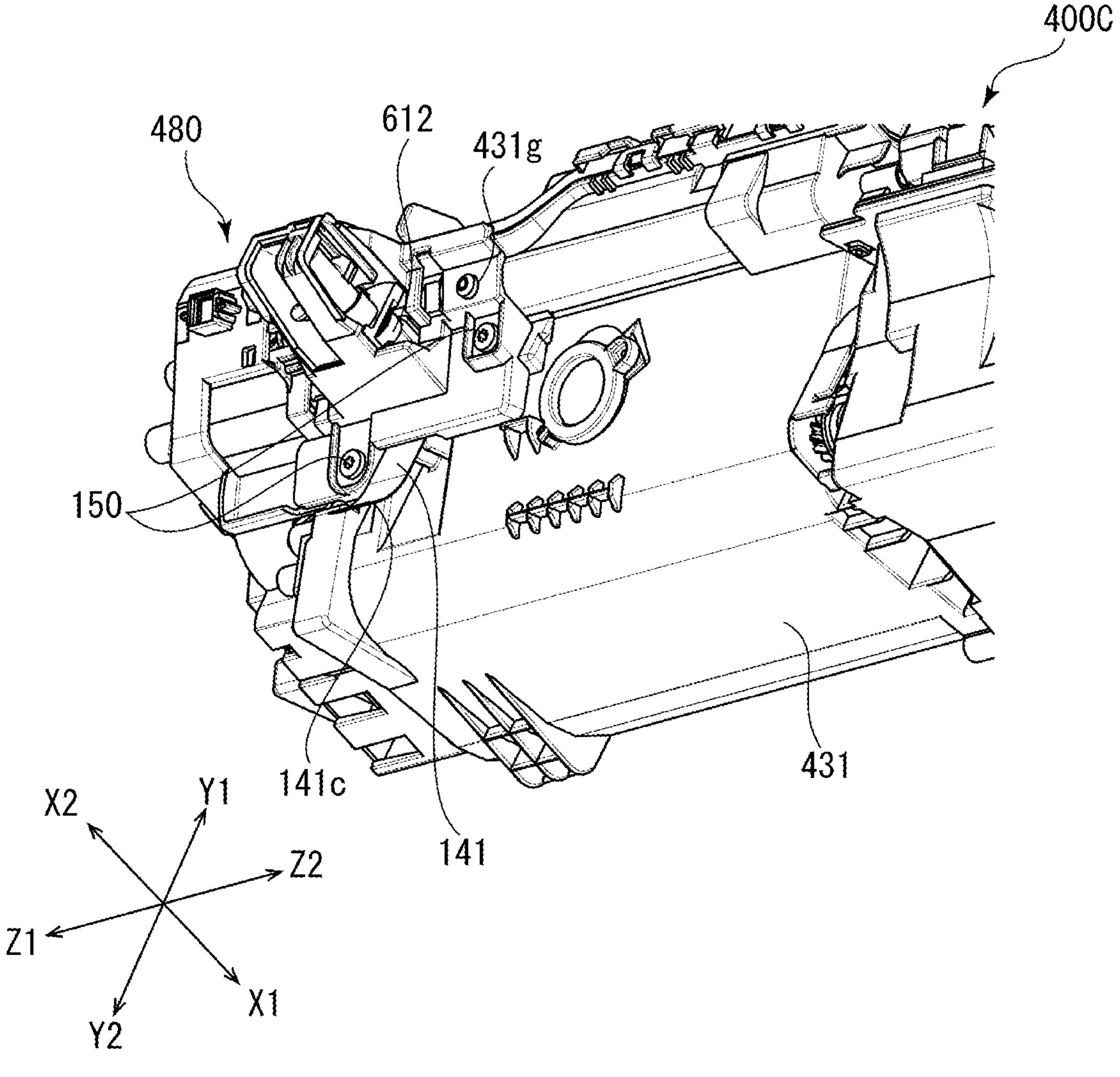

FIG. 67 is a perspective view showing a state in which the elastic seal, the sealing tape, and the shutter unit are assembled to the accommodating portion frame.

Figure 68:
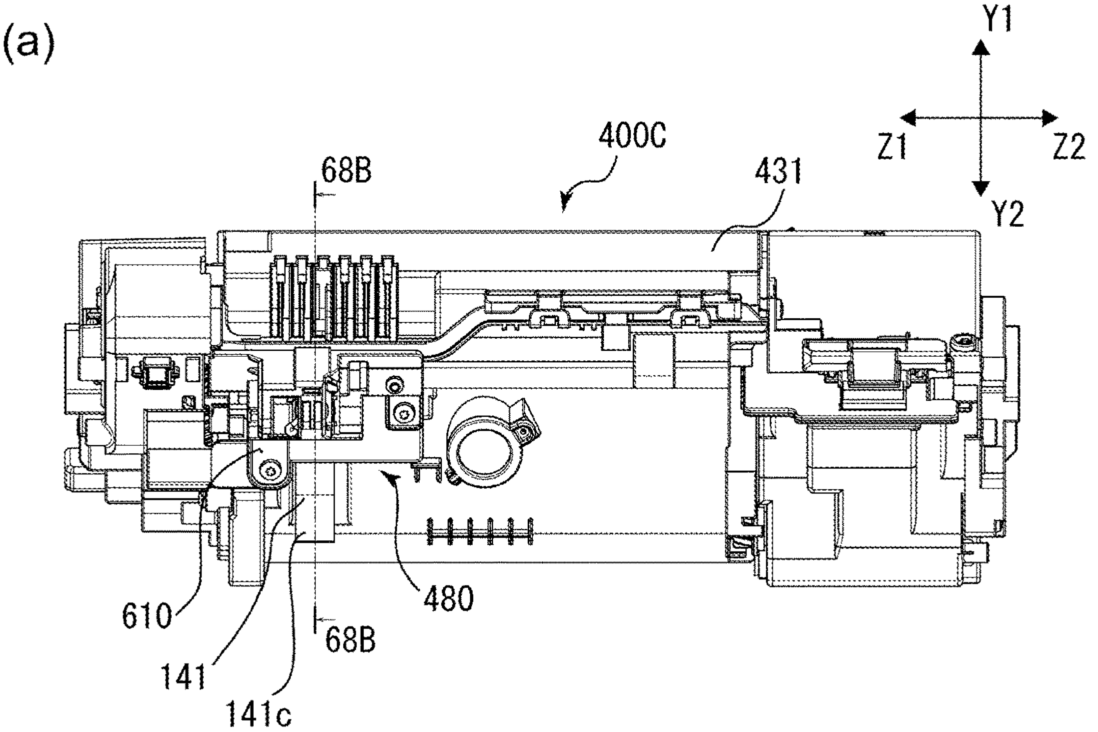
Figure 68:
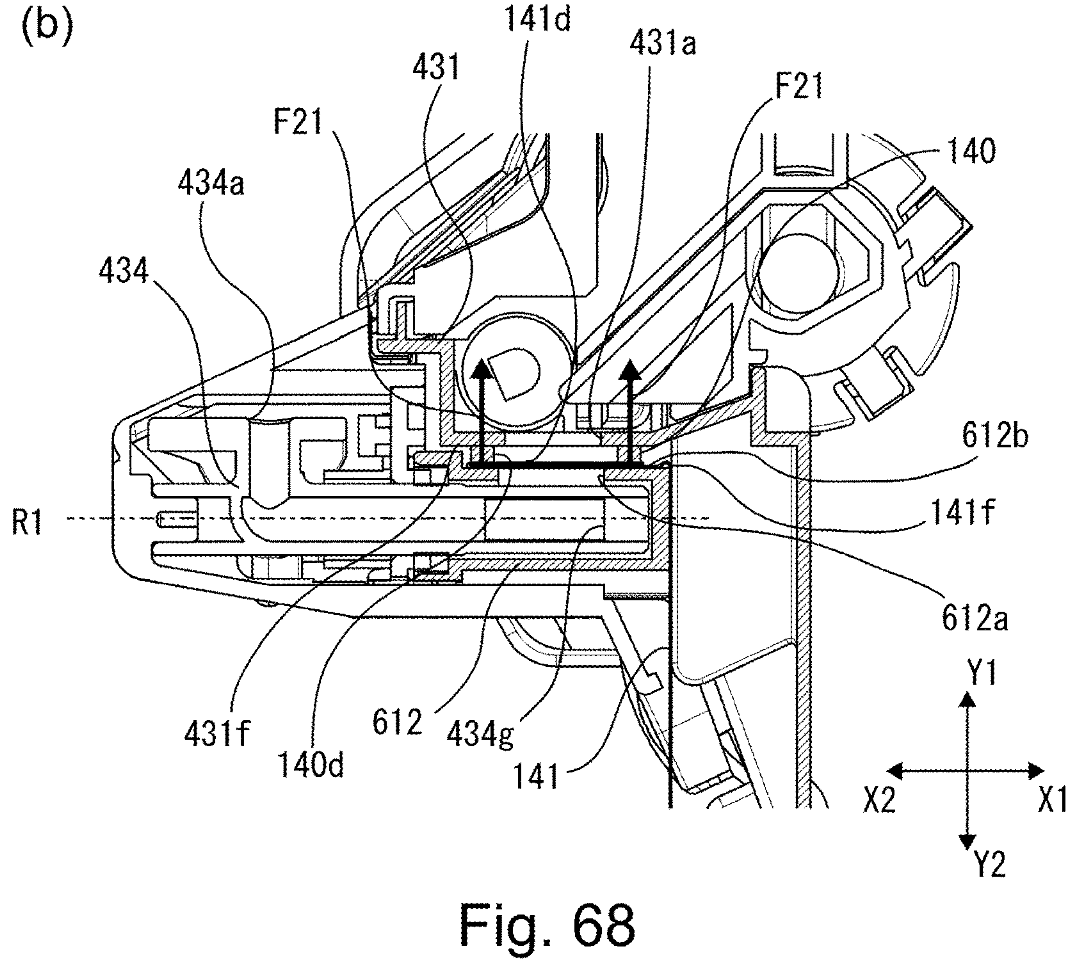

Part (a) of FIG. 68 is a front view showing the toner cartridge, and part (b) of FIG. 68 is a sectional view showing a 68B-68B cross section of part (a) of FIG. 68.

Figure 69:
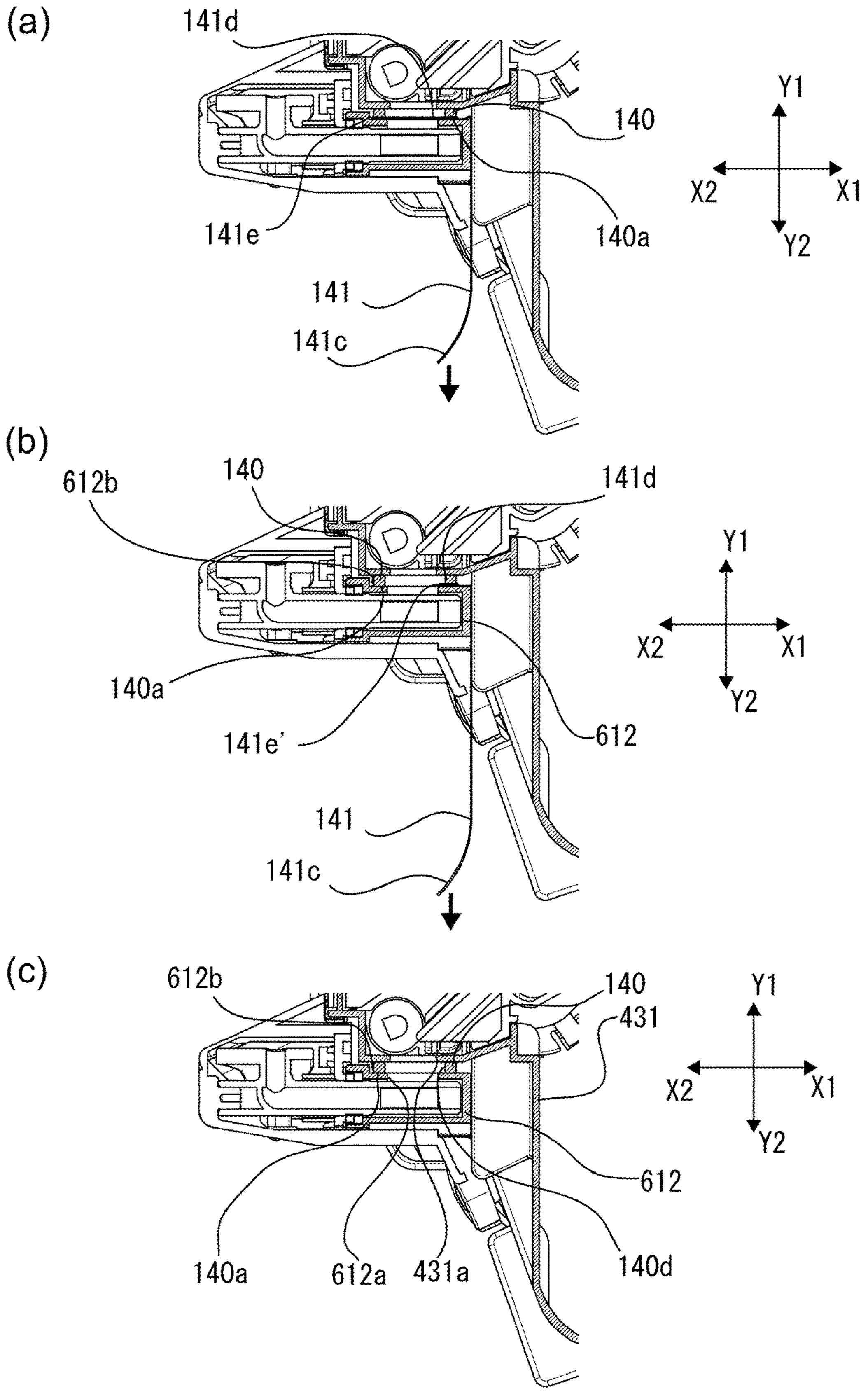

Part (a) of FIG. 69 is a sectional view showing a state before a peeling operation of the sealing tape is performed, part (b) of FIG. 69 is a sectional view showing a state in which the elastic seal is partially peeled from the elastic seal by a user, and part (c) of FIG. 69 is a sectional view showing a state in which the peeling operation of the sealing tape is completed.

Figure 70:
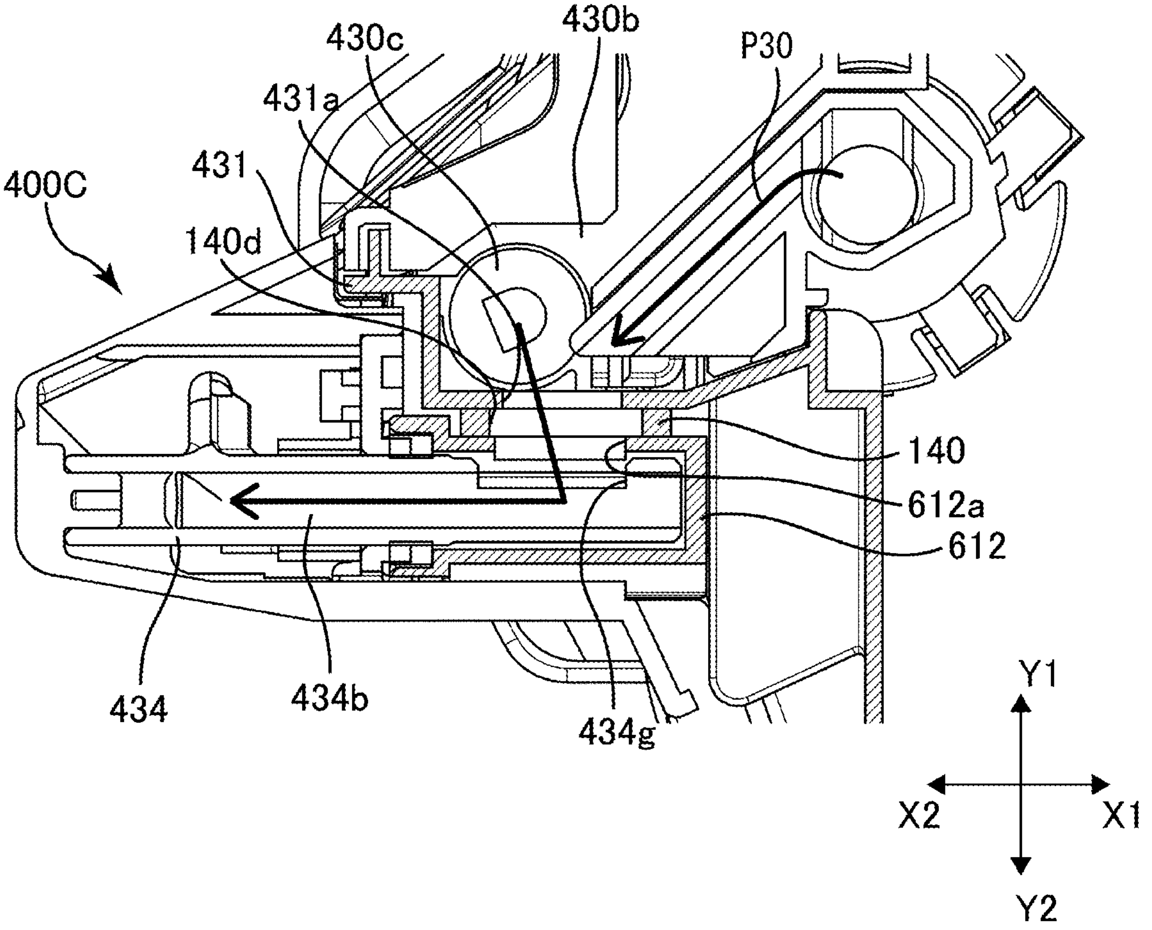

FIG. 70 is a sectional view showing a state in which the sealing tape is peeled off from the elastic seal and the toner cartridge is mounted to the process cartridge of a printer main assembly.

Figure 71:
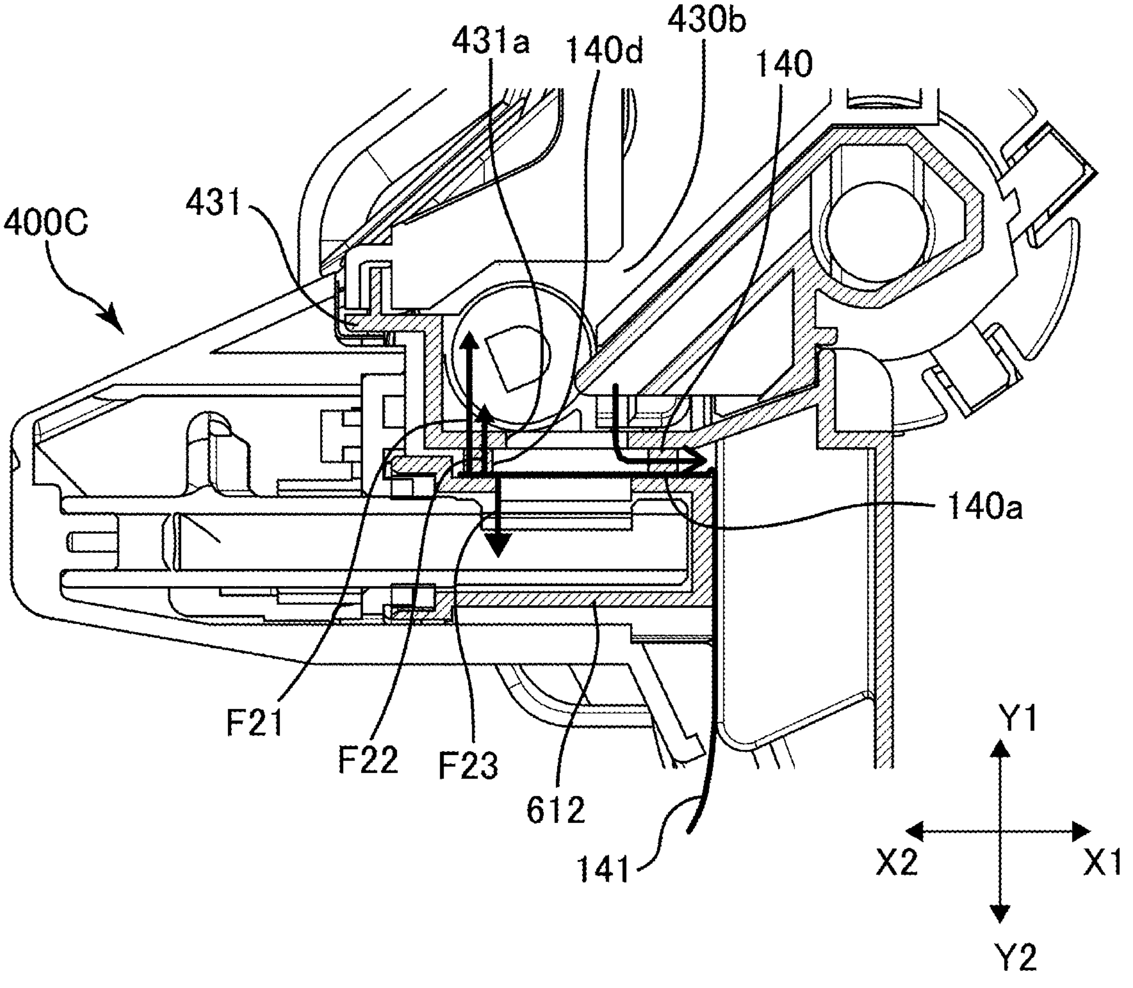

FIG. 71 is a sectional view showing a situation that the pump is operated in a state in which the sealing tape is not peeled off from the elastic seal and in a state in which the toner cartridge is mounted to the printer main assembly and the process cartridge.

Figure 72:
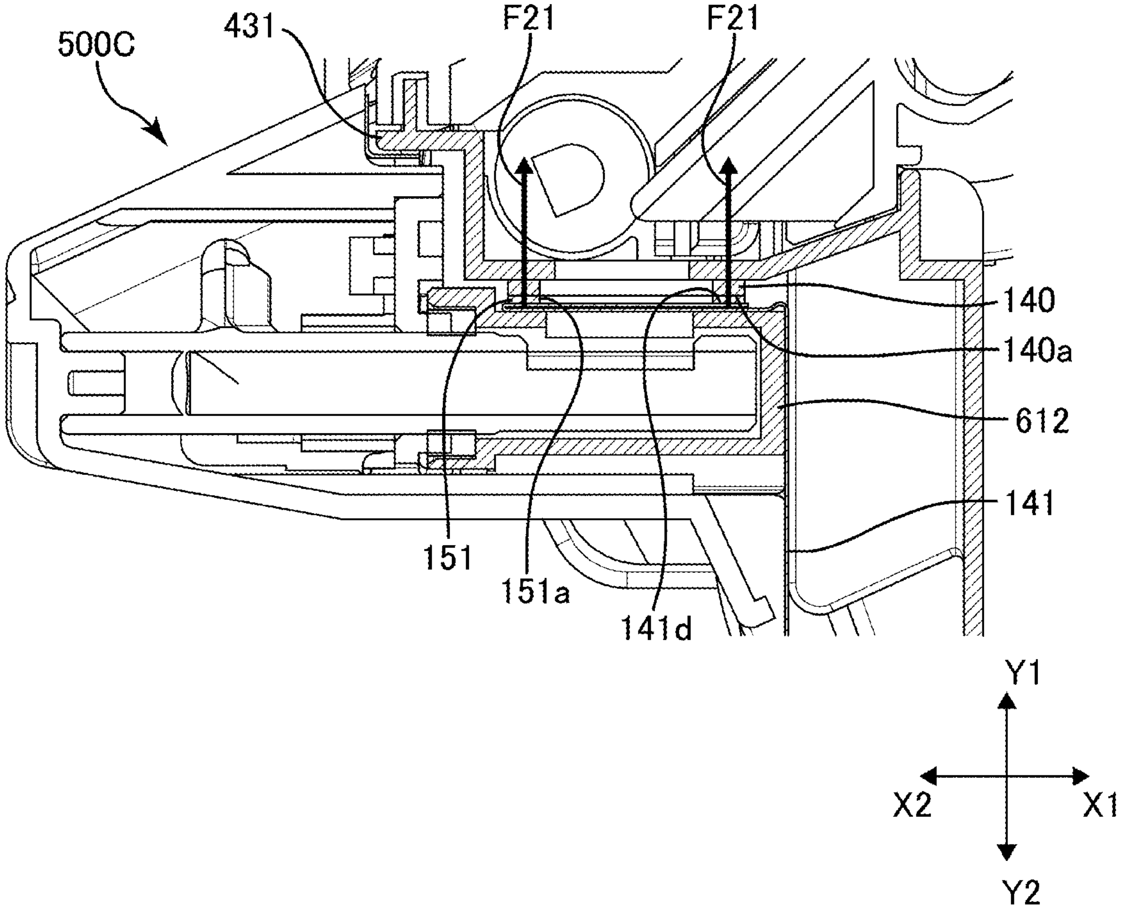

FIG. 72 is a sectional view showing a toner cartridge according to a modified embodiment second of the second embodiment.

Figure 73:
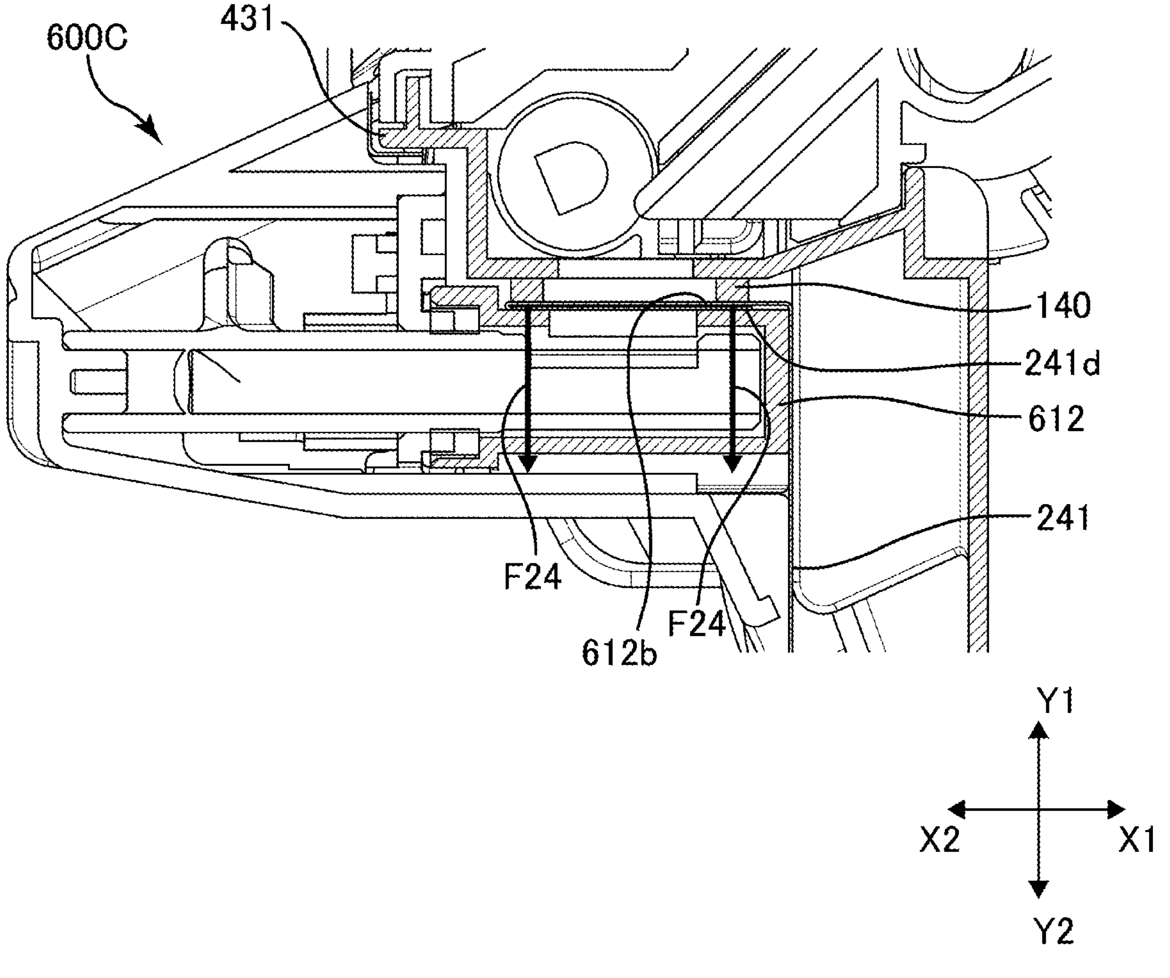

FIG. 73 is a sectional view showing the toner cartridge according to a modified embodiment third of the second embodiment.

Figure 74:
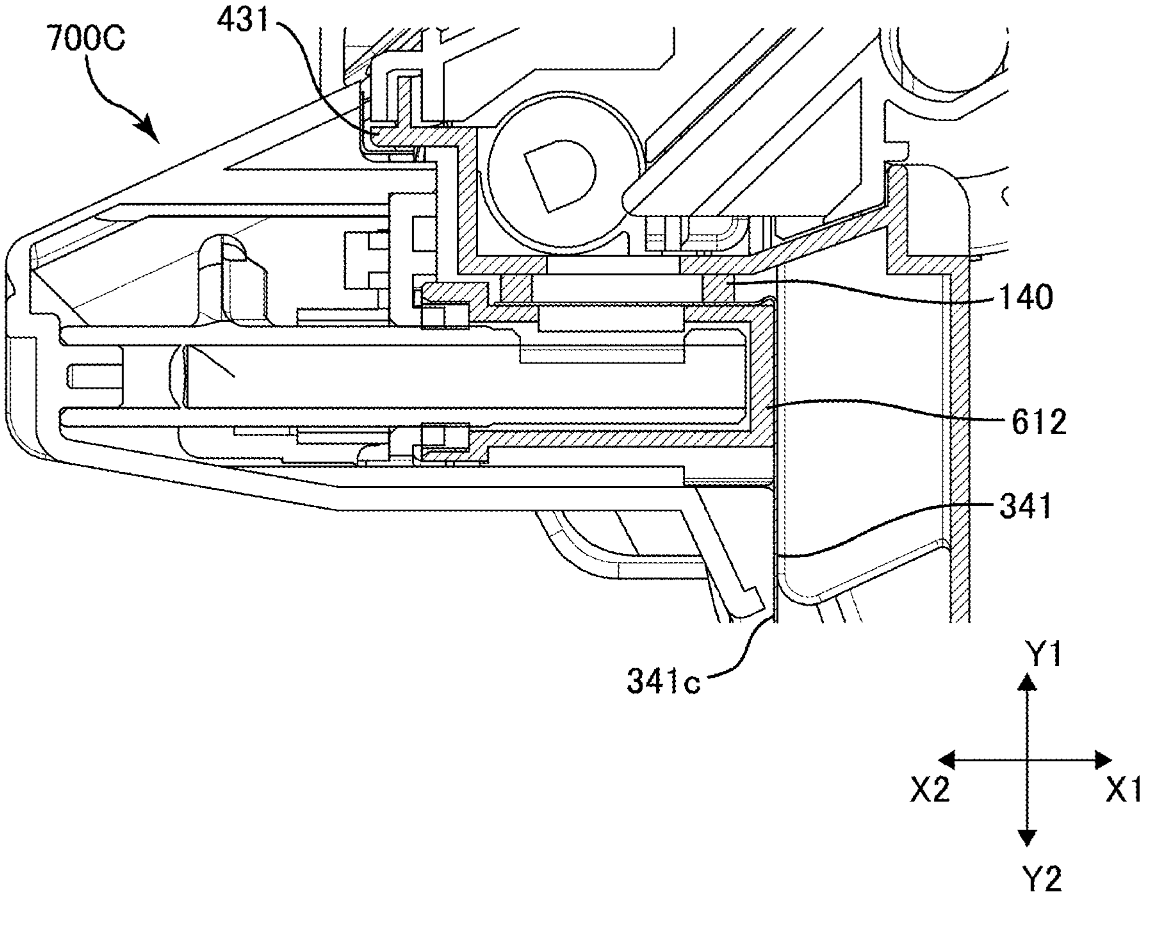

FIG. 74 is a sectional view of the toner cartridge according to a modified embodiment fourth of the second embodiment.

Figure 75:
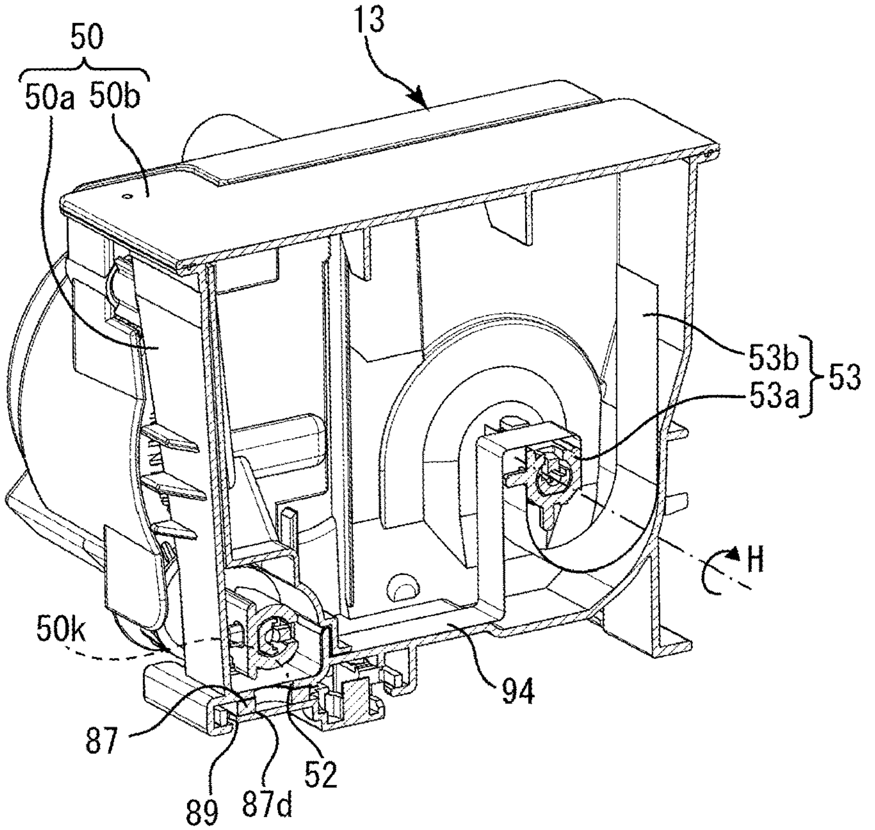
Figure 75:
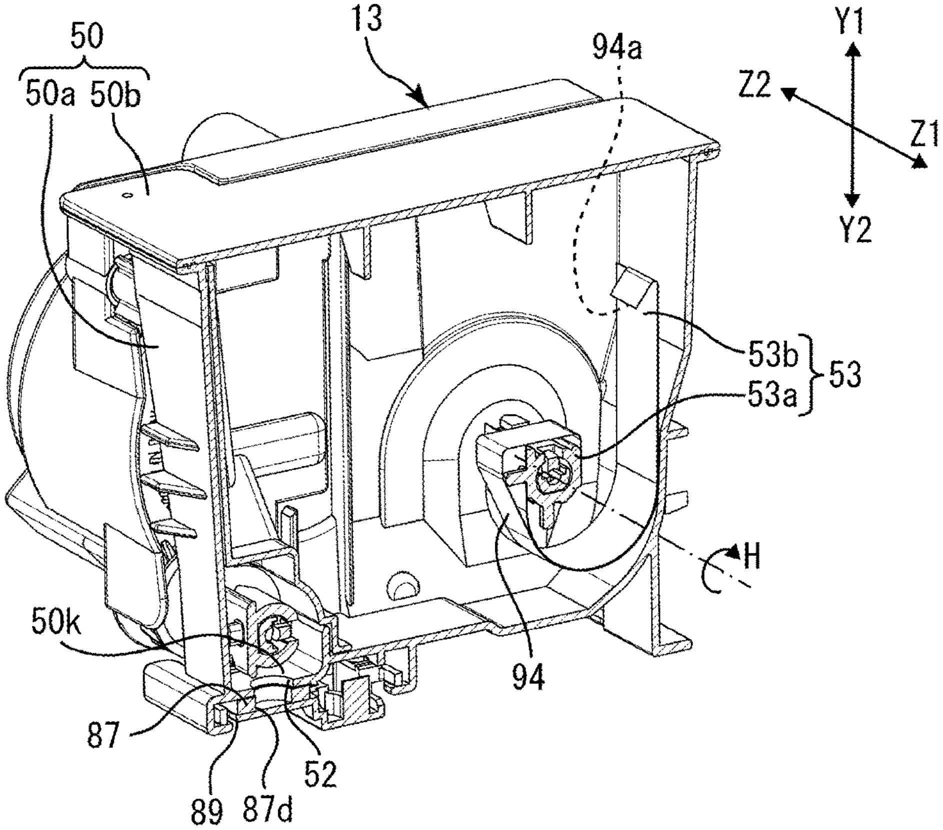

Part (a) of FIG. 75 is a perspective view showing a state in which a new toner cartridge according to a third embodiment is cut in a cross section perpendicular to a Z-direction, and part (b) of FIG. 75 is a perspective view showing a state in which a used (-up) toner cartridge is cut in the cross section perpendicular to the Z-direction.

Figure 76:
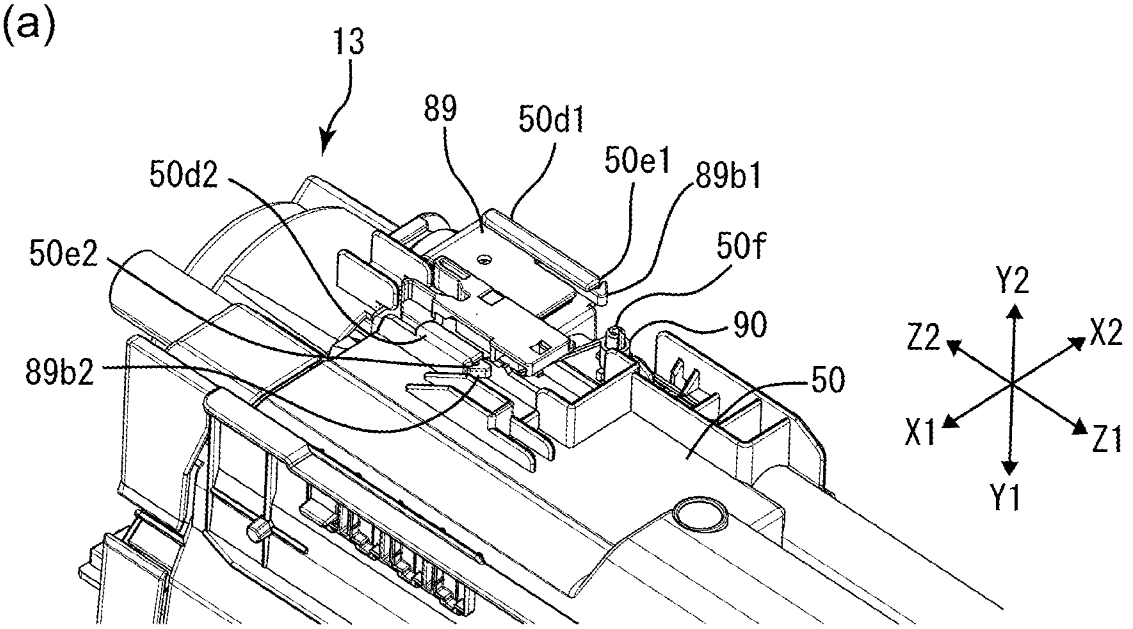
Figure 76:
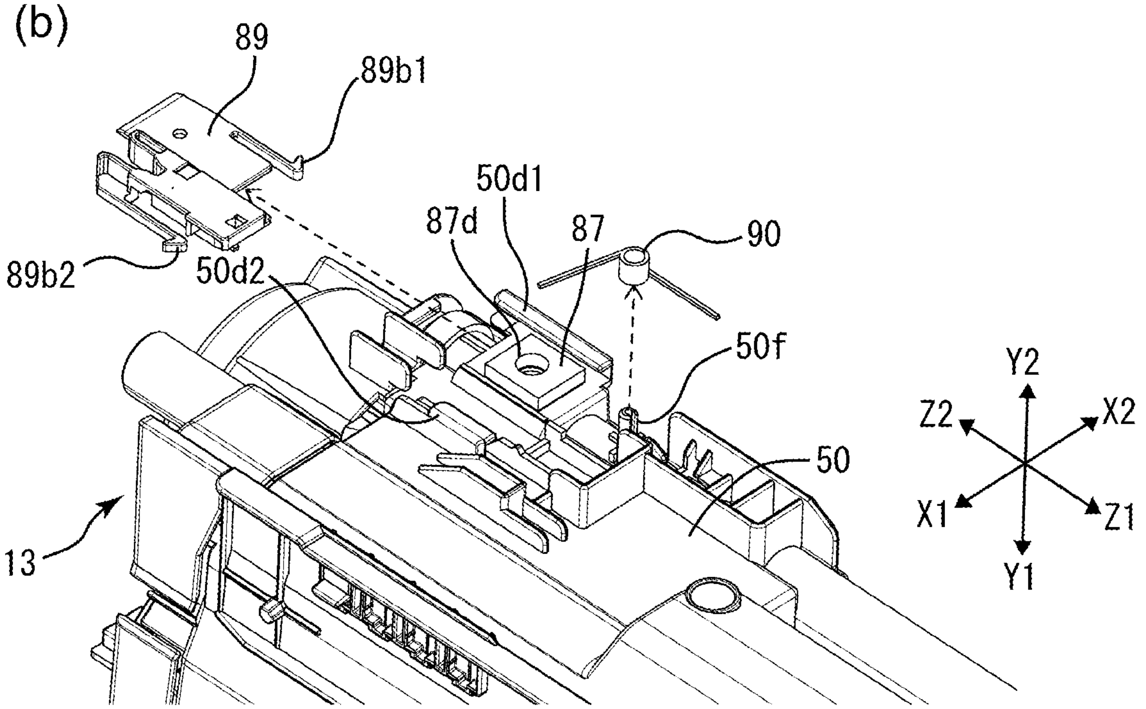

Part (a) of FIG. 76 is a perspective view showing a bottom side of the toner cartridge, and part (b) of FIG. 76 is a perspective view showing a state in which a shutter and a shutter spring and dismounted from a supply frame.

Figure 77:
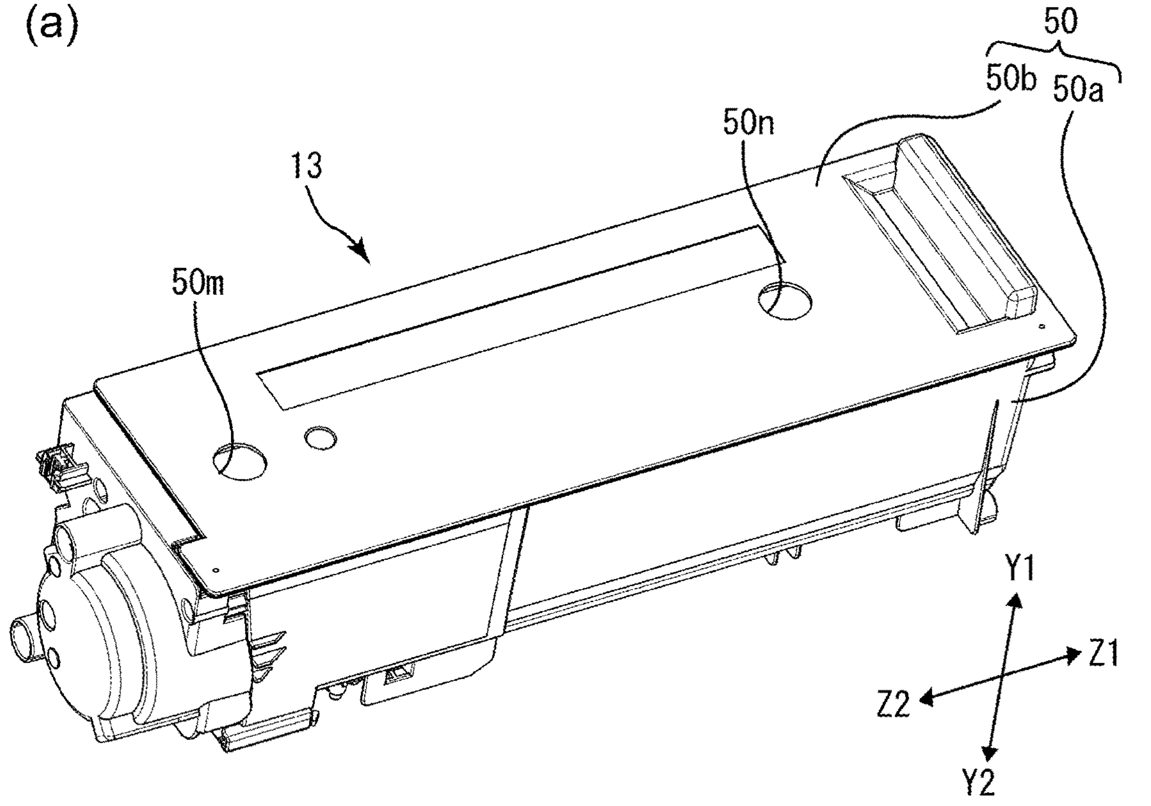
Figure 77:
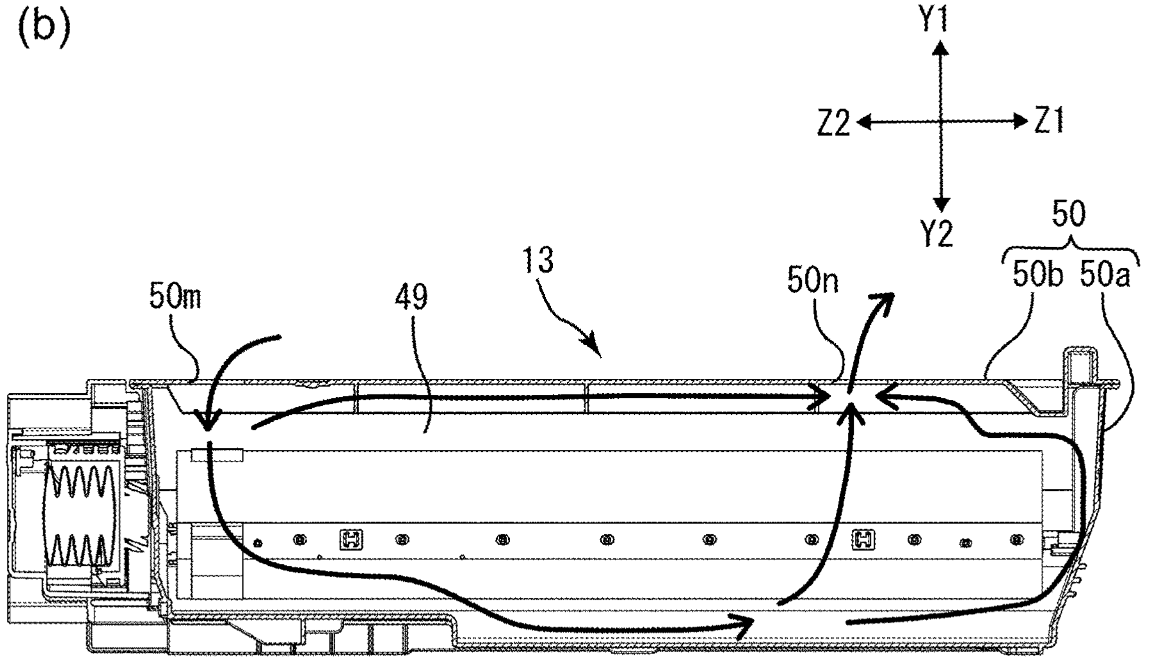

Part (a) of FIG. 77 is a perspective view showing the toner cartridge, and part (b) of FIG. 77 is a sectional view showing an air circulation passage in the toner cartridge.

Figure 78:
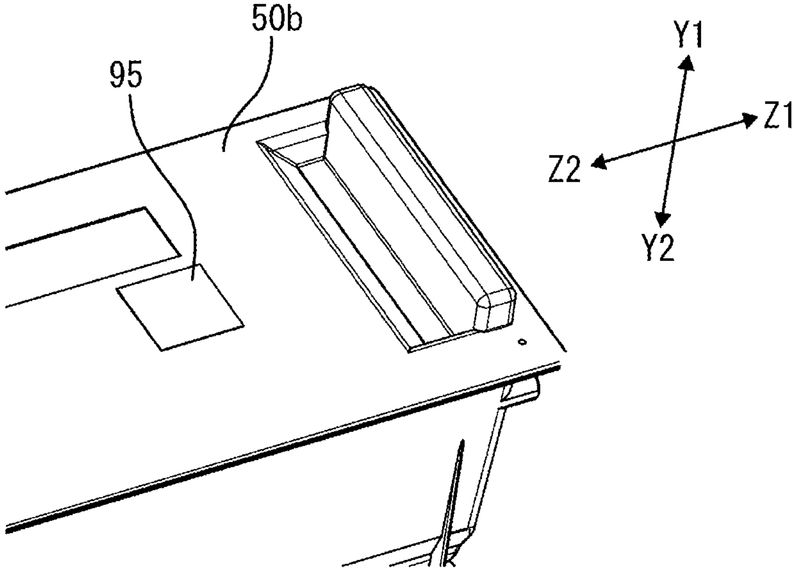
Figure 78:
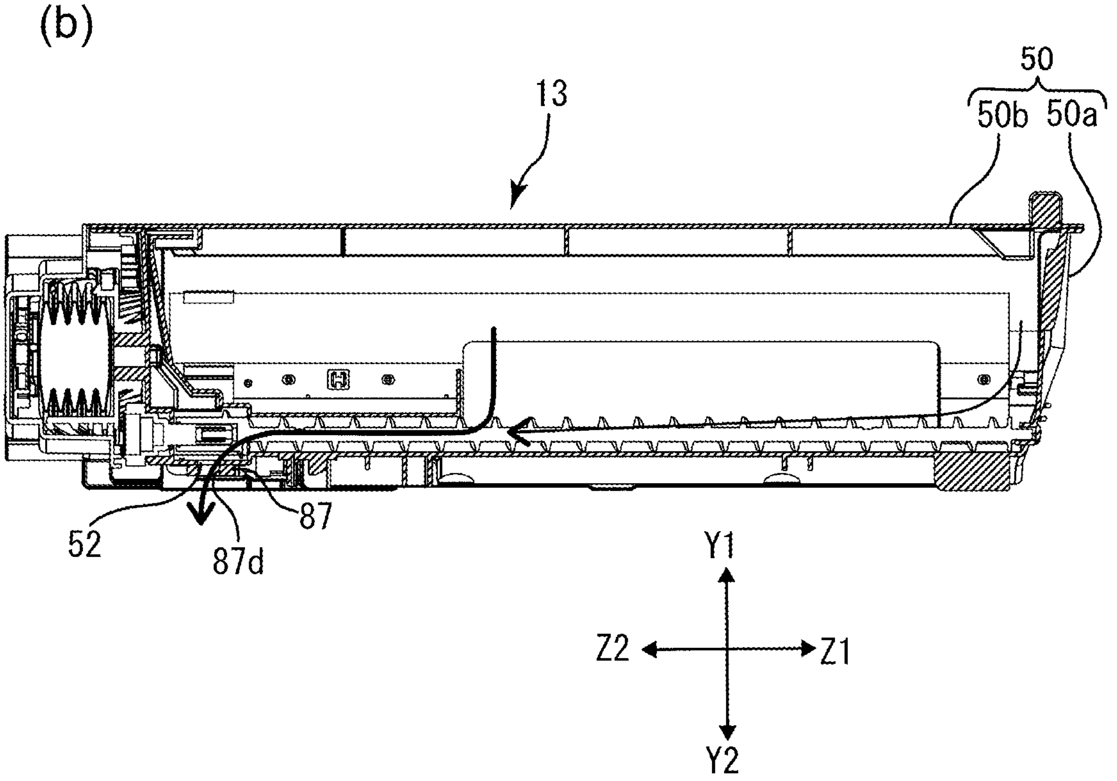

Part (a) of FIG. 78 is a perspective view showing a seal member, and part (b) of FIG. 78 is a sectional view showing an air circulation passage in the toner cartridge.

Figure 79:
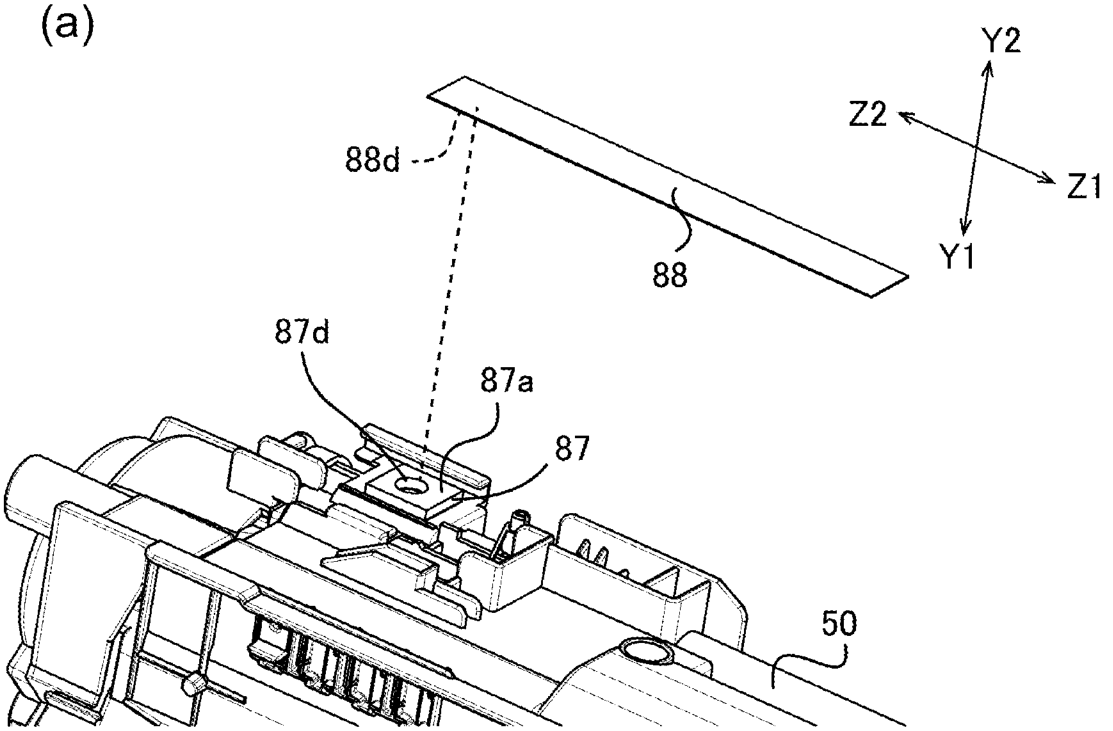
Figure 79:
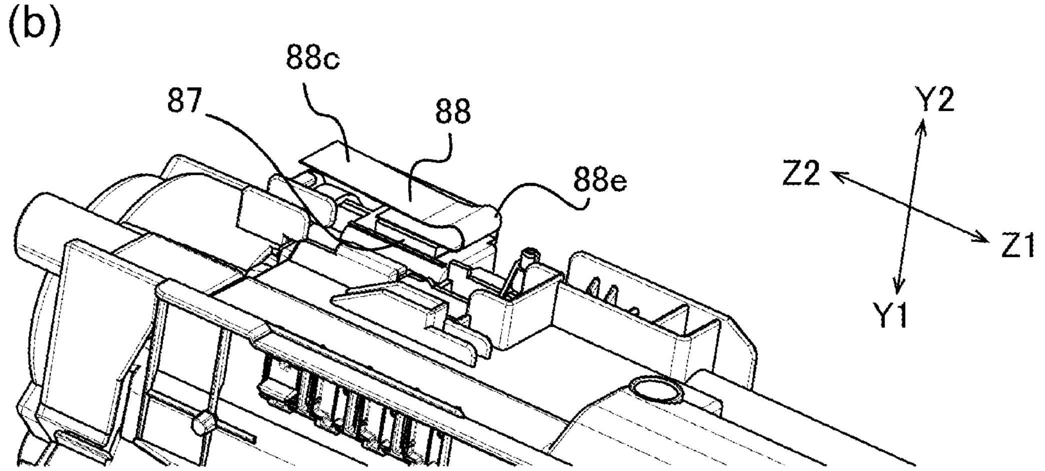

Part (a) of FIG. 79 is a perspective view showing a state in which a sealing tape is being stuck to an elastic seal, and part (b) of FIG. 79 is a perspective view showing a state in which the sealing tape is stuck to the elastic seal.

Figure 80:
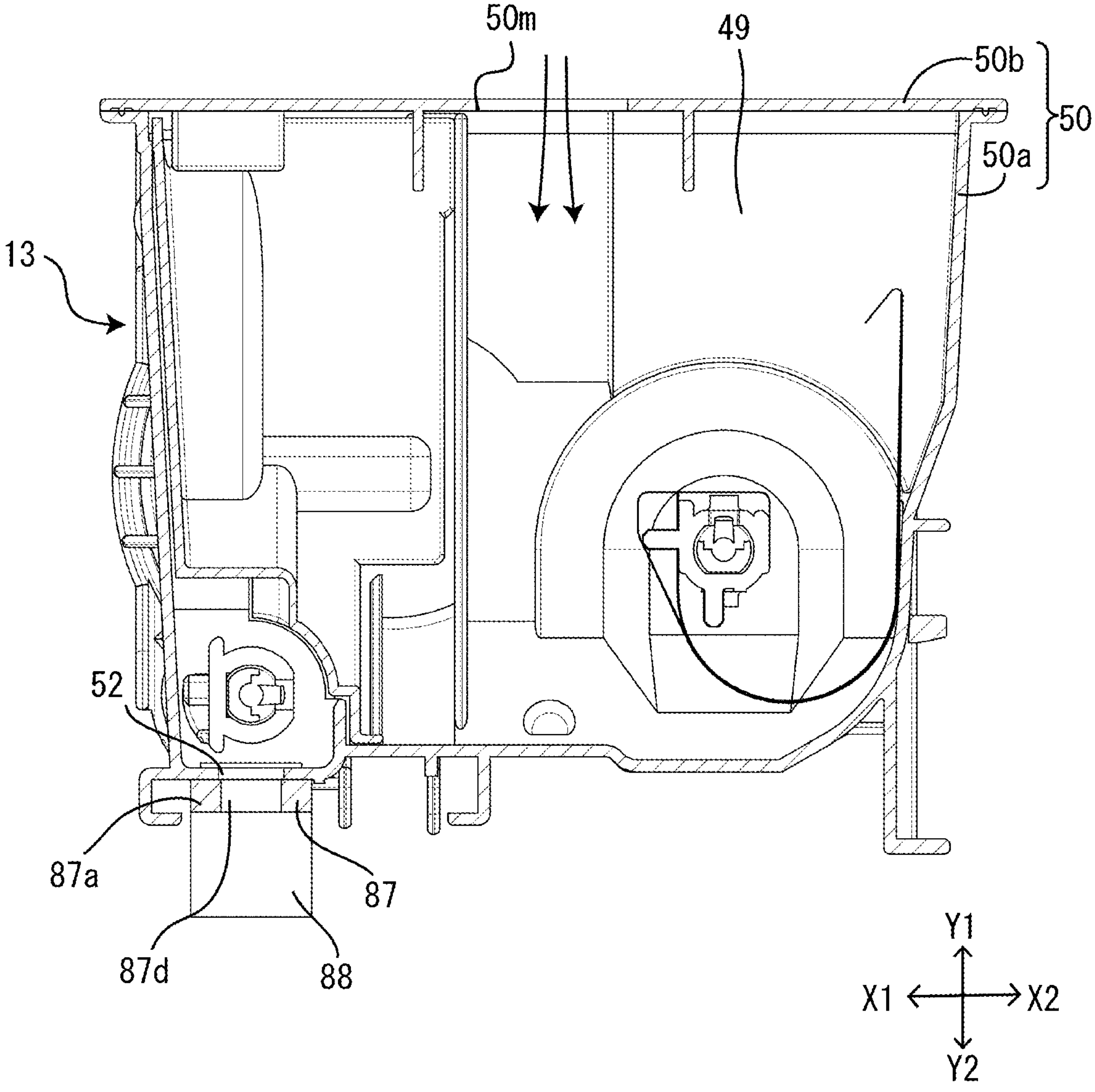

FIG. 80 is a sectional view showing a cross section including an air inflow opening.

Figure 81:
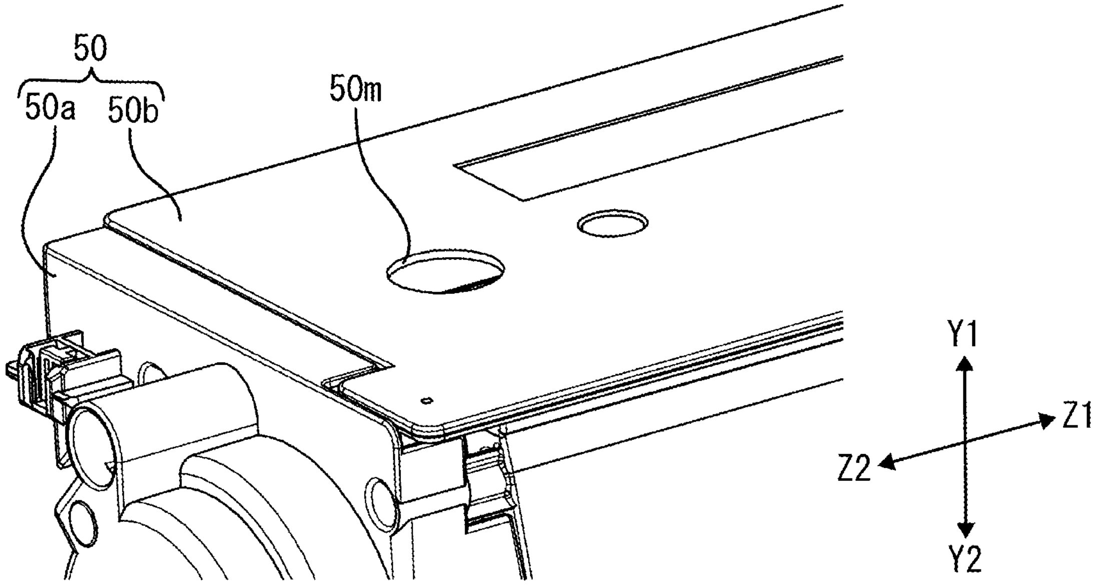
Figure 81:
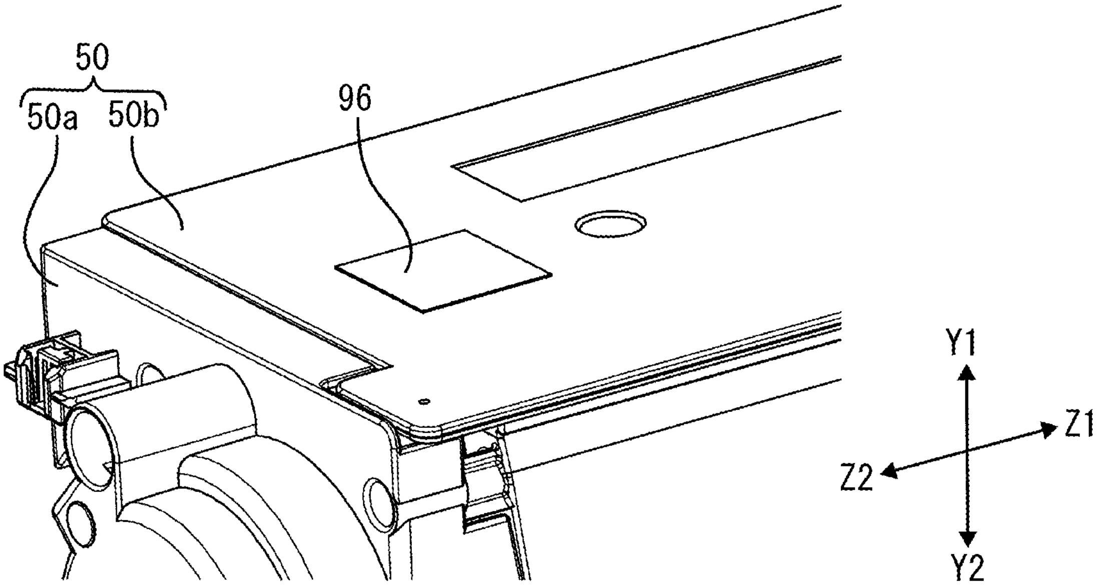

Part (a) of FIG. 81 is a perspective view showing the air inflow opening, and part (b) of FIG. 81 is a perspective view showing a state in which the air inflow opening is sealed by the seal member.

Figure 82:
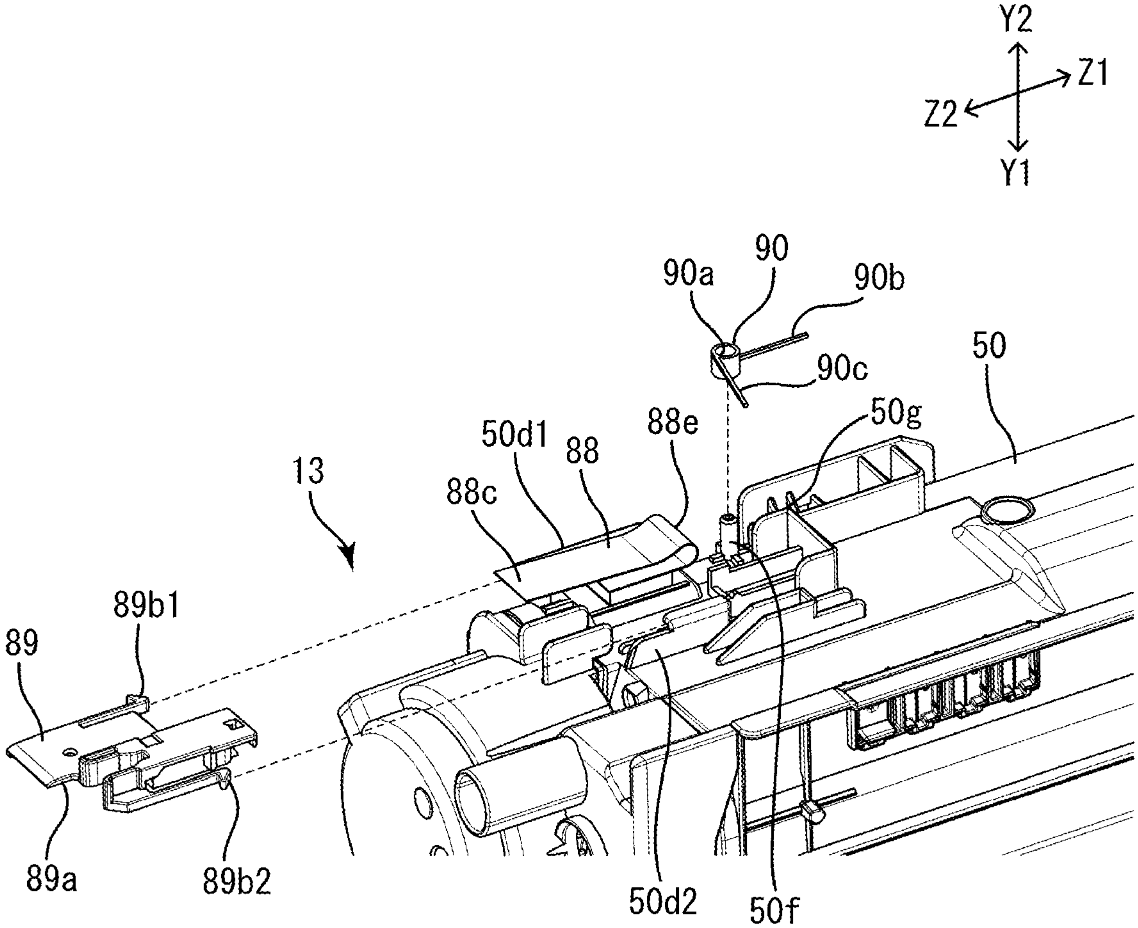

FIG. 82 is a perspective view showing a state in which the shutter spring and the shutter and being assembled to the supply frame.

Figure 83:
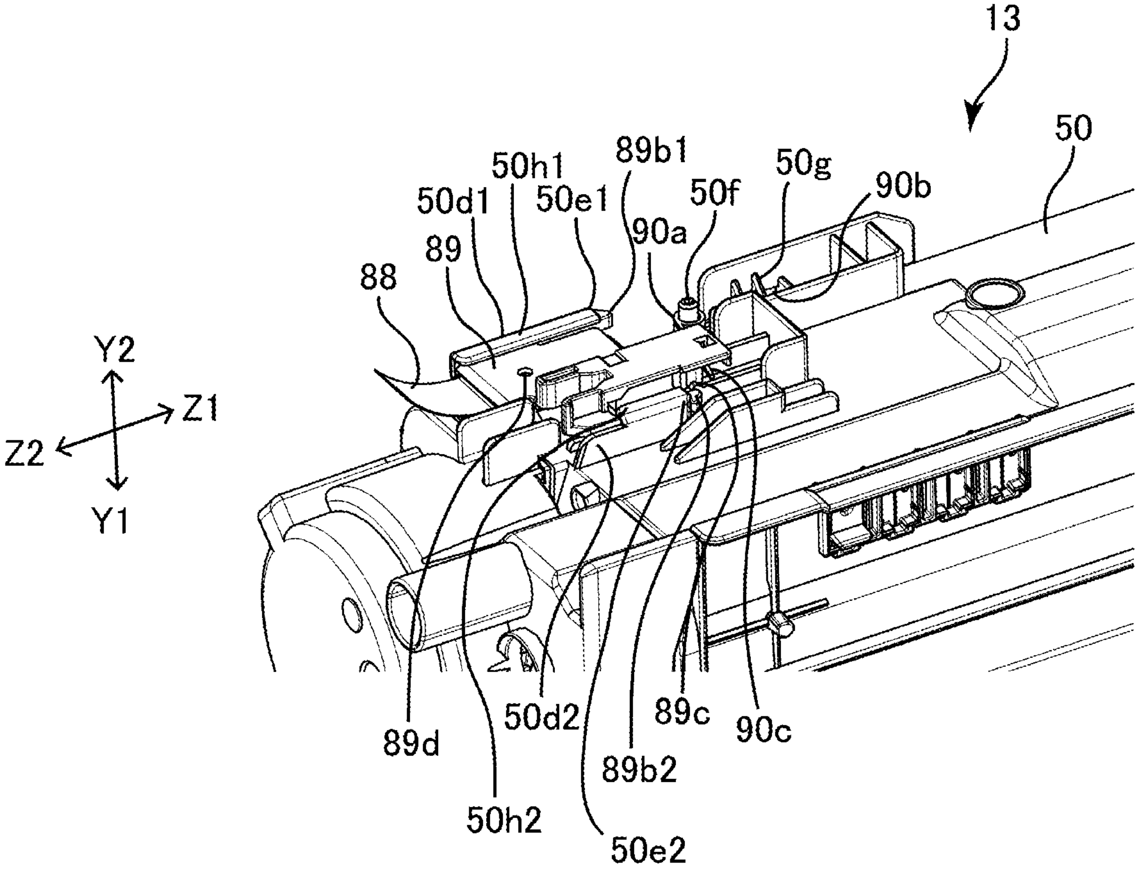

FIG. 83 is a perspective view showing a state in which the shutter spring and the shutter are assembled to the supply frame.

Figure 84:
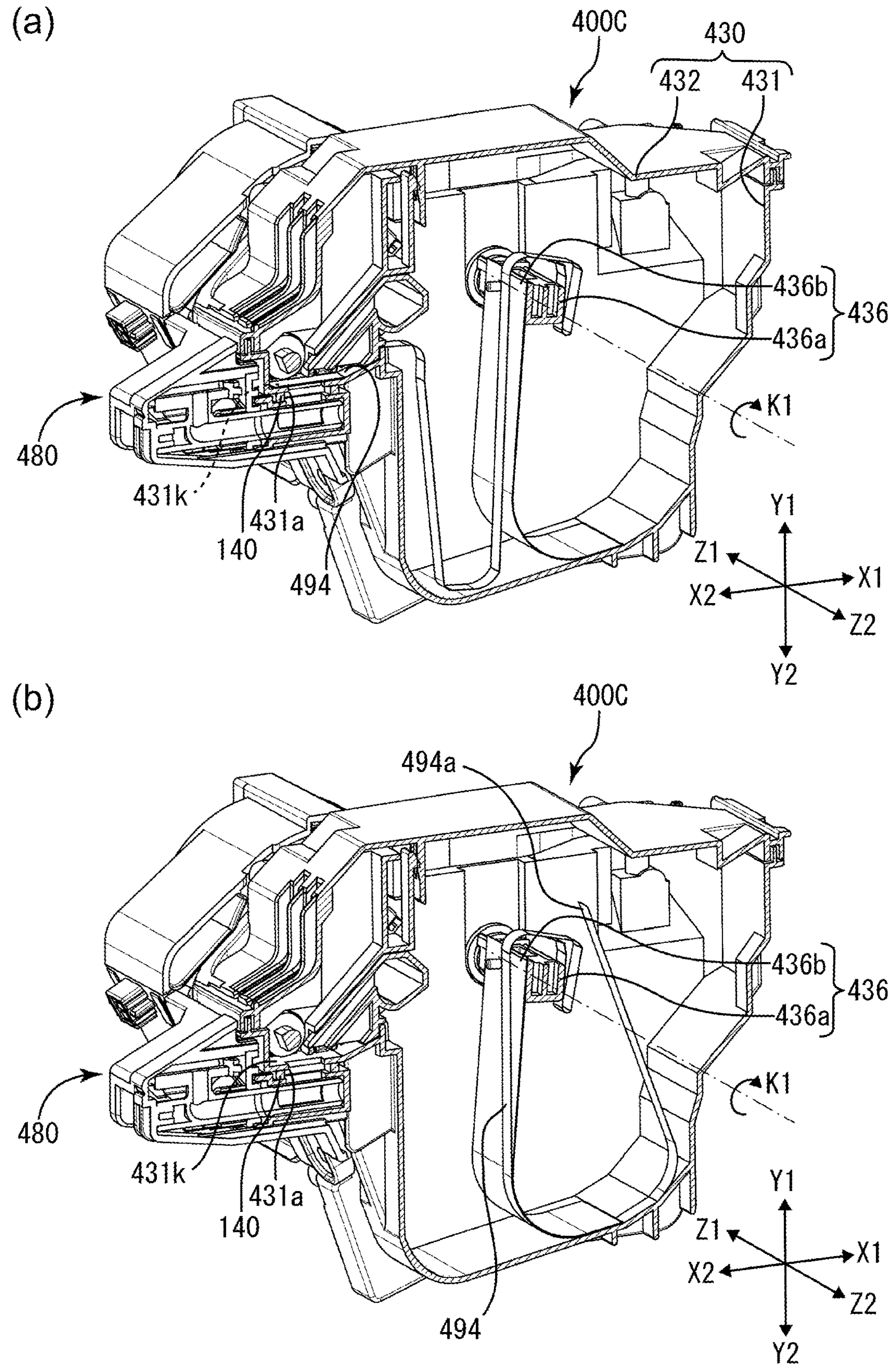

Part (a) of FIG. 84 is a perspective view showing a state in which a new toner cartridge according to a fourth embodiment is cut in a cross section perpendicular to the Z-direction, and part (b) of FIG. 84 is a state in which a used toner cartridge is cut in the cross section perpendicular to the Z-direction.

Figure 85:
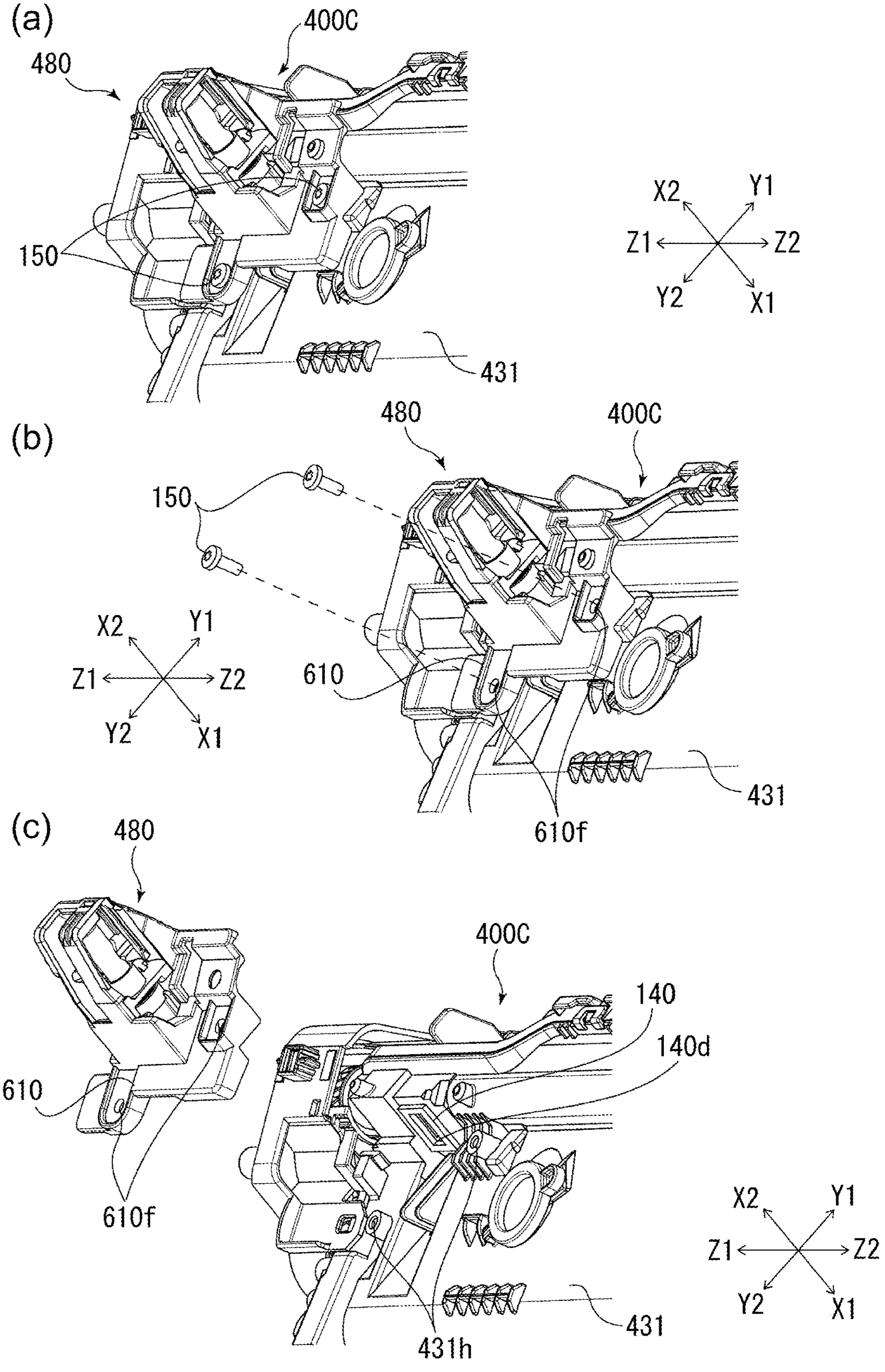

Part (a) of FIG. 85 is a perspective view showing the toner cartridge to which a shutter unit is assembled, part (b) of FIG. 85 is a perspective view showing a state in which screws are dismounted from an accommodating portion frame, and part (c) of FIG. 85 is a perspective view showing a state in which the shutter unit is dismounted from the accommodating portion frame.

Figure 86:
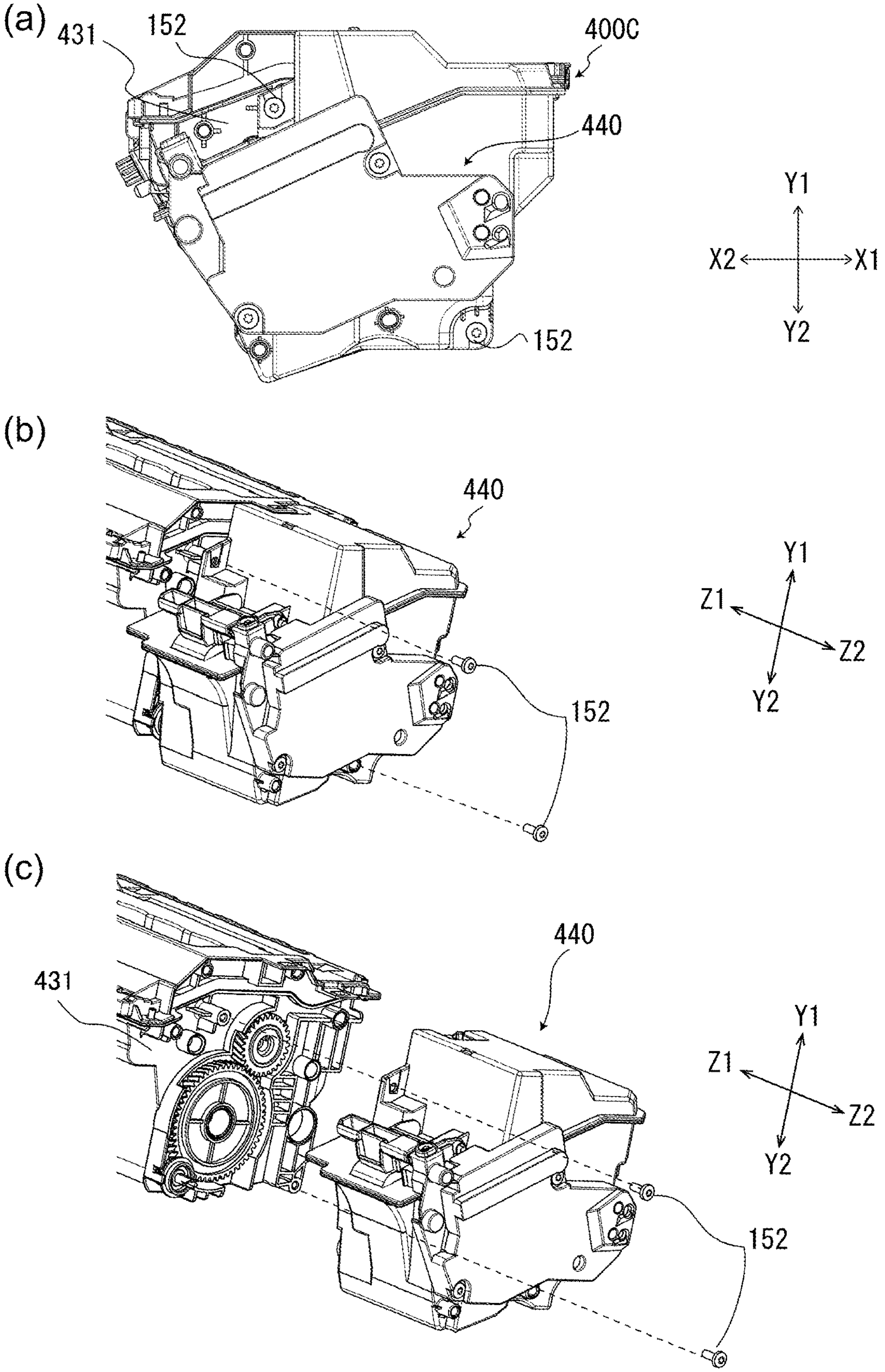

Part (a) of FIG. 86 is a side view showing the toner cartridge to which a residual toner accommodating portion is assembled, part (b) of FIG. 86 is a perspective view showing a state in which screws are dismounted from the accommodating portion frame, and part (c) of FIG. 86 is a perspective view showing a state in which the residual toner accommodating portion is dismounted from the accommodating portion frame.

Figure 87:
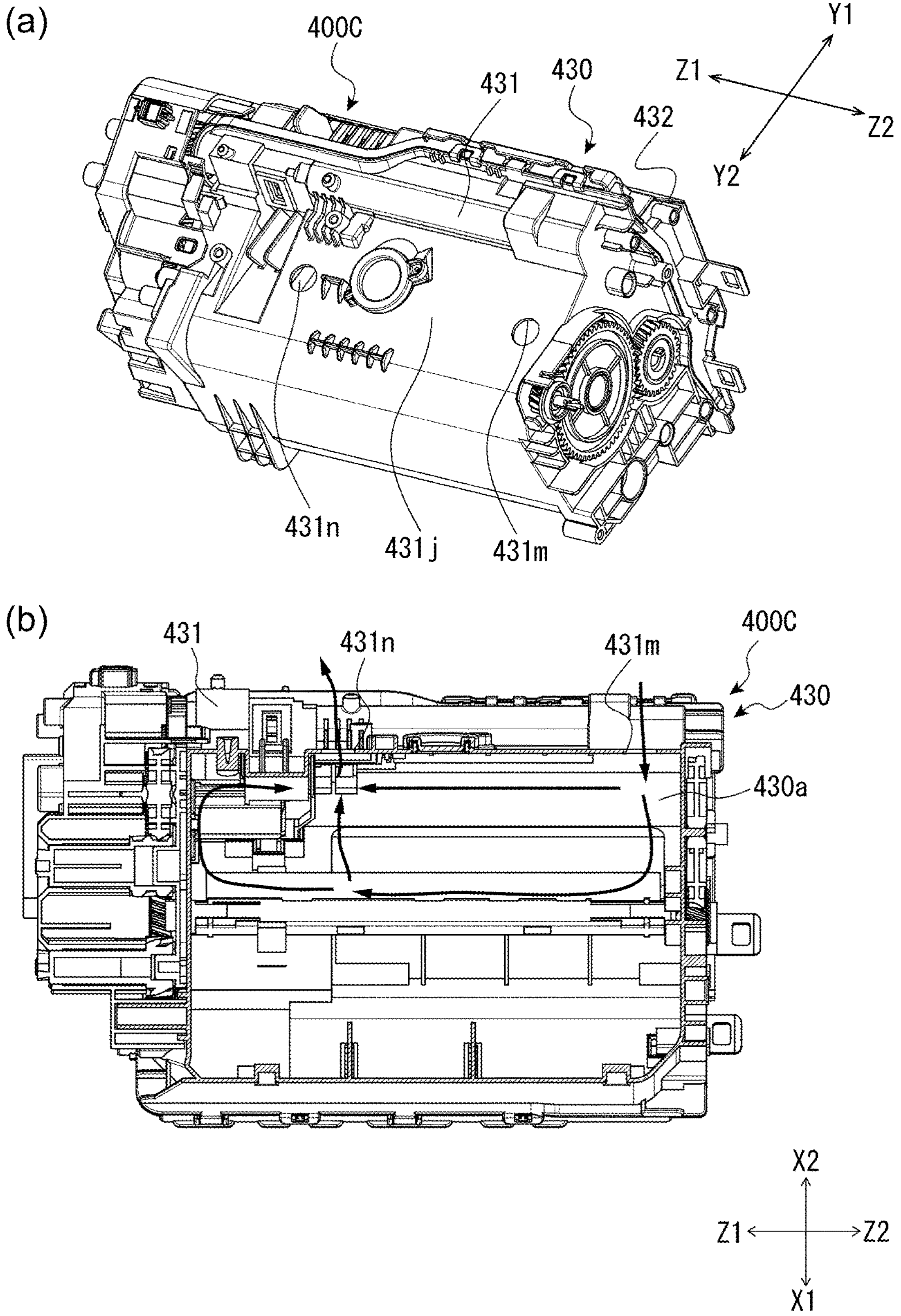

Part (a) of FIG. 87 is a perspective view showing the toner cartridge, and part (b) of FIG. 87 is a sectional view showing the air circulation passage in the toner cartridge.

Figure 88:
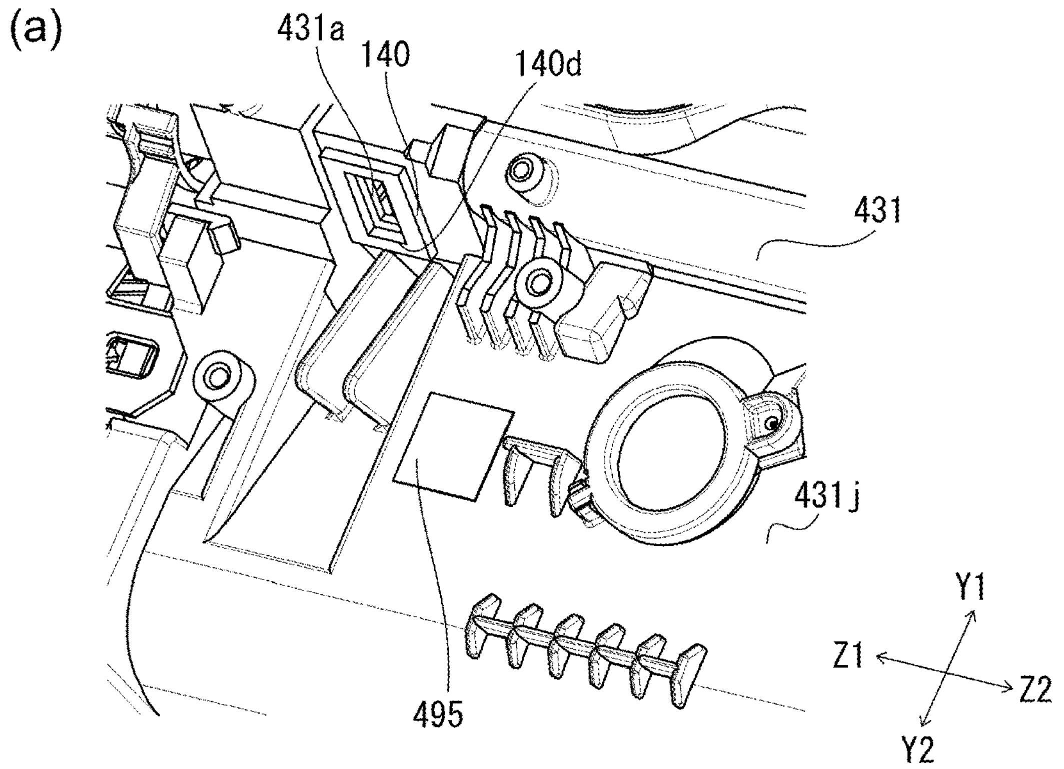
Figure 88:
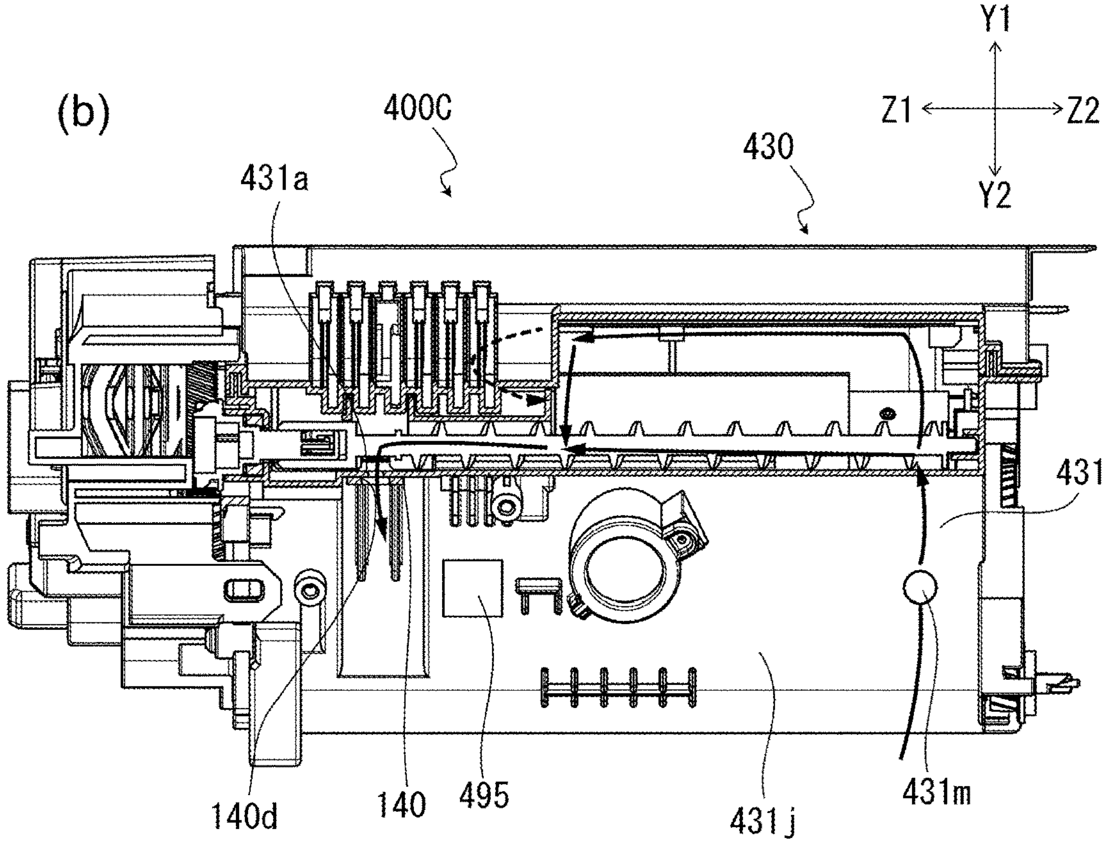

Part (a) of FIG. 88 is a perspective view showing the seal member, and part (b) of FIG. 88 is a partial sectional view showing the toner cartridge in a state in which an air discharge opening is sealed by the seal member.

Figure 89:
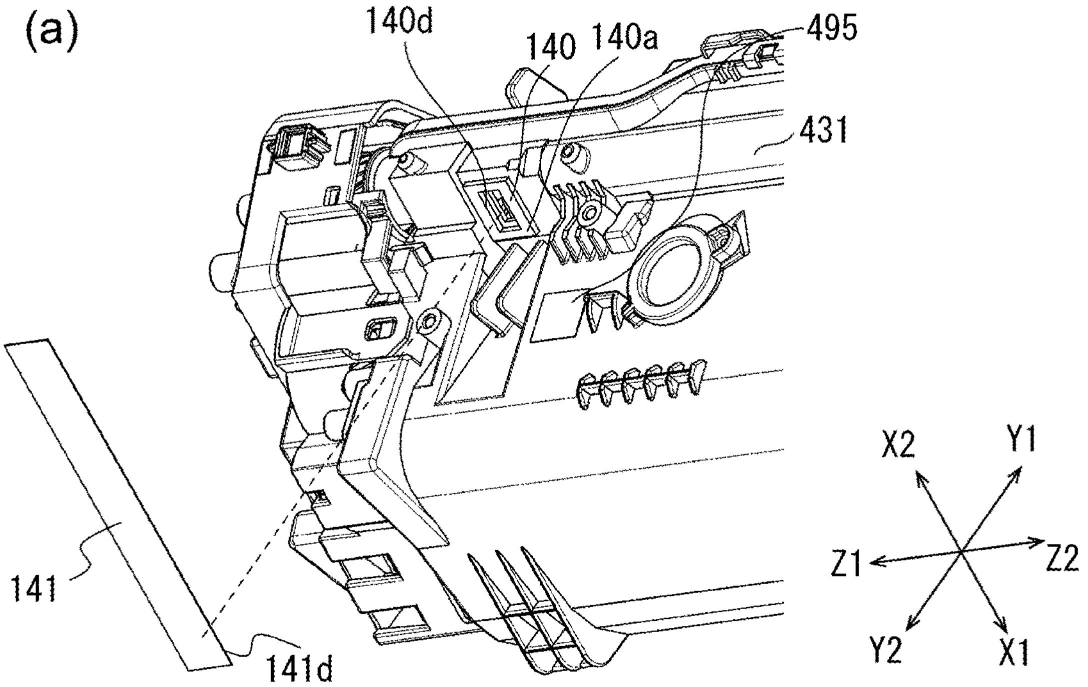
Figure 89:
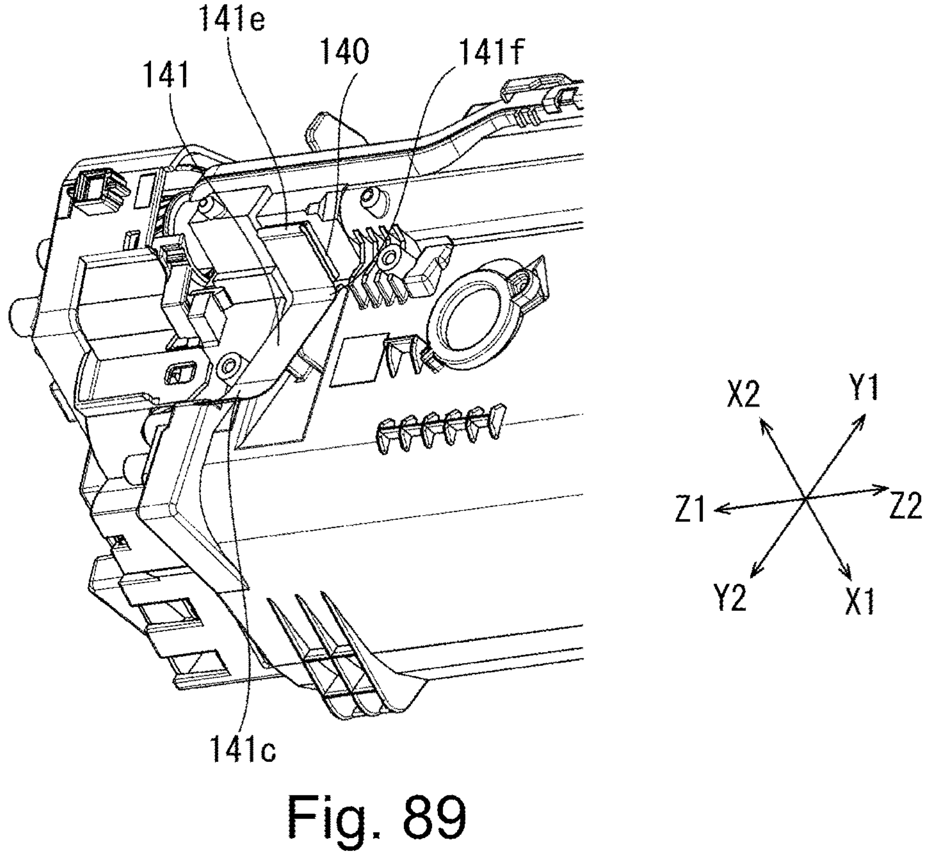

Part (a) of FIG. 89 is a perspective view showing a state in which the sealing tape is being stuck to the elastic seal, and part (b) of FIG. 89 is a perspective view showing a state in which the sealing tape is stuck to the elastic seal.

Figure 90:
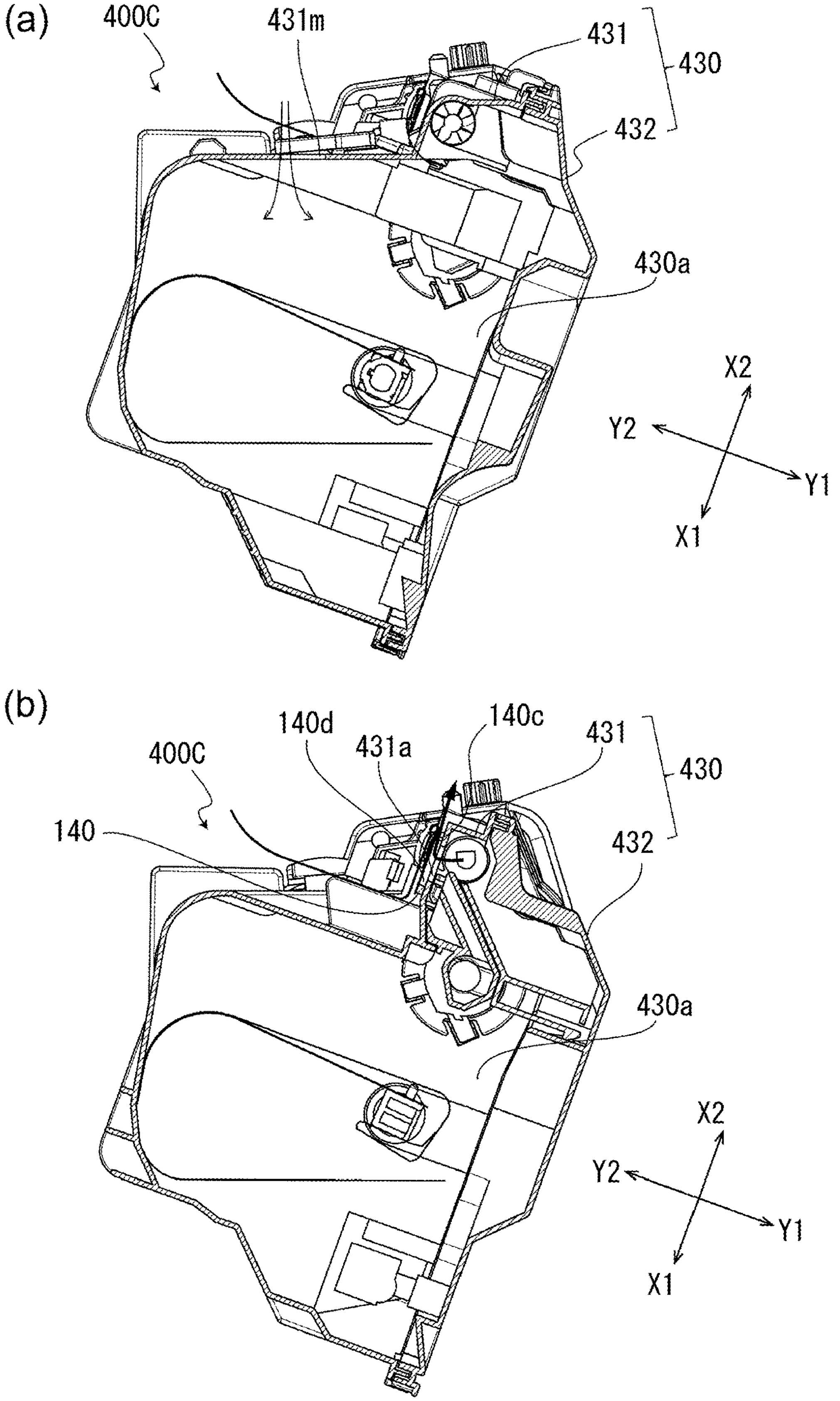

Part (a) of FIG. 90 is a sectional view showing a cross section including the air inflow opening, and part (b) of FIG. 90 is a sectional view showing a cross section including a discharge opening.

Figure 91:
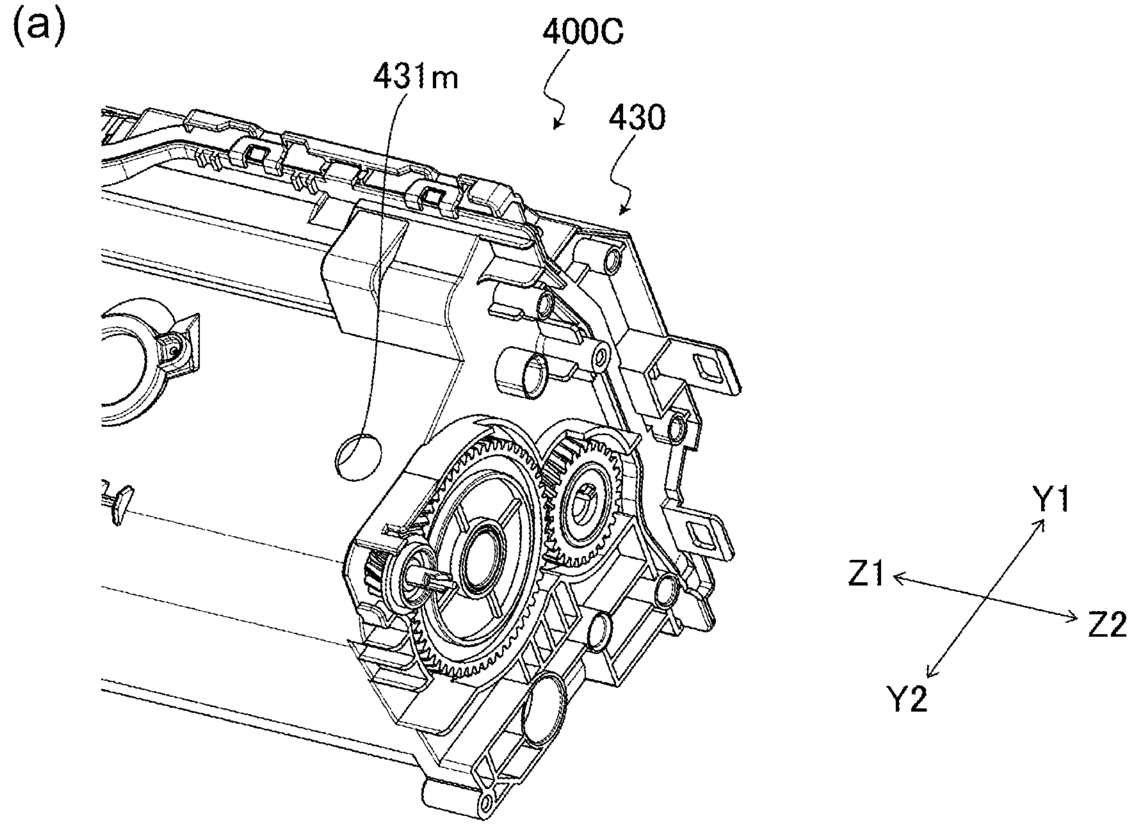
Figure 91:
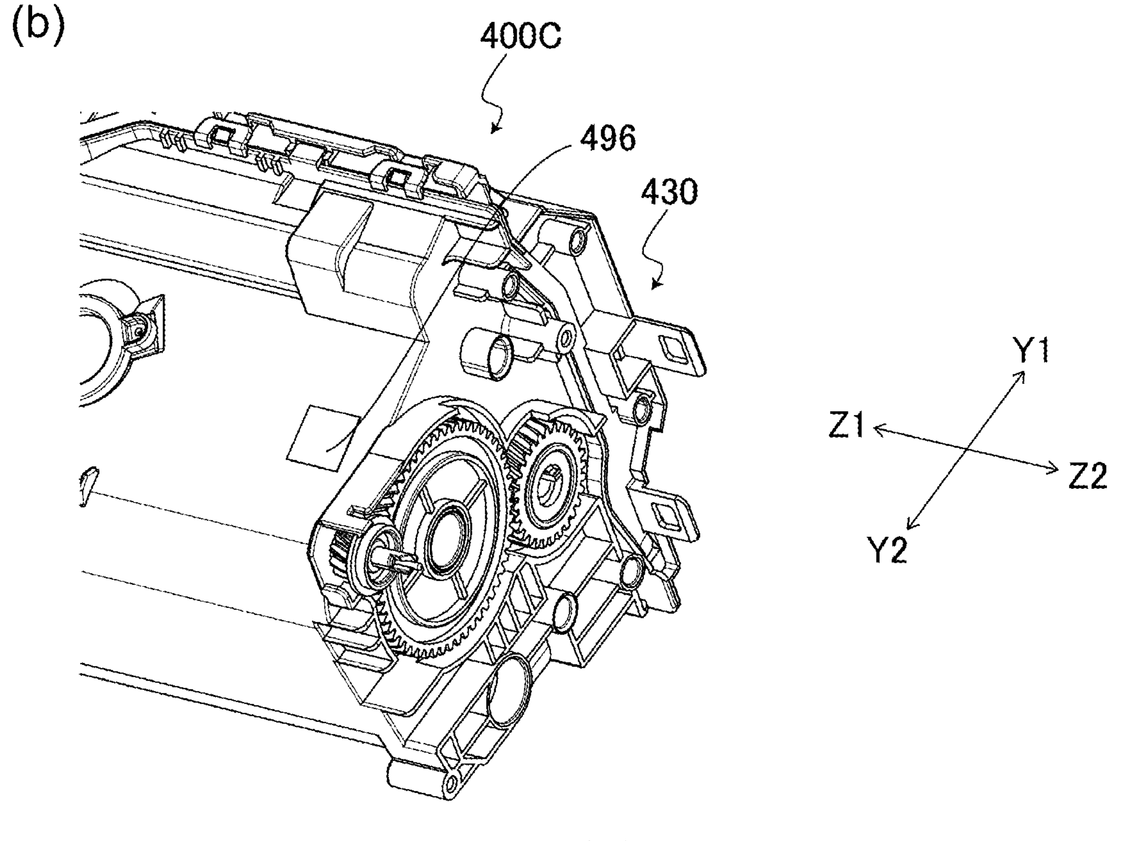

Part (a) of FIG. 91 is a perspective view showing the cross section including the air inflow opening, and part (b) of FIG. 91 is a perspective view showing a state in which the air inflow opening is sealed by the sealing member.

Figure 92:
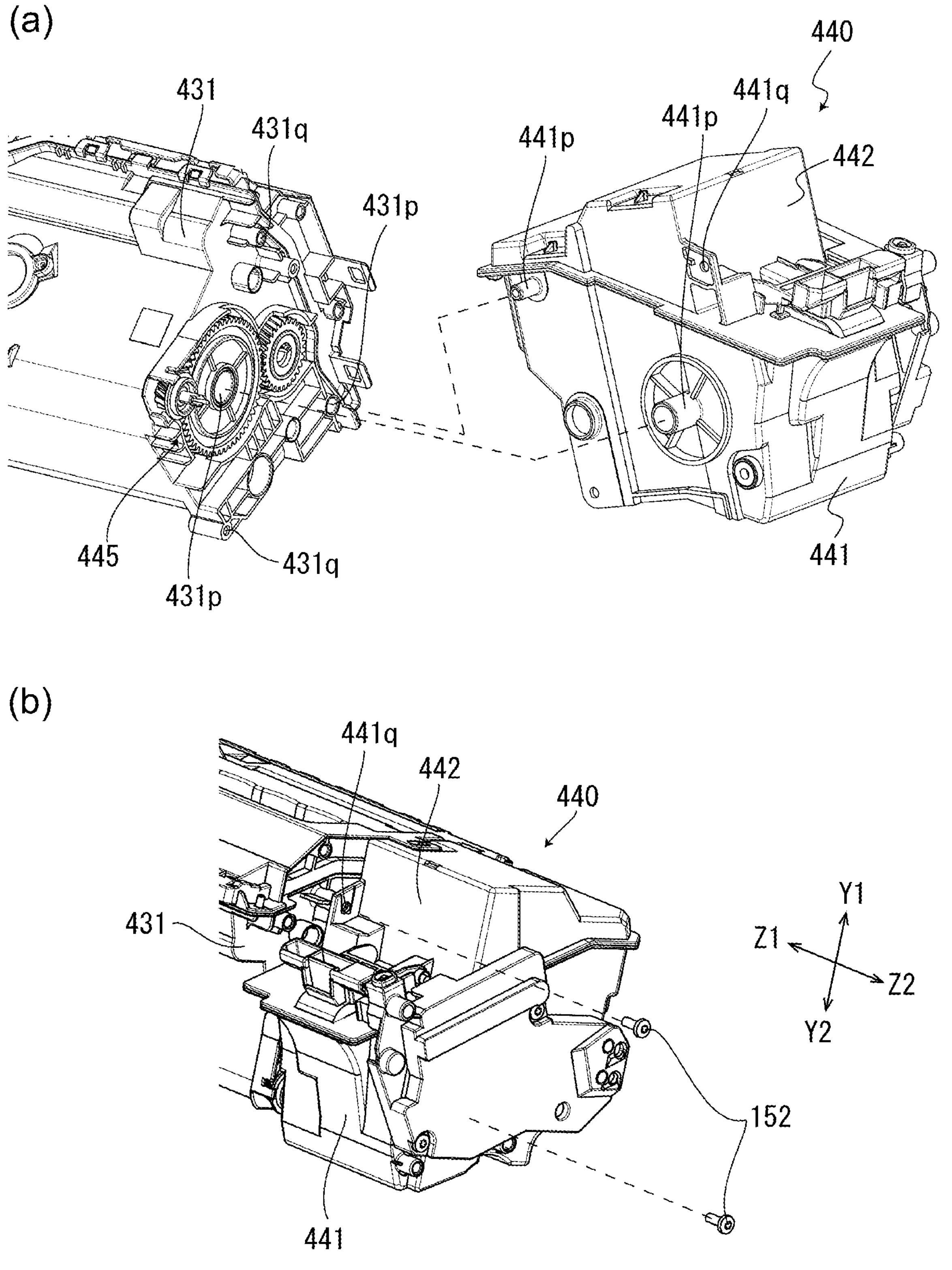

Part (a) of FIG. 92 is an exploded perspective view showing the accommodating portion frame and the residual toner accommodating portion, and part (b) of FIG. 92 is a perspective view showing a state in which the residual toner accommodating portion is fixed to the accommodating portion frame by screws.

Figure 93:
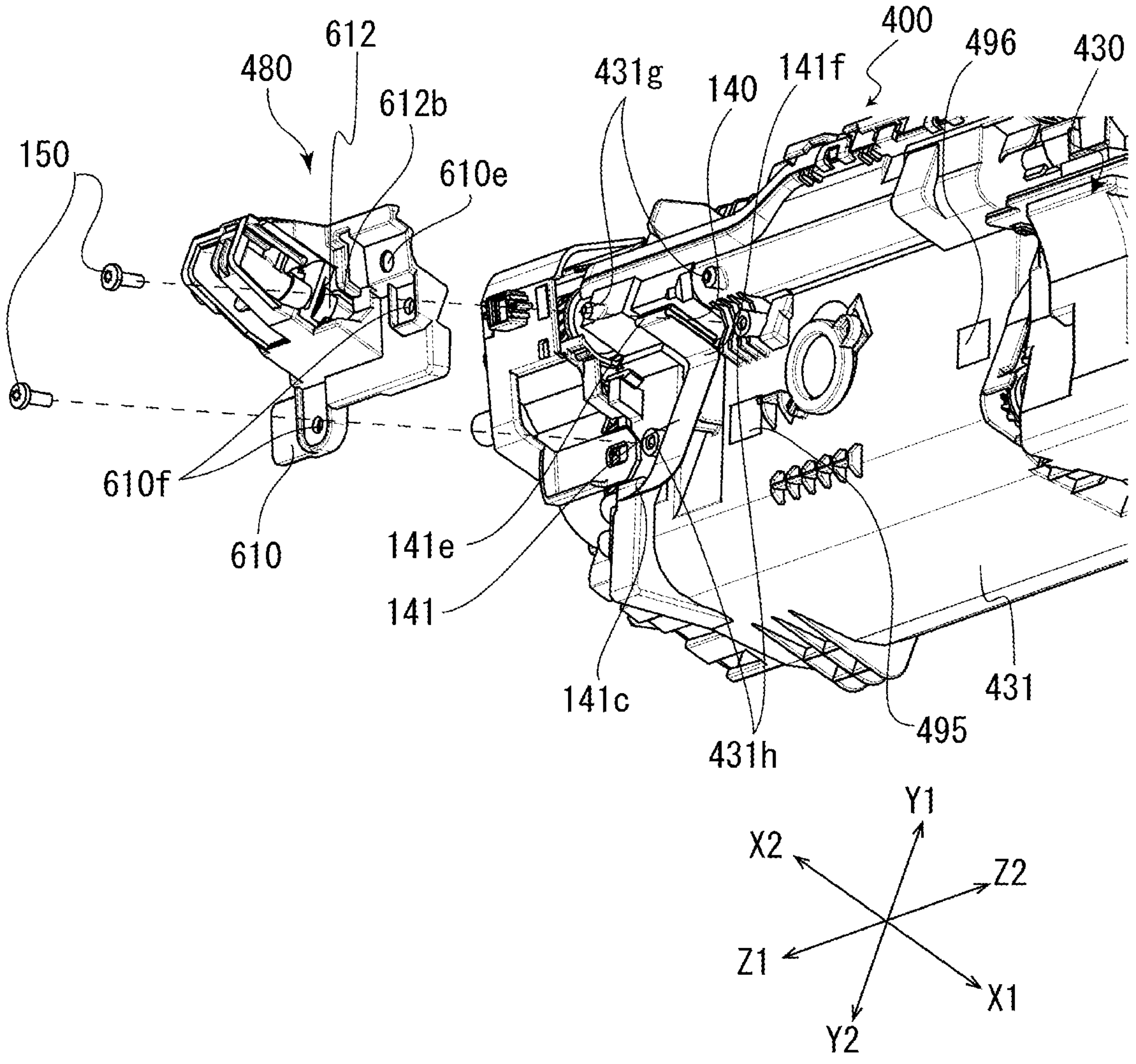

FIG. 93 is a perspective view showing a state in which the shutter unit is being assembled to the accommodating portion frame.

Figure 94:
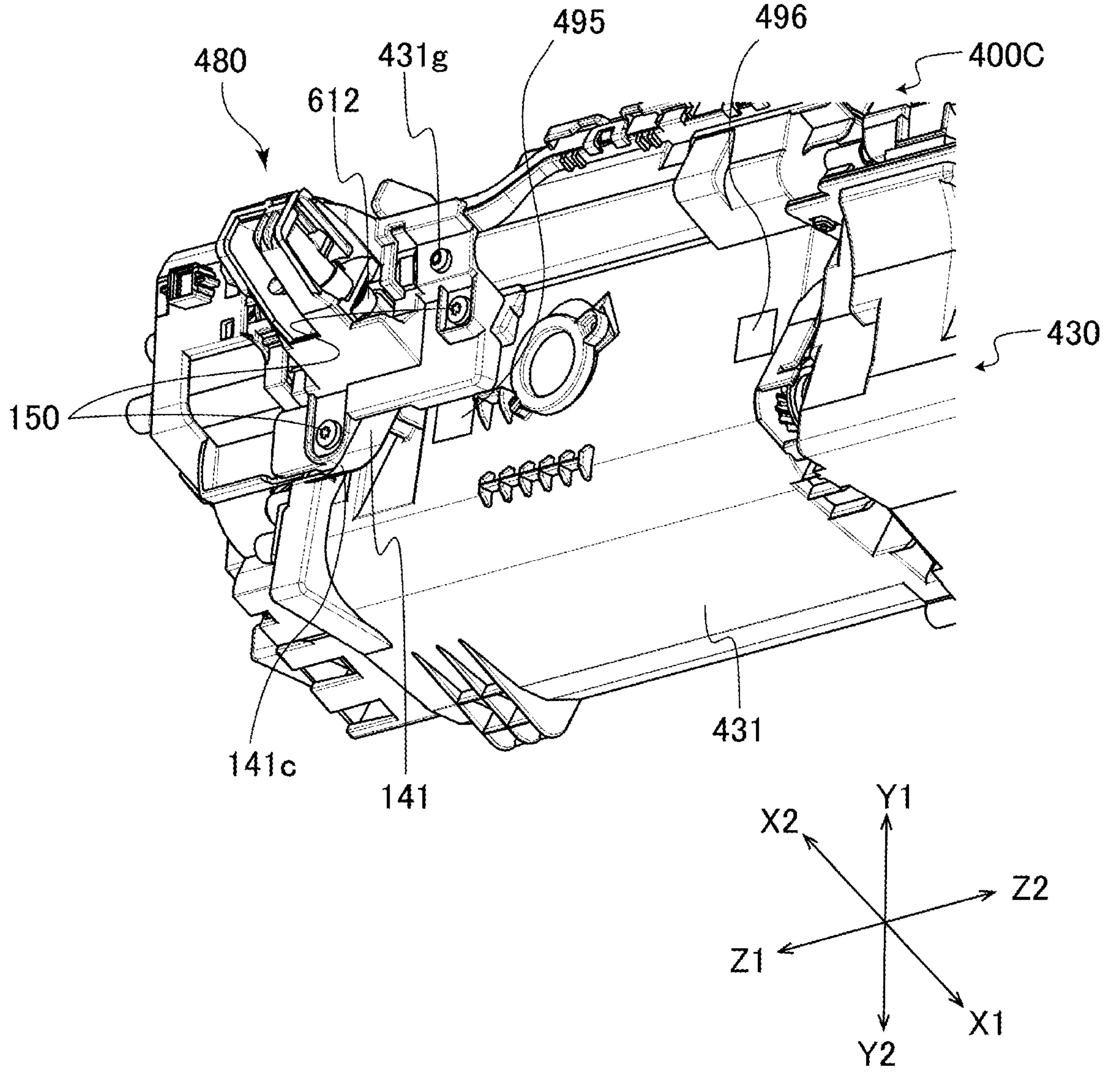

FIG. 94 is a perspective view showing a state in which the shutter unit is assembled to the accommodating portion frame.

DESCRIPTION OF THE EMBODIMENTS

First Embodiment

A first embodiment 1 will be described in the following with reference to the accompanying drawings. Here, the dimensions, materials, shapes, and relative arrangements of the components described in the embodiments may be appropriately changed depending on the structure of the apparatus to which the invention is applied, various conditions, and the like. It is not intended to limit the scope of the present invention to the following embodiments.

<Overall Structure of Image Forming Apparatus 100>

Figure 1:
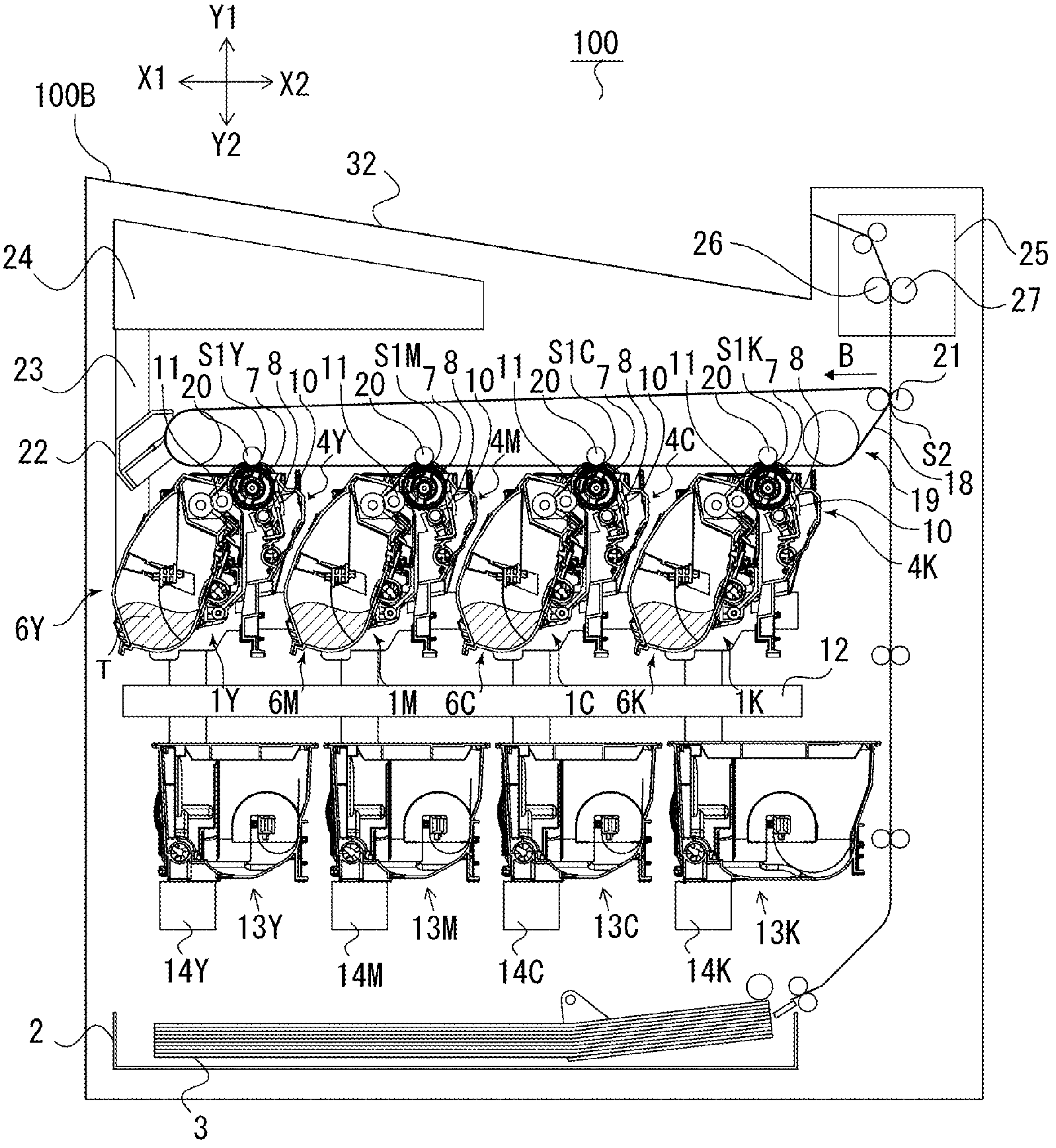
FIG. 1 is a schematic view showing an image forming apparatus according to a first embodiment.

Referring to FIG. 1, the overall structure of an electrophotographic image forming apparatus 100 according to a first embodiment will be described. FIG. 1 is a schematic view showing the image forming apparatus 100 which is an electrophotographic printer according to the first embodiment. In this embodiment, a process cartridge 1 and a toner cartridge 13 is detachably mountable to an apparatus main assembly 100B of the image forming apparatus 100. A portion of the image forming apparatus 100 excluding cartridges (1, 13) may be referred to as a main assembly or the apparatus main assembly 100B of the image forming apparatus 100. The apparatus main assembly 100B is constituted so as to receive toner discharged from the toner cartridge 13.

In this embodiment, structures and operations of first to fourth image forming portions are substantially the same except that colors of formed images are different. Therefore, in the following, if no particular distinction is necessary, suffixes Y to K will be omitted for general explanation.

The first to fourth process cartridges 1 are juxtaposed in the horizontal direction. Each process cartridge 1 comprises a cleaning unit 4 and a developing unit 6. The cleaning unit 4 includes a photosensitive drum 7 as an image bearing member, a charging roller 8 as a charging means for uniformly electrically charging a surface of the photosensitive drum 7, and a cleaning blade 10 as a cleaning means. The developing unit 6 accommodates a developing roller 11 and a developer (hereinafter referred to as toner) T, and includes a developing means for developing an electrostatic latent image on the photosensitive drum 7. The cleaning unit 4 and the developing unit 6 are supported so as to be swingable relative to each other. The first process cartridge 1Y contains yellow (Y) toner in the developing unit 6. Similarly, the second process cartridge 1M contains magenta (M) toner, the third process cartridge 1C contains cyan (C) toner, and the fourth process cartridge 1K contains black (K) toner.

The process cartridge 1 can be mounted to and dismounted from the main assembly of the image forming apparatus 100 by way of mounting means such as a mounting guide (not shown) and a positioning member (not shown) provided in the main assembly of the image forming apparatus 100. Further, a scanner unit 12 for forming the electrostatic latent image is provided below the process cartridge 1. Further, in the image forming apparatus, the waste (residual) toner feeding unit 23 is provided behind the process cartridge 1 (downstream of the process cartridge 1 in the inserting direction of the process cartridge 1) in the image forming apparatus 100.

The first to fourth toner cartridges 13 are arranged horizontally below the process cartridge 1 in an order corresponding to the colors of the toners contained in the respective process cartridges 1. In the following description, the toner cartridge 13 is simply referred to as a cartridge 13 in some cases.

The first cartridge 13Y contains yellow (Y) toner, similarly, the second toner cartridge 13M contains magenta (M) toner, the third toner cartridge 13C contains cyan (C) to toner, and the fourth toner cartridge 13K contains black toner (K). Then, each toner cartridge 13 supplies the toner to the process cartridge 1 containing the toner of the same color.

A toner replenishing operation (supplying operation) by the toner cartridge 13 is performed when a remaining amount detecting portion (not shown) provided in the apparatus main assembly 100B of the image forming apparatus 100 detects an insufficient remaining amount of the toner in the process cartridge 1. The toner cartridge 13 can be mounted to and dismounted from the image forming apparatus 100 by way of the mounting means such as the mounting guide (not shown) and the positioning member (not shown) provided in the main assembly of the image forming apparatus 100.

Here, when the toner cartridge 13 and the process cartridge 1 are referred to distinctively from each other, one of the two may be referred to as a first cartridge, the other may be referred to as a second cartridge, or the like. A detailed description of the process cartridge 1 and the toner cartridge 13 will be made hereinafter.

Inside the main assembly of the image forming apparatus 100, the first to fourth toner feeding (conveying) devices 14 are arranged below the first to fourth toner cartridges 13 correspondingly to the respective toner cartridges 13. Above the process cartridge 1, an intermediary transfer unit 19 as an intermediary transfer member is provided. The intermediary transfer unit 19 is provided substantially horizontally with a primary transfer portion (S1) side facing down. The intermediary transfer belt 18 facing each photosensitive drum 7 is a rotatable endless belt, and is stretched around a plurality of tension rollers. To an inner surface of the intermediary transfer belt 18, a primary transfer roller 20 is provided as a primary transfer member at a position for forming a primary transfer portion S1 in cooperation with each photosensitive drum 7, interposing the intermediary transfer belt 18 therebetween. Further, a secondary transfer roller 21, which is a secondary transfer member, is in contact with the intermediary transfer belt 18 and forms a secondary transfer portion S2 in cooperation with a roller on the opposite side, interposing the intermediary transfer belt 18. Further, a cleaning unit 22 is disposed on the side opposite from the secondary transfer portion S2, in a left-right direction (a direction in which the secondary transfer unit S2 and the intermediary transfer belt are stretched).

A fixing unit 25 is provided above the intermediary transfer unit 19. The fixing unit 25 includes a heating unit 26 and a pressure roller 27 which press-contacts the heating unit 26. A discharge tray 32 is provided at an upper surface of the apparatus main assembly 100B of the apparatus, and a waste (residual) toner collection container 24 is provided between the discharge tray 32 and the intermediary transfer unit 19. Further, a sheet feeding tray 2 for accommodating a recording material 3 is provided at a lowermost portion of the apparatus main assembly 100B of the apparatus.

Figure 2:
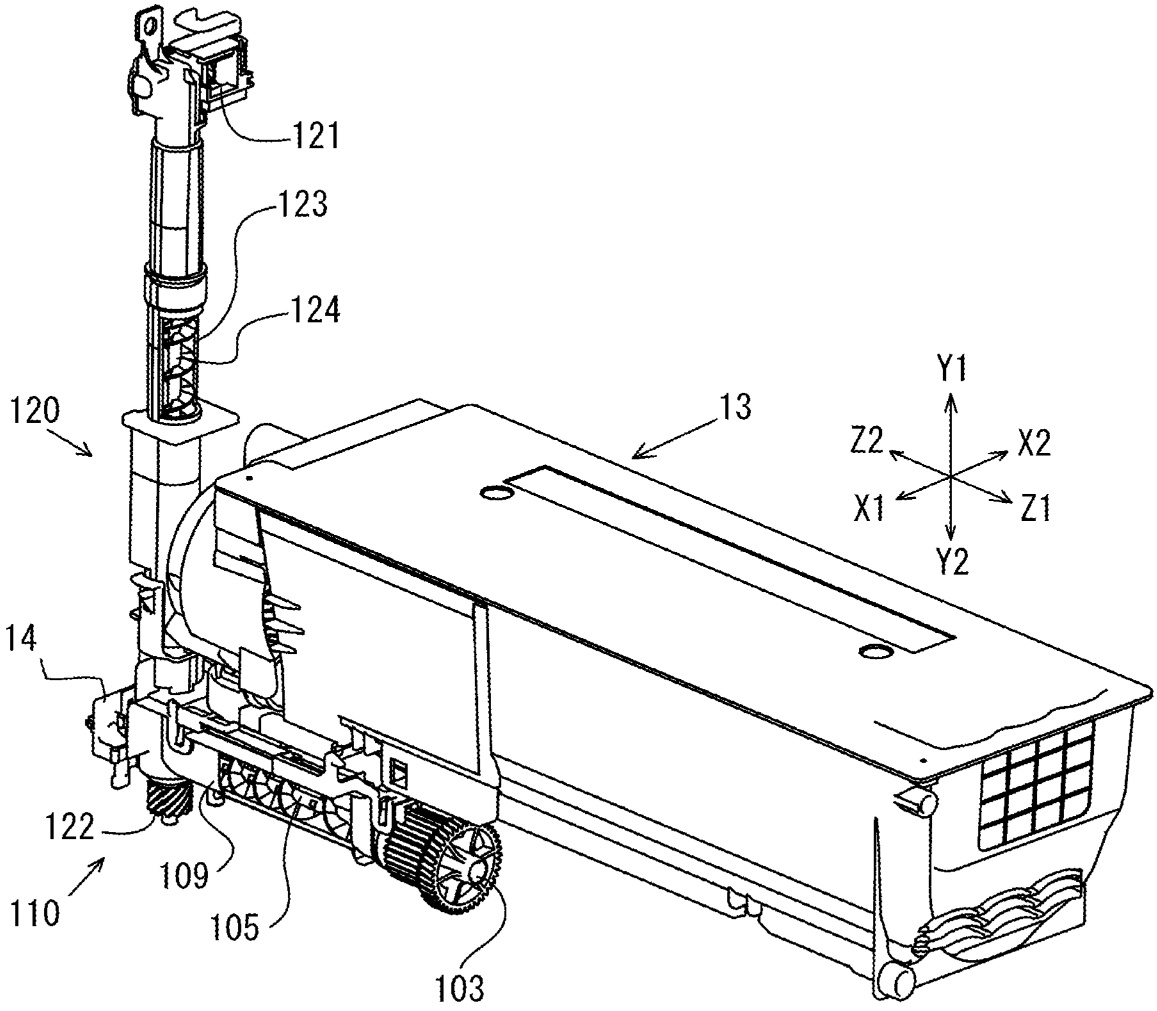
FIG. 2 is a perspective view showing a toner conveying apparatus.

FIG. 2 shows a general structure of the toner feeding device 14 mounted in the apparatus main assembly 100B of the image forming apparatus 100. In FIG. 2, a portion of the shape is cut out to show an internal structure of the toner feeding device 14. The toner feeding device 14 as a supplying portion is roughly divided into an upstream-side feeding portion 110 and a downstream-side feeding portion 120.

A toner receiving opening (not shown) is provided on the upper surface of the upstream-side feeding portion 110. The toner supplied from the toner cartridge 13 (that is, the toner discharged through a discharge opening 52 shown in part (a) of FIG. 8 which will be described hereinafter) is supplied through the toner receiving opening to a storage container 109 inside the upstream-side feeding portion 110. In a state in which the toner cartridge 13 is mounted in the apparatus main assembly 100B, the discharge opening 52 opens downward.

The toner supplied to the storage container 109 is conveyed by an upstream-side screw 105 covered with the storage container 109. The upstream-side screw 105 is rotationally driven by an upstream-side drive gear 103, and the upstream-side screw 105 conveys the toner toward the downstream-side feeding portion 120.

The downstream-side feeding portion 120 is provided with a downstream-side wall surface 123, and inside the downstream-side wall surface 123, a downstream-side screw 124 is provided. A mostupstream portion of the downstream-side feeding portion 120 is connected to a mostdownstream portion of the upstream-side feeding portion 110, and the toner fed by the upstream-side feeding portion 110 is fed to the downstream-side screw 124.

The downstream-side screw 124 is rotationally driven by a downstream-side drive gear 122, and the downstream-side screw 124 conveys the toner in a direction (Y1 direction) against the gravity. The downstream-side screw 124 is structured to supply the toner fed in the direction (Y1 direction) opposite to gravity into the process cartridge 1 shown in FIG. 1 through a main assembly discharge opening 121.

To explain in detail, the toner discharged through the main assembly discharge opening 121 is supplied into the developing unit 6 through a receiving opening 40 provided in the developing unit 6 of the process cartridge 1 as a cartridge shown in part (b) of FIG. 5, which will be described hereinafter.

In this manner, the apparatus main assembly of the image forming apparatus once receives the toner discharged from the toner cartridge 13 in the storage container 109, and then supplies the toner into the process cartridge 1 by using the upstream-side screw 105 and the downstream-side screw 124. By this, the toner is conveyed between the different cartridges (13, 1).

<Image Formation Process>

Figure 3:
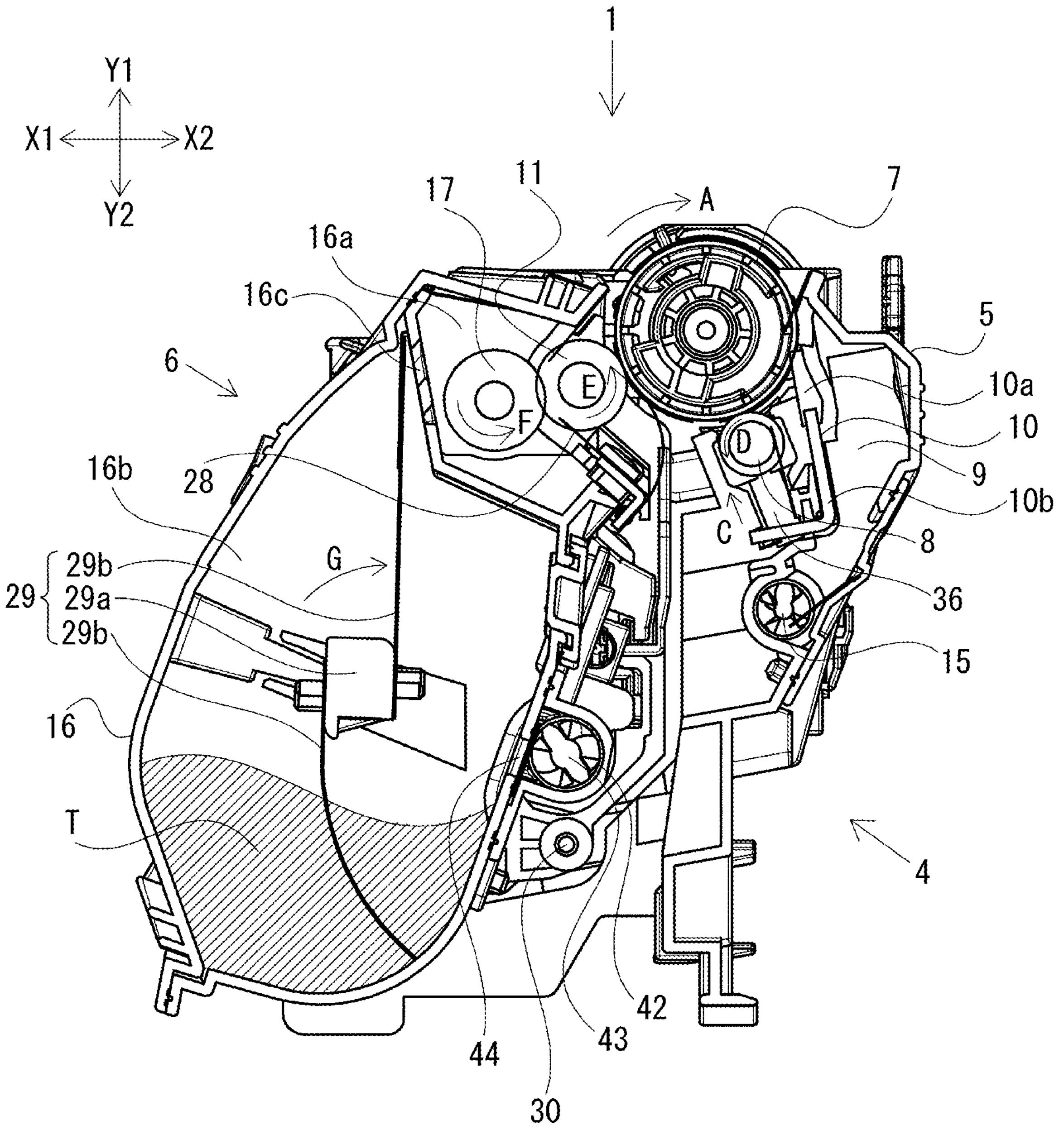
FIG. 3 is a sectional view showing a process cartridge.

Next, referring to FIGS. 1 and 3, an image forming operation in the image forming apparatus 100 will be described. During image formation (image forming operation), the photosensitive drum 7 is rotationally driven at a predetermined speed in a direction of an arrow A in FIG. 3. The intermediary transfer belt 18 is rotationally driven in a direction of an arrow B (forward in a direction of rotation of the photosensitive drum 7).

First, the surface of the photosensitive drum 1 is uniformly electrically charged by the charging roller 8. Next, the surface of the photosensitive drum 1 is scanned and exposed by laser light emitted from the scanner unit 12, so that an electrostatic latent image based on the image information is formed on the photosensitive drum 1. The electrostatic latent image formed on the photosensitive drum 1 is developed as a toner image by the developing unit 6. At this time, the developing unit 6 is pressed by a developing pressure unit (not shown) provided in the main assembly of the image forming apparatus 100. Then, the toner image formed on the photosensitive drum 1 is primarily transferred onto the intermediary transfer belt 18 by the primary transfer roller 20.

For example, at the time of forming a full-color image, the toner images of respective colors are sequentially superimposed on the intermediary transfer belt 18 by sequentially performing the above-mentioned processes in image forming portions S1Y to S1K which are first to fourth primary transfer portions.

On the other hand, the recording material 3 accommodated in the sheet feed tray 2 is fed at a predetermined control timing, and is fed to a secondary transfer portion S2 in synchronization with movement of the intermediary transfer belt 18. Then, the four color toner images on the intermediary transfer belt 18 are collectively secondarily transferred onto the recording material 3 by a secondary transfer roller 21 which is in contact with the intermediary transfer belt 18 with the recording material 3 therebetween.

Thereafter, the recording material 3 onto which the toner image is transferred is fed to the fixing unit 25. The toner image is fixed on the recording material 3 by heating and pressing the recording material 3 in the fixing unit 25. Thereafter, the recording material 3 on which the toner image is fixed is fed to the discharge tray 32 to complete the image forming operation.

Further, the primary transfer residual toner (waste toner) remaining on the photosensitive drum 7 after the primary transfer step is removed by the cleaning blade 10. The secondary transfer residual toner (waste toner) remaining on the intermediary transfer belt 18 after the secondary transfer step is removed by a cleaning unit 22. The waste (residual) toner removed by the cleaning blade 10 and the cleaning unit 22 is fed by the waste toner feeding unit 23 provided in the apparatus main assembly 100B of the apparatus and is accumulated in the waste toner collection container 24. The image forming apparatus 100 can also form a desired monochromatic or multicolor image by using only a desired single or some (but not all) image forming portions.

<Process Cartridge>

Figure 4:
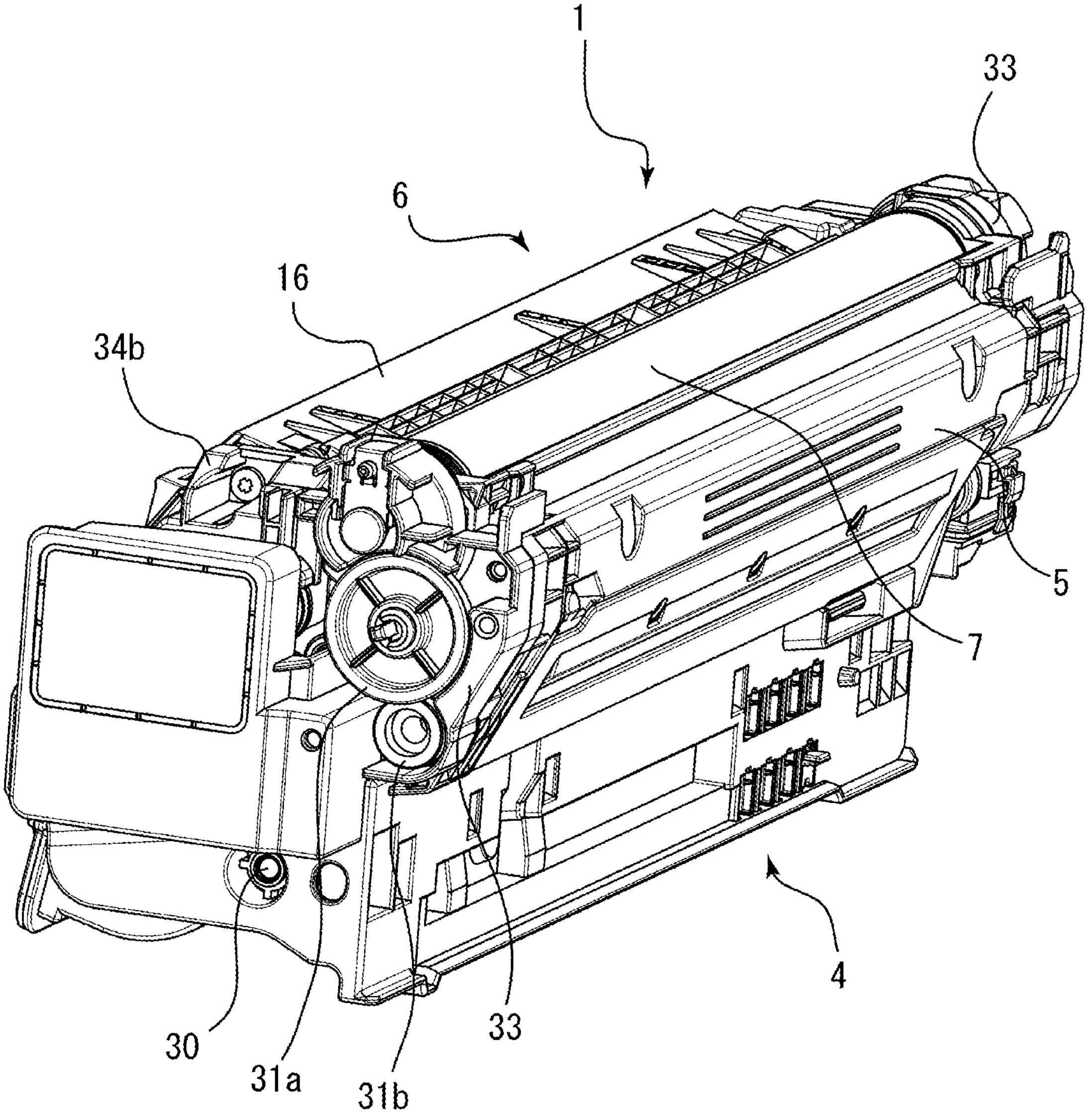
FIG. 4 is a schematic view showing the process cartridge.

Next, referring to FIG. 3 to part (b) of 5, the overall structure of the process cartridge 1 mountable to the main assembly of the image forming apparatus 100 according to this embodiment will be described. FIG. 3 is a sectional view of the process cartridge 1 according to this embodiment. FIG. 4 is a perspective view of the process cartridge 1 as viewed from an upstream side in a process cartridge mounting direction. Parts (a) and (b) of FIG. 5 are perspective views of the process cartridge 1 as viewed from a downstream side in the process cartridge mounting direction.

The process cartridge 1 as a cartridge comprises a cleaning unit 4 and a developing unit 6. The cleaning unit 4 and the developing unit 6 are swingably coupled around a rotation support pin 30.

The cleaning unit 4 has a cleaning frame 5 which supports various members in the cleaning unit 4. Further, in the cleaning unit 4, a waste toner feeding screw 15 extending in a direction parallel to a rotation axis direction of the photosensitive drum 7 is provided, in addition to the photosensitive drum 7, the charging roller 8, and the cleaning blade 10. The cleaning frame 5 is provided with cleaning bearings 33 at opposite longitudinal ends of the cleaning unit 4, respectively, so that the photosensitive drum 7 is rotatably supported by these cleaning bearings 33. The cleaning bearings 33 on the upstream side in the process cartridge mounting direction are provided with cleaning gear trains 31*a* and 31*b*, respectively, for transmitting drive from the photosensitive drum 7 to the waste toner feeding screw 15.

The charging roller 8 provided in the cleaning unit 4 is urged in a direction of the arrow C by the charging roller pressing springs 36 arranged at each of the opposite end portions toward the photosensitive drum 7. The charging roller 8 is provided so as to be driven by the photosensitive drum 7, and when the photosensitive drum 7 is rotationally driven in the direction of the arrow A during image formation, the charging roller is driven in the direction of an arrow D (codirectional with the rotational movement of the photosensitive drum 7).

The cleaning blade 10 provided in the cleaning unit 4 comprises an elastic member 10*a* for removing transfer residual toner (waste toner) remaining on the surface of the photosensitive drum 7 after the primary transfer, and includes a support member 10*b* for supporting the elastic member 10*a*. The waste toner removed from the surface of the photosensitive drum 7 by the cleaning blade 10 is accommodated in a waste toner accommodation chamber 9 formed by the cleaning blade 10 and the cleaning frame 5. The waste toner stored in the waste toner accommodation chamber 9 is fed toward the rear of the image forming apparatus 100 (downstream in a mounting/dismounting direction of the process cartridge 1) by the waste toner feeding screw 15 provided in the waste toner accommodation chamber 9. The fed waste toner is discharged from the waste toner discharge portion 35, and is delivered to the waste toner feeding unit 23 (see FIG. 1) provided in the main assembly of the image forming apparatus 100.

The developing unit 6 has a developing frame 16 which supports various members in the developing unit 6. The developing frame 16 is divided into a developing chamber 16*a* in which a developing roller 11 and a supply roller 17 are provided therein, and a toner accommodating chamber 16*b* in which the toner is accommodated therein and a stirring member 29 is provided therein.

The developing chamber 16*a* is provided with the developing roller 11, the supply roller 17, and a developing blade 28. The developing roller 11 carries the toner, and when forming an image, it rotates in the direction of an arrow E and feeds the toner to the photosensitive drum 7 by contacting the photosensitive drum 7. Further, the developing roller 11 is rotatably supported by the developing frame 16 by development bearing units 34*a* and 34*b* at opposite end portions in the longitudinal direction (rotational axis direction). The supply roller 17 contacts the developing roller 11, and is rotatably supported by the developing frame 16 by the development bearing unit 34, and rotates in the direction of an arrow F during image formation. Further, the developing blade 28 as a layer thickness regulating member which regulates a thickness of the toner layer formed on the developing roller 11 is provided in contact with the surface of the developing roller 11.

The toner accommodating chamber 16*b* is provided with the stirring member 29 for stirring the accommodated toner T and for conveying the toner to the supply roller 17 through the developing chamber communication opening 16*c*. The stirring member 29 includes a rotation shaft 29*a* extending in parallel to the rotational axis direction of the developing roller 11 and a stirring sheet 29*b* as a feeding member which is a flexible sheet. One end of the stirring sheet 29*b* is mounted to the rotation shaft 29*a*, and the other end of the stirring sheet 29*b* is a free end, and the rotation shaft 29*a* rotates to rotate the stirring sheet 29*b* in the direction of an arrow G, by which the stirring sheet 29*b* stirs the toner.

The developing unit 6 is provided with the developing chamber communicating opening 16*c* which communicates the developing chamber 16*a* and the toner accommodating chamber 16*b* with each other. In this embodiment, the developing chamber 16*a* is placed above the toner accommodating chamber 16*b* in an attitude in which the developing unit 6 is normally used (an attitude at the time of use). The toner in the toner accommodating chamber 16*b* dipped up by the stirring member 29 is supplied to the developing chamber 16*a* through the developing chamber communication opening 16*c*.

Further, the developing unit 6 is provided with a receiving opening 40 at one end which is downstream in the inserting direction of the process cartridge 1. A receiving opening seal member 45 and a receiving opening shutter 41 which is movable in the front-rear direction are provided above the receiving opening 40. The receiving opening 40 is closed by the receiving opening shutter 41 when the process cartridge 1 is not mounted on the main assembly of the image forming apparatus 100. The receiving opening shutter 41 is structured to be urged and opened by the main assembly of the image forming apparatus 100 in interrelation with the mounting/dismounting operation of the process cartridge 1.

In the developing unit 6, a receiving feed path 42 which communicates with the receiving opening 40, is provided, and inside the receiving feed path 42, a receiving feed screw 43 is provided. Further, an accommodating chamber communication opening 44 for supplying the toner into the toner accommodating chamber 16*b* is provided in the neighborhood of the longitudinally central portion of the developing unit 6, and communicates the receiving feed path 42 and the toner accommodating chamber 16*b* with each other. The receiving feed screw 43 extends parallel to the rotational axis direction of the developing roller 11 and the supply roller 17, and feeds the toner received from the receiving opening 40 to the toner accommodating chamber 16*b* through the accommodating chamber communication opening 44.

In this embodiment, the process cartridge 1 has both the photosensitive drum 7 and the developing roller 11, but the structure is not necessarily limited to this. For example, the cleaning unit 4 including the photosensitive drum 7 and the developing unit including the developing roller 11 may not be connected, and they may be separate cartridges. In such a case, the cartridge including the cleaning unit 4 may be called a drum cartridge, and the cartridge including the developing unit 6 may be called a developing cartridge. In such a case, the toner is supplied from the toner cartridge 13 to the developing cartridge of the developing unit 6.

<Overall Structure of Toner Cartridge>

Next, referring to part (a) of FIG. 6 to FIG. 9, an overall structure of the toner cartridge 13 mounted on the image forming apparatus 100 according to this embodiment will be described.

Parts (a) to (c) of FIG. 6 are sectional views of the toner accommodating chamber 49, the communication passage 48, and the toner discharge chamber 57 of the toner cartridge 13 according to this embodiment as viewed in the longitudinal direction. FIG. 7 is an exploded perspective view of the toner cartridge 13 according to this embodiment. Parts (a) to (c) of FIG. 8 are sectional views of the neighborhood of the screw 54 (also referred to as a toner feeding screw) of the toner cartridge 13 according to this embodiment as viewed along the lateral direction. That is, parts (a) and (c) of FIG. 8 are sectional views each parallel to the YZ plane. FIG. 9 is an exploded perspective view illustrating an internal space of the toner cartridges 13 which contains the toner, according to this embodiment.

The toner cartridge 13 accommodates the toner (developer) in an internal space 51 thereof, and is mounted to the apparatus main assembly 100B of the image forming apparatus 100 in order to supply (replenish) the toner to the apparatus main assembly 100B of the image forming apparatus 100.

In the explanation of toner the cartridge 13, unless otherwise specified, on the presumption that the toner cartridge 13 takes a normal attitude, that is, an attitude when the toner cartridge 13 is mounted inside the apparatus main assembly 100B of the apparatus, and the directions (X1, X2, Y1, Y2, Z1, Z2) are defined as follows.

A vertical (up-down) direction is indicated by a Y axis. An arrow Y1 indicates an upward direction, and an arrow Y2 indicates a downward direction. The surface of the toner cartridge 13 provided at the end in the Y1 direction is referred to as a top surface (upper surface), and the surface thereof at the end in the Y2 direction is referred to as a bottom surface (bottom, lower portion, lower end). The top surface of the toner cartridge 13 faces upward (Y1 direction), and the bottom surface faces downward (Y2 direction). The Y1 direction and the Y2 direction may be collectively referred to as the up-down direction, the height direction, the vertical direction, the gravity direction, or the Y direction and the Y axis direction.

A front-rear direction is indicated by the Z-axis. As the toner cartridge 13 is mounted to the apparatus main assembly 100B of the image forming apparatus 100, the direction toward the upstream is indicated by the arrow Z1 in the mounting direction, and the direction toward the downstream side of the mounting direction is referred to as Z2 direction. For convenience of explanation, the Z1 direction is the front and the Z2 direction is the ba the apparatus main assembly 100B ck. That is, the surface provided at the end of the toner cartridge 13 in the Z1 direction is referred to as the front surface (front portion, front end) of the toner cartridge 13, and the surface provided at the end in the Z2 direction is referred to as the rear surface (back surface, rear end, rear portion). Further, a Z1 direction side of the toner cartridge 13 is referred to as a non-driving side, and a Z2 direction side of the toner cartridge 13 is referred to as a driving side in some cases.

The front surface of the toner cartridge 13 faces the front (Z1 direction), and the rear surface faces the rear (Z2 direction). The toner cartridge 13 has a longitudinal direction that extends from the front side to the rear side (extension in the Z-axis direction). The Z1 direction and the Z2 direction may be collectively referred to as the front-rear direction, the longitudinal direction, the vertical direction, the Z direction, or the Z-axis direction.

Further, the left-right direction is indicated by the X-axis. For convenience of explanation, the direction to the left when viewed along the dismounting direction (that is, the Z1 direction) when the toner cartridge 13 is dismounted from the main assembly 100*b* of the image forming apparatus 100 is indicated by an arrow X1, and the direction to the right is indicated by an arrow X2. The surface provided at the end of the toner cartridge 13 in an X1 direction is referred to as a left side surface (left surface, left end, left end), and the surface provided at the end in an X2 direction is referred to as a right side surface (right surface, right portion, right end). The left side surface of the toner cartridge 13 faces the left direction (X1 direction), and the right side surface faces the right direction (X2 direction). The direction from the left side surface to the right side surface (that is, the extension in the X-axis) of the toner cartridges 13 is referred to as a widthwise direction. The X1 direction and the X2 direction are collectively referred to as a left-right direction, a horizontal direction, a widthwise direction, a lateral direction, an X direction, an X-axis direction, or the like.

Thus, a distance between the front surface and the rear surface of the toner cartridge 13 is longer than a distance between the right side surface and the left side surface, and is longer than a distance between the upper surface and the bottom surface. However, it is not limited to such a structure. For example, the distance between the right side surface and the left side surface of the toner cartridge 13 may be made the longest, or the distance between the top surface and the bottom surface may be made the longest.

The X-axis, Y-axis, and Z-axis are perpendicular to each other. For example, the X-axis is perpendicular to the Y-axis and also perpendicular to the Z-axis. Further, a plane perpendicular to the X-axis may be referred to as a YZ plane, a plane perpendicular to the Y-axis may be referred to as a ZX plane, and a plane perpendicular to the Z-axis may be referred to as an XY plane. For example, the ZX plane is a horizontal plane. The X direction and the Y direction are directions along the ZX plane which is the horizontal plane, i.e., the horizontal direction.

In the description of this embodiment, the first to third toner cartridges (13Y, 13M, 13C) containing the toners of yellow (Y), magenta (M) and cyan (C) colors other than black are taken as an example.

The fourth toner cartridge (13K) containing the black (K) toner has a larger toner capacity than the first to third toner cartridges (13Y, 13M, 13C), and in the other respects, it is substantially the same as the other cartridges other than that. Therefore, the description of the fourth toner cartridge 13K will be omitted.

The toner supplied to the apparatus main assembly 100B of the image forming apparatus 100 from the toner cartridge 13 is supplied to the process cartridge 1 by the toner feeding device 14 (see FIG. 2) as described above. That is, the toner cartridge 13 contains the toner to be supplied (replenished) into the process cartridge 1.

As shown in FIG. 7, the toner cartridge (13Y, 13M, 13C) of this embodiment comprises a supply frame 50 as a casing and a frame. The supply frame 50 includes a container portion 50*a* and a lid portion 50*b*, and is provided by mounting the lid portion 50*b* to the container portion 50*a*. Further, the container portion 50*a* and the lid portion 50*b* form an internal space 51 inside the supply frame 50. The lid portion 50*b* is located at the end of the toner cartridge 13 in the Y1 direction and forms the top surface of the toner cartridge 13 and the supply frame 50.

The supply frame 50 includes a partition member (partition) 55 placed in the internal space 51 thereof. The partition member 55 further divides the internal space 51 into a plurality of regions. That is, as shown in parts (a) to (c) of FIG. 7 and parts (a) to (c) of FIG. 8, the internal space 51 is divided into a plurality of chambers such as the toner accommodating chamber 49, the communication passage 48, and the toner discharge chamber 57 by a partition member 55. The partition member (partition) 55 can be regarded as a part of the supply frame 50, or the partition member 55 can be actually formed integrally with the supply frame 50.

Further, in the neighborhood of the end portions (rear end, rear surface) on the Z2 side of the supply frame 50, as shown in FIG. 7 and parts (a) to (c) of FIG. 8, a drive train including a drive input gear 59, a cam gear 60, and a screw gear 64, and a pump 58, and the like are mounted. A side cover 62 is mounted to the supply frame 50 so as to cover the gear train, the pump 58, and the like. In particular, the cam gear 60 is restricted from moving in the Z1 direction and the Z2 direction by the side cover 62 and the supply frame 50.

As shown in parts (a) to (c) of FIG. 8, the toner cartridge 13 has an internal space 51 containing the toner therein, and the internal space 51 is divided into the toner accommodating chamber 49, the communication passage 48, and the toner discharging chamber 57 described above by the partition member 55. The partitioning of the internal space 51 by the partition member 55 as described above is merely an example, and a layout can be appropriately changed as needed.

The stirring member 53 and the screw 54 are extended from the upstream side (that is, the Z1 direction side) of the toner cartridge 13 in the mounting direction to the downstream side (that is, the Z2 direction side) of the mounting direction.

The screw 54 is partially covered with the partition member 55, at a part which is extend from the upstream side in the mounting direction (the Z1 direction side) to the downstream side in the mounting direction (the Z2 direction side). By covering the screw 54 with the partition member 55, a tunnel-like space is formed inside the partition member 55, and it serves as a communication passage (communication port) 48. Each chamber formed in the internal space 51 of the supply frame 50 will be described in detail in the following.

(Toner Accommodating Chamber)

The toner accommodating chamber (developer accommodating chamber) 49 has a space for accommodating the toner (developer) as showing in part (a) of FIG. 6 to FIG. 9. A supply stirring member 53 (hereinafter, simply referred to as a stirring member 53) is provided in the toner accommodating chamber 49. The stirring member 53 as a stirring unit is arranged parallel to the longitudinal direction of the toner cartridge 13 and is rotatably supported by the supply frame 50. Further, the stirring member 53 includes a rotation shaft 53*a* and a supply stirring sheet 53*b* as a feeding member which is a flexible stirring sheet. The stirring member 53 is a movable member which is movable relative to the supply frame 50.

One end of the supply stirring sheet 53*b* is mounted on the rotation shaft 53*a*, and the other end of the supply stirring sheet 53*b* is a free end. By the rotation shaft 53*a* rotating to rotate the supply stirring sheet 53*b* in the direction of the arrow H, the toner is stirred by the supply stirring sheet 53*b*, and the toner is fed to the screw 54.

The screw 54 is a feed member which feeds the toner along the rotation axis thereof to the communication passage 48 and the toner discharge chamber 57, which will be described hereinafter. The rotation axis of the screw 54 and the rotation axis of the stirring member 53 are substantially parallel with each other.

Inside the toner accommodating chamber 49, there is provided a wall 50*a*1 between the screw 54 and the stirring member 53. The wall 50*a*1 is a wall-shaped or plate-shaped projection (rib) projecting upwardly from the floor surface of the toner accommodating chamber 49. The walls 50*a*1 are juxtaposed in parallel adjacent to the feeding screw 54 and extend along the axial direction of the feeding screw 54, that is, the toner feeding direction. By being sandwiched between the wall 50*a*1 and the side surface of the container portion 50*a* of the supply frame 50, the screw 54 can stably feed the toner around itself. On the downstream side of the toner accommodating chamber 49 in the toner feeding direction, the wall 50*a*1 is not provided between the screw 54 and the stirring member 53. This is in order that in the portion on the downstream side of the screw 54, an amount of the toner received from the stirring member 53 is increased. The upper portion of the screw 54 is also open, and therefore, some toner moves from the stirring member 53 to the screw 54 beyond the upper portion of the wall 50*a*1. Although described in a third embodiment, a state in which an inner toner seal 94 which is peeled out is provided inside the toner accommodating chamber 49 may be formed (see part (b) of FIG. 75).

(Communication Passage)

The communication passage (toner passage, tunnel) 48 is, as shown in part (a) to (c) of FIG. 6 and parts (a) to (c) of FIG. 8, a space and an opening which communicate the toner accommodating chamber 49 and the toner discharge chamber 57 with each other, which will be described hereinafter, and is a passage through which the toner moves. The communication passage 48 is constituted by a partition member 55 and the supply frame 50. At least a part of the screw 54 as a feeding member is placed in the communication passage 48.

The screw 54 is a movable member which is movable relative to the supply frame 50, and more specifically, it is rotatably supported by the supply frame 50. A part of the screw 54 is exposed to the toner accommodating chamber 49, and the rotation feeds the toner in the toner accommodating chamber 49 along the rotational axis direction of the screw 54.

As described above, the communication passage 48 is constituted by the partition member 55 and the supply frame 50, extends along the toner feeding direction by the screw 54, and has a tunnel shape. Further, the partition member 55 covers a part of the screw 54, so that the screw 54 is placed inside the communication passage 48. The tunnel shape of the communication passage 48 is formed corresponding to the outer shape of the screw 54. That is, the communication passage 48 has a function of cutting off the toner fed by the screw 54 and feeding the toner in a constant quantity. In order to accurately control the toner amount of the toner passing through the communication passage 48, the communication passage 48 may suitably extend long along the Z direction which is the toner feeding direction, but is not necessarily limited to this. For example, a length of the communication passage 48 in the toner feeding direction may be very short.

A part of the toner fed by the screw 54 can enter the inside of the communication passage 48 and move to the toner discharge chamber 57, but the rest of the toner cannot enter the communication passage 48, so that it remains in the toner accommodating chamber 49. The amount of the toner entering the inside of the communication passage 48 can be appropriately determined by appropriately setting the ratio between the size of the opening of the tunnel formed by the communication passage 48 and the size of the screw 54. That is, by passing the screw 54 through the inside of the communication passage 48, only a desired amount of the toner can be supplied to the toner discharge chamber 57.

The screw 54 conveys the toner in the direction (Z2 direction) from the front surface (front end) to the rear surface (rear end) of the toner cartridge 13. That is, in this embodiment, the longitudinal direction of the screw 54, that is, the toner feeding direction is the same as the longitudinal direction (Z direction, front-rear direction) of the toner cartridge 13. The structure of the toner cartridge 13 can be appropriately changed depending on the structure of the image forming apparatus 100.

(Toner Discharge Chamber)

The toner discharge chamber (developer discharge chamber) 57 is a space formed by the partition member 55 and the supply frame 50, and it is placed downstream of the communication passage 48 in the feeding direction in which the screw 54 feeds the toner.

In the neighborhood of the toner discharge chamber 57, that is, in the neighborhood of the rear surface (end in the Z2 direction) of the supply frame 50, as shown in FIG. 7 and part (a) of FIG. 8, the screw gear 64 for receiving a rotational force for rotating the screw 54 is provided. Further, the toner discharge chamber 57 is provided with a discharge opening 52 for discharging the toner (developer) from the internal space 51 of the supply frame 50 to the outside. The discharge opening 52 is an opening to permit the toner to be discharged by communicating the inside and outside of the supply frame 50.

The discharge opening 52 is formed on the bottom side of the toner cartridge 13 (that is, the bottom surface of the supply frame 50) and is directed to the bottom of the toner cartridge 13. That is, the toner is discharged downwardly through the discharge opening 52. The discharge opening 52 is placed on the downstream side of the toner cartridge 13 in the feed direction of the screw 54. That is, the distance between the discharge opening 52 and the rear surface of the toner cartridge 13 (the Z2 direction side) is shorter than the distance between the discharge opening 52 and the front surface (the Z1 direction side) of the toner cartridge 13.

Further, the pump 58 is provided adjacent to the rear surface (downstream end portion in the arrow Z2 direction) of the toner cartridge 13. The pump 58 includes a bellows portion 58*a* which can be expanded and contracted, that is, which is reciprocable. The bellows portion 58*a* has a flexibility and can be deformed by expanding and contracting (reciprocation). The bellows portion 58*a* is a region having a volume variable by expanding and contracting and deforming. The inside of the pump 58 and the inside of the toner discharge chamber 57 communicate with each other through a communication opening provided in the toner discharge chamber 57.

In the pump 58, the bellows portion (movable portion, variable portion) 58*a* is reciprocated, that is, is expanded and contracted by the drive train and the drive conversion portion (drive conversion mechanism, pump drive mechanism) 68 which will be described hereinafter, so that the internal volume of the bellows portion (movable portion) 58*a* can be changed. Thus, the pump 58 can act on the toner discharge chamber 57.

As the pump 58 expands and contracts, the internal pressure (internal air pressure) of the toner discharge chamber 57 changes periodically, and a difference is produced between the external air pressure of the toner cartridge 13 and the internal air pressure of the toner discharge chamber 57. The discharge opening 52 effects suction and discharge by this pressure difference, and by using the flow of air (gas) at this time for stirring and discharging the toner, the toner can be discharged stably.

When the pump 58 expands and its volume increases, the air pressure inside the pump 58 and the toner discharge chamber 57 decreases, so that the air enters the inside of the toner discharge chamber 57 through the discharge opening 52. The inward flow of air loosens the toner in the toner discharge chamber 57, and the fluidity of the toner can be increased. Thereafter, when the pump 58 contracts and the volume thereof decreases, the air pressure inside the pump 58 and the toner discharge chamber 57 increases, so that the toner is discharged through the discharge opening 52 from the inside of the toner discharge chamber 57 to the outside together with the air. By repeating this process, the toner is intermittently and periodically discharged from the inside of the toner cartridge 13 to the outside thereof through the discharge opening 52.

With the structure in which the toner is fed together with the air, it is easy to feed the toner in a narrow passage or to carry the toner discharged from the discharge opening 52 on the air flow and move it to a distant position. This is suitable for increasing feeding efficiency of the toner discharged from the toner cartridge 13. Further, the toner can be discharged even if the discharge opening 52 is made small, and therefore, it is possible to constrain the toner from being unintentionally scattered from the discharge opening 52 to the outside of the toner cartridge 13.

In this embodiment, the toner can be stirred by driving the pump 58 to periodically change the air pressure inside the toner discharge chamber 57. Particularly, in this embodiment, since suction and exhaust are performed through the discharge opening 52, the moving direction of the air passing through the discharge opening 52, that is, the direction of the air flow is periodically changed by the drive of the pump 58. Therefore, it is easy to stir the toner in the neighborhood of the discharge opening 52, which is suitable for increasing the fluidity of the toner and efficiently feeding the toner.

Although it is possible to dispose the pump 58 away from the toner discharge chamber 57, the pump 58 directly connected to the toner discharge chamber 57 as in this embodiment, is preferable because the pump 58 can act directly on the toner discharge chamber 57.

When the pump 58 is driven, the smaller the pressure difference between the toner accommodating chamber 49 and the toner discharging chamber 57, the more stable the toner can be discharged. Therefore, in the normally used attitude (attitude during use), the communication opening (vent passage) 46 for venting the toner discharge chamber 57 and the toner accommodating chamber is placed above the discharge opening 52 and the pump 58.

That is, when the pump 58 is driven, the pump 58 expands and contracts, so that the air pressure (internal pressure) inside the toner discharge chamber 57 periodically decreases and increases. Further, by the toner moving from the toner accommodating chamber 49 toward the toner discharging chamber 57, the air pressure (internal pressure) inside the toner accommodating chamber 49 decreases. If a large pressure difference is produced between the toner accommodating chamber 49 and the toner discharge chamber 57 as a result of these changes in air pressure, the amount of the toner passing through the communication passage 48 may vary, or the toner may flow back through the communication passage 48, with the result that the amount of the toner supplied to the toner discharge chamber 57 may change. If this occurs, the amount of the toner discharged from the discharge opening 52 may become unstable.

Therefore, in this embodiment, by disposing the vent 46 at a position different from the communication passage 48, the toner accommodating chamber 49 and the toner discharge chamber are communicated with each other, and the air flow between the toner accommodating chamber 49 and the toner discharge chamber 57 is assured. By this, it is possible to prevent a high pressure difference between the toner accommodating chamber 49 and the toner discharging chamber 57.

That is, the provision of the vent 46 are effective to compatibly establish both (i) the internal pressure of the toner discharge chamber 57 is increased and decreased by the pump 58 to stably discharge the toner through the discharge opening 52, and (ii) the pressure difference between the toner accommodating chamber 49 and the toner discharge chamber 57 is prevented from increasing.

The vent 46 may be structured so as to permit the toner as well as the air to pass therethrough. However, in such a case, it is desirable that the amount of the toner which enters and exits the toner discharge chamber 57 through the vent 46 is sufficiently smaller than the amount of the toner which passes through the communication passage 48 and which is supplied to the toner discharge chamber 57. By doing so, even if some toner passes through the vent 46, the amount of the toner inside the toner discharge chamber 57 does not vary significantly. For this reason, the influence on the amount of the toner discharged from the discharge opening 52 can be suppressed or eliminated.

In view of this, it is desirable to dispose the vent 46 at a position where the toner does not easily pass through, that is, at a position where the toner does not present therearound. For example, it is conceivable to provide the vent 46 at a position as high as possible inside the toner discharge chamber 57 or the toner accommodating chamber 49. By doing so, the amount of the toner passing through the vent 46 can be reduced. Further, it is possible to prevent the vent from being clogged by the toner. That is, the movement of air through the vent 46 is not hindered by the toner.

From this point of view, inside the toner accommodating chamber 49, the lower end of the vent 46 is located above the upper end of the communication passage 48 and above the screw 54. This is because the amount of the toner passing through the vent 46 is made smaller as compared with the amount of the toner passing through the inside of the communication passage 48 by the screw 54. Furthermore, in the state that the toner is accommodated in the toner accommodating chamber 49, the lower end of the vent 46 inside the toner accommodating chamber 49 is positioned higher than the upper level of the toner (see part (b) of FIG. 8. Conversely, the amount of the toner accommodated in the toner accommodating chamber 49 is limited so that the upper level of the toner is lower than the lower end of the vent 46. By doing so, the toner inside the toner accommodation chamber 49 does not easily reach the vent 46.

Here, the upper level of the toner in the toner accommodating chamber 49 is the upper level of the toner before the user starts to use the toner cartridge 13, that is, in a state where the toner contained in the toner cartridge 13 is not yet used. When observing the height of the upper level of the toner, the toner cartridge 13 is in the normal attitude. In this embodiment, it is the attitude in which the discharge opening 52 is directed downward, that is, it is the attitude in which the side on which the discharge opening 52 is provided is a bottom side. Then, the upper level of the toner is made parallel to the horizontal plane so that the toner is uniformly contained inside the toner accommodating chamber 49. Subsequently, after waiting a certain period of time until the state of the toner stabilizes, the height of the upper level of the toner is checked (see part (b) of FIG. 8).

By disposing the vent 46 inside the toner accommodating chamber 49 and setting the toner accommodating amount appropriately in this manner, it is possible to constrain the toner from moving from the toner accommodating chamber 49 to the toner discharging chamber 57 through the vent 46. In addition, it is accomplished to constrain the vent 46 from being clogged by the toner in the toner accommodating chamber 49.

Further, in the state that the toner is not used yet (that is, the toner cartridge 13 is unused and fresh), the upper level of the toner inside the toner accommodating chamber 49 is above the upper end of the pump 58. That is, in this embodiment, the upper level of the toner is placed at a position higher than the pump 58 in order to accommodate a sufficient amount of the toner in the toner accommodating chamber 49, and the vent 46 is placed further above the upper level of the toner. Both securing the toner accommodation amount and assuring the function of the vent 46 are accomplished.

Of the parts and members which are compared in the vertical relationship (height) in the foregoing, the vent 46, the communication passage 48, and the toner discharge chamber 57 are provided straddling the toner accommodating chamber 49 and the toner discharge chamber 57, and they have certain widths in the Z-axis direction. Therefore, if the vent 46, the screw 54, and the communication passage 48 are slanted at an angle relative to the Z axis or the horizontal plane, the heights of the members on the toner accommodating chamber 49 side and on the toner discharging chamber 57 side may differ from each other. When the vertical relationship between the vent 46, the screw 54, and the communication passage 48 is mentioned in the foregoing, these heights inside the toner accommodating chamber 49 are compared. That is, in the above description, the heights of the respective members on the toner accommodating chamber 49 side are compared.

However, in this embodiment, the vent 46, the communication passage 48, and the screw 54 are all arranged parallel to the Z axis, that is, horizontally, and the height of each member is constant regardless of the position. Therefore, in this embodiment, the above-mentioned height relationship is established regardless of whether it is inside the toner accommodating chamber 49 or in the toner discharge chamber 57. That is, the above-mentioned vertical relationship regarding the communication opening 46, the screw 54, and the communication passage 48 is established regardless of the coordinates of the Z axis.

Similarly, not only the lower end of the vent 46 in the toner accommodating chamber 49, but also the lower end of the vent 46 inside the toner discharge chamber 57 are placed above the upper end of the pump 58. The vent 46 is placed also at a high position inside the toner discharge chamber 57 in order to prevent the toner from returning from the toner discharge chamber 57 to the toner accommodating chamber 49 through the vent 46.

As another method of suppressing the amount of the toner passing through the vent 46, there is a method of covering the vent 46 with a filter. As such an example, part (c) of FIG. 8 shows the structure of the toner cartridge 13 as a modified embodiment in which the communication opening (vent) 69 including a filter is provided instead of the vent 46.

The filter 69*a* provided in the vent 69 is a member which suppresses the passage of the toner while permitting passage of air. In part (c) of FIG. 8, the filter 69*a* (hatched portion) is emphasized for explanation.

When the vent 69 including the filter 69*a* is used in this manner, the passage of the toner can be suppressed, even if the toner exists around the vent 69. Particularly, the filter is effective when the vent is provided below the upper level of the toner. Of course, the vent 46 in part (b) of FIG. 8 may be provided with a filter in the same manner as with the vent 69.

Further, in part (b) of FIG. 8, the vent 46 is formed by utilizing the gap formed between the partition member 55 and the supply frame 50, but a vent may be provided by forming an opening in the partition member 55 is formed like the vent 69 shown in part (c) of FIG. 8.

Since the vent 46 and the communication passage 48 are both communication passages (communication openings and paths) which communicate the toner discharge chamber 57 and the toner accommodating chamber 49 with each other, one of them may be called a first communication passage (or a first communication opening and a first path), and the other may be called a second communication passage (or a second communication opening, a second path) or the like. However, the vent (opening) 46 is a communication passage for the purpose of passing air, and therefore, unlike the communication passage 48 which is a toner path, the vent 46 may have a structure in which the toner cannot pass, as described above.

Next, the description will be made as to a relationship between sizes of the toner accommodating chamber 49, the communication passage 48, and the toner discharge chamber 57. Area As is the area of a cross section of the communication passage 48 on a 6A-6A line in part (a) of FIG. 8. The area of a region shown by hatching in part (a) of FIG. 6 is As.

Further, an area of the cross section of the toner discharge chamber 57 on a 6B-6B line of part (a) of FIG. 8 on the downstream side (the Z2 direction side) of the communication passage 48 is Bs. The area of the region shown by hatching in part (b) of FIG. 6 is Bs.

Further, the area of the cross section of the toner accommodating chamber 49 on a 6C-6C line in part (a) of FIG. 8 on the upstream side (the Z1 direction side) of the communication passage 48 is Cs. The area of the region shown by hatching in part (a) of FIG. 6 is Cs.

The three cross-sections taken along the 6A-6A line, the 6B-6B line and the 6C-6C line are all cross sections taken by the planes perpendicular to the Z axis. In other words, they are cross sections taken along the planes perpendicular to the toner feed direction by the screw 54, perpendicular to the longitudinal direction of the toner cartridge 13, and parallel to the XY plane.

At this time, the areas of the cross sections of the communication passage 48, the toner discharge chamber 57, and the toner accommodating chamber 49 satisfy the following relationship $$As<Bs, \text{ and}$$

$$As<Cs.$$

That is, the cross section of the communication passage 48 is smaller than the cross section of the toner discharge chamber 57 and the cross section of the toner accommodating chamber 49.

The area Bs of the cross section of the toner discharge chamber 57 and the area Cs of the cross section of the toner accommodating chamber 49 are different along the Z-axis coordinates (depending on the position in the toner feeding direction). Further, in this embodiment, the area As of the cross section of the communication passage 48 is substantially constant regardless of the coordinates of the Z axis (position in the toner feeding direction), but the area As of the cross section of the communication passage 48 can be changed depending on the coordinates of the Z axis. Even in such a case, the cross sections satisfying the above-described magnitude relationship can be found in the communication passage 48, the toner discharge chamber 57 and the toner accommodating chamber 49, respectively.

For example, suppose As is the area of the smallest cross section of the communication passage 48. In this case, at least one cross section having the area Cs larger than the area As is provided in the toner accommodating chamber 49, and at least one cross section having the area Bs larger than the area As is provided in the toner discharge chamber 57.

It can be said as follows. When the area of the largest cross section of the toner accommodating chamber 49 is Cs, and the area of the largest cross section of the toner discharge chamber 57 is Bs, the communication passage 48 has at least one cross section having an area As which is smaller than Cs and Bs.

By making the cross-sectional area Cs of the toner accommodating chamber 49 larger as compared with the cross section (As) of the communication passage 48, a sufficient amount of the toner can be stored inside the toner accommodating chamber 49, and the toner can also be efficiently stirred by the stirring member 53 inside the toner accommodating chamber 49. The stirring member 53 stirs the toner to prevent the toner from aggregating. That is, the stirring member 53 can increase the fluidity by loosening the toner.

On the other hand, the toner can be fed in a constant quantity by passing the toner through the communication passage 48 having a small cross section. That is, in order to limit the amount of the toner which moves from the toner accommodating chamber 49 to the toner discharge chamber 57, the area As of the communication passage 48 is made smaller than the area Cs of the toner accommodating chamber 49. By this, when the screw travels through the communication passage 48, the amount of the toner fed can be reduced and controlled to a desired level (constant level).

Further, since the toner discharge chamber 57 has a cross section larger than the cross section of the communication passage 48, the toner can be loosened inside the toner discharge chamber 57. That is, the toner discharge chamber 57 needs to increase the fluidity of the toner inside the toner discharge chamber 57 when the air is sucked through the discharge opening 52. Therefore, the toner discharge chamber 57 needs a certain volume to mix the air and the toner when the air flows thereinto through the discharge opening 52. In order to assure the volume, the area Bs of the toner discharge chamber 57 is made larger than the area As of the communication passage 48.

As shown in part (a) of FIG. 8, the 6B-6B cross section of the toner discharge chamber 57 described above is a cross section which passes through the discharge opening 52, but when determining the area Bs of the cross section of the toner discharge chamber 57 it is not necessary to use a cross section which passes through the discharge opening 52. That is, it is preferable that there is at least one cross section having an area Bs satisfying "As<Bs" inside the toner discharge chamber 57.

However, if the cross section of the toner discharge chamber 57 at the position of the discharge opening 52, that is, the cross section of the toner discharge chamber 57 taken along a plane passing through the discharge opening 52 satisfies "As<Bs", it is more suitable from the standpoint of increasing the fluidity around the discharge opening 52.

Further, in the case that the area As of the communication passage 48 is made smaller than the area Bs of the toner discharge chamber 57, it is possible to prevent the toner from flowing back through the communication passage 48. When the pump 58 contracts, the air pressure in the toner discharge chamber 57 increases, so that the toner and air are discharged through the discharge opening 52. At this time, some air and toner may tend to move to the toner accommodating chamber 49 through the communication passage 48. However, in this embodiment, the toner movement path is narrowed in the communication passage 48, and therefore, it is possible to constrain the toner and the air in the toner discharge chamber 57 from moving back to the toner accommodating chamber 49 through the communication passage 48. Further, in this embodiment, not only the area As of the communication passage 48 is reduced, but also the screw 54 is provided inside the communication passage 48, so that the screw 54 also functions to suppress the movement of the toner flowing back through the communication passage 48.

By the provision of the communication passage 48 in this manner, it is possible to suppress the movement of the toner and the air from the toner discharge chamber 57 to the toner accommodating chamber 49. The toner can be stably discharged to the outside of the toner cartridge 13 through the discharge opening 52 of the toner discharge chamber 57.

In this embodiment, the communication passage 48 has substantially the same cross-sectional area (As) in a certain range (substantially the entire area in this embodiment). When the communication passage 48 has a region having the same cross-sectional size over a certain range, it is easy to stabilize the amount of the toner passing through the communication passage 48. However, as described above, the size of the cross section of the communication passage 48 can be changed depending on the position. If the toner flow path is narrowed anywhere between the toner discharge chamber 57 and the toner accommodating chamber 49, at least such a portion can be regarded as the communication passage 48.

If the cross-sectional area of the communication passage 48 differs depending on the position, the smallest cross-sectional area As (Asmin) of the communication passage 48, the largest cross-sectional area Bsmax of the toner discharge chamber 57, and the largest cross-section Csmax of the toner accommodating chamber 49 are compared with each other. In this embodiment, "Asmin<Bsmax<Csmax" are satisfied. In order to increase the capacity of the toner stored in the toner accommodating chamber 49, it is preferable that the cross section of the toner accommodating chamber 49 is larger than the cross section of the communication passage 48 and than the cross section of the toner discharge chamber 57.

Here, min in the suffix means the minimum value, and max means the maximum value. Further, when the area Bs of the cross section of the toner discharge chamber 57 is determined at the position of the discharge opening 52, "Asmin<Bs<Csmax" can be satisfied.

In the internal space 51 of the supply frame 50, the screw 54 and the stirring member 53 are provided as movable feeding members relative to the supply frame 50. Unless otherwise specified, when these feeding members (53, 54) are provided in the communication passage 48, the toner accommodating chamber 49, and the toner discharge chamber 47, the areas As, Bs, and Cs include the cross-sectional area of the feeding members (53, 54) as well. In other words, the cross-sectional areas of the spaces formed inside the communication passage 48, the toner accommodating chamber 49, and the toner discharge chamber 47 in the state that the screw 54 and the stirring member 53 is removed from the supply frame 50 are the areas As, Bs, and Cs. By this, the presence/absence and sizes of the screw 54 and the stirring member 53 do not affect the values of the areas As, Bs, and Cs.

However, in this embodiment, when the areas As, Bs, and Cs of the communication passage 48, the toner discharge chamber 47, and the toner accommodating chamber 49 are determined, even if the cross-sectional area of the screw 54 and the cross-sectional area of the stirring member 53 are excluded, each of the above-mentioned area relationships is satisfied. That is, in the cross section of part (a) of FIG. 6, an area of the part excluding the region of the screw 54 from the hatched region is redefined as As; in the cross section of part (b) of FIG. 6 an area of the part excluding the region of the screw 54 from the hatched region is redefined as Bs; and an area of the part excluding the region of the screw 54 and the stirring member 53 from the hatched region in the cross section of part (c) of FIG. 6 is redefined as Cs. Even if As, Bs, and Cs are redefined in this manner, a cross-section satisfying the above-mentioned relationship of As, Bs, and Cs exists in the communication passage 48, the toner discharge chamber 47, and the toner accommodating chamber 49.

In this embodiment, the volume of the communication passage 48 is the smallest, and the volume of the toner accommodating chamber 49 is the largest. The volume of the toner discharge chamber 57 is larger than the volume of the communication passage 48 and is smaller than the volume of the toner accommodating chamber 49. The amount of the toner accommodated in the cartridge 13 can be easily changed by changing the area Cs of the toner accommodating chamber 49 without changing the shapes of the communication passage 48 and the toner discharge chamber 57.

Further, although the four toner cartridges 13 of this embodiment are used with the image forming apparatus 100 for forming a four-color image, one toner cartridge 13 can be used for a monochromatic image forming apparatus for forming a monochromatic image. Further, two of the toner cartridges 13 may be used for an image forming apparatus for forming an image of two colors. That is, there is no limit to the number of the toner cartridges which can be used simultaneously in one image forming apparatus 100.

In this embodiment, a part of the screw 54 exists substantially directly above the discharge opening 52 of the toner discharge chamber 57. That is, a part of the screw 54 is placed inside the toner accommodating chamber 49, another part is placed inside the communication passage 48, and a further part is placed inside the toner discharge chamber 57.

By this, the screw 54 can reliably feed the toner from the toner accommodating chamber 49 through the communication passage 48 toward the discharge opening 52 of the toner discharge chamber 57.

However, the structure of the screw 54 is not limited to this example. It is conceivable that the feeding member such as the screw 54 is not provided in a part or parts of the toner accommodating chamber 49, the communication passage 48, and/or the toner discharge chamber 57. For example, inside a part, it is conceivable that the screw 54 is not formed with spiral blades and only the shaft of the screw having no toner transporting ability is provided.

(Expansion and Contraction, and Reciprocation of Pump)

Next, referring to part (a) of FIG. 10 to part (b) of FIG. 11, the expansion/contraction motion and the reciprocating motion of the pump 58 will be described.

Parts (a) and (b) of FIG. 10 are partial perspective views of the rear end portion of the toner cartridge 13 in a state that the side cover 62 is shifted rearward to show the transmission path of the rotational drive. Part (a) of FIG. 10 is the perspective view of the rear end portion of the toner cartridge 13 as viewed from below, and part (b) of FIG. 10 is the perspective view of the toner cartridge 13 as viewed from above.

Parts (a) and (b) of FIG. 11 are partial perspective views of the rear end portion of the toner cartridge 13, in a state that the side cover 62 is shifted rearward in order to illustrate the expansion/contraction operation of the pump 58. Part (a) of FIG. 11 shows a state in which the pump 58 is expanded, and part (b) of FIG. 11 shows a state in which the pump 58 is contracted.

As shown in part (a) of FIG. 10 to part (b) of FIG. 11, a drive train is provided on the rear side of the toner cartridge 13, that is, in the neighborhood of the rear surface. The drive train of this embodiment includes a drive input gear (drive input member, coupling member) 59, a cam gear 60 as a rotating member, and a screw gear 64. The drive input gear 59 includes a drive receiving unit (drive input unit, coupling portion) 59*a* and a gear portion 59*b*. The cam gear 60 is provided with a cam groove 60*a*. In the cam gear 60, a cylindrical portion on which the cam groove 60*a* is formed may be referred to as a cam portion. The cam groove 60*a* is extended snakingly, and has a peak portion 60*b* at the rear side and a valley portion 60*c* at the front side. The direction of the axis of the cam gear 60 is parallel to the Z axis.

A link member 61 as the reciprocating member has a cam projection 61*a*, and the cam projection 61*a* is in engagement with the cam groove 60*a*. Further, the link member 61 is supported by the side cover 62 so as to be movable in the front-rear direction (Z-axis direction) while the movement in the rotational direction about the axis Z which is the central axis of the pump 58 is restricted. That is, the link member 61 can reciprocate in the direction of the axis of the cam gear 60.

The side cover 62 is a cover member (protective member) for covering the pump 58 to protect the pump 58, it is provided at an end portion of the toner cartridge 13 in the Z2 direction, and provides a rear surface (rear end) of the toner cartridge 13. The side cover 62 may be regarded as a part of the frame (casing) of the toner cartridge 13 together with the supply frame 50. In such a case, the supply frame 50 may be particularly referred to as a frame body (casing body) or the like.

The pump 58 described above is provided with a connecting portion 58*b*, by means of which the link member and the pump 58 are connected with each other. In this embodiment, the cam gear 60 and the link member 61 are included in the drive conversion portion (drive conversion mechanism, pump drive mechanism) 68.

Next, the transmission path of the rotation drive transmitted from the apparatus main assembly 100B of the image forming apparatus 100 to the toner cartridge 13 will be described. As shown in parts (a) and b of FIG. 10, rotational drive is inputted from the drive output member (coupling member on the main assembly side) 100*a* provided in the apparatus main assembly 100B (see FIG. 1) of the image forming apparatus 100, to the toner cartridge 13. That is, by connecting (coupling) the drive receiving portion (coupling portion) 59*a* of the drive input gear 59 provided on the toner cartridge 13 with the drive output member 100*a*, the driving force receiving portion 59*a* receives the rotational force (driving force). As a result, the drive input gear 59 rotates, and the drive force is transmitted from the drive input gear 59 to respective members of the toner cartridge 13.

The drive input gear 59 is connected to the rotation shaft 53*a* of the stirring member 53 as shown in FIG. 7, and therefore, the stirring member 53 is rotated by the rotation of the drive input gear 59. The gear portion 59*b* of the drive input gear 59 is, as shown in FIG. 7, parts (a) and (b) of FIG. 10, and parts (a) and (b) of FIG. 11, engaged with the gear portion 60*d* of the cam gear 60, and transmits the rotational drive to the cam gear 60. Further, the gear portion 60*d* of the cam gear 60 is engaged with the screw gear 64 to rotate the screw gear 64. The screw 54 is connected with the screw gear 64, and the screw 54 is driven by the transmitted rotational drive. The diameter of the gear portion 60*d* of the cam gear 60 is smaller than the diameter of the cylindrical portion (cam portion) on which the cam groove 60*a* of the cam gear 60 is formed.

Thus, the drive input gear 59 is a drive input member to which a driving force (rotational force) is inputted from the outside of the toner cartridge 13 (that is, the apparatus main assembly 100B of the image forming apparatus 100). In other words, the drive input gear 59 is a cartridge-side coupling member structured to be able to couple with the drive output member (main assembly-side coupling member) 100*a*.

Further, the drive input gear 59 also functions as a drive transmission member (gear member) for transmitting the driving force to each member of the toner cartridge 13. That is, the drive input gear 59 includes both the coupling portion (driving force receiving portion) 59*a* to which the driving force is inputted and the gear portion 59*b* for outputting the driving force to another member of the toner cartridge 13. The gear portion 59*b* is arranged on the outer peripheral surface of the drive input gear 59. The rotational force (driving force) inputted to the drive input gear 59 is used not only to drive the screw 54 and the stirring member 53, but also to drive the pump 58.

Therefore, referring to parts (a) and (b) of FIG. 12, the description will next be made as to a drive conversion portion 68 for converting the rotational force (driving force) received by the drive input gear 59 into the reciprocating motion to expand/contract and reciprocate the pump 58 will be described using parts (a) and (b) of FIG. 12.

The drive conversion portion 68 in this embodiment is a cam (cam mechanism), and includes the cam gear (rotating member) 60 and the link member (reciprocating member) 61. The link member 61 is restricted in movement in the rotational direction around the axis Z. Therefore, when the cam gear 60 is rotated by receiving the rotational drive, the cam projection 61*a* of the link member 61 alternately passes through the peaks 60*b* and the valleys 60*c* of the cam groove 60*a* of the cam gear 60, so that the link member 61 reciprocates in the front-rear direction.

That is, the state of part (a) of FIG. 12 and the state of part (b) of FIG. 12 are alternately repeated. At this time, the point where the cam projection 61*a* which is each engaging portion, and the cam groove 60*a* come into contact with each other in order for the cam gear 60 as the rotating member to reciprocate the link member 61 as the reciprocating member is referred to as the engaging point P.

In interrelation with the reciprocating motion of the link member 61, the connecting portion 58*b* connected to the link member 61 also reciprocates. Then, the reciprocating motion of the connecting portion 58*b* causes the bellows portion 58*a* of the pump 58 to expand and contract, so that the internal volume of the pump 58 changes periodically. The connecting portion 58*b* is a force receiving portion (expansion/contracting force receiving portion, pump driving force receiving portion) which receives the force for expanding/contracting the pump 58 from the link member 61.

As described above, the drive conversion portion 68 (link member 61, cam gear 60) converts the rotational force received by the drive input gear 59 to the force to expand and contract the bellows portion 58*a* of the pump 58 (the force for driving the pump to change the volume of the pump), thus driving the pump 58.

At this time, the pump 58 is placed inside the rotating cam gear 60 in the radial direction. That is, the pump 58 is inside the cam gear 60 and is surrounded by the cam gear 60.

Further, the bellows portion 58*a* of the pump 58 and the engagement point P are set so that they overlap in the expansion/contraction direction (moving direction of the pump) of the pump 58, at some phase. With such an arrangement relationship, the space required for expansion and contraction of the pump 58 and the space required for movement of the engagement point P can be shared, and the expansion and contraction amount (movement amount) of the pump 58 can be made larger in the limited space.

Further, in this embodiment the drive input gear 59 directly connected to the stirring member 53 is used, as the drive input member (drive input coupling member, input coupling) which couples with the drive output member (output coupling) 100*a* of the apparatus main assembly to receive the driving force.

The drive input gear 59 is indirectly connected to the screw 54 by way of a gear train (gear portion) 59*b* of the drive input gear 59, cam gear 60, and screw gear 64) (see parts (a) to (c) of FIG. 6 and FIG. 7). Further, the drive input gear 59 is connected to the pump 58 by way of a gear train (gear portion) 59*b* and cam gear 60 of the drive input gear 59) and a drive conversion portion 68 (cam gear 60 and link member 61) (see parts (a) and (b) of FIG. 11). By connecting the drive input gear 59 to each member in this manner, the driving force is transmitted to each of the stirring member 53, the screw 54, and the pump 58 by the rotation of the drive input gear 59.

However, the method of connecting the stirring member 53, the screw 54, and the pump 58 with the drive input gear 59 is not limited to this example. For example, the drive input gear 59 may be directly connected to the screw 54, and the drive force may be transmitted from the drive input gear 59 to the stirring member 53 and/or the cam gear 60 by way of a gear train. Similarly, a drive input member may be provided directly on the cam gear 60, and then a drive force may be transmitted from the cam gear 60 to the stirring member 53 and/or the screw 54 by using a gear train. Further, instead of the gear train, another drive transmission member such as a belt may be used to transmit the driving force from the drive input gear 59 to the stirring member 53, the screw 54, and/or the drive conversion portion 68 of the pump.

That is, the drive input member (drive input gear 59) may be operatively connected to each member (stirring member 53, screw 54, and pump 58) of the cartridge 13 so as to be actable on them. That is, it will suffice if the drive input member (59) is connected to these members (53, 54, 58) so as to be able to transmit the driving force, and the connection method is not limited to a specific example. It may be a direct connection or an indirect connection by way of a gear or the like. The indirect connection method is not limited to the method using a gear, and a method using a drive transmission member (for example, a belt for drive transmission) different from the gear can also be employed.

Further, in this embodiment, the driving force receiving portion (coupling portion) 59*a* of the drive input gear 59 is coupled with the drive output member 100*a*, so that the drive input gear 59 receives a driving force from the drive output member 100*a* (see part (a) of FIG. 10). That is, the drive input gear 59 is a coupling member on the cartridge side (cartridge side coupling, cartridge side coupler), and the drive output member 100*a* is a coupling member on the image forming apparatus main assembly side (main assembly side coupling, apparatus main assembly side coupler). The drive output member 100*a* is an output coupling (output coupler) on the side which outputs the driving force toward the cartridge, and the drive input gear 59 is a coupling on the inputted side (inputted coupler, inputted coupling) to which the driving force is inputted.

More specifically, an opening is formed inside the driving force receiving portion 59*a*, and the space between the inner surface of the driving force receiving portion 59*a* and the axis is open. The free end of the drive output member 100*a* can enter the inside of the opening (open space) of the driving force receiving portion 59*a*. Here, in the neighborhood of the free end of the drive output member 100*a*, the circular outer peripheral surface of the drive output member 100*a* is recessed at three locations at 120° intervals. By this, pits and projections (namely, portion with pit and portion without pit) are formed on the outer peripheral surface of the drive output member 100*a*. Similarly, inside the driving force receiving portion 59*a*, three projections projecting from the inner surface of the driving force receiving portion 59*a* toward the axis of the driving force receiving portion 59*a* are formed at intervals of 120 degrees. By this, pits and projections (namely, portion without projection and portion with projection) are also formed on the inner peripheral surface of the circular tubular portion of the driving force receiving portion 59*a*.

The projection and the pit portion provided on the inner peripheral surface of the driving force receiving portion 59*a* are engaged (engaged) with the pit and the projection provided on the outer peripheral surface of the drive output member 100*a*, by which the drive output member 100*a* and the driving force receiving portion 59*a* connected (coupled) with each other. By this, the driving force can be transmitted from the drive output member 100*a* to the driving force receiving portion 59*a*. The drive output member 100*a* and the driving force receiving portion 59*a* rotate together in a substantially coaxial state. The drive input gear 59 transmits the rotational force received from the drive output member 100*a* by the projection of the driving force receiving portion 59*a* toward each driven portion of the toner cartridge 13, namely, the stirring member 53, the screw 54, the pump 58, and the like.

Thus, when the image forming apparatus main assembly 100B of the image forming apparatus 100 and the toner cartridge 13 are connected by connecting the coupling members to each other in this manner, the driving force (rotational force) can be accurately and stably transmitted to the toner cartridge 13 and the driven portions thereof, and therefore, it is suitable. Further, it is possible to easily make the coupling members (59, 100*a*) connectable to each other, by inserting the toner cartridge 13 into the main assembly of the apparatus.

The shapes of the coupling members (59, 100*a*) of the image forming apparatus main assembly and the toner cartridge are not limited to above-described examples. For example, the shapes may be reversed such that the drive output member 100*a* has an opening, and the driving force receiving portion 59*a* of the drive input gear 59 has a shaft portion capable of entering the opening of the drive output member 100*a*.

The method of transmitting the driving force from the apparatus main assembly 100B to the toner cartridge 13 is not limited to the coupling connection by such two coupling members (couplers). For example, it is conceivable that the connection method between the toner cartridge 13 and the apparatus main assembly 100B of the apparatus is a method other than the coupling connection, and, for example, a connection using two gears may be employed. As an example, a structure is also conceivable in which a gear portion is provided on the drive output member 100*a*, and the drive input gear 59 is rotated by engaging the gear portion 59*b* of the drive input gear 59 with such a gear portion. In the case that the gear connection is employed in this manner, the driving force receiving portion 59*a* is unnecessary for the drive input gear 59. When the driving force receiving portion 59*a* is removed from the drive input gear 59 in this manner, the drive input member is a gear member, not a coupling member.

As a method for connecting the pump 58 to the drive input gear 59, a mechanism different from that of the drive conversion portion 68 (cam gear 60 and link member 61) of this embodiment can be employed.

The pump 58 is a blower and an air flow generator for generating an air flow (gas flow, air flow) for discharging the toner. The pump 58 is a toner discharger and an air discharger which discharges the toner, air (gas) from the inside of the toner cartridge 13. The pump 58 is also an suction device which suctions air (gas) from the outside of the toner.

The pump 58 of this embodiment is a bellows pump (bellows pump), which is a positive displacement pump, and more specifically, a reciprocating pump. Other examples of reciprocating pumps include diaphragm pumps, piston pumps, and plunger pumps. The bellows pump (bellows pump) may be regarded as a type of diaphragm pump. These reciprocating pumps can periodically and intermittently discharge the toner from the discharge opening 52 by periodically changing the air pressure inside the supply frame 50 by the reciprocating movement of the movable portion.

However, with a structure in which the movable portion of the pump reciprocates by sliding movement as with the piston of a piston pump, a gap is formed between the movable portion and other members. The toner may enter the gap and affect the operation of the pump. In this respect, the bellows pump and the diaphragm pump have a structure in which the flexible movable portion is deformed and reciprocated, and no movable portion slides. Therefore, there is no such a portion as a gap between the moving portion of the pump and other members. It is possible to prevent the toner from affecting the operation of the moving parts of the pump. That is, a pump such as a bellows pump or a diaphragm pump is further preferable because the pump can operate stably.

In addition, the pump 58 of this embodiment performs both suction and exhaustion through the discharge opening 52. However, the present invention is not limited to such a structure. For example, in the modified example shown in FIG. 13, the toner accommodating chamber 49 is provided with an inlet port 86 in the toner accommodating chamber 49 in addition to the discharge opening 52. When the pump 58 is expanded, the pump 58 suctions the air not only through the discharge opening 52 but also through the inlet port 86.

The air suctioned through the inlet port 86 enters the inside of the toner discharge chamber 57 from the toner accommodating chamber 49 through the communication opening 46, and is used for discharging the toner when the pump 58 contracts. The inlet port 86 may be placed at a position other than the toner accommodating chamber 49. For example, the inlet port 86 can be placed in the toner discharge chamber 57, or the inlet port 86 can be directly connected to the pump 58. A plurality of inlet ports 86 may be provided in the toner cartridge 13.

It is preferable that the inlet port 86 is provided with a check valve 86*a* so as to prevent the toner from leaking out. The check valve 86*a* opens the inlet port 86 to allow the inlet port 86 to take in the air when the air pressure in the toner accommodating chamber drops. When the air pressure in the toner accommodating chamber rises, the inlet port 86 is kept closed to suppress the discharge of the air through the inlet port 86, and to suppress the discharge of the toner through the inlet port 86.

In the modified example as shown in FIG. 13, the amount of air suctioned through the discharge opening 52 may be small or negligible as compared with the amount of the air suctioned through the inlet port 86. However, as in the structure shown in part (a) of FIG. 8 and the like, if the structure is such that air is positively suctioned through the discharge opening 52, the toner around the discharge opening is stirred when the discharge opening 52 takes the air in. That is, it is easy to increase the fluidity of the toner inside the toner discharge chamber 57, and therefore, it is easy to smoothly discharge the toner through the discharge opening 52. In that respect, this embodiment (see part (a) of FIG. 8 and the like) in which the suction opening is limited to the discharge opening 52 is preferable.

A structure using another type of pump is also conceivable. FIG. 14 is a schematic view of a modified example of the toner cartridge having a pump 83 which is a centrifugal pump instead of the pump 58 which is a reciprocating pump (bellows pump).

The pump 83 has an impeller (impeller, rotatable member) which is driven to rotate, and is structured to blow the air by rotating the impeller. The pump 83 is a so-called fan, and more specifically, a centrifugal blower. In the modified embodiment of FIG. 14, the pump 83 is placed at substantially the same position as the pump described above.

The driving force received by the drive input gear 59 is transmitted to rotate the impeller of the pump 83. The pump 83 uses centrifugal force to move the air Ar sucked through an inlet port 84 provided along the pump axis, from the center of the pump 83 to the outside in the radial direction by the rotation of the impeller. In this process, the pressure of the air increases, and the size becomes suitable for toner feeding. In this manner, the air (gas) suctioned and pressurized by the pump 83 through the inlet port 84 is fed into the toner discharge chamber 57 and moves toward the discharge opening 52. As a result, the toner is discharged together with the air through the discharge opening 52. Types of centrifugal pumps include centrifugal pumps and turbine pumps, and impellers usable with the pumps may have various shapes. The pump 83 may be called a turbo fan, a sirocco fan, or the like, depending on the shape of the impeller. In the modified embodiment shown in FIG. 14, the direction of the air flow is fixed in the direction from the inlet port 84 to the discharge opening 52 and does not change.

As another example of the pump capable of taking in air from the inlet port 84 in this manner, in addition to the centrifugal pump which is an example of the non-displacement pump, an axial flow pump which is another example of the non-displacement pump and a rotary pump (rotary displacement pump), which is a kind of displacement pump, is also conceivable. A screw pump is an example of a rotary pump.

However, in particular, the centrifugal pump is easy to increase the pressure of the air in the process of feeding the air in the neighborhood of the rotation axis in the radial direction so as to keep it away from the axis, and to produce an air flow suitable for discharging the toner. As described above, even if the pump is such as a centrifugal pump, different from the reciprocating pump, the toner can be discharged together with the air through the discharge opening 52.

However, on the other hand, in the modified embodiment of FIG. 14, in order to suction a sufficient amount of air through the inlet port 84, the inlet port 84 and the pump 83 need to have sufficient sizes. Further, it is necessary to rotate the impeller of the pump 83 at a sufficiently high speed, and a large gear train for speeding up may be required as a mechanism for transmitting the rotational force from the drive input gear 59 to the centrifugal pump 83, as the case may be. As the gear train for speeding up, those using planetary gears can be considered. This is to increase the rotation speed of the pump 83 with respect to the rotation speed of the drive input gear 59.

Further, in the case that the toner cannot be sufficiently discharged only by the air flow generated by the pump 83, a stirring member for stirring the toner or transporting the toner toward the discharge opening 52 has to be additionally provided inside the toner discharge chamber 57, as the case may be. As such a stirring member, a sheet 85 mounted to the shaft of the screw 54 can be considered (see FIG. 14). The sheet 85 has a structure similar to that of the sheet of the stirring member 53, and stirs and conveys the toner by rotating together with the screw 54. The sheet 85 is structured to discharge the toner in the toner discharge chamber 57 through the discharge opening 52 together with the air fed by the pump 83 by its rotation. Depending on the rotation of the sheet 85, the amount of the toner or air discharged through the discharge opening 52 may change periodically, or the toner or air may be discharged intermittently. Although only one sheet 85 is shown in FIG. 14, a plurality of sheets 85 may be mounted to the screw 54.

In this manner, in the modified embodiment in which another type of pump (centrifugal pump 83, for example) is used instead of the reciprocating pump 58, the toner cartridge may be large in the size, the number of parts mounted to the pump may increase, with the result that the cartridge structure becomes complicated in some cases.

On the other hand, if a reciprocating pump (a bellows pump, for example) is used, the toner can be easily discharged and stirred with a relatively simple structure. Therefore, a toner cartridge including such a reciprocating pump is more suitable because it is easy to suppress the upsizing and complication.

[Outer Appearance Structure of Toner Cartridge]

Next, referring to FIG. 15 to part (b) of FIG. 24, a structure as to an outer appearance of the toner cartridge 13 will be described. FIG. 15 is a perspective view of the toner cartridge 13 as viewed from below, and FIG. 16 is an exploded perspective view of the toner cartridge 13 as viewed from below. As shown in FIGS. 15 and 16, on a lower surface side of the supply frame 50 of the toner cartridge 13, an elastic seal 87, a sealing tape 88, a shutter 89, and a shutter spring 90 are mounted to the supply frame 50.

An installation surface 50*c* on the lower surface side of the supply frame 50 is provided with the discharge opening 52 through which the toner in the supply frame 50 is discharged, and the elastic seal 87, the sealing tape 88, and the shutter 89 are disposed so as to be superposed on the installation surface 50*c* with each other in the Y direction. That is, the elastic seal 87 is disposed between the installation surface 50*c* and the sealing tape 88 in the Y direction, as the sealing tape 88 as a sealing member is disposed between the elastic seal 87 and the shutter 89 in the Y direction. The shutter 89 is supported by the supply frame 50 so as to be movable between a closed position (part (a) of FIG. 23) and an open position (part (b) of FIG. 23). In the following, respective members will be specifically described.

Part (a) of FIG. 17 is a perspective view showing the sealing tape 88, and part (b) of FIG. 17 is a perspective view for illustrating a step of folding back the sealing tape 88. As shown in part (a) of FIG. 17, the sealing tape 88 is a flexible member extending in the longitudinal direction. With respect to the longitudinal direction of the sealing tape 88, one end portion is a grip portion 88*c* which is capable of being gripped by the user, and the other end portion is provided with a sticking surface 88*d*. The sticking surface 88*d* is formed by applying an adhesive or the like to the sealing tape 88 in a predetermined region and has an adhesive force.

Further, the sealing tape 88 may be, as shown in part (b) of FIG. 17, formed by being folded back at a fold-back portion 88*a* in a state in which the adhesive is applied onto entirety of one surface 88*b* (upper surface in part (b) of FIG. 17). The fold-back portion 88*a* is in a position shifted on one side in the longitudinal direction of the sealing tape 88. Further, even when the sealing tape 88 is folded back at the fold-back portion 88*a*, a region in which no portion of the sealing tape is bonded constitutes the sticking surface 88*d*. One end portion in the longitudinal direction of the sealing tape 88 in which the fold-back portion 88*a* is provided constitutes the grip portion 88*c*.

The sealing tape 88 is constituted by a material such as a resin film or paper, but may be constituted by any material when this material has certain strength. Further, the sealing tape 88 is structured to have no air permeability, so that the toner cannot pass through the sealing tape 88.

Part (a) of FIG. 18 is a perspective view showing the elastic seal 87, part (b) of FIG. 18 is a perspective view of the shutter 89 as viewed from above, and part (c) of FIG. 18 is a perspective view of the shutter 89 as viewed from below. As shown in part (a) of FIG. 18, the elastic seal 87 includes a surface layer 87*a*, an adhesive layer 87*b*, and an elastic layer 87*c* between the surface layer 87*a* and the adhesive layer 87*b*. Further, the elastic seal 87 is provided with a through hole 87*d* penetrating through the surface layer 87*a*, the adhesive layer 87*b*, and the elastic layer 87*c*, so that the toner discharged through the discharge opening 52 (see FIG. 16) of the toner cartridge 13 is capable of passing through the through hole 87*d*.

The adhesive layer 87*b* is constituted by a double-side tape or the like, for example, and is adhesively bonded to the installation surface 50*c* as an outer surface of the supply frame 50. The elastic layer 87*c* is an elastic member having the air permeability and is constituted by a foamed urethane, for example. The surface layer 87*a* may suitably constituted by a material, such as high-density polyethylene, which is not readily relatively bonded.

As shown in parts (a) and (b) of FIG. 18, the shutter 89 includes a nipping surface 89*a*, a pair of retaining portions 89*b*1 and 89*b*2, and a spring hooking portion 89*c*. Each of the retaining portions 89*b*1 and 89*b*2 has a claw shape. Further, the nipping surface 89*a* is provided with an opening 89*d*. The opening 89*d* is disposed so as to overlap with the through hole 87*d* of the elastic seal 87 when the shutter 89 is positioned in the open position. A region in which the opening 89*d* of the nipping surface 89*a* is not formed covers the through hole 87*d* when the shutter 89 is positioned in the closed position. That is, the closed position is a position where the opening 89*d* does not overlap with the through hole 87*d* of the elastic seal 87 as viewed in the discharging direction in which the toner is discharged through the discharge opening 52. The open position is a position where the opening 89*d* overlaps with at least a part of the through hole 87*d* of the elastic seal 87 as viewed in the discharging direction in which the toner is discharged through the discharge opening 52.

FIG. 19 is a perspective view showing the supply frame 50 in a state in which the elastic seal 87, the sealing tape 88, the shutter 89, and the shutter spring 90 are dismounted. As shown in FIG. 19, at a lower surface of the supply frame 50, a pair of guide portions 50*d*1 and 50*d*2, a boss 50*f*, and a spring hooking portion 50*g* which movably guide the shutter 89 between the closed position and the open position are provided.

At downstream ends of the guide portions 50*d*1 and 50*d*2 in the Z1 direction, locking portions 50*e*1 and 50*e*2 by which the retaining portions 89*b*1 and 89*b*2 of the shutter 89 are capable of being locked are provided. The pair of guide portions 50*d*1 and 50*d*2 are formed in an L shape in cross section, and have restricting surfaces 50*h*1 and 50*h*2 formed so as to approach each other in the X direction. The restricting surfaces 50*h*1 and 50*h*2 include a space, between themselves and the installation surface 50*c* in the Y direction, such that the elastic seal 78, the sealing tape 88, and the shutter 89 are mounted. The boss 50*f* projects downward and is constituted so that the shutter spring 90 is mounted.

FIG. 20 is a perspective view showing a state in which the elastic seal 87 and the sealing tape 88 are assembled to the supply frame 50. As shown in FIG. 20, the adhesive layer 87*b* of the elastic seal 87 is bonded to the installation surface 50*c* of the supply frame 50. At this time, the discharge opening 52 and the through hole 87*d* of the elastic seal 87 are positioned so that the discharge opening 52 is substantially co-axial with the through hole 87*d* of the elastic seal 87. Each of the discharge opening 52, the through hole 87*d*. and the opening 89*d* (see part (b) of FIG. 18) is a circular hole.

Then, the sticking surface 88*d* of the sealing tape 88 is bonded to the surface layer 87*a* of the elastic seal 87. At this time, the sticking surface 88*d* is disposed so as to cover entirety of the through hole 87*d* of the elastic seal 87. To the sticking surface 88*d*, the adhesive may be applied onto a peripheral portion of the through hole 87*d* including a region overlapping with the through hole 87*d* as viewed in the Y direction, and as regards the region overlapping with the through hole 87*d* as viewed in the Y direction, the adhesive needs not to be applied.

FIG. 21 is a perspective view showing a state in which the shutter spring 90 and the shutter 89 are being assembled to the supply frame 50. FIG. 22 is a perspective view showing a state in which the elastic seal 87, the sealing tape 88, the shutter 89, and the shutter spring 90 are assembled to the supply frame 50.

As shown in FIG. 21, the sealing tape 88 stuck to the elastic seal 87 is folded at the fold-back portion 88*e*, and the grip portion 88*c* is positioned at a trailing end portion of the sealing tape 88 (downstream end portion in the Z2 direction). The fold-back portion 88*e* is positioned between the sticking surface 88*d* and the grip portion 88*c* in the longitudinal direction of the sealing tape 88. Then, a coil portion 90*a* of the shutter spring 90 is inserted to the boss 50*f* of the supply frame 50. A one end portion 90*b* of the shutter spring 90 mounted to the boss 50*f* is locked to the spring hooking portion 50*g*.

The shutter 89 is inserted in the Z1 direction between the pair of guide portions 50*d*1 and 50*d*2. At this time, the shutter 89 is inserted so as to pass through below the grip portion 88*c* of the sealing tape 88. Then, the retaining portions 89*b*1 and 89*b*2 of the shutter 89 pass through the guide portions 50*d*1 and 50*d*2, respectively, and then are locked to the locking portions 50*e*1 and 50*e*2 of the guide portions 50*d*1 and 50*d*2, respectively, as shown in FIG. 22. The other end portion 90*c* of the shutter spring 90 is locked to the spring hooking portion 89*c* of the shutter 89. Although the shutter 89 is urged in the Z1 direction by the shutter spring 90, the shutter 89 is positioned in the closed position by locking the retaining portions **89*b*1 and 89*b*2 to the locking portions 50*e*1 and 50*e*2, respectively. Further, the nipping surface 89*a* of the shutter 89 contacts the sealing tape 88 until the sealing tape 88 is peeled off from the surface layer 87*a* of the elastic seal 87. Then, when the nipping surface 89*a* contacts the surface layer 87*a* when the sealing tape 88 is peeled off from the surface layer 87*a* of the elastic seal 87**.

In a state in which the elastic seal 87, the sealing tape 88, the shutter 89, and the shutter spring 90 are assembled to the supply frame 50, the entirety of the through hole **87*d* of the elastic seal 87 is covered with the sealing tape 88. Further, in the X direction, a width of the sealing tape 88 is larger than a diameter of the through hole 87*d*, and a width of the nipping surface 89*a* of the shutter 89 is wider than the width of the sealing tape 88**.

By this, the through hole **87*d* is securely covered with the sealing tape 88, so that the sealing tape 88 is securely pressed by the nipping surface 89*a* of the shutter 89. The sealing tape 88 is capable of taking a sealing state in which the sealing tape 88 seals the toner discharged through the through hole 87*d* of the elastic seal 87 and a discharge state in which the toner discharged through the through hole 87*d* is discharged through the discharge opening 52**.

Part (a) of FIG. 23 is a bottom view showing the toner cartridge 13 when the shutter 89 is positioned in the closed position, and part (b) of FIG. 23 is a bottom view showing the toner cartridge 13 when the shutter 89 is positioned in the open position. As shown in part of FIG. 23, the shutter 89 is urged in the Z2 direction by the shutter spring 90, and in a state in which an external force does not act on the shutter 89, the retaining portions **89*b*1 and 89*b*2 and the locking portions 50*e*1 and 50*e*2 are locked to each other, so that the shutter 89** is positioned in the closed position.

As shown in part (b) of FIG. 23, the shutter 89 includes a portion-to-be-pressed **50*j* capable of contacting a pressing portion 91 of the apparatus main assembly 100B (see FIG. 1). When the toner cartridge 13 is mounted to the apparatus main assembly 100B in the Z2 direction, the portion-to-be-pressed 50*j* of the shutter 89 contacts the pressing portion 91 of the apparatus main assembly 100B. Further, when the toner cartridge 13 is further mounted in the Z2 direction, the pressing portion 91 presses the portion-to-be-pressed 50*j* of the shutter 89 in the Z1 direction. That is, when the toner cartridge 13 is mounted to the apparatus main assembly 100B, a reaction force acting from the pressing portion 91 to the portion-to-be-pressed 50*j* acts on the shutter 89 as a pressing force F10** (external force).

By the pressing force F10, the shutter 89 moves in the Z1 direction against an urging force of the shutter spring 90. By this, in a state in which the toner cartridge 13 is mounted to the apparatus main assembly 100B, the shutter 89 is maintained in the open position shown in part (b) of FIG. 23.

When the toner cartridge 13 is dismounted from the apparatus main assembly 100B, the portion-to-be-pressed **50*j* of the shutter 89 is separated from the apparatus main assembly 100B, so that the shutter 89** is returned from the open position to the closed position.

Next, referring to parts (a) and (b) of FIG. 24, a positional relationship between the shutter 89, the sealing tape 88, and the elastic seal 87 will be described. Part (a) of FIG. 24 is a sectional view showing a structure of a periphery of the discharge opening 52 in a state in which the shutter 89 is positioned in the closed position, and part (b) of FIG. 24 is a sectional view showing a structure of the periphery of the discharge opening 52 in a state in which the shutter 89 is positioned in the open position.

As shown in part (a) of FIG. 24, in the toner cartridge 13 of this embodiment, from the supply frame 50 toward below, the elastic seal 87, the sealing tape 88, and the shutter 89 are arranged in a named order. The elastic seal 87 covers the periphery of the discharge opening 52 so that the through hole **87*d* and the discharge opening 52 are substantially coaxial with each other. The sticking surface 88*d* of the sealing tape 88 covers the through hole 87*d* of the elastic seal 87, and the nipping surface 89*a* of the shutter 89 covers a surface of the sealing tape 88 on a side opposite from the sticking surface 88*d***.

Here, a gap between the installation surface **50*c* (see FIG. 19) of the supply frame 50 and the restricting surfaces 50*h*1 and 50*h*2 in the Y direction is narrower than the sum of thickness of the elastic seal 87 in a natural state, the sealing tape 88 and the shutter 89. In this embodiment, the elastic seal 87, the sealing tape 88, and the shutter 89 are disposed between the installation surface 50*c* and the restricting surfaces 50*h*1 and 50*h*2, so that the elastic seal 87 is in a crushed state between the installation surface 50*c* and the sealing tape 88. Further, the restricting surfaces 50*h*1 and 50*h*2 as restricting portions restrict separation of the shutter 89 from the elastic seal 87 in the discharging direction in which the toner is discharged through the discharge opening 52**.

By this, the sticking surface **88*d* of the sealing tape 88 is pressed downward by an elastic force of the elastic seal 87, and the shutter 89 receives the reaction force from the restricting surfaces 50*h*1 and 50*h*2 (see part (a) of FIG. 19), so that the sticking surface 88*d* is pressed upward by the nipping surface 89*a*. That is, the sticking surface 88*d* of the sealing tape 88 is nipped at a predetermined nipping pressure by the elastic seal 87 and the shutter 89. Further, it can also be said that the shutter 89 as a nipping member and an urging member urges the elastic seal 87 via the sealing tape 88 in a compression direction (upward direction, Y direction) with an urging force F11 by receiving the reaction force from the restricting surface 50*h*1 and 50*h*2 (see part (a) of FIG. 19) of the supply frame 50**.

Further, as shown in part (b) of FIG. 19, when the shutter 89 is positioned in the open position, the through hole **87*d* of the elastic seal 87 and the opening 89*d* of the shutter 89 are substantially co-axial with each other. Also, in this case, the nipping surface 89*a* of the shutter 89 covers the sticking surface 88*d* of the sealing tape 88**.

Further, also, in the case where the shutter 89 is positioned in the open position, the sticking surface **88*d* of the sealing tape 88 is pressed downward by the elastic force of the elastic seal 87, and the shutter 89 receives the reaction force from the restriction surfaces 50*h*1 and 50*h*2 (see part (a) of FIG. 19) of the supply frame 50, so that the sticking surface 88*d* is pressed upward by the nipping surface 89*a*. That is, the sticking surface 88*d* of the sealing tape 88 is nipped with a predetermined nipping pressure by the elastic seal 87 and the shutter 89. Further, it can be said that the shutter 89 nips the sealing tape 88 with the predetermined nipping pressure in cooperation with the elastic seal 87 irrespective of the position of the shutter 89. Further, it can also be said that the shutter 89 urges the elastic seal 87 via the sealing tape 88 in a compression direction (upward direction, Y1 direction) with the urging force F11 by receiving the reaction force from the restriction surfaces 50*h*1 and 50*h*2 of the supply frame 50 (see, part (a) of FIG. 19). Further, it can be said that the sealing tape 88 is nipped with the predetermined nipping pressure by the elastic seal 87 and the shutter 89 even when the shutter 89** is positioned in either one of the closed position and the open position.

In this embodiment, the nipping surface 89*a* of the shutter 89 urges a whole area of the sticking surface 88*d* of the sealing tape 88 toward the elastic seal 87 side, but may also be structured to urge a part of the sticking surface 88*d* toward the elastic seal 87 side. The nipping surface 89*a* is suitable when urges the whole area of the sticking surface 88*d* of the sealing tape 88 toward the elastic seal 87 side since the nipping surface 89*a* can securely press the sticking surface 88*d* from below, but even in the case where the nipping surface 89*a* urges only a part of the sticking surface 88*d*, the effect of the present invention can be achieved.

[Peeling Operation of Sealing Tape]

Next, referring to parts (a) to (c) of FIG. 25, a peeling operation of the sealing tape 88 will be described.

Part (a) of FIG. 25 is a sectional view showing a state before the peeling operation of the sealing tape 88 is performed and such that the sticking surface 88*d* of the sealing tape 88 is stuck to the surface layer 87*a* of the elastic seal 87. Part (b) of FIG. 25 is a sectional view showing a state in which the sealing tape 88 is partially peeled off from the elastic seal 87 by the user. Part (c) of FIG. 25 is a sectional view showing a state in which the peeling operation of the sealing tape 88 is completed.

As shown in part (a) of FIG. 25, when the user pulls the sealing tape 88 in the Z2 direction by gripping the grip portion 88*c*, the sealing tape 88 starts to be peeled off gradually from the fold-back portion 88*e* thereof relative to the elastic seal 87. The sealing tape 88 is folded back at the fold-back portion 88*e* in a direction away from the surface layer 87*a* of the elastic seal 87. For this reason, when the user pulls the sealing tape 88 in the Z2 direction, at the fold-back portion 88*e*, a force by which the sticking surface 88*d* of the sealing tape 88 is separated from the elastic seal 87 in the Y2 direction, i.e., a peeling stress is exerted on the sealing tape 88. In general, as regards bonding of the adhesive or the like, shearing strength is high, but peeling strength is not higher that the shearing strength.

In this embodiment, peeling strength between the sticking surface 88*d* of the sealing tape 88 and the surface layer 87*a* of the elastic seal 87 is set smaller than peeling strength between the surface layer 87*a* and the elastic layer 87*c* of the elastic seal 87.

For this reason, the user can easily peeled off the sealing tape 88 from the elastic seal 87. Further, the sealing tape 88 can be easily peeled off from the elastic seal 87, so that damage on the elastic seal 87 can be suppressed.

As shown in part (b) of FIG. 25, when the user pulls the sealing tape 88 in the Z2 direction, the fold-back portion 88*e* gradually moves in the Z2 direction. For example, the fold-back portion moves from the fold-back portion 88*e* of part (a) of FIG. 25 to a fold-back portion 88*e*' of part (b) of FIG. 25. Then, the elastic seal 87 contacts the nipping surface 89*a* of the shutter 89 from a portion where the sticking surface 88*d* of the sealing tape 88 is peeled off from the elastic seal 87. In this embodiment, the elastic seal 87 is compressed more than a thickness of the sealing tape 88 in a state in which the sealing tape 88 is not peeled off.

Then, as shown in part (c) of FIG. 25, when the peeling-off of the sealing tape 88 from the elastic seal 87 is completed, the whole area of the surface layer 87*a* of the elastic seal 87 contacts the nipping surface 89*a* of the shutter 89. In this state, the discharge opening 52 of the supply frame 50 and the through hole 87*d* of the elastic seal 87 communicate with each other, so that a gap between the supply frame 50 and the shutter 89 is sealed by the elastic seal 87. By this, when the shutter 89 is positioned in the closed position, it is possible to suppress the toner accommodated inside the supply frame 50 from flowing out to the outside.

[Toner Discharge]

FIG. 26 is a sectional view showing a state in which the sealing tape 88 is peeled off from the elastic seal 87 and in which the toner cartridge 13 is mounted to the apparatus main assembly 100B (see FIG. 1). Generally, before the toner cartridge 13 is mounted to the apparatus main assembly 100B, the sealing tape 88 is peeled off from the elastic seal 87. However, the sealing tape 88 may also be peeled off from the elastic seal 87 after the toner cartridge 13 is mounted to the apparatus main assembly 100B.

In the toner cartridge 13 shown in FIG. 26, the sealing tape 88 is peeled and the shutter 89 is positioned in the open position, and therefore, the discharge opening 52, the through hole 87*d*, and the opening 89*d* communicates with each other. To the toner discharging chamber 57, by the screw 54, the toner is fed from the communication passage 48. When the pump 58 operates in this state, by air pressure P10 from the pump 58, internal pressure of the toner discharging chamber 57 changes.

By this, the toner in the toner discharging chamber 57 passes together with the air through the discharge opening 52, the through hole 87*d*, and the opening 89*d* in a named order, and is discharged to the outside of the toner cartridge 13. The toner discharged from the toner cartridge 13 is conveyed by the toner feeding device 14 (see FIG. 2) as described above, and is supplied into the developing unit 6 through the receiving opening 40 (see part (b) of FIG. 5) of the developing unit 6.

Part (a) of FIG. 27 is a sectional view showing a situation such that an operation for compressing the pump 58 is performed in a state in which the sealing tape 88 is not peeled off from the elastic seal 87 and in which the toner cartridge 13 is mounted to the apparatus main assembly 100B. Part (b) of FIG. 27 is a sectional view showing a state in which the pump 58 is compressed.

As shown in part (a) of FIG. 27, the case where the user mounts the toner cartridge 13 to the apparatus main assembly 100B without peeling off the sealing tape 88 from the elastic seal 87 will be considered. At this time, the shutter 89 is positioned in the open position.

Further, the drive is transmitted from the apparatus main assembly 100B to the toner cartridge 13, and when the pump 58 operates, the internal pressure of the toner discharging chamber 57 is increased by the air pressure of the pump 58, so that the air passed through the discharge opening 52 and the through hole 87*d* pushes the sealing tape 88 downward. By this, a peeling force F13 acts on the sealing tape 88. The present invention is not limited to the case where the pump 58 operates, but the internal pressure of the toner discharging chamber 57 changes depending on an environment during transportation or during storage, such as the case where the toner cartridge 13 is transported by air or the like, for example.

On the other hand, between the elastic seal 87 and the sealing tape 88, the above-described urging force F11 by the shutter 89 and the adhesive force F12 by the sticking surface 88*d* of the sealing tape 88 act on. In this embodiment, against the peeling force F13, the urging force F11 acts on the sealing tape 88, and therefore, the adhesive force F12 can be made small. By making the adhesive force F12 small, the user can easily peel off the sealing tape 88 with a small force, so that usability is improved.

For example, different from this embodiment, in the case where the sealing tape 88 is not urged by the shutter 89 with the urging force F11, there is a need to make the adhesive force F12 larger so that the sealing tape 88 is not dropped in the main assembly by the peeling force F13. Then, although it is possible to respond to a change in internal pressure of the toner discharging chamber 57 when forgetting to peel off the sealing tape 88, a large force is required when peeling off the sealing tape 88, so that the usability lowers. Further, when a vent is provided in the supply frame 50 and a filter or the like is provided in the vent, a cost increases.

Thus, in this embodiment, by urging the sealing tape 88 by the shutter 89 with the urging force F11, the usability can be inexpensively improved while responding to the change in internal pressure of the toner discharging chamber 57 when the sealing tape 88 is forgotten to be peeled off. That is, the conventional constitution can be further developed.

The urging force F11 by the shutter 89 described with reference to part (a) of FIG. 27 is sufficiently larger than the peeling force F13. As shown in part (b) of FIG. 27, when the pump 58 is compressed, the internal pressure of the toner discharging chamber 57 increases, and the air in the toner discharging chamber 57 tries to escape to the outside. In this embodiment, the sealing tape 88 is stuck to the surface layer 87*a* of the elastic seal 87 on a side far from the supply frame 50. For this reason, the air in the toner discharging chamber 57 passes through the elastic layer 87*c* of the elastic seal 87 having the air permeability and can escape to the outside of the toner cartridge 13. By this, the internal pressure of the toner discharging chamber 57 is lowered, and an increase in load of a drive train of the drive input gear 59, the cam gear 60, the screw gear 64, and the like for driving the pump 58 can be suppressed.

In this embodiment, the sealing tape 88 has no air permeability, but may have the air permeability. For example, the sealing tape 88 is provided with a filter in at least a part of a region overlapping with the through hole 87*d* of the elastic seal 87 as viewed in the Y direction, so that it becomes possible to further lower the internal pressure of the toner discharging chamber 57. By this, the increase in load of the drive train for driving the pump 58 can be further suppressed. The filter is capable of passing the air therethrough, but cannot pass the toner therethrough. Further, it is preferable that the adhesive is not applied to at least a part of the region of the filter overlapping with the through hole 87*d* of the elastic seal 87 as viewed in the Y direction.

Modified Embodiment 1 of First Embodiment

Next, a modified embodiment 1 of the first embodiment will be described with reference to parts (a) and (b) of FIG. 28. Part (a) of FIG. 28 is a sectional view showing an elastic seal 187 according to the modified embodiment 1, and part (b) of FIG. 28 is a sectional view showing a state in which the elastic seal 187 is elastically deformed. Although the elastic seal 87 in the first embodiment has the air permeability and the function of escaping the internal pressure of the toner discharging chamber 57, the elastic seal 187 according to the modified embodiment 1 does not have the air permeability.

As shown in part (a) of FIG. 28, the elastic seal 187 according to the modified embodiment 1 is disposed between the supply frame 50 and the sealing tape 88, and to the surface layer 87*a* of the elastic seal 187, the sealing tape 88 is stuck. The elastic seal 187 is constituted by, for example, a rubber which has no air permeability and which is elastically deformable, but when the material is a material having remarkably low air permeability, the material may also be, for example, foam urethane or the like. In the following, a property such that the air permeability is remarkable low is expressed by that there is no air permeability.

As shown in part (b) of FIG. 28, when the pump 58 operates without peeling off the sealing tape 88 from the elastic seal 187 and the internal pressure of the toner discharging chamber 57 increases, the elastic seal 187 is elastically deformed in a direction in which a volume of the through hole 87*d* is increased. That is, the elastic seal 187 is elastically deformed to the outside in a radial direction. By this, the internal pressure of the toner discharging chamber 57 can be lowered. That is, even when the elastic seal 187 having no air permeability is used, it is possible to respond to the change internal pressure of the toner discharging chamber 57.

Modified Embodiment 2 of First Embodiment

Next, a modified embodiment 2 of the first embodiment will be described with reference to FIG. 29 to part (b) of FIG. 30. FIG. 29 is an exploded perspective view showing a toner cartridge 130 according to the modified embodiment 2 of the first embodiment. Part (a) of FIG. 30 is a sectional view showing the toner cartridge 130 when the shutter 89 is positioned in the closed position, and part (b) of FIG. 30 is a sectional view showing the toner cartridge 130 when the shutter 89 is positioned in the open position.

In the first embodiment, the sealing tape 88 was directly stuck to the elastic seal 87, but as shown in FIG. 29, the toner cartridge 130 according to the modified embodiment 2 is provided with a plate member 92 as an intermediary member between the elastic seal 87 and the sealing tape 88. Constitutions other than the plate member 92 are similar to those in the first embodiment, and therefore, description thereof will be omitted.

The plate member 92 is provided with a through hole 92*a* for permitting passing of the toner. To the plate member 92, the sticking surface 88*d* of the sealing tape 88 is stuck, and the through hole 92*a* is covered with the sticking surface 88*d*. The plate member 92 is bonded to the surface layer 87*a* of the elastic seal 87 by, for example, the adhesive.

As shown in part (a) of FIG. 30, in the state in which the shutter 89 is positioned in the closed position, similarly as in the first embodiment, the sealing tape 88 is urged toward the elastic seal 87 side by the shutter 89 with the urging force F11. As shown in part (b) of FIG. 30, also, in the state in which the shutter 89 is positioned in the open position, the sealing tape 88 is urged toward the elastic seal 87 side by the shutter 89 with the urging force F11.

For this reason, the sealing tape 88 can decrease the adhesive force between the sticking surface 88*d* of the sealing tape 88 and the plate member 92. Therefore, the usability can be improved. An adhesive strength between the sealing tape 88 and the plate member 92 may preferably be set smaller than an adhesive strength between the elastic seal 87 and the plate member 92 and a breaking strength of the elastic seal 87. By this, when the sealing tape 88 is peeled off from the plate member 92, stress does not readily occur on the elastic seal 87, so that damage on the elastic seal 87 can be reduced.

The surface layer 87*a* and the elastic layer 87*c* of the elastic seal 87 may be formed of an integral material. Further, the elastic seal 87 and the plate member 92 may be bonded to each other by welding or the like other than the (adhesive) bonding without being limited to the bonding.

Modified Embodiment 3 of First Embodiment

Next, a modified embodiment 3 of the first embodiment will be described with reference to FIG. 31 to part (b) of FIG. 32. FIG. 31 is an exploded perspective view showing a toner cartridge 230 according to the modified embodiment 2 of the first embodiment. Part (a) of FIG. 32 is a sectional view showing the toner cartridge 230 when the shutter 89 is positioned in the closed position, and part (b) of FIG. 32 is a sectional view showing the toner cartridge 230 when the shutter 89 is positioned in the open position.

In the first embodiment, the sealing tape 88 was directly stuck to the elastic seal 87, but a sealing tape 188 in the modified embodiment 3 is stuck to the nipping surface 89*a* of the shutter 89. As shown in FIG. 31, the elastic seal 87 is assembled to the installation surface 50*c* of the supply frame 50. A sticking surface 188*d* of the sealing tape 188 is stuck to the nipping surface 89*a* of the shutter 89.

More specifically, the sticking surface 188*d* is peelably stuck to the nipping surface 89*a* so as to cover entirety of the opening 89*a* of the shutter 89. Then, the shutter 89 in a state in which the sealing tape 188 is stuck thereto is assembled to the supply frame 50. At this time, the sealing tape 188 and the elastic seal 87 are in contact with each other, but are not bonded together or the like, so that these members are movable relative to each other.

As shown in part (a) of FIG. 32, the sealing tape 188 includes a fold-back portion 188*e* downstream of the sticking surface 188*d* in the Z1 direction. Further, the sealing tape 188 includes a non-sticking region 188*f* between the sticking surface 188*d* and the fold-back portion 188*e*. Onto the non-sticking region 188*f*, the adhesive is not applied, so that the non-sticking region 188*f* is not stuck to the nipping surface 89*a* of the shutter 89.

Such a non-sticking region 188*f* is provided on the sealing tape 188, so that the non-sticking region 188*f* is deformed when the shutter 89 is moved between the closed position shown in part (a) of FIG. 32 and the open position shown in part (b) of FIG. 32. In the modified embodiment 3, the non-sticking region 188*f* is deformably constituted, and therefore, a contact portion between the sealing tape 188 and the elastic seal 87 becomes hardly slidable. When the contact portion between the sealing tape 188 and the elastic seal 87 slides, there is a possibility that the toner deposited on the elastic seal 87 is exposed to the outside of the toner cartridge 230. For that reason, it is preferable that setting is made so that a frictional force of a contact portion between portions of the sealing tape 188 is lower than a frictional force of the contact portion between the sealing tape 188 and the elastic seal 87.

Even if the contact portion between the sealing tape 188 and the elastic seal 87 slides, it is preferable that a region broader than the sticking surface 188*d* of the sealing tape 188 is covered with the shutter 89 so that the user does not touch the toner deposited on the elastic seal 87. By this, during the mounting/dismounting of the toner cartridge 230 to/from the apparatus main assembly 100B (see FIG. 1), deposition of the toner on the user is suppressed, so that usability can be improved.

Also, in the modified embodiment 3, similarly as in the first embodiment, even in the case where the shutter 89 is positioned in either one of the closed position and the open position, the sealing tape 188 is nipped at a predetermined nipping pressure between the elastic seal 87 and the shutter 89.

Therefore, an adhesive force of the sealing tape 188 to the shutter 89 can be made small. Further, in the modified embodiment 3, the sealing tape 188 is not stuck to the elastic seal 87, but is stuck to the shutter 89, and therefore, stress does not occur on the elastic seal 87 when the sealing tape 188 is peeled off. For this reason, damage on the elastic seal 87 can be reduced.

Modified Embodiment 4 of First Embodiment

Next, a modified embodiment 4 of the first embodiment will be described with reference to FIG. 33 to part (b) of FIG. 34. FIG. 33 is a sectional view showing a toner cartridge 330 according to the modified embodiment 4 of the first embodiment. Part (a) of FIG. 34 is a sectional view showing the toner cartridge 330 according to the modified embodiment 4 of the embodiment 1, and part (b) of FIG. 34 is a sectional view showing a sealing member 288A according to the modified embodiment 4.

In the first embodiment, the sealing tape 88 was stuck to the elastic seal 87, but a sealing film 288 in the modified embodiment 4 is not stuck to the elastic seal 87 and the shutter 89. That is, as shown in FIG. 33, the sealing film 288 as a sealing member is held by being nipped at a predetermined nipping pressure by the elastic seal 87 and the shutter 89.

Further, similarly as in the first embodiment, even in the case where the shutter 89 is positioned in either one of the closed position and the open position, the shutter 89 urges the sealing film 288 toward the elastic seal 87 side. During use of the toner cartridge 330, the user dismounts the sealing film 288 from the toner cartridge 330 by pulling the grip portion 88*c* of the sealing film 288 in the Z2 direction. As shown in part (a) of FIG. 34, the sealing film 288 may be detachably fixed to the supply frame 50 at a part thereof. Further, instead of the sealing film 288 having flexibility, as shown in part (b) of FIG. 34, the sealing member 288A comprising a plate-like rigid member may be applied.

The sealing film 288 or the sealing member 288A in the modified embodiment 4 is not stuck to the elastic seal 87, and therefore, when the sealing film 288 or the sealing member 288A is dismounted, stress does not occur on the elastic seal 87. For this reason, damage on the elastic seal 87 can be reduced. Further, for the sealing film 288 and the sealing member 288A, bonding, welding, and the like are not needed, and therefore, it is possible to reduce a part cost and a processing cost. Further, the sealing film 288 and the sealing member 288A are not provided with a fold-back portion, and therefore, lengths of the sealing film 288 and the sealing member 288A can be shortened.

Therefore, the user can shorten distances for pulling out the sealing film 288 and the sealing member 288A, so that usability can be improved.

In the modified embodiment 4, the sealing film 288 or the sealing member 288A is not stuck to the elastic seal 87, and therefore, a sealing property of the through hole 87*d* of the elastic seal 87 lowers. For this reason, in view of a force of the pump 58 of the toner cartridge, assumption of a distribution environment, and the like, constitutions of this embodiment and the modified embodiments 1 to 4 may preferably be appropriately selected.

Second Embodiment

Next, a second embodiment of the present invention will be described. FIG. 35 is a sectional view showing a laser printer which is an example of an image forming apparatus according to this embodiment. Incidentally, dimensions, materials, shapes, a relative arrangement, and the like of constituent parts of the image forming apparatus described in the following embodiments should be appropriately changed depending on constitutions and various conditions of apparatuses (devices) to which the present invention is applied. Accordingly, the scope of the present invention is not intended to be limited to the following embodiments.

[Basic Structure of Laser Printer]

As shown in FIG. 35, a laser printer 401 which is the image forming apparatus of this embodiment includes a printer main assembly 400A, a process cartridge 400B and a toner cartridge 400C which are detachably mountable to the printer main assembly 400A. Details of a mounting and dismounting method of the process cartridge 400B and the toner cartridge 400C to/from the printer main assembly 400A will be described later.

In the printer main assembly 400A as an apparatus main assembly, a sheet feeding portion 503, a transfer roller 504, a fixing portion 505, and a laser scanner 501 are installed. The process cartridge 400B and the toner cartridge 400C can be mounted to the printer main assembly 400A so as to be positioned on an upper side and a front side in the laser printer 401.

Here, the upper side in the laser printer 401 is the Y1 direction shown in FIG. 35. Further, a lower side in the laser printer 401 is the Y2 direction shown in FIG. 35 which is a direction opposite to the above-described Y1 direction. Further, the front side (front surface side) in the laser printer 401 is the X1 direction shown in FIG. 35. Further, the rear side (rear surface side) in the laser printer 401 is the X2 direction shown in FIG. 35 which is a direction opposite to the above-described X1 direction. An installation position (normal attitude) of the laser printer 401 is in a state in which an accommodating portion of the sheet S is positioned on the lower side of the apparatus and in which an openable door 507 is positioned on the upper side of the apparatus, and in this state, a bottom of the laser printer 401 (the accommodating portion side of the sheet S) is directed in the direction of gravity (gravitation).

Next, referring to FIGS. 36 and 37, the process cartridge 400B will be specifically described. FIG. 36 is a front view of the process cartridge 400B according to this embodiment, and shows a state of the process cartridge 400B mounted to the printer main assembly 400A as viewed in the X1 direction shown in FIG. 35. Further, FIG. 37 is a main sectional view (c-c cross section shown in FIG. 36) showing a structure of the process cartridge 400B according to this embodiment.

As shown in FIG. 37, the process cartridge 400B as a cartridge according to this embodiment includes a cleaning unit 410 (first unit) provided with a photosensitive drum (drum unit) 411 as an image bearing member and a developing unit 415 (second unit). The developing unit 415 is provided with a developing roller 416 as a developing means for carrying a developer (toner).

The cleaning unit 410 is provided with a cleaning blade 417, a charging roller 412, a charging roller cleaner 414, a waste (residual) toner primary accommodating portion 410*a*, a first residual toner feeding path 410*b*, and a second residual toner feeding path 410*c* (see FIG. 39), and rotatably supports the photosensitive drum 411. The cleaning blade 417 functions as a cleaning means for the photosensitive drum 411. The charging roller 412 functions as a charging means for the photosensitive drum 411. Further, the charging roller cleaner 414 functions as a cleaning means for the charging roller 412.

In this embodiment, an axis parallel to a rotational axis of the photosensitive drum 411 is a Z-axis, and in the case where directionality relating to the Z-axis is expressed, a Z1 direction and a Z2 direction are used. Further, the Z-axis is perpendicular to each of the above-described X-axis (X1 direction, X2 direction) and the above-described Y-axis (Y1 direction, Y2 direction). Further, in the case where the process cartridge 400B and the toner cartridge 400C are mounted to the printer main assembly 400A, the X-axis (X1 and X2 directions), the Y-axis (Y1 and Y2 direction), and the Z-axis (Z1 and Z2 directions) of each of the printer main assembly 400A, the process cartridge 400B, and the toner cartridge 400C are coincide with associated axes (directions), respectively.

The charging roller 412 is disposed so as to contact an outer peripheral surface of the photosensitive drum 411, and the charging roller 412 charges the surface of the photosensitive drum 411 by application of a voltage (charging bias) from the printer main assembly 400A. Further, the charging roller 412 is rotated with rotation of the photosensitive drum 411.

The cleaning blade 417 is an elastic member disposed in contact with the outer peripheral surface of the photosensitive drum 411. The cleaning blade 417 is capable of removing, from the surface of the photosensitive drum 411, the toner remaining on the photosensitive drum 411 after, for example, the sheet S described later passes through between the photosensitive drum 411 and the transfer roller 504, at a free end thereof which elastically contacts the photosensitive drum 411. The removed toner (hereinafter, referred to as waste (residual) toner) is fed from the residual toner primary accommodating portion 410*a* to the toner cartridge 400C through the first residual toner feeding path 410*b* and the second residual toner feeding path 410*c*.

The charging roller cleaner 414 is a roller disposed in contact with the surface (outer peripheral surface) of the charging roller 412 and is rotated with rotation of the charging roller 412, and thus cleans the charging roller 412.

FIG. 38 is a sectional view (b-b cross section shown in FIG. 36) showing a supply opening 421*c* of the process cartridge 400B according to this embodiment. As shown in FIG. 38, the positioning unit 415 includes a developing chamber 551 in which the developing roller 416 and a toner supplying roller 413 are provided, a developer accommodating portion 552 for supplying the toner to the developing chamber 551, a toner receiving chamber 553 for receiving the toner supplied from the toner cartridge 400C, and a stirring member 554.

The developing roller 416 is a developing member (developing means) for supplying the toner to the photosensitive drum 411 and then for developing the electrostatic latent image, formed on the photosensitive drum 411, with the toner supplied. The toner supplying roller 413 supplies the toner, in the developing chamber 551, to the developing roller 416. A developing blade 418 contacts the surface of the developing roller 416 and defines an amount of the toner deposited on the surface of the developing roller 416. Further, the developing blade 418 imparts a triboelectric charge to the toner. That is, the developing blade 418 is an adjusting means for adjusting the amount of the toner used in this embodiment.

The stirring member 554 is a stirring means for stirring the toner supplied to the inside of the developing unit 415, so as to be uniformly dispersed. The toner accommodated inside the developer accommodating portion 552 is sent to the developing chamber 551 by rotation of the stirring member 554, thus being supplied to the developing roller 416.

The toner in the developer accommodating portion 552 is detected in remaining amount by an unshown remaining amount detecting means, and when the toner amount in the developer accommodating portion 552 becomes a certain amount or less, the toner is supplied from the toner cartridge 400C to the process cartridge 400B. Then, the toner supplied to the developing unit 415 is supplied to the developer accommodating portion 552 via the supply opening 421*c* of a stay 421, a delivery opening 421*d*, and a toner receiving chamber 553.

Next, an operation of the laser printer 401 will be described with reference to FIG. 35. The photosensitive drum 411 is rotationally driven by an unshown driving source, and is charged uniformly to a predetermined potential by the charging roller 412. The surface of the photosensitive drum 411 after the charging is exposed to light on the basis of image information by the laser scanner 501, and an electric charge of an exposed portion is removed, so that an electrostatic latent image is formed. To the thus-formed electrostatic latent image on the photosensitive drum 411, the toner is supplied from the developing roller 416, so that a toner image is formed on the photosensitive drum 411.

At this time, in parallel to the toner image forming operation, the sheet S is fed along the sheet feeding portion 503. Specifically, a feeding roller 503*b* rotates and feeds the sheet S. Thereafter, the sheet S is timed to the formation of the toner image on the photosensitive drum 411, so that the sheet S is conveyed to between the photosensitive drum 411 and the transfer roller 504. When the sheet S passes through between the photosensitive drum 411 and the transfer roller 504, by application of a voltage for transfer to the transfer roller 504, the toner image is formed as an unfixed image on the sheet S.

The sheet S on which the toner image is transferred is conveyed to the fixing portion 505. On the surface of the sheet S conveyed to the fixing portion 505, the unfixed image heated and pressed when passes through the fixing portion 505 is fixed. That is, the fixing portion 505 is a fixing means according to the image forming apparatus of this embodiment. Thereafter, the sheet S is conveyed by the sheet feeding portion 503 and then is discharged and stacked onto a discharge tray 506. At a front surface of the printer main assembly 400A, the openable door 507 is provided rotatably on the basis of a rotation shaft (not shown). The user is capable of performing a mounting and dismounting operation of the process cartridge 400B and the toner cartridge 400C to and from the inside of the printer main assembly 400A in a state in which the openable door 507 is open.

[Basic Structure of Process Cartridge]

Next, referring to FIGS. 39 to 42, the structure of the process cartridge 400B in this embodiment will be specifically described.

FIG. 39 is a sectional view (d-d cross section shown in FIG. 36) showing the second residual toner feeding path 410*c* of the process cartridge 400B according to this embodiment. Parts (a) and (b) of FIG. 40 are exploded perspective view of the process cartridge 400B according to this embodiment. Part (a) of FIG. 40 shows the case where the process cartridge 400B is viewed from a driving side, and part (b) of FIG. 40 shows the case where the process cartridge 400B is viewed from a non-driving side. Parts (a) and (b) of FIG. 41 are schematic views for illustrating a contact state and a separation state of the developing unit 415 relative to the photosensitive drum 411 according to this embodiment. In parts (a) and (b) of FIG. 41, in order to explain a separation mechanism 500 for the printer main assembly 400A, a state in which a side cover 407 is omitted is shown. Part (a) of FIG. 41 shows a state in which the photosensitive drum 411 and the developing roller 416 are in contact with each other, and part (b) of FIG. 41 shows a state in which the photosensitive drum 411 and the developing roller 416 are in separation from each other. Parts (a) and (b) of FIG. 41 are side views in the case where the process cartridge 400B is viewed from the driving side in an axial direction of the developing roller 416. FIG. 42 shows a side view of the process cartridge 400B according to this embodiment on the non-driving side. As shown in parts (a) and (b) of FIG. 40, in the developing unit 415, at opposite end portions with respect to the axial direction of the developing roller 416, a first bearing member 404 and a second bearing member 405 are provided, respectively, so that the developing roller 416 is rotatably supported by the first bearing member 404 and the second bearing member 405. The first bearing member 404 is positioned on the non-driving side of the process cartridge 400B, and the second bearing member 405 is positioned on the driving side of the process cartridge 400B.

As shown in FIGS. 40 to 42, a cylindrical portion 405*a* of the second bearing member 405 is supported by a cylindrical hole 407*a* provided in the side cover 407 of the cleaning unit 410. Further, a pin 406 is inserted so as to straddle a cylindrical hole 420*a* of a cleaning frame 420 and a cylindrical 404*a* of the first bearing member 404. The cylindrical hole 407*a* of the side cover 407 and the cylindrical portion 405*a* of the second bearing member 405 are disposed so that a swing axis 408 is an axial center. The pin 406 and the cylindrical hole 404*a* of the first bearing member 404 are disposed so that the swing axis 408 is the core center. Further, the developing unit 415 is connected to the cleaning unit 410 so as to be rotatable about the swing axis 408. In other words, the developing unit 415 is supported rotatably about the swing axis 408 relative to the cleaning unit 410. The swing axis 408 is disposed substantially parallel to a rotational axis 411*b* of the photosensitive drum 411.

On both side surfaces of the process cartridge 400B (on end portion sides of the process cartridge 400B in the longitudinal direction), a first pressing spring 419*a* and a second pressing spring 419*b* which are urging means for urging the developing unit 415 toward the cleaning unit 410 are provided. On the driving side of the process cartridge 400B, the first pressing spring 419*a* is disposed, and on the non-driving side of the process cartridge 400B, the second pressing spring 419*b* is disposed. The developing unit 415 is urged by the first pressing spring 419*a* and the second pressing spring 419*b*, so that the developing roller 416 is contacted to the photosensitive drum 411.

Next, a contact and separation operation of the developing unit 415 relative to the cleaning unit 410 will be described using parts (a) and (b) of FIG. 41. As shown in part (a) of FIG. 41, the second bearing member 405 is provided with a projected portion 405*b*. As shown in part (a) of FIG. 41, in a position where the projected portion 405*b* does not contact the separation mechanism 500, the developing roller 416 contacts the photosensitive drum 411. In the laser printer 401 of this embodiment, a state shown in part (a) of FIG. 41 is an image forming position (contact position, development position) where the developing roller 416 and the photosensitive drum 411 are in contact with each other and where the electrostatic latent image formed on the surface of the photosensitive drum 411 can be developed.

Further, as shown in part (b) of FIG. 41, the separation mechanism 500 provided in the printer main assembly 400A contacts the projected portion 405*b* and receives a force, and thus the developing unit 415 is rotated in a direction of an arrow R2 about the swing axis 408 as a rotation center, so that the photosensitive drum 411 and the developing roller 416 are separated from each other. At this time, the separation mechanism 500 presses the developing unit 415 against urging forces of the first pressing spring 419*a* and the second pressing spring 419*b*. In the laser printer 401 according to this embodiment, a state shown in part (b) of FIG. 41 is a non-image forming position (separation position) where the developing roller 416 is retracted (separated) from the image forming position.

When the separation mechanism 500 returns to an original position, the separation mechanism 500 is separated from the projected portion 405*b*, and by the urging forces of the first pressing spring 419*a* and the second pressing spring 419*b*, the developing roller 416 and the photosensitive drum 411 move again to the image forming position shown in part (a) of FIG. 41.

That is, the laser printer 401 according to this embodiment is provided with the separation mechanism 500, so that the position of the process cartridge 400B can be switched between the contact position (image forming position) and the separation position (non-image forming position). By this structure, as regards the process cartridge 400B, as an attitude of the developing unit 415 relative to the photosensitive drum 411, movement (switching) between the contact position and the separation position can be performed, so that it is possible to suppress toner deterioration and toner consumption during non-image formation.

Next, as shown in parts (a) and (b) of FIG. 40, the cleaning unit 410 is constituted by the cleaning frame 420, the stay 421, and the side cover 407. The cleaning frame 420 supports the cleaning blade 417, the charging roller 412, and the charging roller cleaner 414. The photosensitive drum 411 is mounted to the cleaning frame 420 by a drum pin 422 on one side in the longitudinal direction, and is rotatably supported by a photosensitive drum supporting portion 407*b* provided on the side cover 407 on the other (opposite) side.

Further, as shown in FIG. 39, the cleaning unit 410 includes the second residual toner feeding path 410*c* for feeding the residual toner, collected in the cleaning frame 420, to the toner cartridge 400C. A feeding direction of the second residual toner feeding path 410*c* is a feeding direction L2 shown by an arrow in FIG. 39. The feeding direction L2 is parallel to a flat plane perpendicular to the rotational axis 411*b* of the photosensitive drum 411. As shown in FIG. 38, as described above, the process cartridge 400B is provided with the supply opening 421*c* for permitting reception of supply of the toner from the toner cartridge 400C. A relationship between the supply opening 421*c*, the first residual toner feeding path 410*b*, and the second residual toner feeding path 410*c* will be described later.

[Basic Structure of Toner Cartridge]

Next, referring to FIG. 43 to part (b) of FIG. 55, the toner cartridge 400C according to this embodiment will be specifically described. FIG. 43 is a front view of the toner cartridge 400C and shows a state in which the toner cartridge 400C is mounted. FIG. 44 is a main sectional view (e-e cross section shown in FIG. 43) showing the toner accommodating portion 430 of the toner cartridge 400C. FIG. 45 is an exploded perspective view of the toner cartridge 400C as viewed from the driving side. FIG. 46 is an exploded perspective view of the toner cartridge 400C as viewed from the non-driving side. FIG. 47 is a side view of the toner cartridge 400C as viewed from the driving side. FIG. 48 is a side view (i-i cross section shown in FIG. 47) of the toner cartridge 400*c* on the basis of a rotational axis center of a toner accommodating portion screw member 435. In FIG. 47, a mounting direction of the toner cartridge 400C toward the printer main assembly 400A and the process cartridge 400B is represented by an arrow D1 direction. FIG. 49 is a sectional view (h-h cross section shown in FIG. 43) for illustrating a leveling portion 433*a*1 of the toner cartridge 400C. FIG. 50 is a perspective sectional view of the toner cartridge 400C along the longitudinal direction. FIG. 51 is a sectional view (f-f cross section shown in FIG. 43) of the toner cartridge 400C on the basis of the rotational axis center of a shutter member 434. FIG. 52 is a sectional view (j-j cross section shown in FIG. 47) of the toner cartridge 400C on the basis of the rotational axis center of the shutter member 434. FIG. 53 includes a front view, a left side view, a right side view, a bottom view, and sectional views, FIG. 54 is a sectional view (g-g cross section shown in FIG. 43) of the toner cartridge 400C for illustrating a residual toner accommodating portion 440. Part (a) of FIG. 55 is a sectional view of the shutter member 434 for illustrating a conveying path CP of the shutter member 434, and part (b) of FIG. 55 is a sectional view showing a C1-C1 cross section of part (a) of FIG. 55.

As shown in FIGS. 43, 44, 54, and the like, the toner cartridge 400C according to toner cartridge includes the toner accommodating portion 430 for accommodating the toner supplied to the process cartridge 400B and the residual toner accommodating portion 440 for collecting the residual toner from the process cartridge 400B.

Further, as shown in FIG. 50, as regards the toner cartridge 400C, in a direction parallel to an axis G1 as a rotational drive axis of a pump/screw drive inputting portion 439 described later, a driving-side toner cartridge side cover 450 is provided on one side while interposing the toner accommodating portion 430 and the residual toner accommodating portion 440. Further, as regards the toner cartridge 400C, in a direction parallel to the axis G1, a non-driving driving-side toner cartridge side cover 460 is provided on the other side while interposing the toner accommodating portion 430 and the residual toner accommodating portion 440. That is, a frame forming an outer configuration of the toner cartridge 400C is formed by the toner accommodating portion 430, the residual toner accommodating portion 440, the driving-side toner cartridge side cover 450, and the non-driving-side toner cartridge side cover 460. In other words, the toner cartridge 400C is an assembly of individual divided frames such as a plurality of accommodating portions, a plurality of side covers, and the like.

In this embodiment, as shown in FIG. 50, an axis parallel to the axis G1 of the pump/screw drive inputting portion 439 is defined as a Z-axis. An X-axis, a Y-axis, and the Z-axis in the toner cartridge 400C coincide with the X-axis (X1 and X2 direction), the Y-axis (Y1 and Y2 direction), and the Z-axis (Z1 and Z2 direction) of each of the printer main assembly 400A and the process cartridge 400B.

In the following, details of the toner accommodating portion 430 will be described. As shown in FIGS. 45 and 46, the toner accommodating portion as the frame is formed by an accommodating portion frame 431 and an accommodating portion lid 432. Inside the toner accommodating portion 430, a toner accommodating chamber 430*a* in which the toner is accommodated, and the toner accommodating chamber 430*a* is provided with the toner accommodating portion screw member 435 for feeding the toner toward a discharge opening 431*a* (see FIG. 48) formed in the accommodating portion frame 431 and with a toner accommodating portion stirring and feeding unit 436 as a stirring unit for feeding the toner toward the toner accommodating portion screw member 435. Although described later in a fourth embodiment, inside the toner accommodating chamber

430*a*, a state in which an inner toner seal 494 which is peeled off is present may be formed (see part (b) of FIG. 84).

Here, as shown in FIG. 44, a horizontal direction in a mounting completion attitude of the toner cartridge 400C to the printer main assembly 400A is inclined by 4.6° with respect to a rectilinear line connecting the toner accommodating portion screw member 435 and a rotation center of the toner accommodating portion stirring and feeding unit 436.

Further, as shown in FIG. 48, the accommodating portion frame 431 includes the discharge opening 431*a* on a downstream side with respect to the feeding direction of the toner accommodating portion screw member 435. The accommodating portion frame 431 includes, as shown in FIG. 44, a curved portion 431*d* which is substantially same in shape as a screw diameter in a portion corresponding to a screw portion 435*a* of the toner accommodating portion screw member 435.

On an upstream side of the toner accommodating portion screw member 435 with respect to the feeding direction, a partition wall 431*c* is provided. The partition wall 431*c* is disposed continuously opposed to the curved portion 431*d*. A space between the partition wall 431*c* and the curved portion 431*d* is open toward an upper side in the direction of gravity. Further, by the curved portion 431*d* and the partition wall 431*c* in the accommodating portion frame 431, a toner storage portion 431*a*1 is formed. A height of the partition wall 431*c* is higher than a tap point of the toner accommodating portion screw member 435, and the toner storage portion 431*a*1 has a shape such that an upper side thereof in the direction of gravity is open in an attitude in which the mounting of the toner cartridge 400C is completed.

As shown in FIGS. 48 and 50, in the neighborhood of an end of the toner accommodating portion screw member 435 on the upstream side in the feeding direction, a shape such that the partition wall 431*c* is broken off, but by a feeding force of the toner accommodating portion screw member 435, the toner can be stored in the toner storage portion 431*a*1.

As shown in FIGS. 45 and 46, the toner accommodating portion stirring and feeding unit 436 is driven by a stirring drive inputting portion 438 rotatably supported on an end side of the toner accommodating portion in the longitudinal direction (i.e., on the outside of the toner accommodating portion 430), so that a stirring portion is rotatable. Details of a drive inputting method from the printer main assembly 400A side to the stirring drive inputting portion 438 will be described later. The toner feeding capacity of the toner accommodating portion stirring and feeding unit 436 changes depending on an amount of the toner present in the toner accommodating portion 430. Therefore, in this embodiment, the toner storage portion 431*a*1 is provided as a region in which the partition wall 431*c* is provided in the neighborhood of the toner accommodating portion screw member 435. By this structure, irrespective of the amount of the toner present inside the toner accommodating portion 430, the toner accommodating portion screw member 435 is capable of suppressing a change in toner powder pressure of the toner present in the toner storage portion 431*a*1 to a low level. That is, the toner cartridge 400C is provided with the toner storage portion 431*a*1, so that it is possible to suppress variation in feeding amount of the toner accommodating portion screw member 435.

Further, the toner accommodating portion 430 is, as shown in FIG. 49, provided with the leveling portion 433*a*1 for adjusting the toner feeding amount to a constant amount. As shown in FIGS. 48 to 50, the leveling portion 433*a*1 is formed on the partition member 433*a* provided between the partition wall 431*c* and the discharge opening 431*a* in the feeding direction of the toner accommodating portion screw member 435.

A shape of the leveling portion 433*a*1 is a curved shape having the substantially same diameter as an outer diameter shape of the toner accommodating portion screw member 435. As described above, the accommodating portion frame 431 is provided with the curved portion 431*d*. In the toner cartridge 400C, the toner accommodating portion screw member 435 is disposed in a space formed by adding a curved portion of the leveling portion 433*a*1 and the curved portion 431*d* of the accommodating portion frame 431 to each other (i.e., a region surrounded by these two curved portion) in the feeding direction. Accordingly, inside the region formed by the two curved portions, a feeding amount of the toner fed to the discharge opening 431*a* by the toner accommodating portion screw member 435 can be maintained at a constant level. The space formed by adding the leveling portion 433*a*1 and the curved portion 431*d* of the accommodating portion frame 431 to each other (i.e., the region surrounded by the two curved portions) is referred to as a feeding path 430*c*.

Further, a length of the leveling portion 433*a*1 along the feeding direction may desirably be a length corresponding to two pitches (corresponding to consecutive two mountains) or more of the screw portion of the toner accommodating portion screw member 435. A reason for this is that for the feeding of the toner by the toner accommodating portion screw member 435, backflow of the toner is suppressed by the air supplied by a pump 437*a* described later.

As described above, the toner cartridge 400C is provided with the partition wall 431*c* and the leveling portion 433*a*1, so that it is possible to reduce variation in amount of the toner fed to the discharge opening 431*a* of the accommodating portion frame 431.

Next, an input constitution of an external driving force provided in the toner cartridge 400C will be described. As shown in FIGS. 45 and 46, the toner cartridge 400C includes a pump unit 437, the stirring drive inputting portion 438, the pump/screw drive inputting portion 439, and the driving-side toner cartridge side cover 450 for covering the pump 437*a* provided to the pump unit 437. The above-described constitutions are disposed on the side (driving side) where the stirring drive inputting portion 438 of the toner cartridge 400C. On the other hand, when a side opposite from the driving side (in the longitudinal direction of the toner cartridge 400C) is the non-driving side, on the non-driving side, the above-described residual toner accommodating portion 440 is disposed. Details of respective portions constituting the residual toner accommodating portion 440 will be described later.

As shown in FIGS. 45 to 47 and 50, the pump unit 437 includes the pump 437*a* as a volume fluctuation means, a cam gear 437*b* for expanding and contracting the pump 437*a*, and a link arm 437*c*. Further, the pump/screw drive inputting portion 439 is a driving means for driving the pump 437*a* and the toner accommodating portion screw member 435.

Each of the pump unit 437, the stirring drive inputting portion 438, and the pump/screw drive inputting portion 439 is disposed outside the toner accommodating portion 430. Of these portions, the stirring drive inputting portion 438 and the pump/screw drive inputting portion 439 are rotatably supported outside the toner accommodating portion 430.

The pump/screw drive inputting portion 439 is a first driving force receiving member according to this embodiment and is provided with a projected-shaped pump/screw coupling portion 439*a* exposed more than the driving-side toner cartridge side cover 450. The pump/screw coupling portion 439*a* is a driving force receiving portion (first driving force receiving portion) according to this embodiment.

Further, the stirring drive inputting portion 438 is a second driving force receiving portion according to this embodiment and is provided with a projected-shaped drive stirring coupling portion 438*a* exposed more than the driving-side toner cartridge side cover 450. The drive stirring coupling portion 438*a* is a driving force receiving portion (second driving force receiving portion) according to this embodiment.

The pump/screw coupling portion 439*a* and the drive stirring coupling portion 438*a* are capable of obtaining the driving forces from the printer main assembly 400A side in a state in which these portions 439*a* and 438*a* are engaged with a first coupling member and a second coupling member, respectively, of the printer main assembly 400A corresponding to shapes of these portions 439*a* and 438*a*, respectively. As shown in FIG. 50, a rotational drive axis of the pump/screw drive inputting portion 439 is the above-described axis G1. The axis G1 is disposed in substantially parallel to the rotational axis 411*b* of the photosensitive drum 411 of the process cartridge 400B, and a rotational drive axis of the stirring drive inputting portion 438.

The cam gear 437*b* of the pump unit 437 is provided with a gear portion 437*b*1 for inputting a rotational driving force outputted from the pump/screw coupling portion 439*a*. Accordingly, the gear portion 437*b*1 (i.e., the cam gear 437*b*) is rotated by the driving force transmitted from the pump/screw coupling portion 439*a*. Further, the link arm 437*c* connected to the cam gear 437*b* is reciprocated in the direction of the axis G1 by rotation of the cam gear 437*b*. A contact surface of the link arm 437*c* with the pump 437*a* is positioned outside the toner accommodating portion 430 more than the pump 437*a* in the axis G1 direction, so that the pump 437*a* is expanded and contracted along the axis G1 by reciprocation of the above-described link arm 437*c*. That is, an expansion and contraction direction of the pump 437*a* is substantially parallel to the axis G1.

As shown in FIGS. 50 and 51, the toner accommodating portion 430 includes the nozzle member 433*b* connected to the pump 437*a*. Further, below the discharge opening 431*a*, a toner discharge opening 434*a* of the shutter member 434 is provided. The shutter member 434 is a feeding pipe member for the laser printer 401 according to this embodiment and is rotatably mounted to the toner cartridge 400C. Further, the toner discharge opening 434*a* is open toward the outside of the toner cartridge 400C.

As shown in FIGS. 51 and 53, the nozzle member 433*b* is provided with a pump-side opening 433*b*1 and a toner-side opening 433*b*2. The nozzle member 433*b* has a shape such that a space obtained by connecting a space extending from the pump-side opening 433*b*1 in the direction of the axis G1 and a space extending from the toner-side opening 433*b*2 in a direction crossing the axis G1, i.e., extending in a direction crossing the feeding direction of the toner accommodating portion screw member 435. As shown in FIG. 53, a cross-sectional area of the toner-side opening 433*b*2 is smaller than a cross-sectional area of the pump-side opening 433*b*1.

As shown in FIG. 51, the toner-side opening 433*b*2 is disposed above the discharge opening 431*a*. Further, the toner-side opening 433*b*2 is disposed between a rotation center of the toner accommodating portion screw member 435 and the discharge opening 431*a* in a height direction of the toner cartridge 400C. Further, as shown in FIG. 51, the nozzle member 433*b* is disposed so that a part of the discharge opening 431*a* overlaps with an extension line of the toner-side opening 433*b*2 as viewed in the direction of the axis G1, i.e., in the Z direction.

A flow of the air generated by a contraction operation of the pump 437*a* flows from the pump-side opening 433*b*1 to the toner-side opening 433*b*2. At this time, the cross-sectional area of the toner-side opening 433*b*2 is smaller than the cross-sectional area of the pump-side opening 433*b*1, and therefore, a speed (flow speed) of the air flowing through the toner-side opening 433*b*2 becomes fast. The air flowing through the toner-side opening 433*b*2 and the toner fed to the discharge opening 431*a* by the toner accommodating portion screw member 435 are mixed with each other. Then, the toner mixed with the air is carried to the toner discharge opening 434*a* through the discharge opening 431*a* via a shutter entrance 434*g* described later, and is supplied to the process cartridge 400B.

As described above, in the toner cartridge 400C, the toner-side opening 433*b*2 of the nozzle member 433*b* is directed in the direction crossing the feeding direction of the toner accommodating portion screw member 435 at a position spaced from the discharge opening 431*a*. By this constitution, even when the user directs the pump 437*a* of the toner cartridge 400C in a lower direction, it is possible to suppress that the toner enters the pump 437*a*. When the toner enters the inside of the pump 437*a*, a force required to expand and contract the pump 437*a* increases. In order to solve this problem, the laser printer 401 according to this embodiment employs the above-described constitution, so that an amount of the toner entering the pump 437*a* can be reduced, and therefore, an increase in torque exerted on the pump/screw coupling portion 439*a* can be suppressed.

Further, the toner cartridge 400C is, as shown in FIG. 51, provided with a supply chamber 430*b* along the feeding direction of the toner accommodating portion screw member 435 in order to efficiently send the air, generated by the contraction operation of the pump 437*a*, to the toner discharge opening 434*a* via the discharge opening 431*a*. Specifically, in the feeding direction of the toner accommodating portion screw member 435, on a side downstream of the leveling portion 433*a*1, the supply between 430*b* which is defined by the partition member 433*a*, the nozzle member 433*b*, the accommodating portion lid 432, and the accommodating portion frame 431 and which is partitioned flow the toner accommodating chamber 430*a* is provided. As regards a size of a cross-sectional area, of the toner accommodating chamber 430*a*, the supply chamber 430*b*, and the feeding path 430*c*, the toner accommodating chamber 430*a* is largest, the supply chamber 430*b* is second largest, and the feeding path 430*c* is smallest.

The shutter member 434 is a toner feeding means including a toner feeding nozzle (toner feeding member) of the toner cartridge 400C and is provided with the conveying path CP and a discharging portion used when the toner is supplied from the toner cartridge 400C toward the process cartridge 400B side. The shutter member 434 is rotatable depending on the mounting operation of the toner cartridge 400C to the printer main assembly 400A, and by this rotation, the shutter member 434 is capable of opening and closing the toner discharge opening 434*a* described later. Specifically, the shutter member 434 can change in state between a state (open side) in which the toner can be discharged and a state (closed state) in which the toner is sealed by rotation thereof. The shutter member 434 is capable of controlling supply and non-supply of the toner to the process cartridge 400B by being switched between the open state and the closed state. The closed state of the shutter member 434 is a state in which a path from the discharge opening 431*a* of the accommodating portion frame 431 to the toner discharge opening 434*a* of the shutter member 434 is blocked. That is, the closed state of the shutter member 434 is a state in which the discharge opening 431*a* of the accommodating portion frame 431 is closed.

As shown in FIGS. 51 and 52, the shutter member 434 includes the shutter entrance 434*g* which receives the toner dropped through the discharge opening 431*a* formed in the toner accommodating portion 430, the toner discharge opening 434*a*, the feeding portion 434*b* for feeding the toner from the shutter entrance 434*g* to the toner discharge opening 434*a*, and an edge portion 434*d*. The toner discharge opening 434*a* functions as a toner discharging portion of the toner cartridge 400C and is an opening formed by the edge portion 434*d*. That is, a portion for forming a free end part of a cylindrical portion formed by the feeding portion 434*b* and a portion of the toner discharge opening 434*a* is the edge portion 434*d*.

A state shown in FIG. 52 is the open state of the shutter member 434. In this embodiment, the discharging direction of the toner discharged through the toner discharge opening 434*a* is a discharging direction E1 and is indicated by a broken arrow in FIG. 52. Further, the feeding direction of the toner fed via the feeding portion 434*b* is a feeding direction CV and is indicated by a chain double-dashed line in FIG. 52. In this embodiment, as described later, the feeding portion 434*b* is bent at an intermediary portion, and therefore the feeding direction CV is indicated by being divided into a plurality of components (first feeding direction CV1 and second feeding direction CV2).

As shown in FIG. 52, in a state in which the toner cartridge 400C is mounted to the printer main assembly 400A, a part of the feeding portion 434*b* extends in a discharge which crosses the axis G1 and in which the toner is spaced from the axis G1. That is, the first feeding direction CV1 (first direction) of the toner by the feeding portion 434*b* includes a component which crosses the axis G1 of the pump/screw drive inputting portion 439 and in which the toner is spaced from the axis G1.

Further, another part of the feeding portion 434*b* extends in a direction which is parallel to the axis G1 which is the rotational drive axis of the pump/screw drive inputting portion 439 and in which the toner is spaced from the pump/screw coupling portion 439*a*. That is, the second feeding direction CV2 of the toner by the feeding portion 434*b* includes a component of a direction which is parallel to the axis G1 of the pump/screw drive input portion 439 and in which the toner is spaced from the pump/screw coupling portion 439*a* for receiving the driving force for feeding the toner.

Then, the toner discharged through the toner discharge opening 434*a* is discharged in the discharging direction in which the toner is spaced from the pump/screw coupling portion 439*a*. That is, the discharging direction E1 (second direction) of the toner discharged through the toner discharge opening 439*a* includes a component of the discharge which is parallel to the axis G1 of the pump/screw coupling portion 439*a* and in which the toner is spaced from the pump/screw coupling portion 439*a* for receiving the driving force for feeding the toner. The component included in the toner discharging direction in the toner discharge opening 434*a* and the component included in the second feeding direction relating to a path from the feeding portion 434*b* to the toner discharge opening 434*a* at least partially coincide with each other.

Next, referring to parts (a) and (b) of FIG. 55, details of the toner conveying path CP in the shutter member 434 will be described. The toner conveying path CP is a path along which the toner moves in the feeding (conveying) portion 434*b* of the shutter member 434. As shown in parts (a) and (b) of FIG. 55, in a cross section of the feeding portion 434*b* perpendicular to the conveying path CP indicated by a solid line arrow, a center-of-gravity point 8 of a cross section is assumed as an arbitrary position in the conveying path CP. However, as regards a portion where the cross section of the feeding portion 434*b* is partially lacked, it is difficult to define an accurate position of the center-of-gravity point g. Accordingly, in this embodiment, a mostupstream point of the conveying path CP where there is no lack in cross section is defined as a starting point, and a mostdownstream point of the conveying path CP is defined as an end point. Incidentally, a cross-sectional view of the feeding portion 434*b* relating to the conveying path CP of the toner is not limited to a circular shape. For example, as the cross-sectional view of the feeding portion 434*b*, any cross-sectional view such that an outer edge of the cross section of the feeding portion 434*b* is interrupted or such that there is an abrupt shape change, or the like may be used.

In this embodiment, a line continuously connecting center-of-gravity points in continuous cross section of the conveying path CP of the toner is defined as a toner conveying (feeding) line (indicated by an arrow of a solid line in FIG. 55). The toner conveying line is a line showing a main path in the conveying path CP of the toner and passes through approximate centers of the respective cross sections in general, but is not limited thereto at a position where there is an abrupt angle change in shape of the feeding portion 434*b*. A direction of the toner conveying line is a toner feeding (conveying) direction in each point. Further, a second conveying direction CV2 of the toner in an end point of the toner conveying path CP is synonymous with a discharging direction E1 of the toner.

As described above, the toner discharged through the toner discharge opening 434*a* is discharged toward the discharging direction E1 which is parallel to the axis G1 and which includes a component in a direction spaced from the pump/screw drive inputting portion 439 (see FIG. 52). By this constitution, the laser printer 401 according to this embodiment is capable of suppressing continuation, with the toner, of a coupling portion of the printer main assembly 400A engaging with the pump/screw coupling portion 439*a* of the toner cartridge 400C.

As shown in FIG. 45, the shutter member 434 is disposed on a side where the pump/screw drive inputting portion 439 of the toner accommodating portion 430 in the longitudinal direction (direction parallel to the above-described Z-axis) of the toner cartridge. More specifically, the shutter member 434 in this embodiment is positioned on a side where the pump/screw drive inputting portion 439 is provided relative to a center position of the toner accommodating portion 430 along at least the Z-axis. Accordingly, in the toner cartridge 400C according to this embodiment, loss of a discharging force when the toner is discharged by a volume fluctuation of the pump 437*a* can be decreased, so that upsizing of a discharging mechanism is prevented.

Next, details of the residual toner accommodating portion 440 will be described. As shown in FIGS. 45, 46, and 54, the residual toner accommodating portion 440 is provided with a residual toner accommodating portion frame 441, a residual toner accommodating lid 442, and a residual toner shutter member 443. An outer configuration of the residual toner accommodating portion 440 is formed by the residual toner accommodating portion frame 441 and the residual toner accommodating lid 442.

The residual toner accommodating lid 442 is provided with a residual toner receiving opening 442*a*. As a shutter means for opening and closing this residual toner receiving opening 442*a*, the residual toner shutter member 443 functions.

The residual toner shutter member 443 is capable of opening and closing the above-described residual toner receiving opening 442*a* by being moved in a J direction shown in FIG. 54 in interrelation with mounting and dismounting of the toner cartridge 400C to and from the printer main assembly 400A. A state shown in FIG. 54 is a state in which the residual toner shutter member 443 is open.

Inside the residual toner accommodating portion 440, a first residual toner accommodating screw 444, a residual toner accommodating portion gear train 445, a partition member 446, and a second residual toner accommodating screw 447 are provided. The first residual toner accommodating screw 444 feeds the residual toner, received (dropped) through the residual toner receiving opening 442*a*, in a direction (direction parallel to a broken line shown in FIG. 45) of the rotational axis 411*b* of the photosensitive drum 411. The second residual toner accommodating screw 447 obtains drive from the first residual toner accommodating screw 444 and conveys the residual toner, fed by the first residual toner accommodating screw 444, to an upper side of the toner cartridge 400C. That is, the first residual toner accommodating screw 444 and the second residual toner accommodating screw 447 are residual toner feeding (conveying) members in this embodiment.

As a driving force of the residual toner accommodating portion 440, first, a driving force inputted from the above-described stirring drive inputting portion 438 is transmitted to a toner accommodating portion non-driving-side gear 448 (see FIGS. 45 and 46) positioned on a non-driving side of the toner accommodating portion 430 via the toner accommodating portion stirring and feeding unit 436. Then, the driving force is transmitted from the toner accommodating portion non-driving-side gear 448 to the first residual toner accommodating screw 444 via the residual toner accommodating portion gear train 445.

By the above-described constitution, even in the case where the pump/screw drive inputting portion 439 is not driven, the stirring drive inputting portion 438 can be driven.

In other words, the toner cartridge 400C is capable of independently driving the pump/screw drive inputting portion 439 and the stirring drive inputting portion 438. Accordingly, even when the toner is not supplied to the toner cartridge 400C, the toner cartridge 400C is capable of driving the first residual toner accommodating screw 444 and the second residual toner accommodating screw 447 of the residual toner accommodating portion 440. That is, even in a state in which the toner is not supplied, the toner cartridge 400C is capable of collecting (maintaining a collectable state of) the residual toner from the process cartridge 400B.

Further, means for receiving the driving force inputted from the printer main assembly 400A side (driving force receiving portions) are gathered on one end side of the toner cartridge 400C (with respect to the longitudinal direction), and therefore, it is possible to suppress that a gear train of the printer main assembly 400A is complicated. Further, by using the toner accommodating portion stirring and feeding unit 436, the driving force for driving the respective portions of the toner cartridge 400C is transmitted from one end to the other end of the accommodating portion frame 431, so that the drive can be transmitted to the residual toner accommodating portion 440 without increasing the number of components for driving the driving force. By employing the above-described constitution, the laser printer 401 according to this embodiment is capable of efficiently accommodating the residual toner in the toner cartridge 400C while suppressing upsizing thereof in the longitudinal direction (direction parallel to the drive axis of the toner cartridge 400C and the rotational axis 411*b* of the photosensitive drum 411).

[Peripheral Constitution of Shutter Member]

Subsequently, details of a peripheral constitution of the shutter member 434 provided on the toner cartridge 400C will be described with reference to FIG. 56 to part (b) of FIG. 61. FIG. 56 is an exploded perspective view showing a shutter unit 480 of the toner cartridge 400C. FIG. 57 is a perspective view showing the shutter member 434. FIG. 58 includes a front view, a left-side view, a right-side view, a bottom view, and sectional views of the shutter member 434. Part (a) of FIG. 59 is a front view showing a state in which the shutter member 434 of the toner cartridge 400C seals the toner, and part (b) of FIG. 59 is a partially enlarged view thereof. FIG. 60 includes a front view, a left-side view, a right-side view, a bottom view, and sectional views. Part (a) of FIG. 6 is a side view showing a state in which the shutter member 434 of the toner cartridge 400C seals the toner, and part (b) of FIG. 61 is a sectional view showing a k-k cross section of part (a) of FIG. 61.

As shown in FIG. 56, the toner cartridge 400C includes the shutter unit 480 including the shutter member 434. The shutter unit 480 includes the shutter member 434, the shutter frame 610, a shutter seal (sealing) member 611, a torsion coil spring 613, a shutter supporting member 609, a cylindrical member 612, and a seal (sealing) member 614.

The shutter supporting member 609 is mounted to the shutter frame 610 and is provided with a supporting hole portion 609*a*. The shutter frame 610 is provided with an opening 610*c* and a boss-shaped shutter supporting portion 610*b*. The shutter member 434 includes, as shown in FIGS. 57 and 58, a shutter cylindrical portion 434*j* which extends along the rotational axis R1 and which has a cylindrical shape, a discharge projection 434*k* projected from the shutter cylindrical portion 434*j* toward one side in a radial direction, and an arm portion 434*h* projected from the shutter cylindrical portion 434*j* toward the other side in the radial direction.

At one end portion of the shutter cylindrical portion 434*j*, an engaging portion 434*e* engaging with the shutter supporting portion 610*b* provided to the shutter frame 610 is provided, and at the other end portion of the shutter cylindrical portion 434*j*, a shutter entrance (inlet) 434*g* is provided. The engaging portion 434*e* does not communicate with the feeding portion 434*b* inside the shutter cylindrical portion 434*j*. The shutter cylindrical portion 434*j* of the shutter member 434 is supported by the supporting hole portion 609*a* of the shutter supporting member 609. By this, the shutter member 434 is rotatably supported about the rotational axis R1 by the shutter frame 610 and the shutter supporting member 609.

The discharge projection 434*k* of the shutter member 434 is provided with the toner discharge opening 434*a* communicating with an internal space (feeding portion 434*b*) of the shutter cylindrical portion 434*j*. The feeding portion 434*b* from the toner discharge opening 434*a* to the shutter entrance 434*g* has an L-shape. Further, the discharge projection 434*k* is provided with an actuation projection 434*f*, a positioning surface 434*i*, and a circumferential surface 434*m*. To the circumferential surface 434*m*, as shown in FIG. 56, a shutter seal member 611 is stuck. The shutter seal member 611 is provided with a communication opening 611*a*, and the communication opening 611*a* communicates with the toner discharge opening 434*a* of the shutter member 434.

The arm portion 434*h* is provided on a pump unit 437 side with respect to the rotational axis R1 as viewed in the direction of the rotational axis R1. The actuation projection 434*f* is provided on a side opposite from the pump unit 437 with respect to the rotational axis R1 as viewed in the direction of the rotational axis R1. That is, on the basis of the rotational axis R1 of the shutter member 434, the arm portion 434*h* and the actuation projection 434*f* are in a positional residual providing a point symmetry. By this constitution, when the arm portion 434*h* and the actuation projection 434*f* which are independent of each other are interrelated with the respective portions on the process cartridge 400B side, these members (portions) do not obstruct mutual operations.

A coil portion of the torsion coil spring 613 is inserted into the shutter cylindrical portion 434*j*. One arm portion of the torsion coil spring 613 is locked by the arm portion 434*h* of the shutter member 434, and the other arm portion of the torsion coil spring 613 is locked by the shutter supporting member 609. For this reason, the shutter member 434 is urged by the torsion coil spring in a direction opposite to an arrow H1 direction about the rotational axis R1.

Then, as shown in parts (a) and (b) of FIG. 59, the arm portion 434*h* of the shutter member 434 abuts against an opening end 610*c*1 of the opening 610*c* of the shutter frame 610, so that the shutter member 434 is kept in the closed state. A free end portion 434*h*1 of the arm portion 434*h* is exposed through the opening 610*c*.

As shown in FIG. 56, the shutter supporting member 609 is provided with a flange portion 609*b*, and with the flange portion 609*b*, the seal member 614 is assembled. The seal member 614 is provided with through hole 614*a*. Further, the cylindrical member 612 is fixed to the shutter supporting member 609 via the seal member 614. The shutter cylindrical portion 434*j* of the shutter member 434 penetrates through the coil portion of the torsion coil spring 613, the supporting hole portion 609*a* of the shutter supporting member 609, and the through hole 614*a* of the seal member 614, and then is inserted to the inside of the cylindrical member 612. Particularly, the shutter entrance 434*g* provided at one end portion of the shutter cylindrical portion 434*j* is in a state in which the shutter entrance 434*g* is inserted to the inside of the cylindrical member 612.

The cylindrical member 612 is provided with the opening 612*a* which opposes to the discharge opening 431*a* (see FIG. 48) formed in the accommodating portion frame 431 and which opens upward. The toner discharged from the accommodating portion frame 431 via the discharge opening 431*a* drops toward the opening 612*a* of the cylindrical member 612.

In FIGS. 56 and 57 and part (b) of FIG. 59, the shutter member 434 is in a closed state. At this time, the toner discharge opening 434*a* of the shutter member 434 is directed upward. In other words, the toner discharge opening 434*a* is urged by the torsion coil spring 613 so that the toner discharge opening 434*a* is positioned on a side opposite to the direction of gravity.

Further, the shutter entrance 434*g* of the shutter member 434 is directed in substantially horizontal direction. For this reason, in the case where the shutter member 434 is in a closed state, the shutter entrance 434*g* of the shutter member 434 and the opening 612*a* of the cylindrical member 612 do not communicate with each other.

Further, as shown in FIG. 60 and parts (a) and (b) of FIG. 61, a part of an inner peripheral surface of the shutter frame 610 is provided with a seal contact surface 610*a* having an arcuate shape about the rotational axis R1. In the case where the shutter member 434 is in the closed state, the shutter seal member 611 stuck to the shutter member 434 contacts the seal contact surface 610*a*. For this reason, the toner discharge opening 434*a* of the shutter member 434 and the communication opening 611*a* of the shutter seal member 611 are shielded by the seal contact surface 610*a*, so that it is possible to prevent leakage of the toner from the toner discharge opening 434*a*.

Further, as shown in part (b) of FIG. 59 and FIG. 60, the shutter frame 610 is provided with a rough guide rib 610*d*. When the toner is supplied from the toner cartridge 400C to the process cartridge 400B, the toner cartridge 400C is mounted on the printer main assembly 400A. In a state in which the toner cartridge 400C is mounted on the printer main assembly 400A, the toner cartridge 400C is in a state in which the toner cartridge 400C has already been mounted on the process cartridge 400B. At this time, the toner cartridge 400C is guided toward the process cartridge 400B by the rough guide rib 610*d*.

In a process in which the toner cartridge 400C is mounted on the process cartridge 400B, the 434*h*1 of the arm portion 434*h* of the shutter member 434 is pressed by an unshown guiding surface of the process cartridge 400B. By this, the shutter member 434 is rotated about 90° in an arrow H1 direction about the rotation axis R1 against the opening force of the torsion coil spring 613. Further, the positioning surface 434*i* of the shutter member 434 is pressed by the process cartridge 400B, so that the shutter member 434 is slightly rotated in the arrow H1 direction and is in an open state.

Further, in the process in which the toner cartridge 400C is mounted on the process cartridge 400B, the actuation projection 434*f* of the shutter member 434 moves an unshown receiving-side shutter member, provided on the toner cartridge 400C, from a closed state to an open state. By this, the toner discharge opening 434*a* provided in the shutter member 434 of the toner cartridge 400C communicates with the supply opening provided in the process cartridge 400B, so that a supplying operation of the toner from the toner cartridge 400C to the process cartridge 400B becomes possible.

Further, when the toner cartridge 400C is dismounted from the process cartridge 400B, the receiving-side shutter member provided on the process cartridge 400B and the shutter member 434 provided on the toner cartridge 400C are returned to the closed states.

As described above, the shutter member provided on each of the process cartridge 400B according to this embodiment and the toner cartridge 400C has a constitution in which the shutter member performs an opening and closing operation of the toner supply opening, and therefore, it is possible to prevent that the toner unnecessarily flows out to the outside. Further, the shutter member 434 in this embodiment only rotates in a direction in which the toner discharge opening 434*a* is directed upward or sideward on the basis of up-down and left-right directions of the printer main assembly 400A. Accordingly, the toner cartridge 400C is capable of preventing unintentional toner flowing-out from the toner discharge opening 434*a* by the opening and closing operation of the shutter member and the influence of the gravity.

[Outer Appearance Structure of Toner Cartridge]

Next, referring to FIG. 62 to part (b) of FIG. 63, a structure as to an outer appearance of the toner cartridge 400C will be described. FIG. 62 is a perspective view of the toner cartridge 400C as viewed from below, part (a) of FIG. 63 is an exploded perspective view of the toner cartridge 400C as viewed from below, and part (b) of FIG. 63 is an exploded perspective view of the toner cartridge 13 as viewed from above. As shown in FIG. 62, parts (a) and (b) of FIG. 63, on a rear surface side of the accommodating portion frame 431 of the toner cartridge 400C, i.e., on a downstream side in the X2 direction, an elastic seal 140, a sealing tape 141, and the shutter unit 480 are mounted to the accommodating portion frame 431.

An installation surface 431*f* on the rear surface side of the accommodating portion frame 431 is provided with the discharge opening 431*a* through which the toner in the accommodating portion frame 431 is discharged, and the elastic seal 140, the sealing tape 141, and a cylindrical member 612 of the shutter unit 480 are disposed so as to be superposed on the installation surface 431*f* with each other in the Y direction. That is, the elastic seal 140 is disposed between the installation surface 431*f* and the sealing tape 141 in the Y direction, as the sealing tape 141 as a sealing member is disposed between the elastic seal 140 and the cylindrical member 612 in the Y direction. The shutter unit 480 is fixed to the accommodating portion frame 431 by screws 150 in a state in which the elastic seal 140 and the sealing tape 141 are sandwiched between itself and the accommodating portion frame 431.

Incidentally, the sealing tape 141 has the same constitution as the sealing tape 88 described in the first embodiment, and therefore, will be omitted from description. A step of applying an adhesive onto the sealing tape 141 or the like step is also similar to the step in the first embodiment. The sealing tape 141 includes a grip portion 141*c* gripped by the user and a sticking surface 141*d* having an adhesive force by applying the adhesive thereto. Further, in a state in which the sealing tape 141 is assembled together with the elastic seal 140 and the shutter unit 480 to the accommodating portion frame 431, the sealing tape 141 includes a fold-back portion 141*e* folded back downward and in the X1 direction from the sticking surface 141*d* side, and includes a bent portion 141*f*. The sealing tape 141 is bent substantially at right angles in the bent portion 141*f*.

Further, the sealing tape 141 is constituted by a material such as a resin film or paper, but may be constituted by any material when this material has certain strength. Further, the sealing tape 141 is structured to have no air permeability, so that the toner cannot pass through the sealing tape 141.

Part (a) of FIG. 64 is a perspective view showing the elastic seal 140, part (b) of FIG. 64 is a perspective view of the shutter unit 480 as viewed from below, and part (c) of FIG. 64 is a perspective view of the shutter unit 480 as viewed from above. As shown in part (a) of FIG. 64, the elastic seal 140 includes a surface layer 140*a*, an adhesive layer 140*b*, and an elastic layer 140*c* between the surface layer 140*a* and the adhesive layer 140*b*. Further, the elastic seal 140 is provided with a through hole 140*d* penetrating through the surface layer 140*a*, the adhesive layer 140*b*, and the elastic layer 140*c*, so that the toner discharged through the discharge opening 431*a* (see part (a) of FIG. 63) of the toner cartridge 400C is capable of passing through the through hole 140*d*.

The adhesive layer 140*b* is constituted by a double-side tape or the like, for example, and is adhesively bonded to the installation surface 431*f* as an outer surface of the accommodating portion frame 431. The elastic layer 140*c* is an elastic member having the air permeability and is constituted by a foamed urethane, for example. The surface layer 140*a* may suitably constituted by a material, such as high-density polyethylene, which is not readily relatively bonded.

As shown in parts (a) and (b) of FIG. 64, the shutter frame 610 of the shutter unit 480 is provided with two positioning holes 610*e* (one of them is not shown) and two holes 610*f* through which the screws 150 pass. The cylindrical member 612 of the shutter unit 480 has a nipping surface 612*b* in which an opening 612*a* is provided. Incidentally, the cylindrical member in this embodiment is fixed to the shutter supporting member 609 as described above, and is an immovable member in a state in which the shutter unit 480 is fixed to the accommodating portion frame 431. That is, the cylindrical member 612 is immovable relative to the accommodating portion frame 431. The opening 612*a* of the cylindrical member 512 communicates with the shutter entrance 434*g* (see FIG. 57) of the shutter member 434 when the shutter member 434 is in the open state as described above. In part (c) of FIG. 64, the shutter member 434 is in the closed state, so that the opening 612*a* and the shutter entrance 434*g* do not communicate with each other.

FIG. 65 is a perspective view showing a state in which the elastic seal 140 and the sealing tape 141 are assembled to the accommodating portion frame 431. As shown in FIG. 65, the adhesive layer 140*b* of the elastic seal 140 is bonded to the installation surface 431*f* of the accommodating portion frame 431. At this time, the discharge opening 431*a* and the through hole 140*d* of the elastic seal 140 are superimposed on each other. Each of the discharge opening 431*a*, the through hole 140*d*. and the opening 612*a* (see part (c) of FIG. 64) is a rectangular hole.

Then, the sticking surface 141*d* of the sealing tape 141 is bonded to the surface layer 140*a* of the elastic seal 140. At this time, the sticking surface 141*d* is disposed so as to cover entirety of the through hole 140*d* of the elastic seal 140. To the sticking surface 141*d*, the adhesive may be applied onto a peripheral portion of the through hole 140*d* including a region overlapping with the through hole 140*d* as viewed in the Y direction, and as regards the region overlapping with the through hole 140*d* as viewed in the Y direction, the adhesive needs not to be applied. Further, the accommodating portion frame 431 is provided with two positioning bosses 431*g* and two screw holes 431*h*.

FIG. 66 is a perspective view showing a state in which the shutter unit 480 is being assembled to the accommodating portion frame 431. FIG. 67 is a perspective view showing a state in which the elastic seal 140, the sealing tape 141, and the shutter unit 480 are assembled to the accommodating portion frame 431.

As shown in FIG. 66, the sealing tape 141 stuck to the elastic seal 140 is folded at the fold-back portion 141*e*, and is bent at substantially right angles along a shape of the accommodating portion frame 431 in a bending portion 141*f*. The fold-back portion 141*e* is positioned between the sticking surface 141*d* and the grip portion 141*c* in the longitudinal direction of the sealing tape 141.

The shutter unit 480 is positioned to the accommodating portion frame 431 by inserting the two positioning bosses 431*g* of the accommodating portion frame 431 into the positioning holes 610*e* of the shutter frame 610. In this state, the screws 150 penetrating through the holes 610*f* of the shutter frame 610 are fastened into the screw holes 431*h* of the accommodating portion frame 431, so that the shutter unit 480 is fixed to the accommodating portion frame 431.

In a state in which the shutter unit 480 is fixed to the accommodating portion frame 431, the nipping surface 612*b* of the cylindrical member 612 of the shutter unit 480 is positioned below the elastic seal 140 through the folded-back sealing tape 141. Further, the nipping surface 612*b* of the cylindrical member 612 contacts the sealing tape 141 until the sealing tape 141 is peeled off from the surface layer 140*a* of the elastic seal 140. Then, when the nipping surface 612*b* contacts the surface layer 140*a* when the sealing tape 141 is peeled off from the surface layer 140*a* of the elastic seal 140.

In a state in which the elastic seal 140, the sealing tape 141, and the shutter unit 480 are assembled to the accommodating portion frame 431, the entirety of the through hole 140*d* of the elastic seal 140 is covered with the sealing tape 141. Further, in the Z direction, a width of the sealing tape 141 is larger than a diameter of the through hole 140*d*, and a width of the nipping surface 612*b* of the cylindrical member 612 may preferably be wider than the width of the sealing tape 141.

By this, the through hole 140*d* is securely covered with the sealing tape 141, so that the sealing tape 141 is securely pressed by the nipping surface 612*b* of the cylindrical member 612. The sealing tape 141 is capable of taking a sealing state in which the sealing tape 141 seals the toner discharged through the through hole 140*d* of the elastic seal 140 and a discharge state in which the toner discharged through the through hole 140*d* is discharged through the discharge opening 431*a*. As shown in FIG. 67, in a state in which the elastic seal 140, the sealing tape 141, and the shutter unit 480 are assembled to the accommodating portion frame 431, the grip portion 141*c* of the sealing tape 141 is exposed to the outside of the toner cartridge 400C.

Next, referring to parts (a) and (b) of FIG. 68, a positional relationship between the cylindrical member 612, the sealing tape 141, and the elastic seal 140 will be described. Part (a) of FIG. 68 is a front view showing the toner cartridge 400C, and part (b) of FIG. 68 is a sectional view showing a 68B-68B cross section of part (a) of FIG. 68.

As shown in parts (a) and (b) of FIG. 68, in the toner cartridge 400C of this embodiment, from the installation surface 431*f* of the accommodating portion frame 431 toward below, the elastic seal 140, the sealing tape 141, and the cylindrical member 612 are arranged in a named order. The elastic seal 140 covers the periphery of the discharge opening 431*a* so that the through hole 140*d* overlaps with the discharge opening 431*a* of the accommodating portion frame 431. The sticking surface 141*d* of the sealing tape 141 covers the through hole 140*d* of the elastic seal 140, and the nipping surface 612*b* of the cylindrical member 612 covers a surface of the sealing tape 141 on a side opposite from the sticking surface 141*d*.

Here, a gap between the installation surface 431*f* of the accommodating portion frame 431 and the nipping surface 612*b* of the cylindrical member 612 in the Y direction is narrower than the sum of thickness of the elastic seal 140 in a natural state and the sealing tape 141. In this embodiment, the elastic seal 140 and the sealing tape 141 are disposed between the installation surface 431*f* and the nipping surface 612*b* of the cylindrical member 612, so that the elastic seal 140 is in a crushed state between the installation surface 431*f* and the sealing tape 141. In other words, the elastic seal 140 is crushed by the installation surface 431*f* of the accommodating portion frame 431 and the nipping surface 612*b* of the cylindrical member 612.

By this, the sealing tape 141 is pressed downward by an elastic force of the elastic seal 140, and the sealing tape 141 receives the reaction force from the nipping surface 612*b* of the cylindrical member 612, so that the sealing tape 141 is pressed upward by the nipping surface 612*b*. That is, the sticking surface 141*d* of the sealing tape 141 is nipped at a predetermined nipping pressure by the elastic seal 140 and the cylindrical member 612. Further, the cylindrical member 612 is provided so as to be immovable relative to the accommodating portion frame 431, so that it can be said that the cylindrical member 612 nips the sealing tape 141 with the predetermined nipping pressure in cooperation with the elastic seal 140 irrespective of the position of the cylindrical member 612. Further, it can also be said that the cylindrical member 612 as the nipping member and the urging member urges the elastic seal 140 via the sealing tape 141 in a compression direction (upward direction, Y1 direction) with the urging force F21.

The above-described positional relationship between the elastic seal 140, the sealing tape 141, and the cylindrical member 612 is unchanged even when the shutter member 434 rotates about the rotational axis R1.

In this embodiment, the nipping surface 612*b* of the cylindrical member 612 urges a whole area of the sticking surface 141*d* of the sealing tape 141 toward the elastic seal 140 side, but may also be structured to urge a part of the sticking surface 141*d* toward the elastic seal 140 side. The nipping surface 612*b* is suitable when urges the whole area of the sticking surface 141*d* of the sealing tape 141 toward the elastic seal 140 side since the nipping surface 612*b* can securely press the sticking surface 141*d* from below, but even in the case where the nipping surface 612*b* urges only a part of the sticking surface 141*d*, the effect of the present invention can be achieved.

[Peeling Operation of Sealing Tape]

Next, referring to parts (a) to (c) of FIG. 69, a peeling operation of the sealing tape 141 will be described.

Part (a) of FIG. 69 is a sectional view showing a state before the peeling operation of the sealing tape 141 is performed and such that the sticking surface 141*d* of the sealing tape 88 is stuck to the surface layer 140*a* of the elastic seal 140. Part (b) of FIG. 69 is a sectional view showing a state in which the sealing tape 141 is partially peeled off from the elastic seal 140 by the user. Part (c) of FIG. 69 is a sectional view showing a state in which the peeling operation of the sealing tape 141 is completed.

As shown in part (a) of FIG. 69, when the user pulls the sealing tape 141 in the Y2 direction by gripping the grip portion 141*c*, the sealing tape 141 starts to be peeled off gradually from the fold-back portion 141*e* thereof relative to the elastic seal 140. The sealing tape 141 is folded back at the fold-back portion 141*e* in a direction away from the surface layer 140*a* of the elastic seal 140. For this reason, when the user pulls the sealing tape 141 in the Y2 direction, at the fold-back portion 141*e*, a force by which the sticking surface 141*d* of the sealing tape 141 is separated from the elastic seal 140 in the Y2 direction, i.e., a peeling stress is exerted on the sealing tape 141. In general, as regards bonding of the adhesive or the like, shearing strength is high, but peeling strength is not higher that the shearing strength.

In this embodiment, peeling strength between the sticking surface 141*d* of the sealing tape 141 and the surface layer 140*a* of the elastic seal 140 is set smaller than peeling strength between the surface layer 140*a* and the elastic layer 140*c* of the elastic seal 140.

For this reason, the user can easily peel off the sealing tape 141 from the elastic seal 140. Further, the sealing tape 141 can be easily peeled off from the elastic seal 140, so that damage on the elastic seal 140 can be suppressed.

As shown in part (b) of FIG. 69, when the user pulls the sealing tape 141 in the Y2 direction, the fold-back portion 141*e* gradually moves in the X1 direction. For example, the fold-back portion moves from the fold-back portion 141*e* of part (a) of FIG. 69 to a fold-back portion 141*e*' of part (b) of FIG. 69. Then, the elastic seal 140 contacts the nipping surface 612*b* of the cylindrical member 612 from a portion where the sticking surface 141*d* of the sealing tape 141 is peeled off from the elastic seal 140. In this embodiment, the elastic seal 140 is compressed more than a thickness of the sealing tape 141 in a state in which the sealing tape 141 is not peeled off.

Then, as shown in part (c) of FIG. 69, when the peeling-off of the sealing tape 141 from the elastic seal 140 is completed, the whole area of the surface layer 140*a* of the elastic seal 140 contacts the nipping surface 612*b* of the cylindrical member 612. In this state, the discharge opening 431*a* of the accommodating portion frame 431, the through hole 140*d* of the elastic seal 140, and the opening 612*a* of the cylindrical member 612 communicate with each other, so that a gap between the accommodating portion frame 431 and the cylindrical member 612 is sealed by the elastic seal 140. By this, it is possible to suppress the toner accommodated inside the accommodating portion frame 431 from flowing out to the outside.

[Toner Discharge]

FIG. 70 is a sectional view showing a state in which the sealing tape 141 is peeled off from the elastic seal 140 and in which the toner cartridge 400C is mounted to the process cartridge 400B in the printer main assembly 400A (see FIG. 35). Generally, before the toner cartridge 400C is mounted to the process cartridge 400B, the sealing tape 141 is peeled off from the elastic seal 140. However, the sealing tape 141 may also be peeled off from the elastic seal 140 after the toner cartridge 400C is mounted to the process cartridge 400B.

In the toner cartridge 400C shown in FIG. 70, the sealing tape 141 is peeled and the shutter member 434 is in the open state, and therefore, the discharge opening 431*a*, the through hole 140*d*, and the shutter entrance 434*g* communicate with each other. To the supplying chamber 430*b*, by the toner accommodating portion screw member 435, the toner is fed from the feeding path 430*c*. When the pump 437*a* operates in this state, by air pressure P30 from the pump 437*a*, internal pressure of the supplying chamber 430*b* changes.

By this, the toner in the supplying chamber 430*b* passes together with the air through the discharge opening 431*a*, the through hole 140*d*, and the shutter entrance 434*g* in a named order, and is discharged to the shutter member 434. The toner discharged to the shutter member 434 in the open state passes through the conveying portion 434*b* and is discharged to the outside of the toner cartridge 400C through the toner discharge opening 434*a* (see FIG. 52). The toner discharged from the toner cartridge 400C is supplied to the process cartridge 400B.

FIG. 71 is a sectional view showing a situation such that the pump 437*a* is operated in a state in which the sealing tape 141 is not peeled off from the elastic seal 140 and in which the toner cartridge 400C is mounted to the printer main assembly 400A and the process cartridge 400B.

As shown in part FIG. 71, the case where the user mounts the toner cartridge 400C to the printer main assembly 400A and the process cartridge 400B without peeling off the sealing tape 141 from the elastic seal 140 will be considered. At this time, the shutter member 434 is in the open state.

Further, the drive is transmitted from the printer main assembly, 400A to the toner cartridge 400C, and when the pump 437*a* operates, the internal pressure of the supplying chamber 430*b* is increased by the air pressure of the pump 437*a*, so that the air passed through the discharge opening 431*a* and the through hole 140*d* pushes the sealing tape 141 downward. By this, a peeling force F23 acts on the sealing tape 141. The present invention is not limited to the case where the pump 437*a* operates, but the internal pressure of the supplying chamber 430*b* changes depending on an environment during transportation or during storage, such as the case where the toner cartridge 400C is transported by air or the like, for example.

On the other hand, between the elastic seal 140 and the sealing tape 141, the above-described urging force F21 by the cylindrical member 612 and the adhesive force F22 by the sticking surface 141*d* of the sealing tape 141 act on. In this embodiment, against the peeling force F23, the urging force F21 acts on the sealing tape 141, and therefore, the adhesive force F22 can be made small. By making the adhesive force F22 small, the user can easily peel off the sealing tape 141 with a small force, so that usability is improved.

For example, different from this embodiment, in the case where the sealing tape 141 is not urged by the cylindrical member 612 with the urging force F21, there is a need to make the adhesive force F22 larger in order to resist the peeling force F23 so that the sealing tape 141 does not enter the inside of the process cartridge 400B from the toner cartridge 400C. Then, although it is possible to respond to a change in internal pressure of the supplying chamber 430*b* when forgetting to peel off the sealing tape 141, a large force is required when peeling off the sealing tape 141, so that the usability lowers. Further, when a vent is provided in the accommodating portion frame 431 and a filter or the like is provided in the vent, a cost increases.

As described above, in this embodiment, by urging the sealing tape 141 by the cylindrical member 612 with the urging force F21, the usability can be inexpensively improved while responding to the change in internal pressure of the supplying chamber 430*b* when the sealing tape 141 is forgotten to be peeled off. That is, the conventional constitution can be further developed.

In this embodiment, the urging force F21 by the cylindrical member 612 is sufficiently larger than the peeling force F23. When the pump 437*a* is compressed, the internal pressure of the supplying chamber 430*b* increases, and the air in supplying chamber 430*b* tries to escape to the outside. In this embodiment, the sealing tape 141 is stuck to the surface layer 140*a* of the elastic seal 140 on a side far from the accommodating portion frame 431. For this reason, the air in the supplying chamber 430*b* passes through the elastic layer 140*c* of the elastic seal 140 having the air permeability and can escape to the outside of the toner cartridge 400C. By this, the internal pressure of the supplying chamber 430*b* is lowered, and an increase in load of a drive train of the pump/screw drive inputting portion 439, the cam gear 438*b*, and the like for driving the pump 437*a* can be suppressed.

In this embodiment, the sealing tape 141 has no air permeability, but may have the air permeability. For example, the sealing tape 141 is provided with a filter in at least a part of a region overlapping with the through hole 140*d* of the elastic seal 140 as viewed in the Y direction, so that it becomes possible to further lower the internal pressure of the supplying chamber 430*b*. By this, the increase in load of the drive train for driving the pump 437*a* can be further suppressed. The filter is capable of passing the air therethrough, but cannot pass the toner therethrough. Further, it is preferable that the adhesive is not applied to at least a part of the region of the filter overlapping with the through hole 140*d* of the elastic seal 140 as viewed in the Y direction of the filter.

Incidentally, also, to the second embodiment, techniques similar to the techniques of the modified embodiments 1 to 4 of the first embodiment can be applied, and actions and effects thereof are also similar to those described in the modified embodiments 1 to 4 of the first embodiment. In the following, modified embodiments 1 to 4 of the second embodiment will be briefly described.

Modified Embodiment 1 of Second Embodiment

First, a modified embodiment 1 of the second embodiment will be described. Although the elastic seal 140 in the second embodiment has the air permeability and the function of escaping the internal pressure of the supplying chamber 430*b*, an elastic seal according to the modified embodiment 1 does not have the air permeability.

When the pump 437*a* operates without peeling off the sealing tape 141 from the elastic seal in the modified embodiment 1 and the internal pressure of the supplying chamber 430*b* increases, the elastic seal is elastically deformed outward in a radial direction. By this, the internal pressure of the supplying chamber 430*b* can be lowered. That is, even when the elastic seal 187 having no air permeability is used, it is possible to respond to the change internal pressure of the supplying chamber 430*b*.

Modified Embodiment 2 of Second Embodiment

Next, a modified embodiment 2 of the second embodiment will be described with reference to FIG. 72. FIG. 72 is a sectional view showing a toner cartridge 500C according to the modified embodiment 2 of the second embodiment.

In the second embodiment, the sealing tape 141 was directly stuck to the elastic seal 140, but as shown in FIG. 72, the toner cartridge 500C according to the modified embodiment 2 is provided with a plate member 151 as an intermediary member between the elastic seal 140 and the sealing tape 141. Constitutions other than the plate member 151 are similar to those in the second embodiment, and therefore, description thereof will be omitted.

The plate member 151 is provided with a through hole 151*a* for permitting passing of the toner. To the plate member 151, the sticking surface 141*d* of the sealing tape 141 is stuck, and the through hole 151*a* is covered with the sticking surface 141*d*. The plate member 151 is bonded to the surface layer 140*a* of the elastic seal 140 by, for example, the adhesive.

Similarly as in the second embodiment, the sealing tape 141 is urged toward the elastic seal 140 side by the cylindrical member 612 with the urging force F21. For this reason, the sealing tape 141 can decrease the adhesive force between the sticking surface 141*d* of the sealing tape 141 and the plate member 151. Therefore, the usability can be improved. An adhesive strength between the sealing tape 141 and the plate member 151 may preferably be set smaller than an adhesive strength between the elastic seal 140 and the plate member 151 and a breaking strength of the elastic seal 140. By this, when the sealing tape 141 is peeled off from the plate member 151, stress does not readily occur on the elastic seal 87, so that damage on the elastic seal 87 can be reduced.

Modified Embodiment 3 of Second Embodiment

Next, a modified embodiment 3 of the second embodiment will be described with reference to FIG. 31 to part (b) of FIG. 73. FIG. 73 is a sectional view showing a toner cartridge 600C according to the modified embodiment 2 of the second embodiment.

In the second embodiment, the sealing tape 141 was directly stuck to the elastic seal 140, but a sealing tape 241 in the modified embodiment 3 is stuck to the nipping surface 612*b* of the cylindrical member 612. As shown in FIG. 73, a sticking surface 241*d* of the sealing tape 241 is stuck to the nipping surface 612*b* of the cylindrical member 612.

More specifically, the sticking surface 241*d* is peelably stuck to the nipping surface 612*b* so as to cover entirety of the opening 612*a* of the cylindrical member 612. At this time, the sealing tape 241 and the elastic seal 140 are in contact with each other, but are not bonded together or the like, so that these members are movable relative to each other.

Also, in the modified embodiment 3, similarly as in the second embodiment, the sealing tape 241 is nipped at a predetermined nipping pressure between the elastic seal 140 and the cylindrical member 612. That is, it can be said that the elastic seal 140 urges the sealing tape 241 toward the cylindrical member 612 with an urging force F24.

Therefore, an adhesive force of the sealing tape 241 to the cylindrical member 612 can be made small. Further, in the modified embodiment 3, the sealing tape 241 is not stuck to the elastic seal 140, but is stuck to the cylindrical member 612, and therefore, stress does not occur on the elastic seal 140 when the sealing tape 241 is peeled off. For this reason, damage on the elastic seal 140 can be reduced.

Modified Embodiment 4 of Second Embodiment

Next, a modified embodiment 4 of the first embodiment will be described with reference to FIG. 74. FIG. 74 is a sectional view showing a toner cartridge 700C according to the modified embodiment 4 of the second embodiment.

In the second embodiment, the sealing tape 141 was stuck to the elastic seal 140, but a sealing film 341 in the modified embodiment 4 is not stuck to the elastic seal 140 and the cylindrical member 612. That is, as shown in FIG. 74, the sealing film 341 as a sealing member is held by being nipped at a predetermined nipping pressure by the elastic seal 140 and the cylindrical member 612.

Further, the cylindrical member 612 urges the sealing film 341 toward the elastic seal 140 side. During use of the toner cartridge 700C, the user dismounts the sealing film 341 from the toner cartridge 700C by pulling the grip portion 341*c* of the sealing film 341 in the Y2 direction. The sealing film 341 may be detachably fixed to the accommodating portion frame 431 at a part thereof.

The sealing film 341 in the modified embodiment 4 is not stuck to the elastic seal 140, and therefore, when the sealing film 341 is dismounted, stress does not occur on the elastic seal 140. For this reason, damage on the elastic seal 140 can be reduced. Further, for the sealing film 341, bonding, welding, and the like are not needed, and therefore, it is possible to reduce a part cost and a processing cost. Further, the sealing film 341 is not provided with a fold-back portion, and therefore, lengths of the sealing film 341 can be shortened.

Therefore, the user can shorten distances for pulling out the sealing film 341, so that usability can be improved.

Third Embodiment

Next, a third embodiment of the present invention will be described, but the third embodiment illustrates an example of a remanufacturing method of the toner cartridge 13 of the first embodiment. For this reason, constituents similar to those of the first embodiment will be omitted from illustration or will be described by adding the same reference numerals or symbols to the drawings.

Part (a) of FIG. 75 is a perspective sectional view showing a state in which a fresh (new) toner cartridge 13, i.e., an unused toner cartridge 13 is cut in a cross section perpendicular to the Z direction. Part (b) of FIG. 75 is a perspective sectional view showing a state in which a used toner cartridge 13 is cut in the cross section perpendicular to the Z direction.

As shown in part (a) of FIG. 75, the fresh toner cartridge 13 is provided with the inner toner seal 94 as the film member in the supply frame 50. The inner toner seal 94 is constituted by, for example, a resin film. The inner toner seal 94 is fixed to the rotation shaft 53*a* of the stirring member 53 at one end portion thereof. Further, in the fresh toner cartridge 13, the inner toner seal 94 is peelably fixed to an inner surface 50*k* of the container portion 50*a* at the other end portion thereof. The inner surface 50*k* includes peripheral surfaces of an edge portion of a discharge opening 52.

When the toner cartridge 13 is mounted on the apparatus main assembly 100B and then the stirring member 53 is rotated in an arrow H direction by a driving force transmitted from the apparatus main assembly 100B to the drive input gear 59 (see part (a) of FIG. 10), as shown in part (b) of FIG. 75, the inner toner seal 94 is wound up by the rotation shaft 53*a* and the supply stirring sheet 53*b* of the stirring member 53. By this, the inner toner seal 94 is peeled off from the inner surface 50*k* at the other end portion thereof, so that the inner toner seal 94 is in a state in which the inner toner seal 94 and the supply stirring sheet 53*b* at least partially overlap with each other. The inner toner seal 94 is peeled off from the inner surface 50*k*, so that the toner in the toner cartridge 13 is capable of being discharged to the outside through the discharge opening 52.

That is, when the fresh toner cartridge 13 shown in part (a) of FIG. 75 is used, as in the used toner cartridge 13 shown in part (b) of FIG. 75, a state in which the inner toner seal 94 is peeled off from the inner surface 50*k*.

Incidentally, the inner toner seal 94 is stuck to the inner surface 50*k* by an adhesive, welding, or the like and includes an adhesive surface 94*a* at one end portion thereof. Even in a state in which the adhesive surface 94*a* is peeled off from the inner surface 50*k* and the inner toner seal 94 is wound up by the rotation shaft 53*a* and the supply stirring sheet 53*b*, the adhesive or the like remains on the adhesive surface 94*a*, so that the adhesive surface 94*a* has an adhesive force. Further, the adhesive surface 94*a* of the inner toner seal 94 is welded to the inner surface 50*k* by being melted or dissolved by heat or a solvent, a welded layer remains on the adhesive surface 94*a* of the inner toner seal 94 peeled off from the inner surface 50*k*. The welded layer peeled off from the inner surface 50*k* does not have the adhesive force, but a welding trace (mark) of the adhesive surface 94*a* welded or dissolved by the heater or the solvent remains on the welded layer.

In general, in the case where such a used toner cartridge 13 is used again, in order to seal the discharge opening 52 again, there is a need to enable access of the adhesive surface 94*a* of the inner toner seal 94 to the inner surface 50*k* of the container portion 50*a* by performing a step of eliminating welding of the lid portion 50*b* to the container portion 50*a* or perforation processing of the container portion 50*a* or the lid portion 50*b*. Further, in the case where the adhesive force of the adhesive surface 94*a* due to the peeling is not sufficient, there is a need to perform a step of restoring the adhesive force of the adhesive surface 94*a* by exchanging the inner toner seal 94 with a new inner toner seal 94 or by applying an adhesive onto the inner toner seal 94, or the like step. These steps increases in the number thereof, and therefore, a method of simply remanufacturing the used toner cartridge 13 is required.

Therefore, in this embodiment, remanufacturing of the used toner cartridge 13 is realized by sticking the sealing tape 88 described in the first embodiment to the elastic seal 87 provided on an outer surface side of the supply frame 50 while maintaining a state in which the inner toner seal 94 of the used toner cartridge 13 is peeled off (see part (b) of FIG. 75). In the following, steps for remanufacturing the toner cartridge 13 will be described more specifically.

[Disassembling Step]

First, a disassembling step of dismounting the shutter 89 from the supply frame 50 will be described using parts (a) and (b) of FIG. 76. Part (a) of FIG. 76 is a perspective view showing a bottom side of the toner cartridge 13, and part (b) of FIG. 76 is a perspective view showing a state in which the shutter 89 and the shutter spring 90 are dismounted from the supply frame 50.

First, the operator bends (flexes) the retaining portions 89*b*1 and 89*b*2 of the shutter 89 so as to come near to each other in the X direction as shown in part (a) of FIG. 76. By this, the locking of the retaining portions 89*b*1 and 89*b*2 by the locking portions 50*e*1 and 50*e*2 is eliminated. In this state, as shown in part (b) of FIG. 76, the operator moves the shutter 89 in the Z2 direction and dismounts the shutter 89 from the pair of guiding portions 50*d*1 and 50*d*2. After the shutter 89 is dismounted, the operator moves the shutter spring 90 in the Y2 direction and dismounts the shutter spring 90 from the boss 50*f* of the supply frame 50.

The shutter 89 and the shutter spring 90 are dismounted from the supply frame 50, so that a state in which the through hole 87*d* of the elastic seal 87 is exposed to the outside is formed. In the case where deterioration of the elastic seal 87 progresses, a re-sticking step in which the elastic seal 87 which became old is peeled off from the supply frame 50 and then a new elastic seal 87 is stuck to the supply frame 50 may be performed. The re-sticking step is performed after the disassembling step and before a first sealing step described later.

[Cleaning Step]

Next, a cleaning step of cleaning the inside of the supply frame 50 will be described using part (a) of FIG. 77 to part (b) of FIG. 78. Part (a) of FIG. 77 is a perspective view showing the toner cartridge 13, and part (b) of FIG. 77 is a sectional view showing an air circulation path in the toner cartridge 13. Part (a) of FIG. 78 is a perspective view showing a seal member 95, and part (b) of FIG. 78 is a sectional view showing an air circulation path in the toner cartridge 13.

Depending on affinity between the residual toner remaining inside the supply frame 50 and filling toner for being filled newly in the supply frame 50, there is a need to clean the inside of the supply frame 50. Incidentally, even when the residual toner and the filling toner are mixed with each other, if there is no problem in the image forming process, the cleaning step described with reference to part (a) of FIG. 77 to part (b) of FIG. 78 may be omitted.

In the cleaning step, first, the operator perforates the lid portion 50*b* with an air inflow opening 50*m* and an air discharge opening 50*n* by, for example, a drill or the like, as shown in part (a) of FIG. 77. At this time, it should be noted that drilled powder does not enter the inside of the supply frame 50. Then, as shown in part (b) of FIG. 77, the operator causes the air to flow into the supply frame 50 through the air inflow opening 50*m*. By air pressure at this time, the toner deposited on component parts in an inside space, such as the toner accommodating chamber 49 of the supply frame 50 is blown away. Then, the blown toner is discharged together with the air to the outside of the toner cartridge 13 through the air discharge opening 50*n*. Further, the drilled powder entering the inside of the supply frame 50 is also blown away similarly. Arrows shown in part (b) of FIG. 77 are examples of an air path inside the supply frame 50 in the operation in this embodiment.

In this embodiment, the lid portion 50*b* is provided with the air inflow opening 50*m* on a side of the Z2 direction and the air discharge opening 50*n* on a side of the Z1 direction, but the present invention is not limited thereto. For example, a positional relationship between the air inflow opening 50*m* and the air discharge opening 50*n* may be reversed, and the air inflow opening 50*m* and the air discharge opening 50*n* may be provided in the container portion 50*a*.

Next, as shown in part (a) of FIG. 78, the operator sticks the seal member 95 as a second seal member to the lid portion 50*b* so as to seal the air discharge opening 50*n*. In this state, the operator causes the air to flow into the supply frame 50 through the air inflow opening 50*m* as shown in part (b) of FIG. 78. The air discharge opening 50*n* of the lid portion 50*b* is sealed by the seal member 95, and therefore, the discharge opening 52 provided at a lower surface of the supply frame 50 functions as the air discharge opening.

The air flowing into the supply frame 50 through the air inflow opening 50*m* passes through the through hole 87*d* of the discharge opening 52 and the elastic seal 87, and is discharged to the outside of the toner cartridge 13. At this time, the neighborhood of the discharge opening 52 is cleaned by the air, and the toner is discharged together with the air through the through hole 87*d*. Arrows shown in part (b) of FIG. 78 are examples of an air path inside the supply frame 50 in the operation in this embodiment. As described above, the cleaning step includes a first cleaning step of removing the toner remaining in the toner accommodating chamber 49 with the air through the air inflow opening 50*m* and the air discharge opening 50*n*, an air discharge opening sealing step of mounting the seal member 95 to the supply frame 50 so as to seal the air discharge opening 50*n*, and a second cleaning step of cleaning the discharge opening 52 by the air caused to flow into the toner accommodating chamber 49 through the air inflow opening 50*m* and to be discharged through the discharge opening 52 of the supply frame 50.

The cleaning step in this embodiment includes the first cleaning step, the air discharge opening sealing step, and the second cleaning step as described above, but is not limited thereto. For example, in the lid portion 50*b* of the supply frame 50, either one of the air inflow opening 50*m* and the air discharge opening 50*n* are formed, and the first cleaning step and the air discharge opening sealing step may be omitted. That is, in the second cleaning step, the air is caused to flow into the toner accommodating chamber 49 through one hole (opening) formed in the lid portion 50*b*, and the air and the toner are discharged through the discharge opening 52, so that only the second opening step of cleaning the toner accommodating chamber 49 may be performed.

[First Sealing Step]

Next, using parts (a) and (b) of FIG. 79, the first sealing step of sticking the sealing tape 88 to the elastic seal 87 will be described. Part (a) of FIG. 79 is a perspective view showing a state in which the sealing tape 88 is being stuck to the elastic seal 87, and part (b) of FIG. 79 is a perspective view showing a state in which the sealing tape 88 is stuck to the elastic seal 87.

As shown in part (a) of FIG. 79, in the first sealing step, the operator sticks the sticking surface 88*d* of the sealing tape 88 to the surface layer 87*a* of the elastic seal 87. At this time, the sticking surface 88*d* is disposed so as to cover entirety of the through hole 87*d* of the elastic seal 87. As shown in part (b) of FIG. 79, the sealing tape 88 stuck to the elastic seal 87 is folded back in the fold-back portion 88*e*, and the grip portion 88*c* is positioned at a trailing end portion (downstream end portion with respect to the Z2 direction) of the sealing tape 88.

Incidentally, a step of folding back the sealing tape 88 at the fold-back portion 88*e* may be performed during assembling of the shutter spring 90 described later.

[Filling Step]

Next, using FIG. 80, a filling step of filling the toner in the toner accommodating chamber 49 of the supply frame 50 will be described. FIG. 80 is a sectional view showing a cross section including the air inflow opening 50*m*. As shown in FIG. 80, in the filling step, the operator fills the toner in the toner accommodating chamber 49 through the air inflow opening 50*m*.

Here, in the case where if the air cannot escape from the elastic seal 87 to the outside of the toner cartridge 13, the air escapes from the air inflow opening 50*m* used as a toner filling opening. Then, the toner is jetted together with the air from the air inflow opening 50*m*, so that contamination of the outside of the supply frame 50 with the toner occurs or useless toner occurs. In order to suppress the jet of the toner from the air inflow opening 50*m*, there is a need to fill the toner little by little through the air inflow opening 50*m*, so that it takes time to fill the toner.

In this embodiment, in the above-described first step, the through hole 87*d* of the elastic seal 87 is covered with the sealing tape 88 having no air permeability. For this reason, the air inside the supply frame 50 passes through the elastic layer 87*c* of the elastic seal 87 having the air permeability and thus can escape to the outside of the toner cartridge 13. By this, the toner can be filled in the supply frame 50 through the air inflow opening 50*m* while satisfactory lowering the interval pressure of the supply frame 50, so that the filling of the toner can be performed in a short time.

[Second Sealing Step]

Next, using parts (a) and (b) of FIG. 81, a second sealing step of sealing the air inflow opening 50*m* with a seal member 96 will be described. Part (a) of FIG. 81 is a perspective view showing the air inflow opening 50*m*, and part (b) of FIG. 81 is a perspective view showing a state in which the air inflow opening 50*m* is sealed by the seal member 96.

As shown in parts (a) and (b) of FIG. 81, after the above-described filling step is completed, the operator seals the air inflow opening 50*m*, used as the toner filling opening, by the seal member 96 as a first seal member. By this, it is possible to suppress that the toner filled in the supply frame 50 is leaked to the outside of the supply frame 50.

[Assembling Step]

Next, using FIGS. 82 and 83, an assembling step of assembling the shutter 89 and the shutter spring 90 to the supply frame 50 will be described. FIG. 82 is a perspective view showing a state in which the shutter 89 and the shutter spring 90 are being assembled to the supply frame 50. FIG. 83 is a perspective view showing a state in which the shutter 89 and the shutter spring 90 are assembled to the supply frame 50.

In the assembling step, as shown in FIG. 82, the operator inserts the boss 50*f* of the supply frame 50 into the coil portion 90*a* of the shutter spring 90. The operator locks the one end portion 90*b* of the shutter spring 90 mounted to the boss 50*f* to the spring hooking portion 50*g* provided on the supply frame 50.

Then, the operator inserts the shutter 89 to between the pair of guide portions 50*d*1 and 50*d*2 in the Z1 direction. At this time, the shutter 89 is inserted so as to pass through below the grip portion 88*c* of the sealing tape 88. Then, the retaining portions 89*b*1 and 89*b*2 of the shutter 89 pass through the guide portions 50*d*1 and 50*d*2 and are locked by the locking portions 50*e*1 and 50*e*2 of the guide portions 50*d*1 and 50*d*2, respectively, as shown in FIG. 83, the operator locks the other end portion 90*c* of the shutter spring 90 to the spring hooking portion 89*c* of the shutter 89. The shutter 89 is urged in the Z1 direction by the shutter spring 90, but is positioned in the closed position by locking between the retaining portions 89*b*1 and 89*b*2 and the locking portions 50*e*1 and 50*e*2.

As described above, the operator performs the operations in the order of the disassembling step, the cleaning step, the first sealing step, the filling step, the second sealing step, and the assembling step, so that the used toner cartridge 13 can be remanufactured as a newly usable toner cartridge 13. In this embodiment, the discharge opening 52 of the supply frame 50 is externally sealed by the sealing tape 88 without performing re-sticking the inner toner seal 94 positioned inside the supply frame 50. For this reason, it is possible to remanufacture the toner cartridge 13 simply without dismounting the lid portion 50*b* from the container portion 50*a*, for example. Incidentally, in the remanufactured toner cartridge 13, the inner toner seal 94 still exists inside the supply frame 50.

Further, in this embodiment, the mounting and the dismounting of the peripheral parts of the shutter 89 were described, but other parts, for example, the side cover 62, the pump 58, and the drive trail or the like for driving the pump 58 may be exchanged.

Further, also, in this embodiment, techniques similar to those in the modified embodiments 1 to 4 of the first embodiment can be applied, and an action and an effect thereof are also similar to those described in the modified embodiments 1 to 4 of the first embodiment.

That is, as described in the modified embodiment 1 of the first embodiment, the elastic seal 87 in the third embodiment may be replaced with an elastic seal having no air permeability. In this case, in order to prevent the air from escaping to the outside from the elastic seal 87, there is a need to fill the toner little by little through the air inflow opening 50*m*, or the like.

Further, as described in the modified embodiment 2 of the first embodiment, between the elastic seal 87 and the sealing tape 88 in the third embodiment, the plate member 92 (see FIG. 29) is provided, and the sealing tape 88 may be stuck to the plate member 92. The sealing tape 88 is stuck to the plate member 92 in the first sealing step.

Further, as described in the modified embodiment 3 of the first embodiment, the sealing tape 88 in the third embodiment may be stuck to the nipping surface 89*a* of the shutter 89. The sticking method and the fold-back method of the sealing tape 88 are as described above in the modified embodiment 3 of the first embodiment.

Further, as described above in the modified embodiment 4 of the first embodiment, instead of the sealing tape 88 in the third embodiment, the sealing film 288 (see part (a) of FIG. 34) may be applied. The sealing film 288 is not stuck to the elastic seal 87 or the shutter 89. Further, instead of the flexible sealing film 288, the sealing member 288A (see part (b) of FIG. 34) formed of a plate-like rigid member may be applied.

Fourth Embodiment

Next, a fourth embodiment of the present invention will be described, but the fourth embodiment illustrates an example of a remanufacturing method of the toner cartridge 400C of the second embodiment. For this reason, constituents similar to those of the second embodiment will be omitted from illustration or will be described by adding the same reference numerals or symbols to the drawings.

Part (a) of FIG. 84 is a perspective sectional view showing a state in which a fresh (new) toner cartridge 400C, i.e., an unused toner cartridge 400C is cut in a cross section perpendicular to the Z direction. Part (b) of FIG. 84 is a perspective sectional view showing a state in which a used toner cartridge 400C is cut in the cross section perpendicular to the Z direction.

As shown in part (a) of FIG. 84, the fresh toner cartridge 400C is provided with the inner toner seal 494 and the toner accommodating portion stirring and feeding unit 436 in the toner accommodating portion 430. The toner accommodating portion stirring and feeding unit 436 includes a stirring shaft 436*a* as a rotation shaft rotatably supported by the toner accommodating portion 430 and a stirring sheet 436*b* for stirring the toner inside the toner accommodating portion 430 by being fixed to the stirring shaft 436*a* and being rotated together with the stirring shaft 436*a*. The inner toner seal 494 as the film member is constituted by, for example, a resin film. The inner toner seal 494 is fixed to the stirring shaft 436*a* of the toner accommodating portion stirring and feeding unit 436 at one end portion thereof. Further, in the fresh toner cartridge 400C, the inner toner seal 494 is peelably fixed to an inner surface 431*k* of the accommodating portion frame 431 at the other end portion thereof. The inner surface 431*k* includes peripheral surfaces of an edge portion of a discharge opening 431*a*.

When the toner cartridge 400C is mounted on the printer main assembly 400A and the process cartridge 400B and then the toner accommodating portion stirring and feeding unit 436 is rotated in an arrow K1 direction by a driving force transmitted from the printer main assembly 400A to the stirring drive input portion 438 (see FIG. 45), as shown in part (b) of FIG. 84, the inner toner seal 494 is wound up by the stirring shaft 436*a* and the stirring sheet 436*b* of the stirring member 53. By this, the inner toner seal 494 is peeled off from the inner surface 431*k* at the other end portion thereof, so that the inner toner seal 494 is in a state in which the inner toner seal 494 and the stirring sheet 436*b* overlap with each other. The inner toner seal 494 is peeled off from the inner surface 431*k*, so that the toner in the toner cartridge 400C is capable of being discharged to the outside through the discharge opening 431*a*.

That is, when the fresh toner cartridge 400C shown in part (a) of FIG. 84 is used, as in the used toner cartridge 400C shown in part (b) of FIG. 84, a state in which the inner toner seal 494 is peeled off from the inner surface 431*k*.

Incidentally, the inner toner seal 494 is stuck to the inner surface 431*k* by an adhesive, welding, or the like and includes an adhesive surface 494*a* at one end portion thereof. Even in a state in which the adhesive surface 494*a* is peeled off from the inner surface 431*k* and the inner toner seal 494 is wound up by the stirring shaft 436*a* and the stirring sheet 436*b*, the adhesive or the like remains on the adhesive surface 494*a*, so that the adhesive surface 494*a* has an adhesive force. Further, the adhesive surface 494*a* of the inner toner seal 494 is welded to the inner surface 431*k* by being melted or dissolved by heat or a solvent, a welded layer remains on the adhesive surface 494*a* of the inner toner seal 494 peeled off from the inner surface 431*k*. The welded layer peeled off from the inner surface 431*k* does not have the adhesive force, but a welding trace (mark) of the adhesive surface 494*a* welded or dissolved by the heater or the solvent remains on the welded layer.

In general, in the case where such a used toner cartridge 400C is used again, in order to seal the discharge opening 431*a* again, there is a need to enable access of the adhesive surface 494*a* of the inner toner seal 494 to the inner surface 431*k* of the accommodating portion frame 431 by performing a step of eliminating welding of the accommodating portion lid 432 to the accommodating portion frame 431 or perforation processing of the accommodating portion frame 431 or the accommodating portion lid 432. Further, in the case where the adhesive force of the adhesive surface 94*a* due to the peeling is not sufficient, there is a need to perform a step of restoring the adhesive force of the adhesive surface 494*a* by exchanging the inner toner seal 494 with a new inner toner seal 494 or by applying an adhesive onto the inner toner seal 494, or the like step. These steps increases in the number thereof, and therefore, a method of simply remanufacturing the used toner cartridge 400C is required.

Therefore, in this embodiment, remanufacturing of the used toner cartridge 400C is realized by sticking the sealing tape 141 described in the third embodiment to the elastic seal 140 provided on an outer surface side of the toner accommodating portion 430 while maintaining a state in which the inner toner seal 494 of the used toner cartridge 400C is peeled off (see part (b) of FIG. 84). In the following, steps for remanufacturing the toner cartridge 400C will be described more specifically.

[First Disassembling Step]

First, using parts (a) to (c) of FIG. 85, a first disassembling step of disassembling the shutter unit 480 from the accommodating portion frame 431 will be described. Part (a) of FIG. 85 is a perspective view showing the toner cartridge 400C in a state in which the shutter unit 480 is assembled to the toner cartridge 400C, and part (b) of FIG. 85 is a perspective view showing a state in which the screws 150 are dismounted from the accommodating portion frame 431. Part (c) of FIG. 85 is a perspective view showing a state in which the shutter unit 480 is dismounted from the accommodating portion frame 431.

First, as shown in parts (a) and (b) of FIG. 85, the operator dismounts the two screws 150, co-fastening the shutter frame 610 of the shutter unit 480, from the accommodating portion frame 431.

Further, as shown in part (c) of FIG. 85, the operator dismounts the shutter unit 480 from the accommodating portion frame 431.

The shutter unit 480 is dismounted from the accommodating portion frame 431, so that a state in which the through hole 140*d* of the elastic seal 140 is exposed to the outside is formed. In the case where deterioration of the elastic seal 140 progresses, the old elastic seal 140 may be replaced with a new elastic seal. That is, a re-sticking step in which the elastic seal 140 which became old is peeled off from the accommodating portion frame 431 and then a new elastic seal 140 is stuck to the accommodating portion frame 431 may be performed. The re-sticking step is performed after the first disassembling step and before a first sealing step described later.

[Second Disassembling Step]

Next, using parts (a) to (c) of FIG. 86, a second disassembling step of disassembling the residual toner accommodating portion 440 from the accommodating portion frame 431 will be described. Part (a) of FIG. 86 is a side view showing the toner cartridge 400C in a state in which the residual toner accommodating portion 440 is assembled to the toner cartridge 400C, and part (b) of FIG. 86 is a perspective view showing a state in which screws 152 are dismounted from the accommodating portion frame 431. Part (c) of FIG. 86 is a perspective view showing a state in which the residual toner accommodating portion 440 is dismounted from the accommodating portion frame 431.

As in this embodiment, in the case where the residual toner accommodating portion 440 for collecting the residual toner is provided to the toner cartridge 400C, there is a need to exchange or clean the residual toner accommodating portion 440 as desired. The residual toner accommodating portion 440 is fixed to the accommodating portion frame 431 with the two screws 152 as shown in part (a) of FIG. 96.

In the second disassembling step, as shown in parts (a) and (b) of FIG. 86, the operator dismounts the two screws 152, co-fastening the residual toner accommodating portion 440, from the accommodating portion frame 431.

Further, as shown in part (c) of FIG. 86, the operator dismounts the residual toner accommodating portion 440 from the accommodating portion frame 431 in the Z2 direction. Incidentally, a disassembling direction of the residual toner accommodating portion 440 itself is the X direction and the Y direction which are perpendicular to the Z direction. For this reason, when the residual toner accommodating portion 440 is dismounted from the accommodating portion frame 431 in the Z2 direction, it is possible to suppress that the residual toner accommodating portion 440 is disassembled.

[Cleaning Step]

Next, a cleaning step of cleaning the inside of the toner accommodating portion 430 will be described using part (a) of FIG. 87 to part (b) of FIG. 88. Part (a) of FIG. 87 is a perspective view showing the toner cartridge 400C, and part (b) of FIG. 87 is a sectional view showing an air circulation path in the toner cartridge 400C. Part (a) of FIG. 88 is a perspective view showing a seal member 495, and part (b) of FIG. 88 is a partial sectional view showing the toner cartridge 400C in a state in which an air discharge opening 431*n* is sealed by a seal member 495.

Depending on affinity between the residual toner remaining inside the toner accommodating portion 430 and filling toner for being filled newly in the toner accommodating portion 430, there is a need to clean the inside of the toner accommodating portion 430. Incidentally, even when the residual toner and the filling toner are mixed with each other, if there is no problem in the image forming process, the cleaning step described with reference to part (a) of FIG. 87 to part (b) of FIG. 88 may be omitted.

In the cleaning step, first, the operator perforates a side surface 431*j* of the accommodating portion frame 431 of the toner accommodating portion 430 with an air inflow opening 431*m* and an air discharge opening 431*n* by, for example, a drill or the like, as shown in part (a) of FIG. 87. At this time, it should be noted that drilled powder does not enter the inside of the accommodating portion frame 431. Then, as shown in part (b) of FIG. 87, the operator causes the air to flow into the supply frame 50 through the air inflow opening 431*m*. By air pressure at this time, the toner deposited on component parts in an inside space, such as the toner accommodating chamber 430*a* of the toner accommodating portion 430 is blown away. Then, the blown toner is discharged together with the air to the outside of the toner cartridge 400C through the air discharge opening 431*n*. Further, the drilled powder entering the inside of the accommodating portion frame 431 is also blown away similarly. Arrows shown in part (b) of FIG. 87 are examples of an air path inside the supply frame 50 in the operation in this embodiment.

In this embodiment, the accommodating portion frame 431 is provided with the air inflow opening 431*m* on a side of the Z2 direction and the air discharge opening 431*n* on a side of the Z1 direction, but the present invention is not limited thereto. For example, a positional relationship between the air inflow opening 431*m* and the air discharge opening 431*n* may be reversed, and the air inflow opening 431*m* and the air discharge opening 431*n* may be provided in the accommodating portion lid 432.

Next, as shown in part (a) of FIG. 88, the operator sticks the seal member 495 as a second seal member to the side surface 431*j* of the accommodating portion frame 431 so as to seal the air discharge opening 431*n*. In this state, the operator causes the air to flow into the toner accommodating portion 430 through the air inflow opening 431*m* as shown in part (b) of FIG. 88. The air discharge opening 431*n* of the accommodating portion frame 431 is sealed by the seal member 495, and therefore, the discharge opening 431*a* provided in the accommodating portion frame 431 functions as the air discharge opening.

The air flowing into the accommodating portion frame 431 through the air inflow opening 431*m* passes through the through hole 140*d* of the discharge opening 431*a* and the elastic seal 140, and is discharged to the outside of the toner cartridge 400C. At this time, the neighborhood of the discharge opening 431*a* is cleaned by the air, and the toner is discharged together with the air through the through hole 140*d*. Arrows shown in part (b) of FIG. 88 are examples of an air path inside the toner accommodating portion 430 in the operation in this embodiment.

[First Sealing Step]

Next, using parts (a) and (b) of FIG. 89, the first sealing step of sticking the sealing tape 141 to the elastic seal 140 will be described. Part (a) of FIG. 89 is a perspective view showing a state in which the sealing tape 141 is being stuck to the elastic seal 140, and part (b) of FIG. 89 is a perspective view showing a state in which the sealing tape 141 is stuck to the elastic seal 140.

As shown in part (a) of FIG. 89, in the first sealing step, the operator sticks the sticking surface 141*d* of the sealing tape 141 to the surface layer 140*a* of the elastic seal 140. At this time, the sticking surface 141*d* is disposed so as to cover entirety of the through hole 140*d* of the elastic seal 140. As shown in part (b) of FIG. 89, the sealing tape 141 stuck to the elastic seal 140 is folded back in the fold-back portion 141*e* and is bent at a bending portion 141*f*, and the grip portion 141*c* is positioned at a trailing end portion (downstream end portion with respect to the Z2 direction) of the sealing tape 141.

Incidentally, a step of folding back the sealing tape 141 at the fold-back portion 141*e* and a step of bending the sealing tape 141 at the bending portion 141*f* may be performed during assembling of the shutter unit 480 described later.

[Filling Step]

Next, using parts (a) and (b) of FIG. 90, a filling step of filling the toner in the toner accommodating chamber 430*a* of the toner accommodating portion 430 will be described. Part (a) of FIG. 90 is a sectional view showing a cross section including the air inflow opening 431*m*, and part (b) of FIG. 90 is a sectional view showing a cross section including the discharge opening 431*a*. As shown in part (a) of FIG. 90, in the filling step, the operator fills the toner in the toner accommodating chamber 430*a* through the air inflow opening 431*m*.

Here, in the case where if the air cannot escape from the elastic seal 140 (see part (b) of FIG. 90) to the outside of the toner cartridge 400C, the air escapes from the air inflow opening 431*m* used as a toner filling opening. Then, the toner is jetted together with the air from the air inflow opening 431*m*, so that contamination of the outside of the toner accommodating portion 430 with the toner occurs or useless toner occurs. In order to suppress the jet of the toner from the air inflow opening 431*m*, there is a need to fill the toner little by little through the air inflow opening 431*m*, so that it takes time to fill the toner.

In this embodiment, as shown in part (b) of FIG. 90, in the above-described first step, the through hole 140*d* of the elastic seal 140 is covered with the sealing tape 141 having no air permeability. For this reason, the air inside the toner accommodating portion 430 passes through the elastic layer 140*c* of the elastic seal 140 having the air permeability and thus can escape to the outside of the toner cartridge 400C. By this, the toner can be filled in the toner accommodating portion 430 through the air inflow opening 431*m* while satisfactory lowering the interval pressure of the toner accommodating portion 430, so that the filling of the toner can be performed in a short time.

[Second Sealing Step]

Next, using parts (a) and (b) of FIG. 91, a second sealing step of sealing the air inflow opening 431*m* with a seal member 496 will be described. Part (a) of FIG. 91 is a perspective view showing the air inflow opening 431*m*, and part (b) of FIG. 91 is a perspective view showing a state in which the air inflow opening 431*m* is sealed by the seal member 496.

As shown in parts (a) and (b) of FIG. 91, after the above-described filling step is completed, the operator seals the air inflow opening 431*m*, used as the toner filling opening, by the seal member 496 as a first seal member. By this, it is possible to prevent that the toner filled in the toner accommodating portion 430 is leaked to the outside of the toner accommodating portion 430.

[First Assembling Step]

Next, using parts (a) and (b) of FIG. 92, a first assembling step of assembling the residual toner accommodating portion 440 to the accommodating portion frame 431. Part (a) of FIG. 92 is an exploded perspective view showing the accommodating portion frame 431 and the residual toner accommodating portion 440, and part (b) of FIG. 92 is a perspective view showing a state in which the residual toner accommodating portion 440 is being fixed to the accommodating portion frame 431 by the screws 152.

In the case where the residual toner accommodating portion 440 is exchanged, to the accommodating portion frame 431, a new residual toner accommodating portion 440 or the residual toner accommodating portion 440 dismounted from the accommodating portion frame 431 in the above-described second disassembling step and then being cleaned is assembled.

The accommodating portion frame 431 is provided with two positioning holes 431*p* (one is not shown) and two screw holes 431*q* in which the screws 152 and threadably engaged. Further, the residual toner accommodating portion frame 441 of the residual toner accommodating portion 440 is provided with two positioning bosses 441*p* and unshown holes through which the screws 152 penetrate. The residual toner accommodating lid 442 is provided with holes 441*g* through which the screws 152 penetrate. The residual toner accommodating portion 440 is positioned to an accommodating portion frame 431 by inserting the two positioning bosses 441*p* into the two positioning holes 431*p* of the accommodating portion frame 431. In this state, the two screws 152 penetrate through the holes of the residual toner accommodating portion frame 441 and the holes 441*g* of the residual toner accommodating lid 442 and are fastened in the screw holes 431*q* of the accommodating portion frame 431, so that the residual toner accommodating portion 440 is fixed to the accommodating portion frame 431.

[Second Assembling Step]

Next, using FIGS. 93 and 94, a second assembling step of assembling the shutter unit 480 to the accommodating portion frame 431 of the toner accommodating portion 430 will be described. FIG. 93 is a perspective view showing a state in which the shutter unit 480 is being assembled to the accommodating portion frame 431. FIG. 94 is a perspective view showing a state in which the shutter unit 480 is assembled to the accommodating portion frame 431.

In the second assembling step, as shown in FIG. 93, the operator positions the shutter unit 480 to the accommodating portion frame 431 by inserting two positioning holes 610*e* of the shutter frame 610 to two positioning bosses 431*g* of the accommodating portion frame 431. In this state, the operator penetrates the screws 150 through holes 610*f* of the shutter frame 610 and further fastens the screws 150 in screw holes 431*h* of the accommodating portion frame 431, so that the shutter unit 480 is fixed to the accommodating portion frame 431.

In a state in which the shutter unit 480 is fixed to the accommodating portion frame 431, the nipping surface 612*b* of the cylindrical member 612 is positioned below the elastic seal 140 through the fold-back sealing tape 141. As shown in FIG. 94, in a state in which the shutter unit 480 is assembled to the accommodating portion frame 431, the grip portion 141*c* of the sealing tape 141 is exposed to the outside of the toner cartridge 400C.

As described above, the operator performs the operations in the order of the first disassembling step, the second disassembling step, the cleaning step, the first sealing step, the filling step, the second sealing step, the first assembling step, and the second assembling step, so that the used toner cartridge 400C can be remanufactured as a newly usable toner cartridge 400C. In this embodiment, the discharge opening 431*a* of the accommodating portion frame 431 is externally sealed by the sealing tape 141 without performing re-sticking the inner toner seal 494 positioned inside the toner accommodating portion 430. For this reason, it is possible to remanufacture the toner cartridge 400C simply without dismounting the accommodating portion lid 432 from the accommodating portion frame 431, for example. Incidentally, in the remanufactured toner cartridge 400C, the inner toner seal 494 still exists inside the toner accommodating portion 430.

Further, in this embodiment, the mounting and the dismounting of the shutter unit 480 and the residual toner accommodating portion 440 were described, but other parts, for example, the driving-side toner cartridge side cover 450, the pump 437*a*, and the drive trail or the like for driving the pump 437*a* may be exchanged.

Further, also, in this embodiment, techniques similar to those in the modified embodiments 1 to 4 of the second embodiment can be applied, and an action and an effect thereof are also similar to those described in the modified embodiments 1 to 4 of the second embodiment.

That is, as described in the modified embodiment 1 of the second embodiment, the elastic seal 140 in the fourth embodiment may be replaced with an elastic seal having no air permeability. In this case, in order to prevent the air from escaping to the outside from the elastic seal 140, there is a need to fill the toner little by little through the air inflow opening 431*m*, or the like.

Further, as described in the modified embodiment 2 of the second embodiment, between the elastic seal 140 and the sealing tape 141 in the fourth embodiment, the plate member 151 (see FIG. 72) is provided, and the sealing tape 141 may be stuck to the plate member 151. The sealing tape 141 is stuck to the plate member 151 in the first sealing step.

Further, as described in the modified embodiment 3 of the second embodiment, the sealing tape 141 in the fourth embodiment may be stuck to the nipping surface 612*b* of the cylindrical member 612. The sticking method and the fold-back method of the sealing tape 88 are as described above in the modified embodiment 3 of the second embodiment.

Further, as described above in the modified embodiment 4 of the second embodiment, instead of the sealing tape 141 in the third embodiment, the sealing film 341 (see FIG. 74) may be applied. The sealing film 341 is not stuck to the elastic seal 140 or the cylindrical member 612.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-021184 filed on Feb. 14, 2023, which is hereby incorporated by reference herein in its entirety.

What is claimed is:

1. A toner cartridge for supplying toner to an outside, comprising:

a frame including a toner accommodating chamber configured to accommodate the toner and provided with a discharge opening through which the toner accommodated in the toner accommodating chamber is capable of being discharged;

an elastic seal provided with a through hole and disposed on an outer surface of the frame so that the through hole communicates with the discharge opening;

a pump communicating with the toner accommodating chamber and configured to discharge the toner, accommodated in the toner accommodating chamber, through the discharge opening;

a sealing member capable of taking a sealing state in which the toner discharged through the through hole of the elastic seal is sealed and a discharging state in which the toner discharged through the through hole is discharged through the discharge opening; and a nipping member provided with an opening through which the toner passed through the discharge opening and the through hole is discharged to the outside of the toner cartridge, wherein the nipping member nips the sealing member at a predetermined nipping pressure in cooperation with the elastic seal.

2. The toner cartridge according to claim 1, wherein the elastic seal is compressed between the frame and the sealing member.

3. The toner cartridge according to claim 1, wherein the sealing member has a sticking surface which is peelably stuck to the elastic seal.

4. The toner cartridge according to claim 3, wherein the sticking surface is peelably stuck to the elastic seal so as to cover entirety of the through hole of the elastic seal.

5. The toner cartridge according to claim 3, wherein the sealing member includes a grip portion capable of being gripped by a user and a fold-back portion which is positioned between the sticking surface and the grip portion with respect to a longitudinal direction of the sealing member and at which the sealing member is folded back.

6. The toner cartridge according to claim 5, wherein the grip portion is exposed to the outside of the toner cartridge.

7. The toner cartridge according to claim 1, wherein the elastic seal includes a surface layer to which the sticking surface of the sealing member is stuck and an elastic layer which is stuck to the surface layer and which is elastically deformable, and wherein a peeling strength between the sticking surface of the sealing member and the surface layer is set smaller than a peeling strength between the surface layer and the elastic layer.

8. The toner cartridge according to claim 1, wherein the sealing member has a sticking surface which is peelably stuck to the nipping member.

9. The toner cartridge according to claim 8, wherein the sticking surface is peelably stuck to the nipping member so as to cover entirety of the opening.

10. The toner cartridge according to claim 1, further comprising an intermediary member provided between the elastic seal and the sealing member, wherein the sealing member has a sticking surface which is peelably stuck to the intermediary member.

11. The toner cartridge according to claim 1, wherein the sealing member is held by being nipped between the elastic seal and the nipping member, and wherein the sealing member is not stuck to the elastic seal and the nipping member.

12. The toner cartridge according to claim 1, wherein as viewed in a discharging direction in which the toner is discharged through the discharge opening, the nipping member is movable to a closed position where the opening does not overlap with the through hole of the elastic seal and an open position where the opening overlaps with at least a part of the through hole of the elastic seal, and wherein even when the nipping member is positioned in either one of the closed position and the open position, the sealing member is nipped at the predetermined nipping pressure by the elastic seal and the nipping member.

13. The toner cartridge according to claim 12, wherein the frame includes a restricting portion for restricting separation of the nipping member from the elastic seal with respect to the discharging direction.

14. The toner cartridge according to claim 1, wherein the nipping member is immovably provided to the frame.

15. The toner cartridge according to claim 1, wherein the elastic seal has air permeability.

16. The toner cartridge according to claim 1, wherein the elastic seal does not have air permeability.

17. The toner cartridge according to claim 1, wherein the sealing member is a flexible film.

18. The toner cartridge according to claim 1, wherein the sealing member is a plate-like rigid member.

19. An image forming apparatus comprising:

a toner cartridge according to claim 1; and a main assembly to which the toner cartridge is mountable.

20. The image forming apparatus according to claim 19, wherein the main assembly includes a cartridge provided with a developing roller and includes a supplying portion configured to supply toner, to the cartridge, discharged from the toner cartridge.

21. The image forming apparatus according to claim 19, wherein the discharge opening opens downward in a state in which the toner cartridge is mounted to the main assembly.

* * * * *